Feb. 17, 1953 J. W. GOODERHAM 2,629,016

AUTOMATIC TOLL-TICKETING SYSTEM

Filed June 27, 1942 52 Sheets-Sheet 1

INVENTOR
J. W. GOODERHAM
BY P. C. Smith
ATTORNEY

AUTOMATIC TOLL-TICKETING SYSTEM

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 3

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 10

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 13

INVENTOR
J. W. GOODERHAM
BY P. C. Smith
ATTORNEY

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 15

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY
P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

AUTOMATIC TOLL-TICKETING SYSTEM

Filed June 27, 1942 52 Sheets-Sheet 22

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 23

INVENTOR
J. W. GOODERHAM
BY P. C. Smith
ATTORNEY

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 25

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY
P. C. Smith
ATTORNEY

INVENTOR
J. W. GOODERHAM
BY P. C. Smith
ATTORNEY

AUTOMATIC TOLL-TICKETING SYSTEM

Filed June 27, 1942

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 35

INVENTOR
J. W. GOODERHAM
BY P. C. Smith
ATTORNEY

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 37

INVENTOR
J. W. GOODERHAM
BY P. C. Smith
ATTORNEY

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 39

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 40

INVENTOR
J. W. GOODERHAM
BY P. C. Smith
ATTORNEY

AUTOMATIC TOLL-TICKETING SYSTEM

Filed June 27, 1942

52 Sheets-Sheet 41

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

Feb. 17, 1953 J. W. GOODERHAM 2,629,016

AUTOMATIC TOLL-TICKETING SYSTEM

Filed June 27, 1942 52 Sheets-Sheet 48

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

INVENTOR
J. W. GOODERHAM
BY P. C. Smith
ATTORNEY

AUTOMATIC TOLL-TICKETING SYSTEM

Filed June 27, 1942 52 Sheets-Sheet 52

INVENTOR
J. W. GOODERHAM
BY P. C. Smith
ATTORNEY

Patented Feb. 17, 1953

2,629,016

UNITED STATES PATENT OFFICE 2,629,016

AUTOMATIC TOLL-TICKETING SYSTEM

John W. Gooderham, Larchmont, N. Y., assignor to Bell Telephone Laboratories, Incorporated, New York, N. Y., a corporation of New York Application June 27, 1942, Serial No. 448,782

26 Claims. (Cl. 179—7.1)

This invention relates to a telephone system and more particularly to a system in which it is desirable to register in equipment common to a plurality of subscribers' lines the identity of any one of the lines which may have originated a call.

In the establishment of toll calls in systems equipped with automatic switching mechanism, it is the usual procedure to permit subscribers to obtain access to a toll operator's position by dialing the digit 0 or a suitable code of digits. The toll operator upon answering a call for toll service then secures from the calling subscriber the necessary information for completing the connection and the number of the calling subscriber's line and then proceeds to complete the connection. Since it is necessary to charge a subscriber for each toll call made during a billing period, the toll operator makes out a toll ticket for each completed call, which ticket has thereon the calling subscriber's line number, the number of the line called, the time when the called subscriber answered, the time when the conversation ended and the date. The tickets are then used by the commercial department of the operating company in making out the regular bill for telephone service, the charges for toll calls made by any subscriber during the billing period being computed from the tickets representing the toll calls and these charges are then added to the amount to be charged such subscriber for local service connections.

In order that toll calls may not erroneously be charged to subscribers who have not made such calls, the calling line number given to the toll operator is customarily checked by the toll operator by the application of tone current over the connection established from the line to the operator's position, to a conductor associated with the calling line and by detecting the tone current through the connection of her headset receiver to a number checking multiple of the calling line connected to that conductor. If the subscriber has given his line number correctly to the operator, the tone current will be detected by the operator and she may then make out the ticket.

It has heretofore been proposed to display the number of a calling subscriber's line on a suitable lamp board located at or visible from the toll operator's position, thereby obviating the necessity for the calling subscriber to orally inform the operator as to the identity of his line. It has also been proposed, as disclosed in my application Serial No. 325,342, filed March 22, 1940, to eliminate the services of the toll operator on calls to toll points which are not too remotely removed from the dial switching exchange area by providing facilities for automatically printing on a toll ticket all of the information which may be required for billing purposes; that is, the calling and called subscribers' line identifications, the time and date when the call was made and the elapsed time of the conversation.

It is the object of the present invention to further improve automatic ticketing circuits of the type disclosed in my application hereinbefore referred to whereby an identifying circuit may be used in common by a plurality of office units which are located in the same office building to identify any calling line terminating in any of such office units; whereby the calling subscriber on a party line may be identified and whereby the service class of the calling line may also be identified.

As illustrative of the manner in which this object may be attained, the present invention has been disclosed in connection with a system in which all short haul toll connections to nearby toll points may be established by automatic switching equipment in response to the dialing of called line numbers by a calling subscriber and in which toll tickets for such calls are automatically printed or otherwise made, but it is to be understood that the invention is equally applicable to systems in which all toll connections are established through the services of a toll operator and for which the toll operator makes out toll tickets in the usual manner.

The invention has been illustrated in connection with a telephone system employing step-by-step type switches, but switches of other well-known types could equally well be employed. As illustrated, a subscriber desiring a connection to a line terminating in an office in the nearby toll area, first removes his receiver from the switchhook, whereby an idle line finder paired with a first selector is started in search of the calling line and as soon as the line is found, the usual dial tone is transmitted. Upon hearing the dial tone, the subscriber then proceeds to dial the office code and numerical digits of the wanted line number. In response to the dialing of one or more of the office code digits, the selector switches of a switching train including the first selector switch are operated to extend a connection from the calling line to an idle ticketing trunk accessible from all lines of the office building in which the calling line terminates, over which trunk a connection may be further extended to the office in which the wanted line terminates.

Immediately following the seizure of the trunk, an idle sender common to a plurality of ticketing trunks is associated with this trunk over a trunk finder individual to such sender. The sender is provided with registers for registering the remaining digits of a called line number dialed by the calling subscriber. Since, however, a digit dialed by a calling subscriber might be lost during the time elapsing from the seizure of the trunk and before the idle sender becomes associated with the trunk, the trunk is provided with a digit register for registering the digit dialed following the last code digit dialed to reach the trunk. Since the trunk may be seized in response to the dialing of one, two or three code digits, the register in the trunk may register either the second or third code digit or the thousands numerical digit. As soon as the first digit has been registered in the sender, which digit may be either the third code digit, the thousands digit or the hundreds digit, an idle identifier is associated with the sender over a sender-identifier-connector and the identifier is associated directly with the trunk over a trunk-identifier-connector. Thereupon the identifier reconstructs the office code dialed by the calling subscriber, said code being derived from the trunk or from the trunk and sender, and transmits this code to the sender together with other information necessary for handling the call. During this time the sender also proceeds to test the calling line associated with it over the ticketing trunk and the trunk finder to determine whether a tip or ring party on the calling line is making the call and transfers this information to the identifier. The sender, after registering the called office code information transmitted to it from the identifier and the remaining numerical digits of the called line number, directs the setting of selector switches to extend a connection from the ticketing trunk to the line of the wanted subscriber. Such office code and numerical registrations are also effective to control a printer associated with the automatic ticketing trunk to print on a toll ticket the office code and numerical digits which identify the called line. For controlling the ticket printer in accordance with the office code and numerical digit registrations made in the sender, the sender becomes associated with the trunk over a trunk-sender-connector. The sender also becomes connected over a day and hour connector with a day and hour circuit whereby information concerning the month, day, hour and fraction of the hour when a call is made may be transmitted for printing by the ticket printer.

Forming a part of each identifier are a plurality of detecting circuits and a plurality of register circuits for registering the several elements of the line identification of any calling line number in the calling office, the identification of the calling office unit in cases where the identifier serves a plurality of office units located in the same building and the identification of the class of the calling line. The detecting and registering circuits of all identifiers have common access to a plurality of groups of thousands number indentification circuits serving the office units in the building served by such identifiers, each of which identification circuits has access to the sleeve conductors of all of the thousand lines of the office unit to which it is allocated. All of the identifiers also have common access to a common number and class circuit which is individual to the office building which the identifiers serve. To identify a calling line, the identifier upon its seizure applies an alternating current signal to the sleeve of the ticketing trunk, which is transmitted back over the sleeve circuit established to the trunk from the calling line. The line finder sleeves over any one of which this signal may be transmitted are grouped in accordance with the class of the calling line. The connector sleeves of all subscribers' lines in each office unit are grouped first in thousands groups in accordance with the thousands digit of the directory numbers of the calling lines of the office unit, secondly in hundreds groups in accordance with the hundreds digits of the directory numbers, thirdly in tens groups in accordance with the tens digits of the directory numbers and finally in units in accordance with the units digits of the directory numbers. Each two-party line has a sleeve terminal appearance in connector banks for each of the two subscribers on the line and the connector sleeve conductors of all lines are further grouped in a tip field, a ring field or a denied service field. The connector sleeve conductors representing ring parties of flat rate lines, individual lines and ring and tip parties of message rate lines are grouped in the ring field and the connector sleeve conductors representing tip parties of flat rate lines are grouped in the tip field.

When an identifier seizes the common number and class circuit, the party identification previously made by the sender and registered in the identifier is effective to cause the common number and class circuit to successively associate the tip fields of the groups of thousands number circuits with the detector circuits of the identifier if the party line test is indicative of the fact that a tip party from a flat rate line has initiated the call or to successively associate the ring fields of the several groups of thousands number circuits with the detector circuits if the party line test has indicated that a ring party of a flat rate line or an individual line or either station on a two-party message rate line has initiated the call. The operation of one of the detector circuits during the party field test of any office unit, in response to the presence of the alternating current signal on the secondary winding of one of the thousands transformer coils is effective to cause a registration in the identifier of the thousands line group in which the calling line station is located.

At the same time that the thousands identification is being made, class identification can be made if the class portion of the common number and class circuit is not being used by another identifier. For enabling the class identification to be made, as many transformer coils are provided as there are classes to be identified, the primary windings of each of such transformer coils being connected through resistances and condensers with all of the first selector sleeve conductors apertaining to the allocated class and the secondary windings of such transformer coils being connectable through the connector of the common class and number circuit to detector circuits of the identifier at the time associated with such connector whereby a registration is made of the class of the calling line. The class registration may thus indicate whether the call is being originated by a two-party message rate subscriber, by a coin station, by a local class subscriber or by an operator. If the calling line is one to which automatic ticketing service is denied, its connector sleeve conductor is not connected through the primary windings of hundreds and thousands transformer coils as previously described but is connected through the primary winding of a denied service transformer coil, the secondary winding of which is associable with a detector circuit through the operation of the connector of the common class and number circuit for causing a denied service registration to be made in the associated identifier. In this case the directory number of such line is not identified or registered.

When the thousands group of the identified line has been registered in the identifier and the class identification has been completed, the common number and class circuit will be released and made available for the use of other identifiers. The operation of the thousands group register of the identifier is now instrumental in causing the operation of a thousands connector relay in the thousands number circuit of the calling office unit corresponding to the thousands group in which the calling line station was idenfied, which relay is effective to connect the identifier with the sleeve conductors of the thousand lines of that thousands group. The operation of the thousands group connector relay is also effective after the completion of the hundreds group test to cause the operation of a thousands digit register and an office unit register of the identifier to register the thousands digit and office unit designation of the calling station.

After the operation of the thousands group connector relay, the secondary windings of all of the ten hundreds transformer coils of the calling office unit are associated with the ten detector circuits one of which, corresponding to the hundreds group in which the calling station is located, will respond to the signal current and will cause the registration of the hundreds digit of the directory number of the calling station. When this registration has been completed, that one of ten hundreds connector relays allocated to the operated thousands connector relay corresponding to the hundreds group in which the calling station line is located is operated to extend the connector sleeve conductors of the one hundred lines of that group through contacts of the operated hundreds connector and thousands connector relays to one hundred conductors in each of which a condenser and resistance is serially inserted, which conductors are then connected in groups of ten corresponding to the tens grouping of the calling station line to ground through the primary winding of ten transformer coils. The secondary windings of these tens transformer coils are connectable with the ten detector circuits one of which corresponding to the tens group in which the calling station line is located will respond to the signal current and cause the registration of the tens digit of the directory number of the calling station.

Upon the completion of the tens digit registration, one of ten units connector relays associated with the tens transformer coil corresponding to the tens group in which the calling station line is located, is operated to connect the ten sleeve conductors of such tens group of lines through line test pads to the ten detector circuits one of which, corresponding to the terminal position of the calling station line in the selected tens group, will respond to the signal current and cause the registration of the units digit of the directory number of the calling station.

The office unit, thousands, hundreds, tens and units registrations thus made identify the calling station on a connector terminal or directory number basis and may be employed to light lamps to display the calling line identification or, as disclosed, such registration may be transferred to registers in the sender for controlling the ticket printer of the ticketing trunk to print such calling office unit and line identification digits on the toll ticket.

The invention having been described in a general manner, reference may now be had to the following detailed description thereof taken in connection with the accompanying drawings in which.

Figure 1:
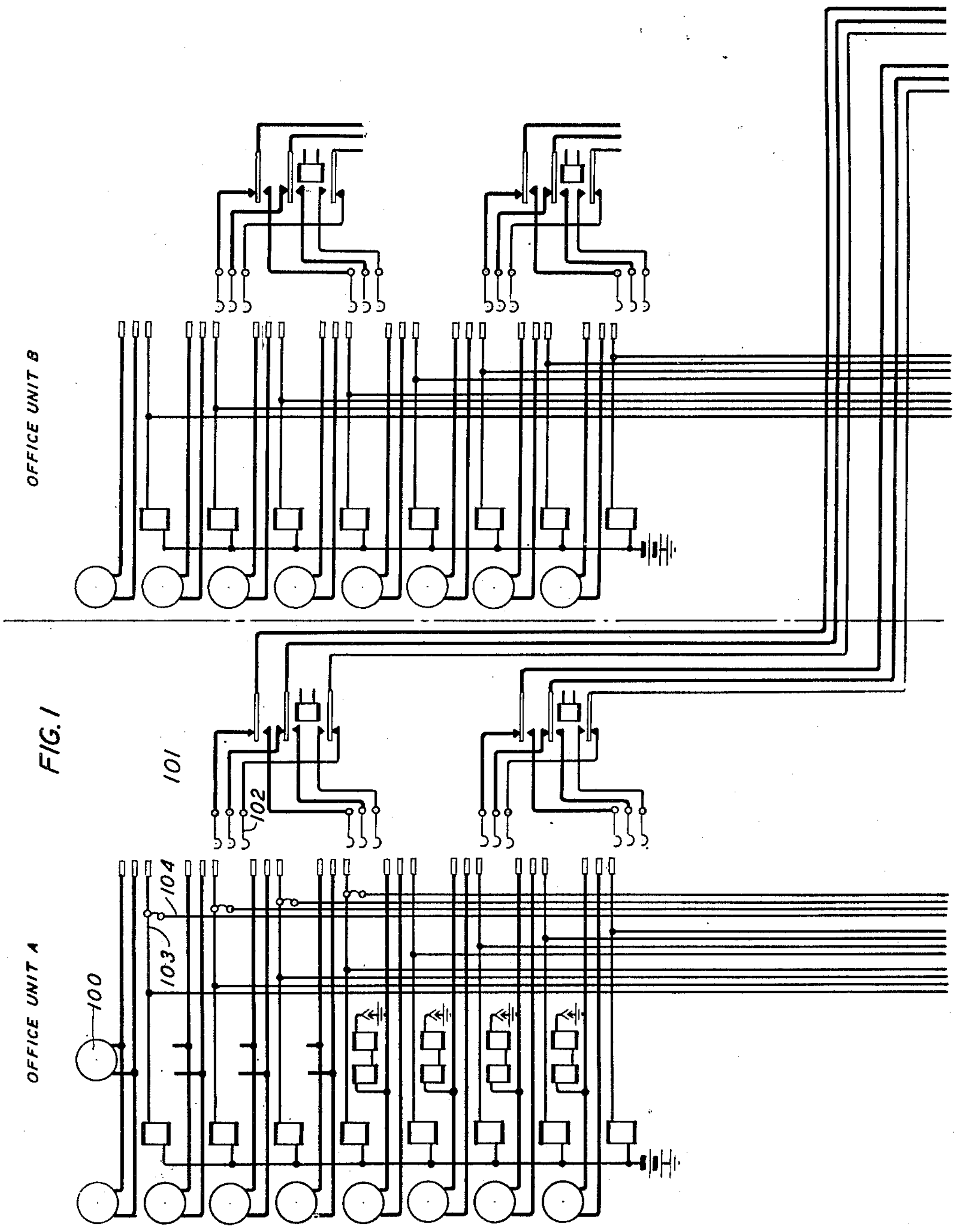
Fig. 1 shows schematically in the left portion thereof a plurality of line finders of one office unit of an office building, each of said line finders serving 200 lines, and a plurality of said lines terminating in different banks and bank levels thereof; in the right portion of this figure is shown a plurality of line finders and lines of a second office unit located in the same building.
Figure 2:
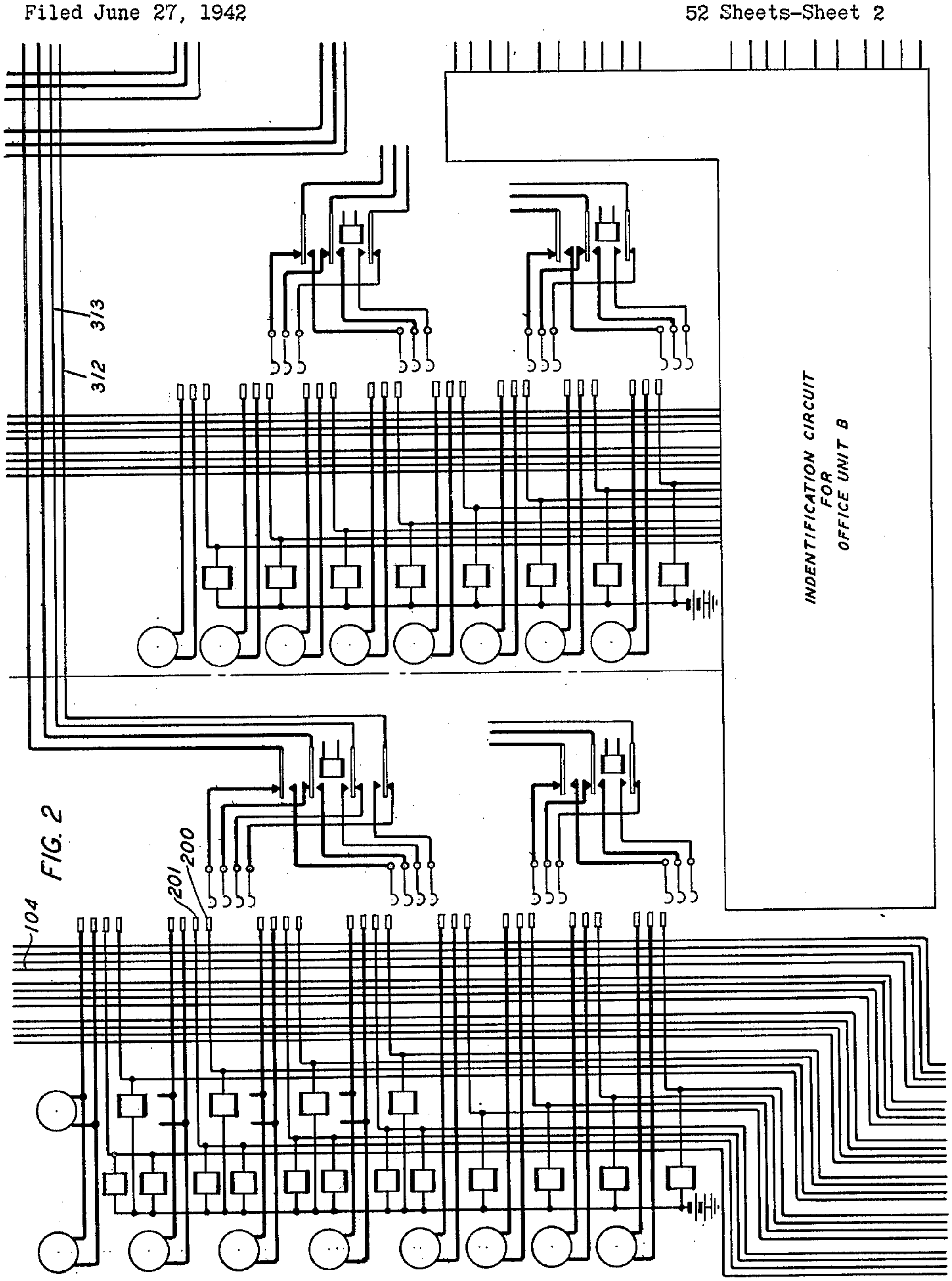
Fig. 2 shows schematically in the left portion thereof a plurality of additional line finders and lines of the first office unit; in the right portion thereof, additional line finders and lines of the second office unit and a box indicative of the thousands number circuits which may be allocated to the second office unit corresponding to the circuits disclosed in Figs. 10 to 12, inclusive.
Figure 3:
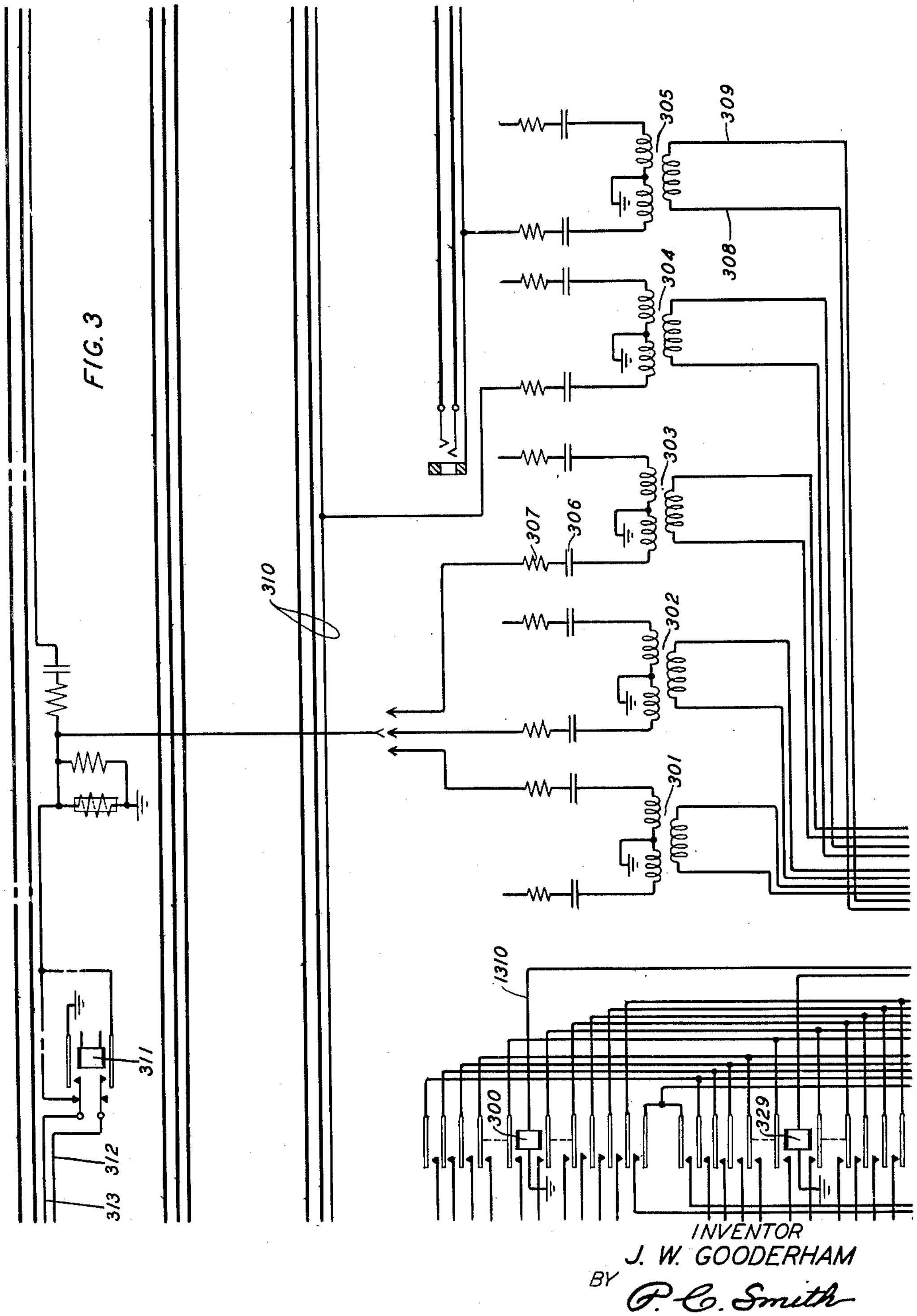
Figure 4:
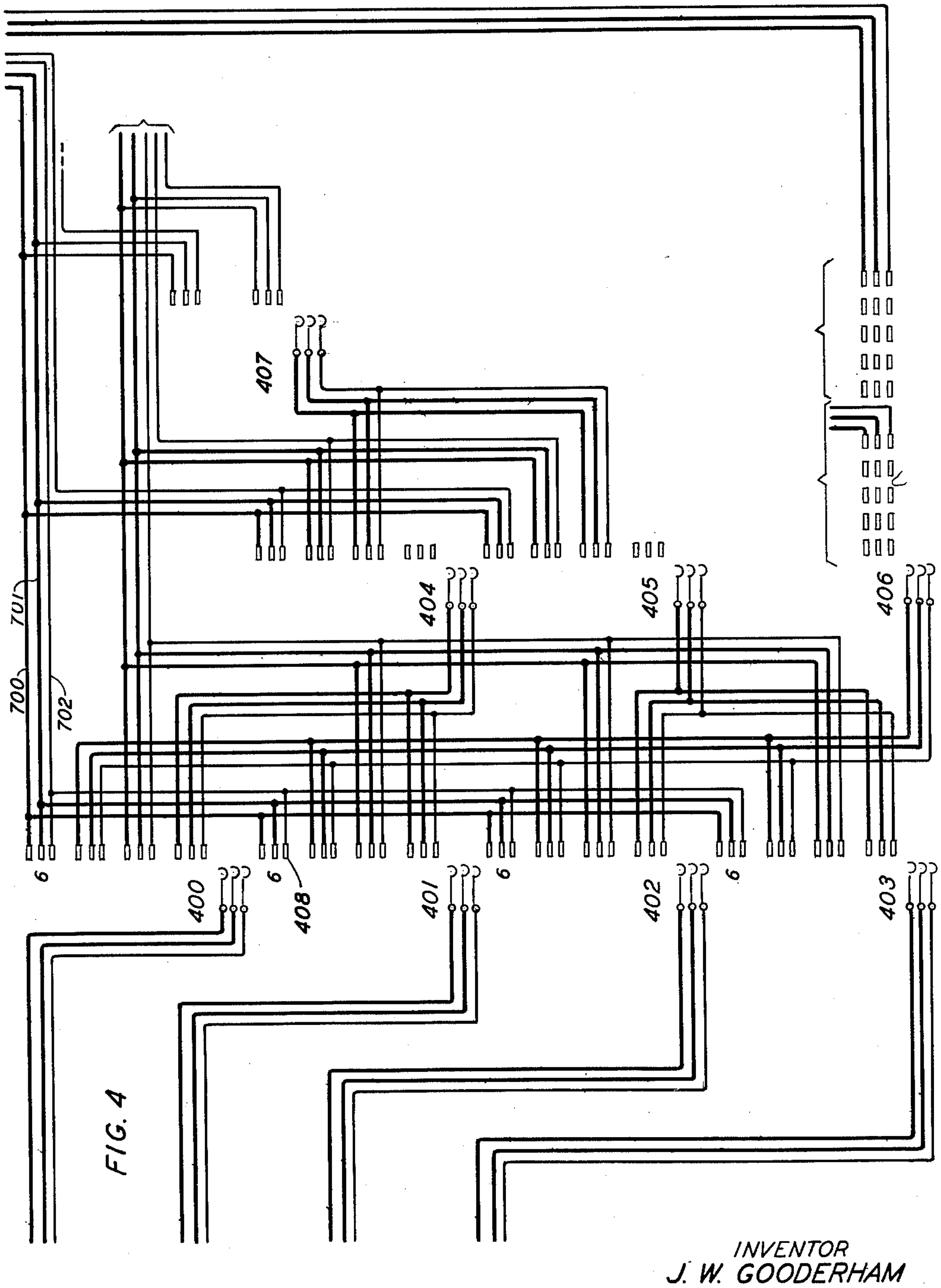
Figure 5:
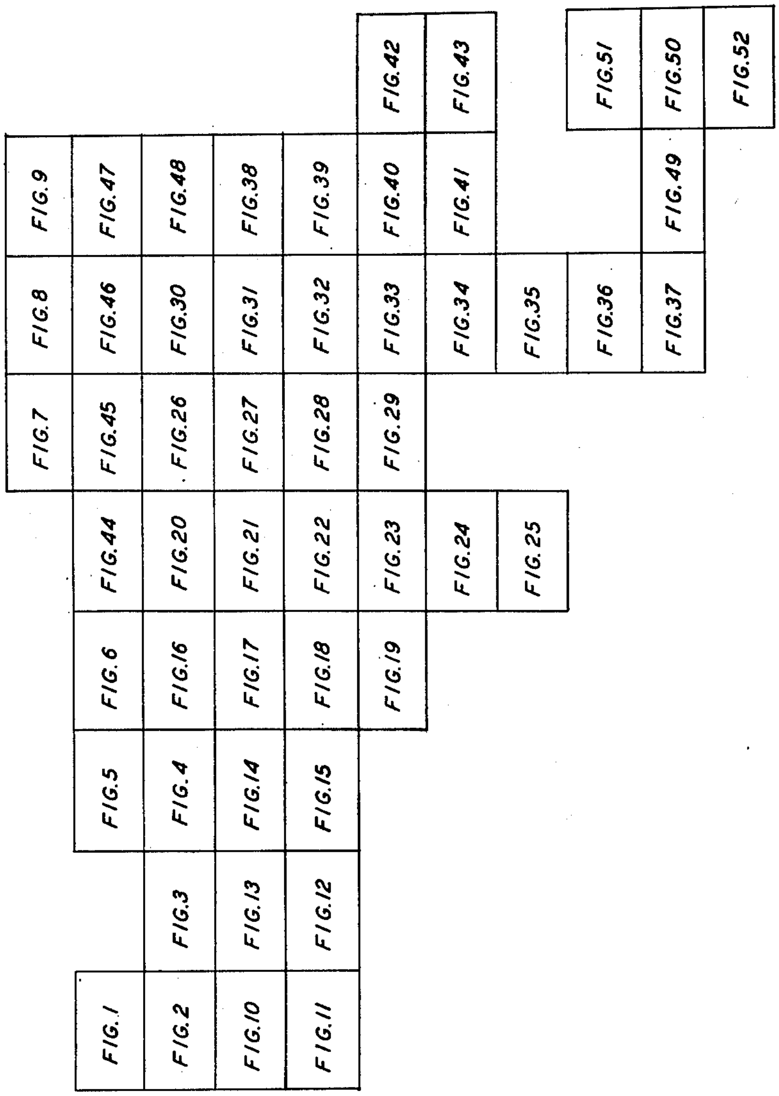
Figure 6:
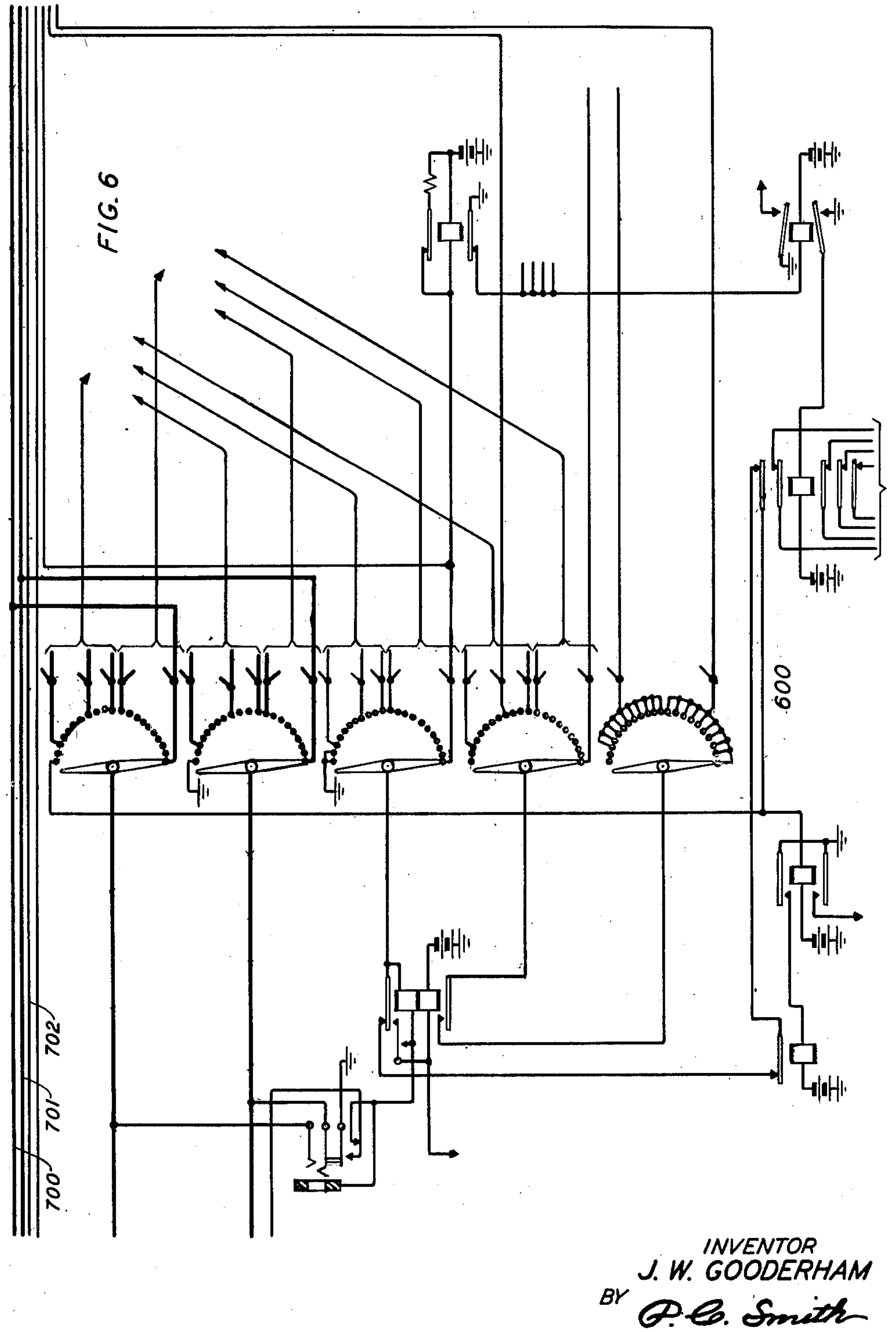
Figure 7:
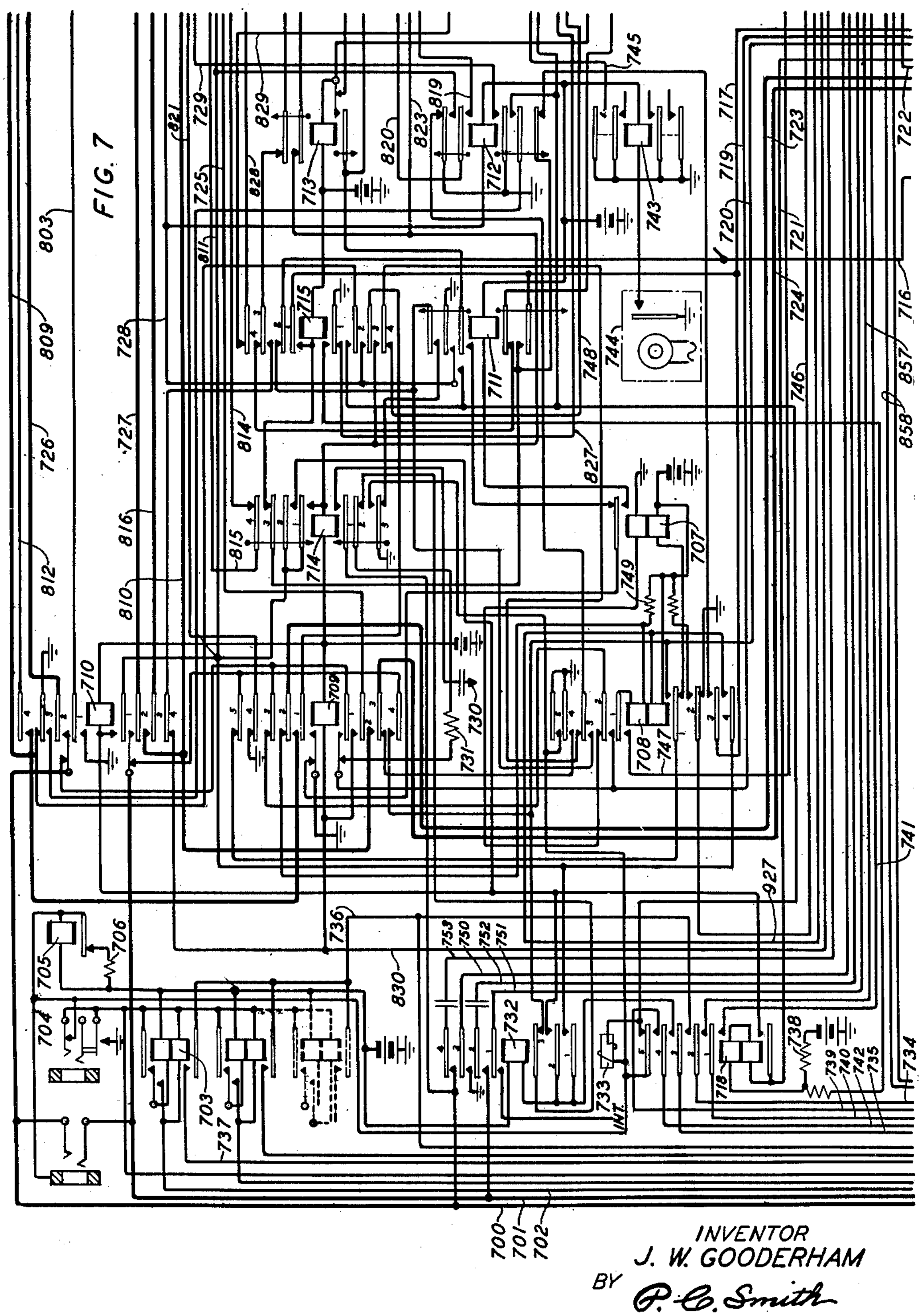
Figure 8:
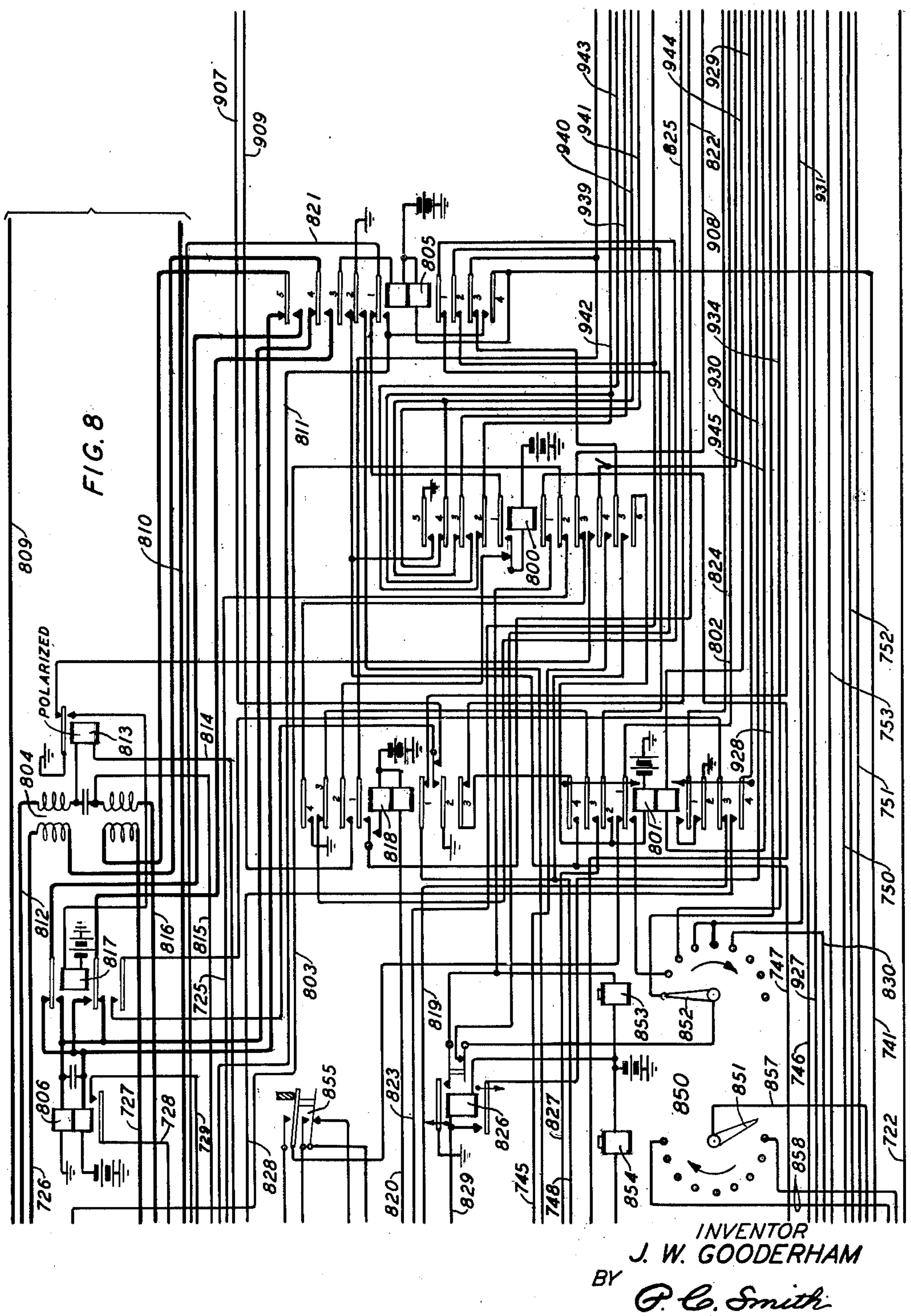
Figure 9:
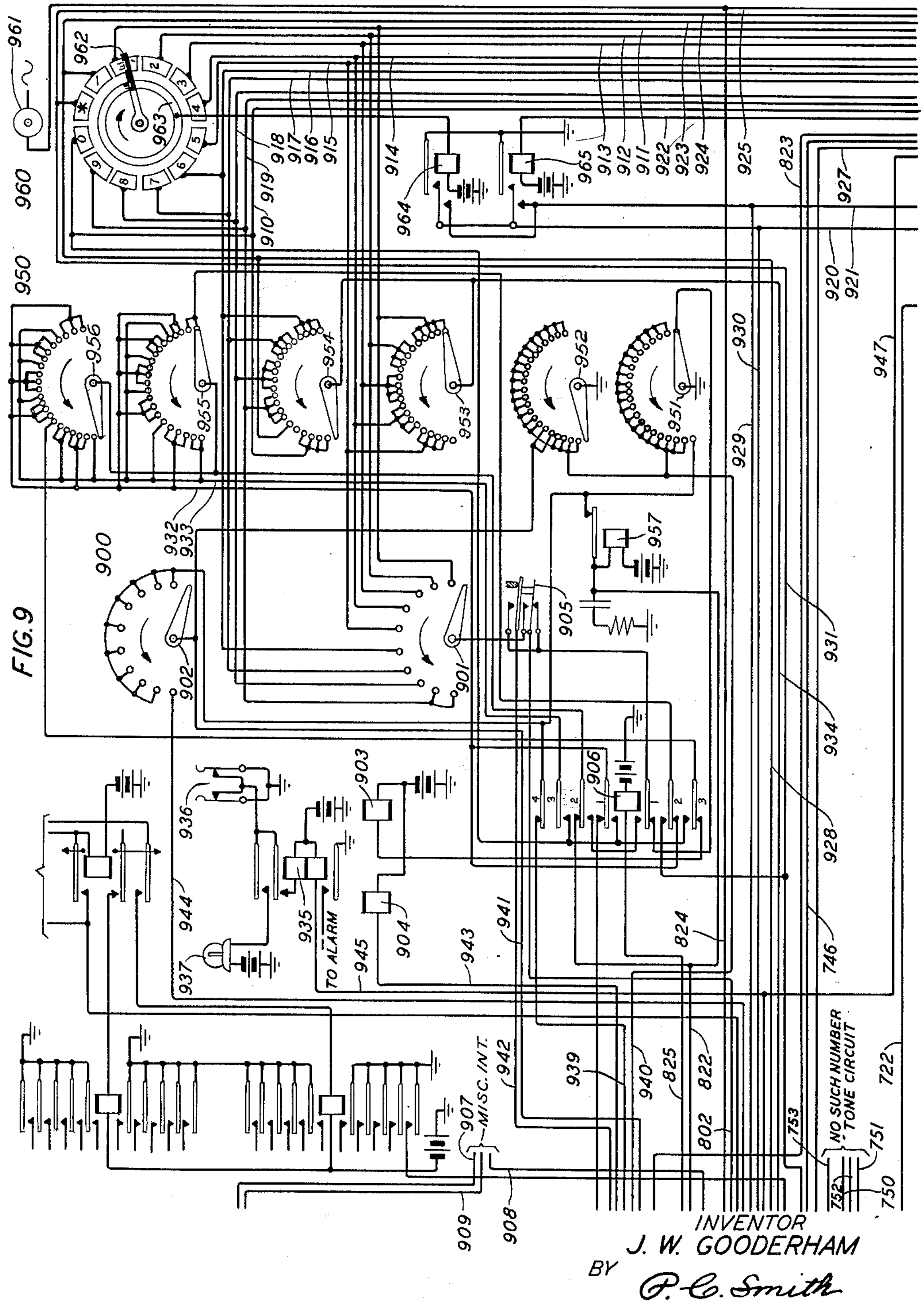
Figure 10:
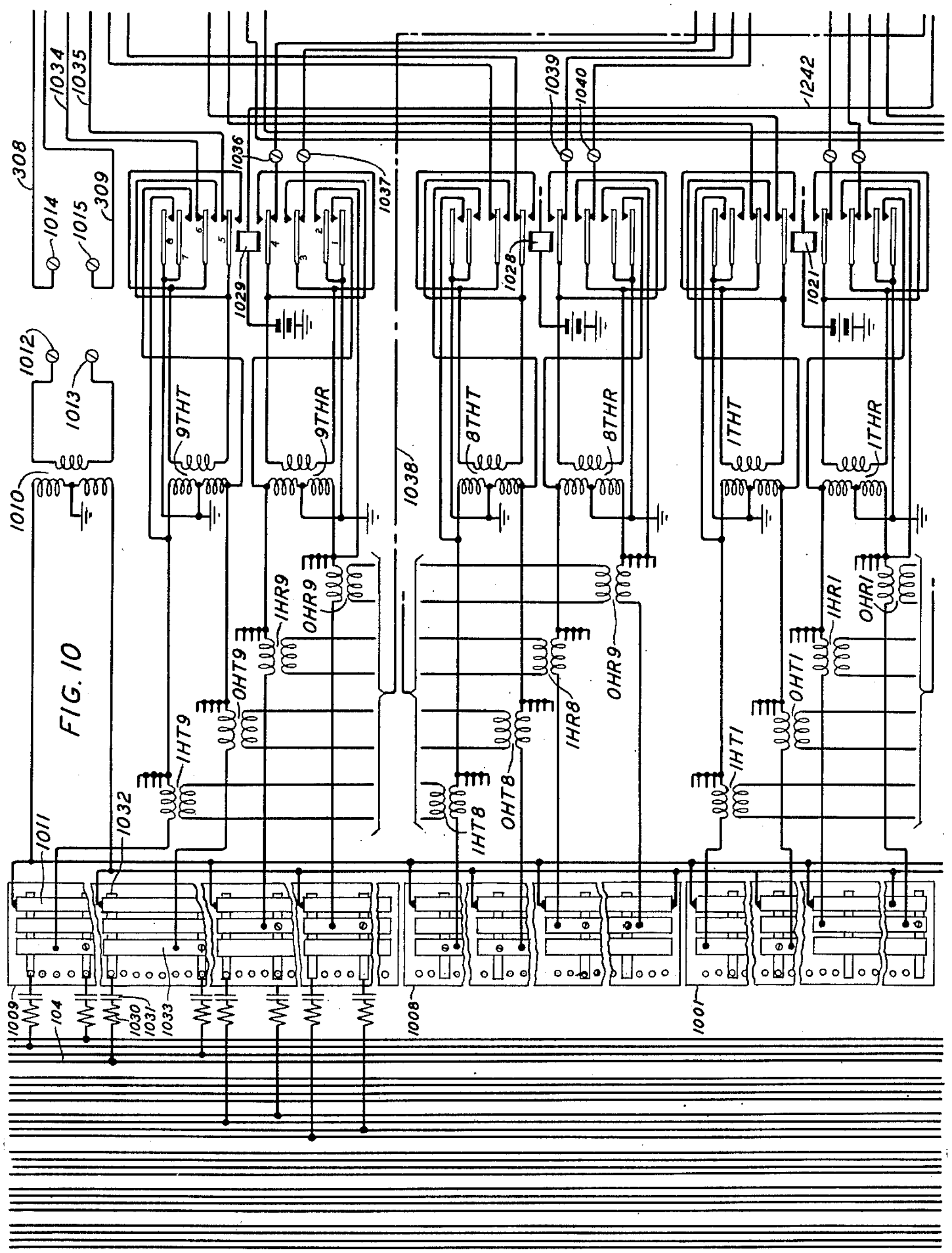
Figure 11:
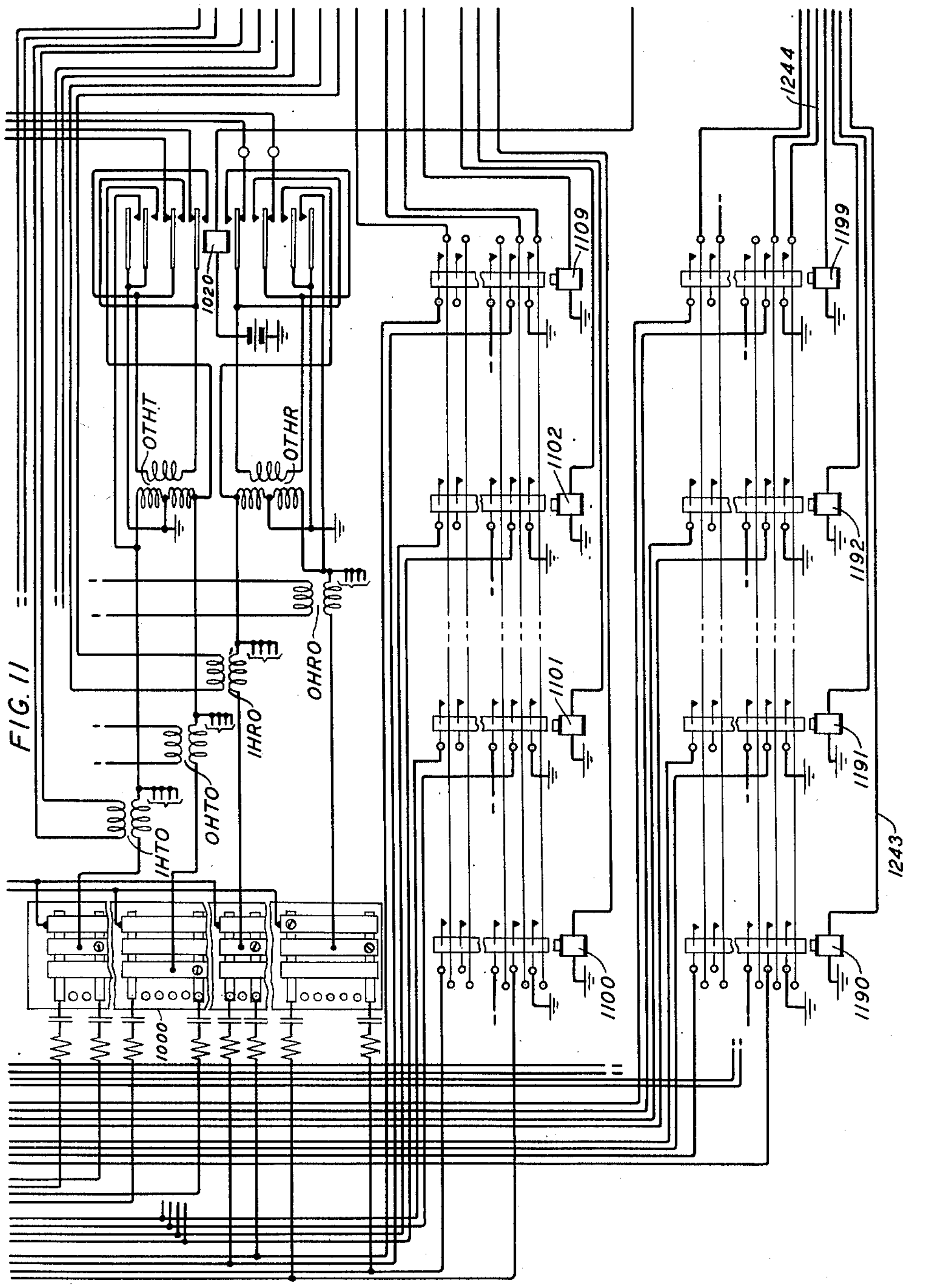
Figure 12:
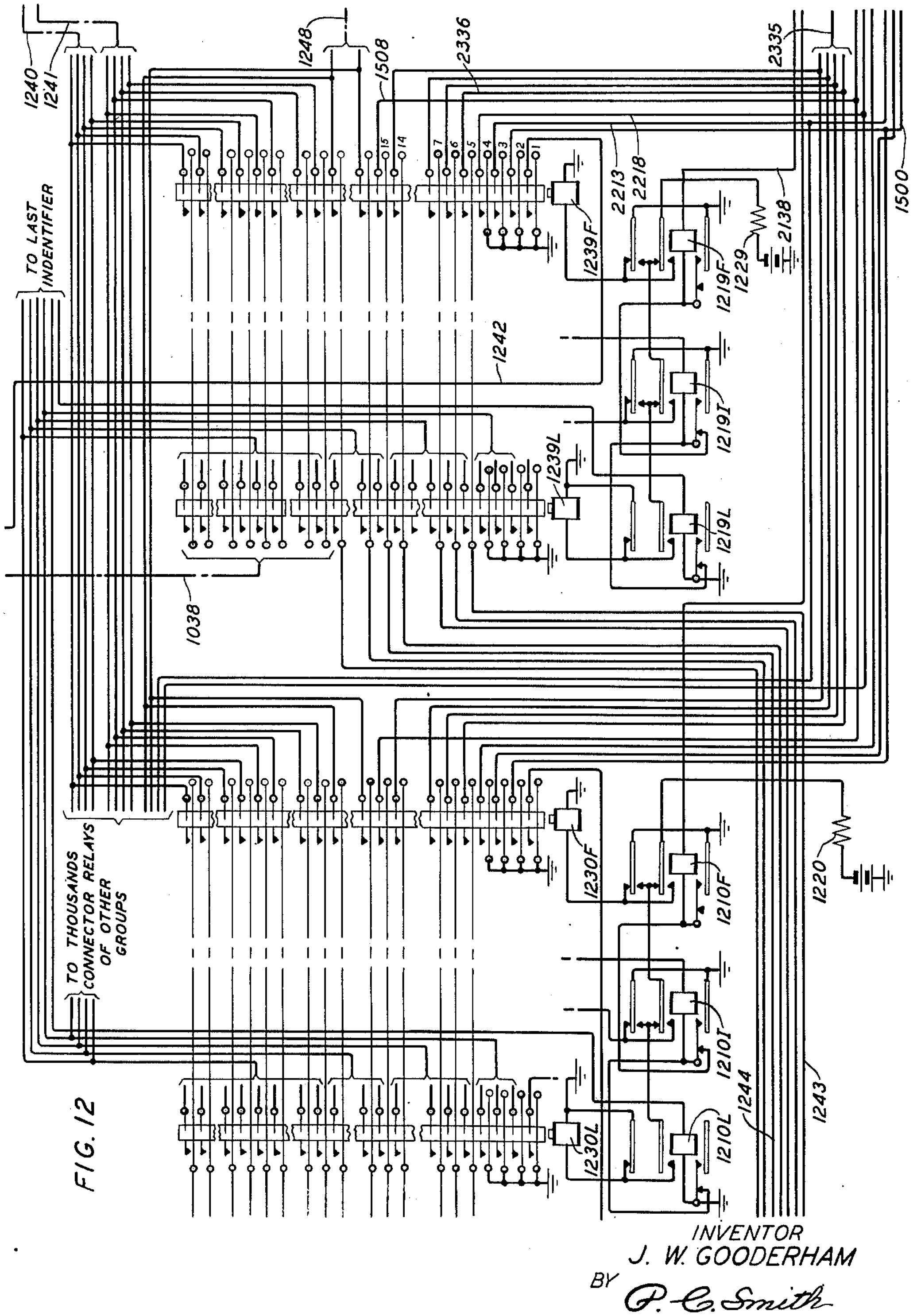
Figure 13:
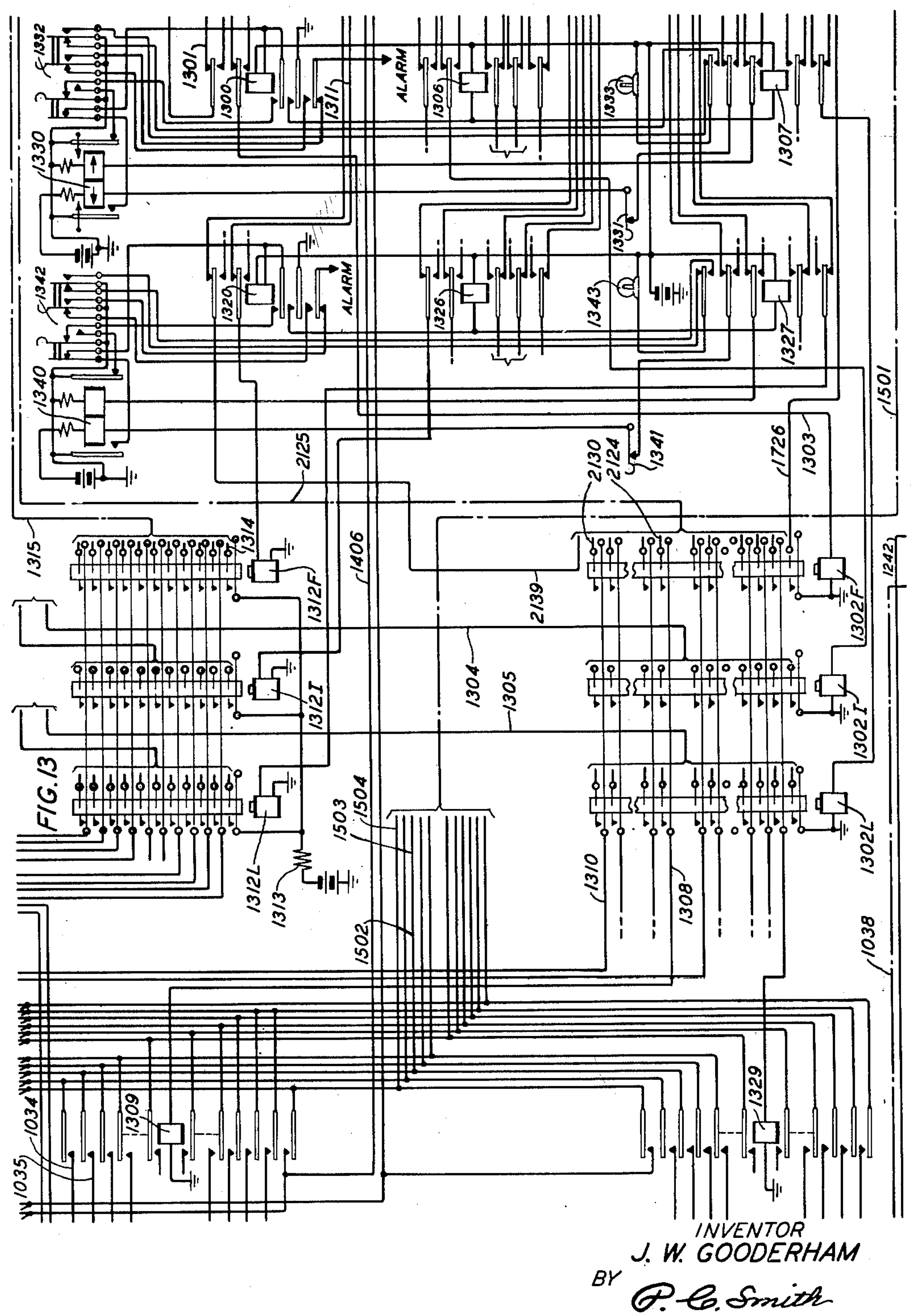
Figure 14:
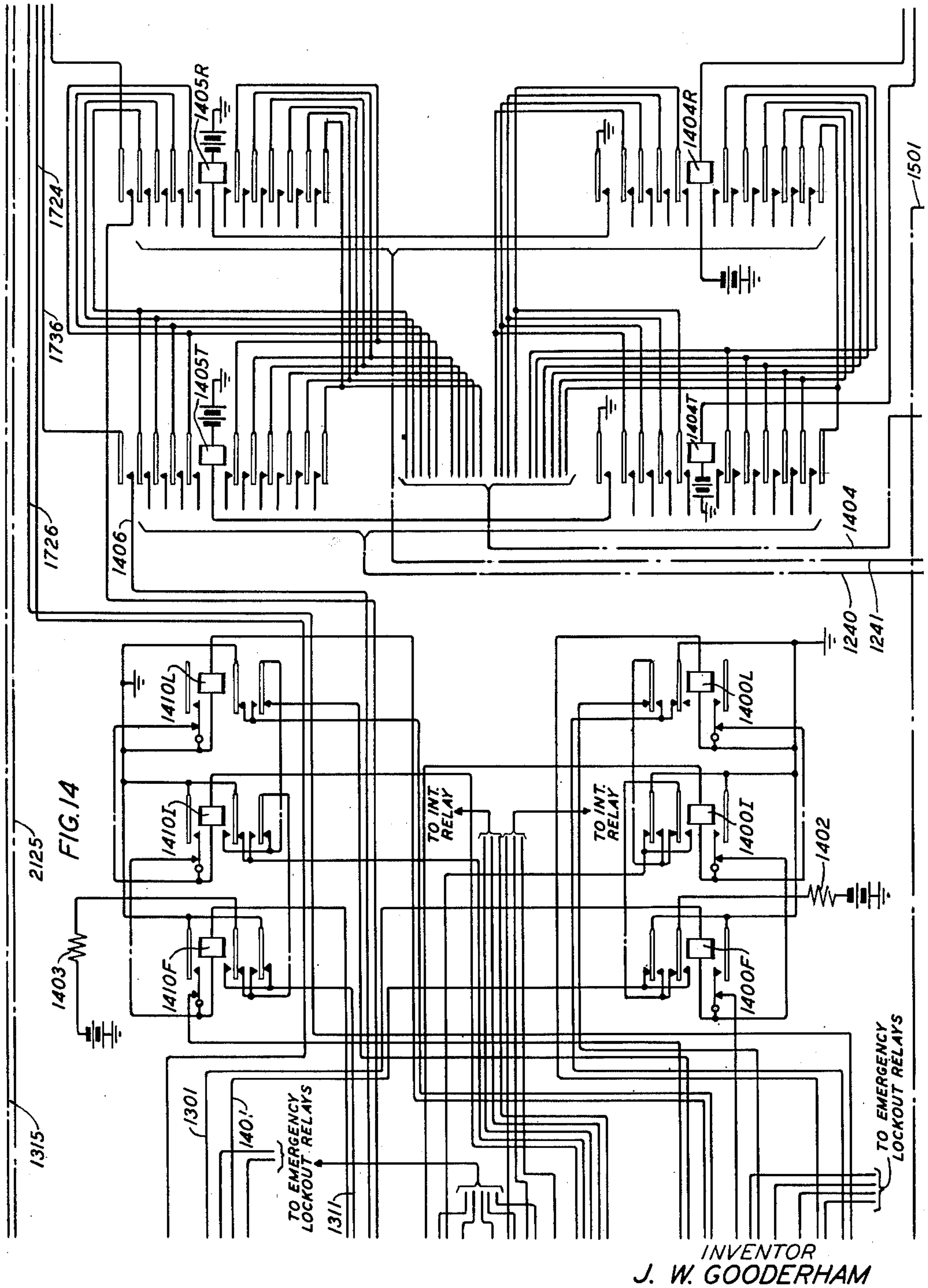
Figure 15:
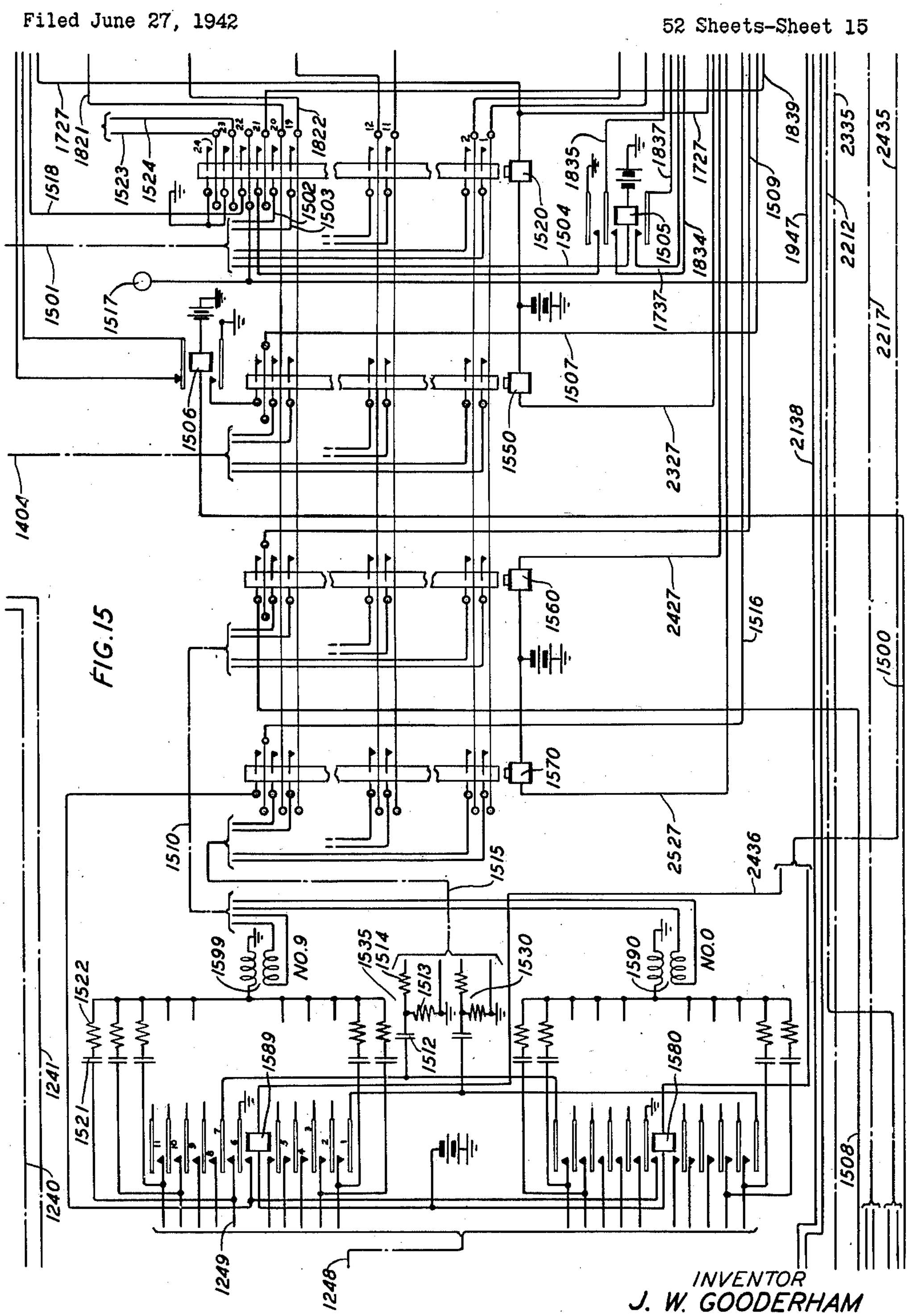
Figure 16:
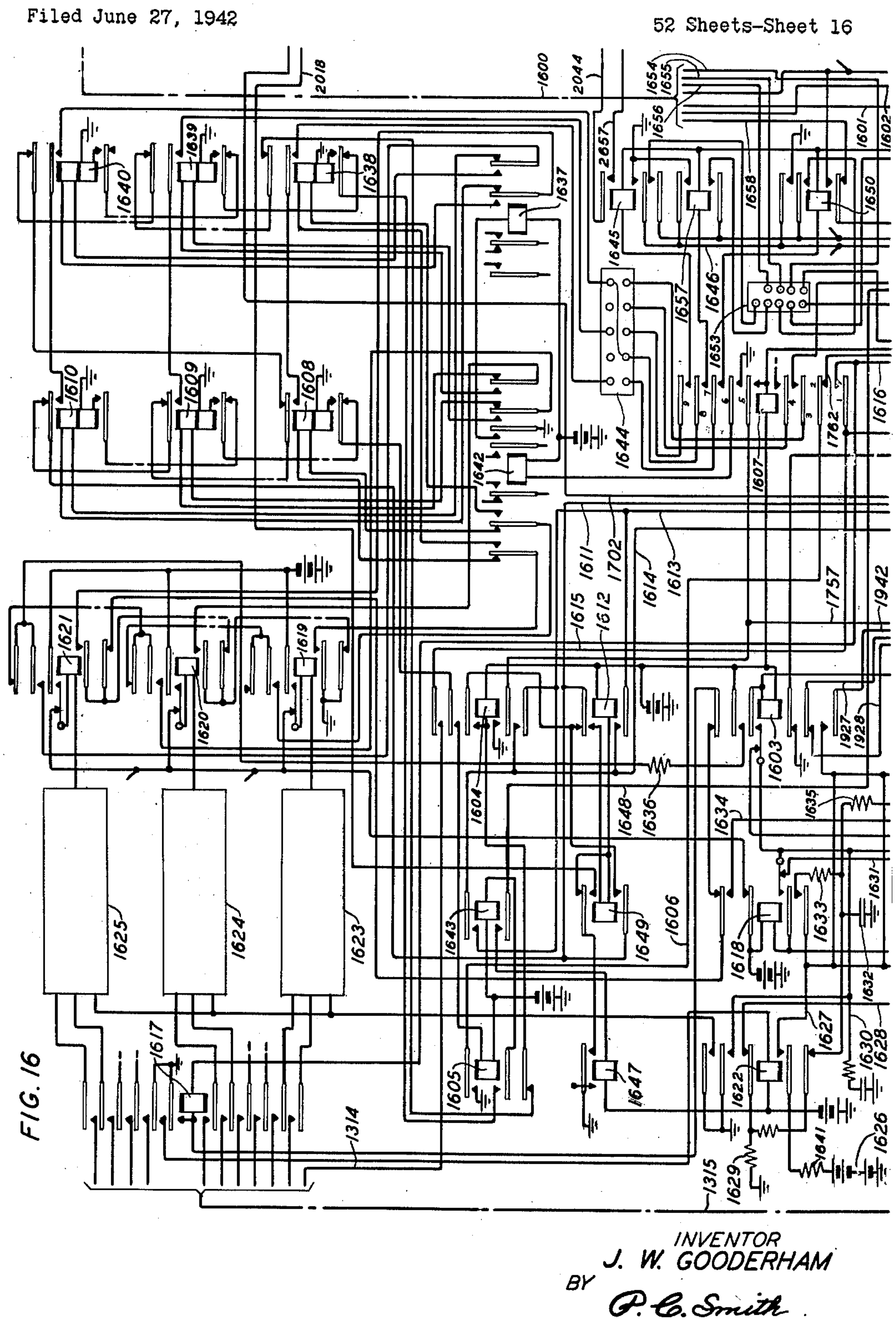
Figure 17:
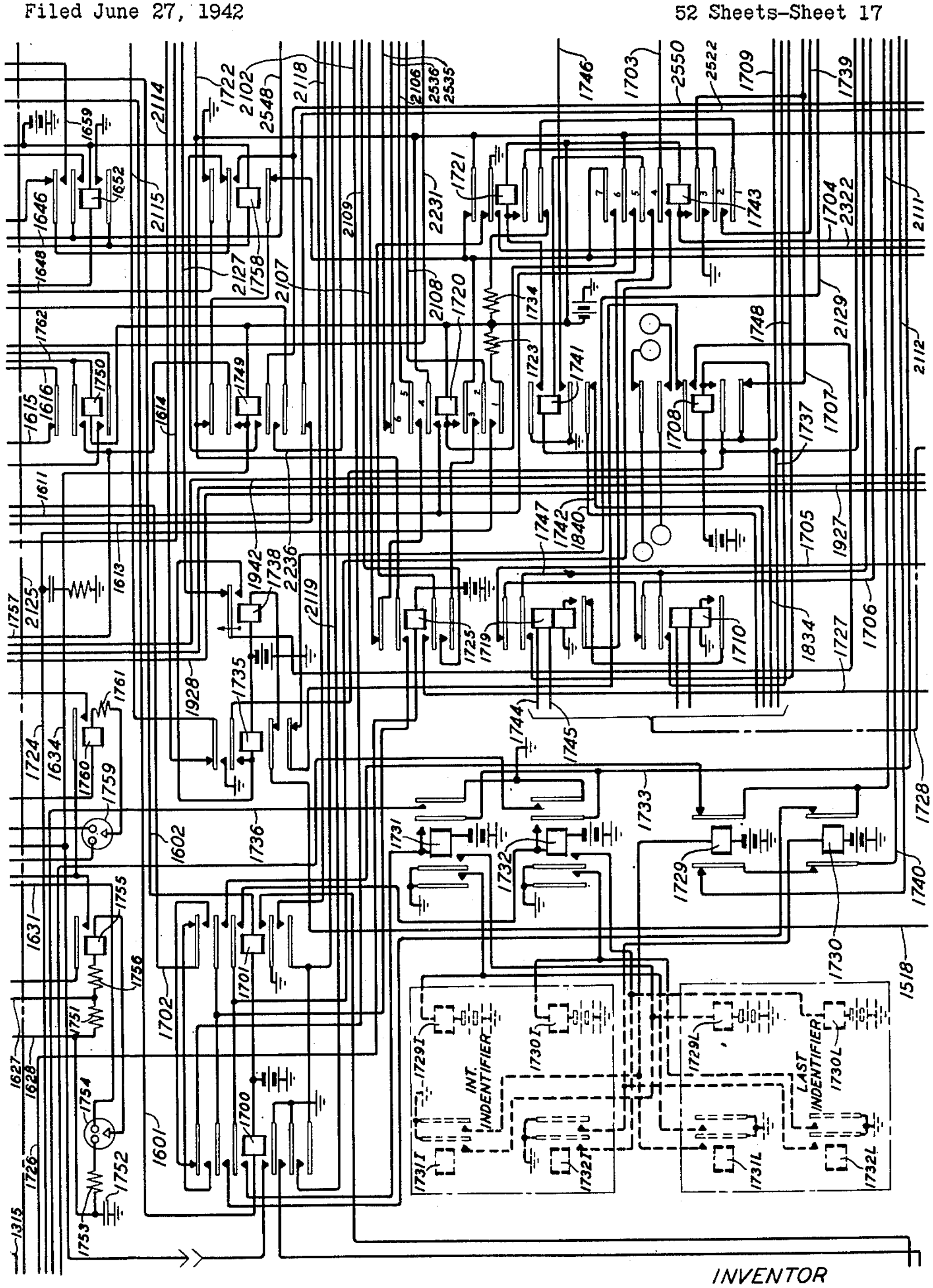
Figure 18:
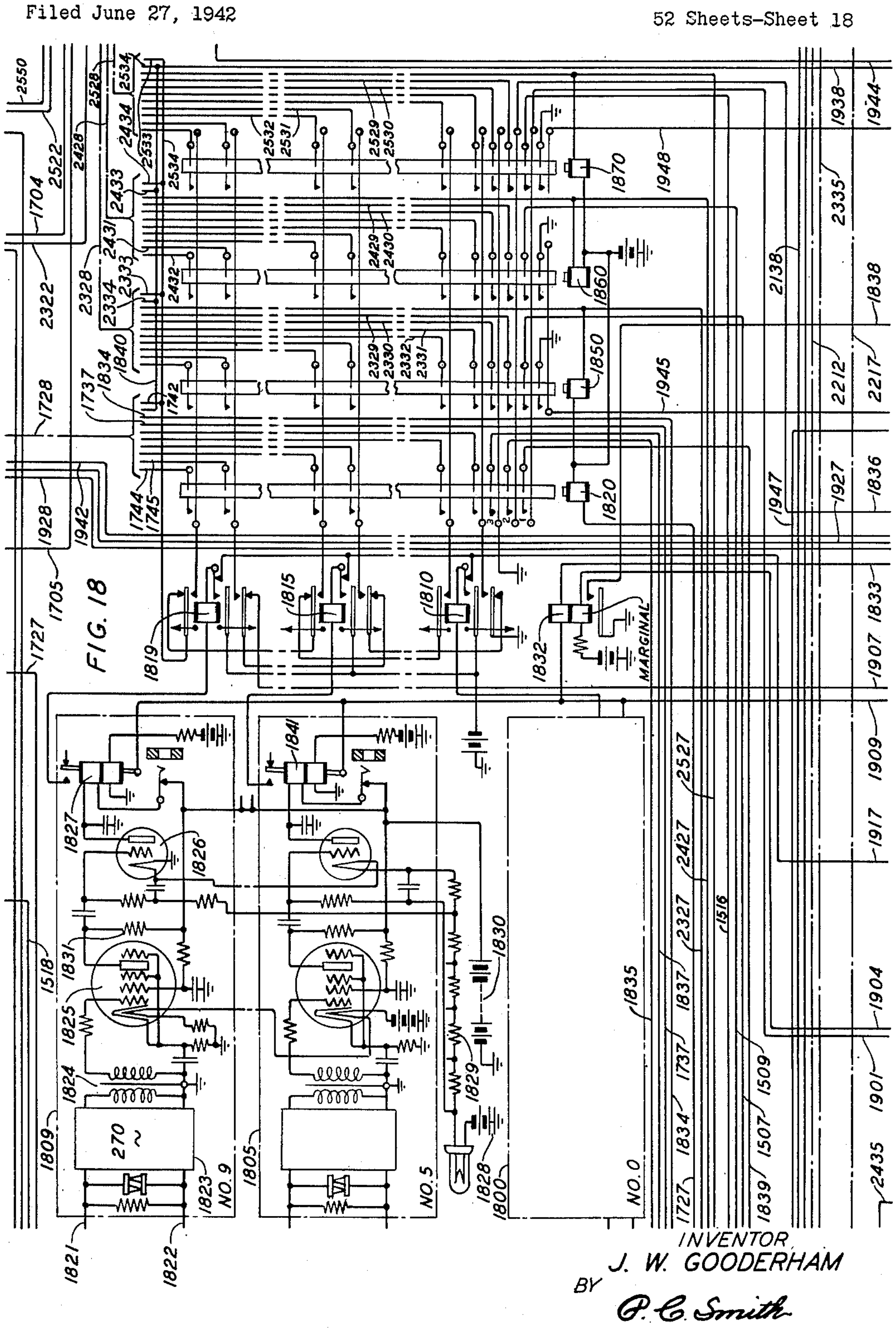
Figure 19:
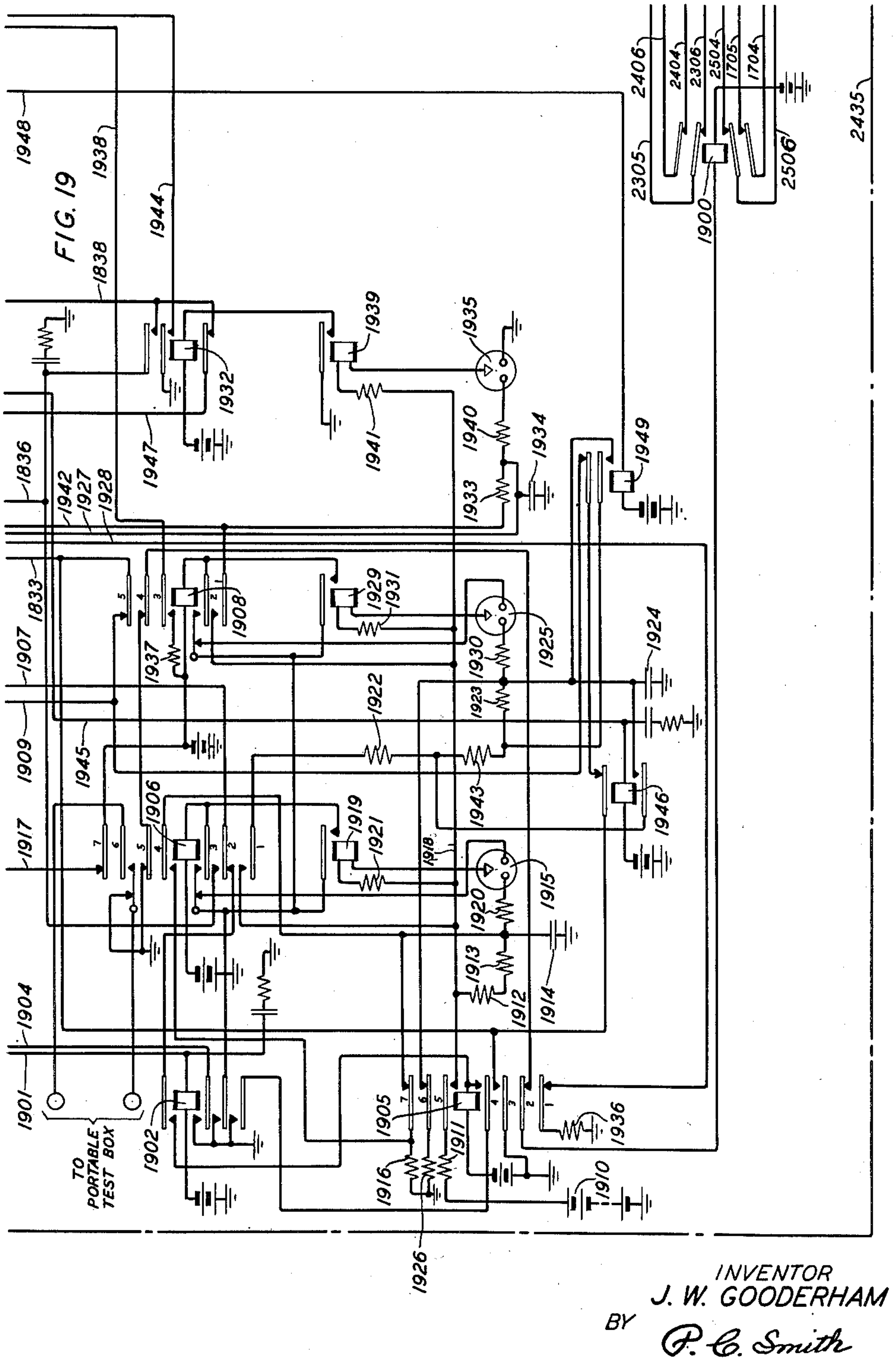
Figure 20:
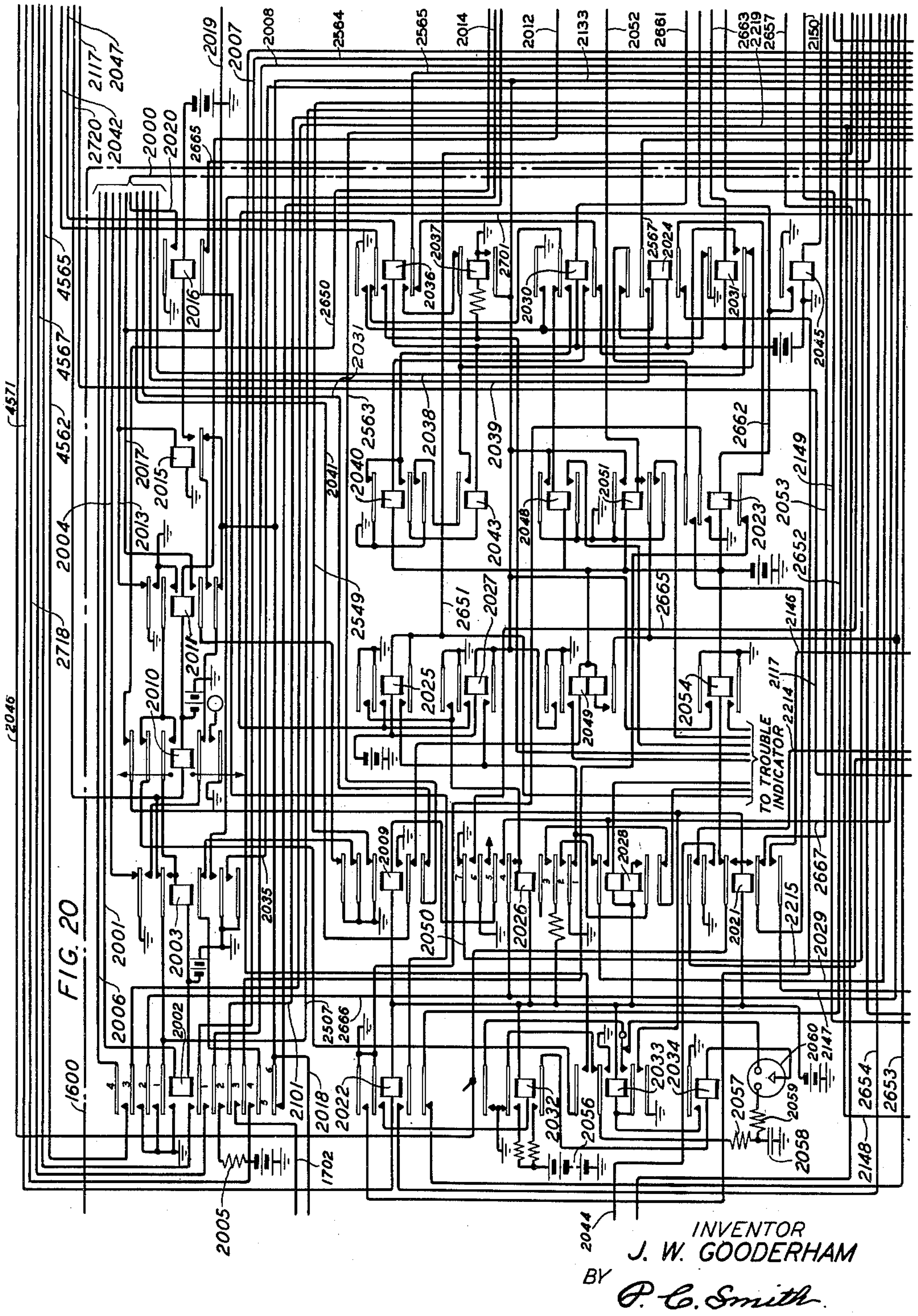
Figure 21:
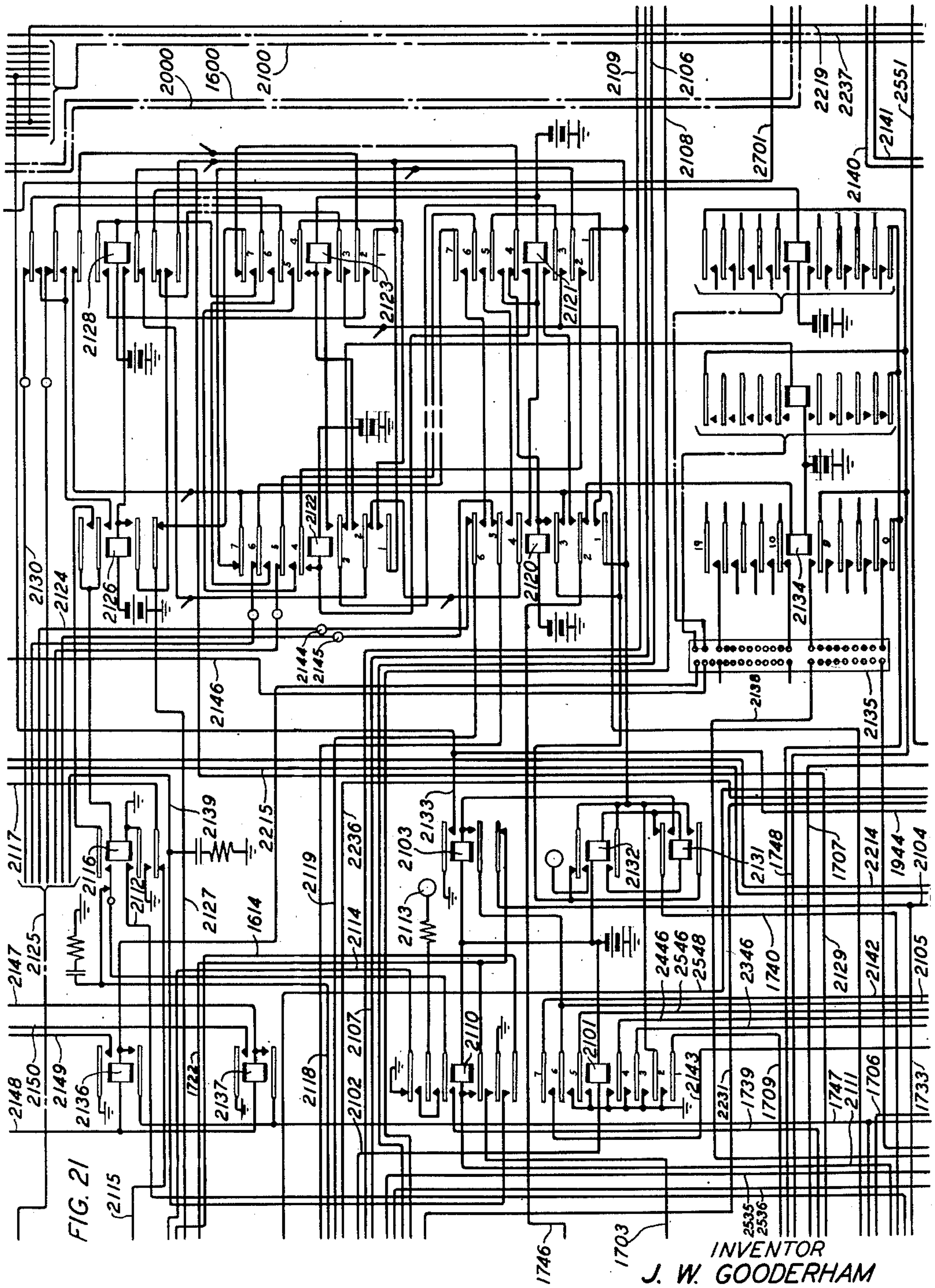
Figure 22:
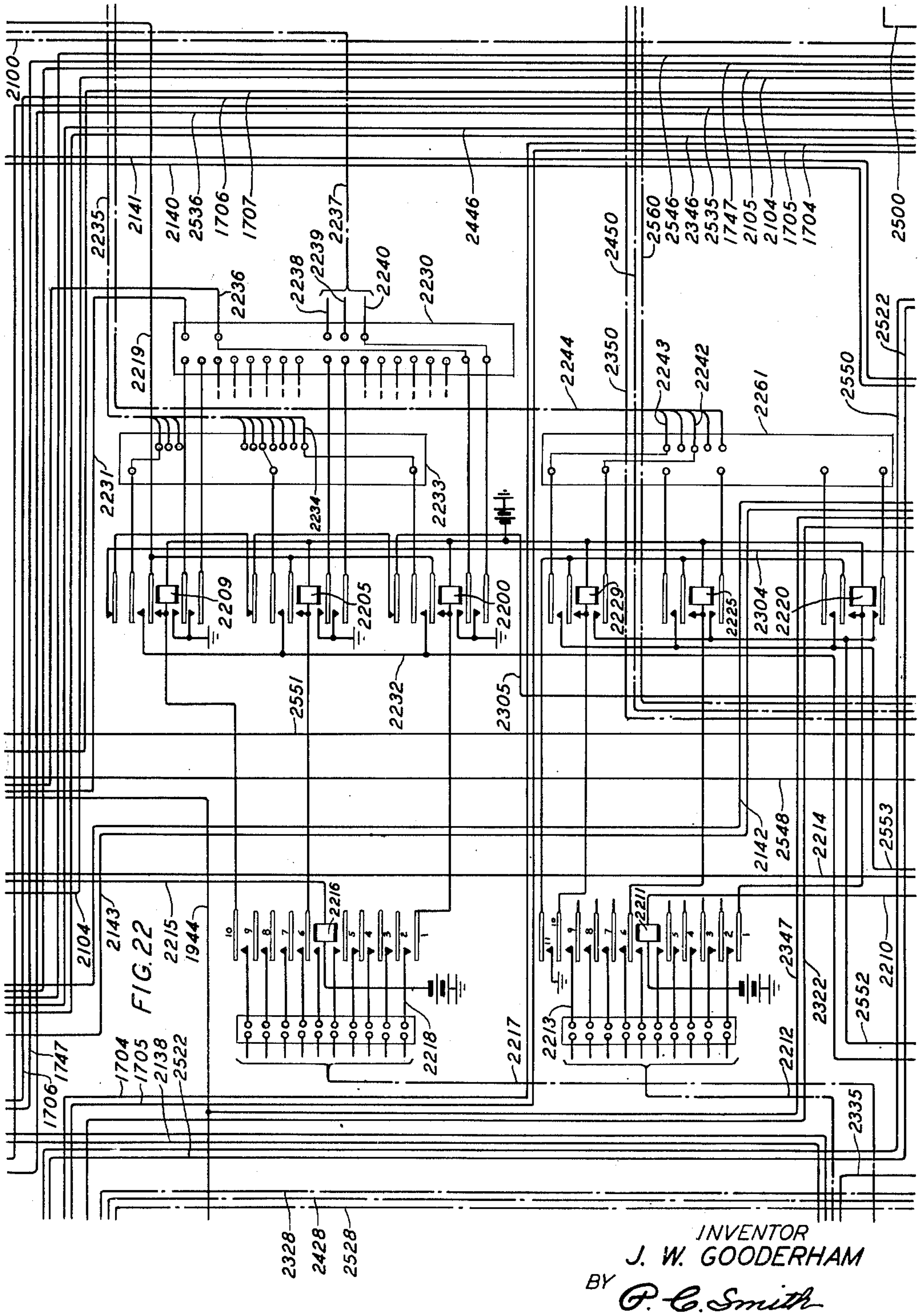
Figure 23:
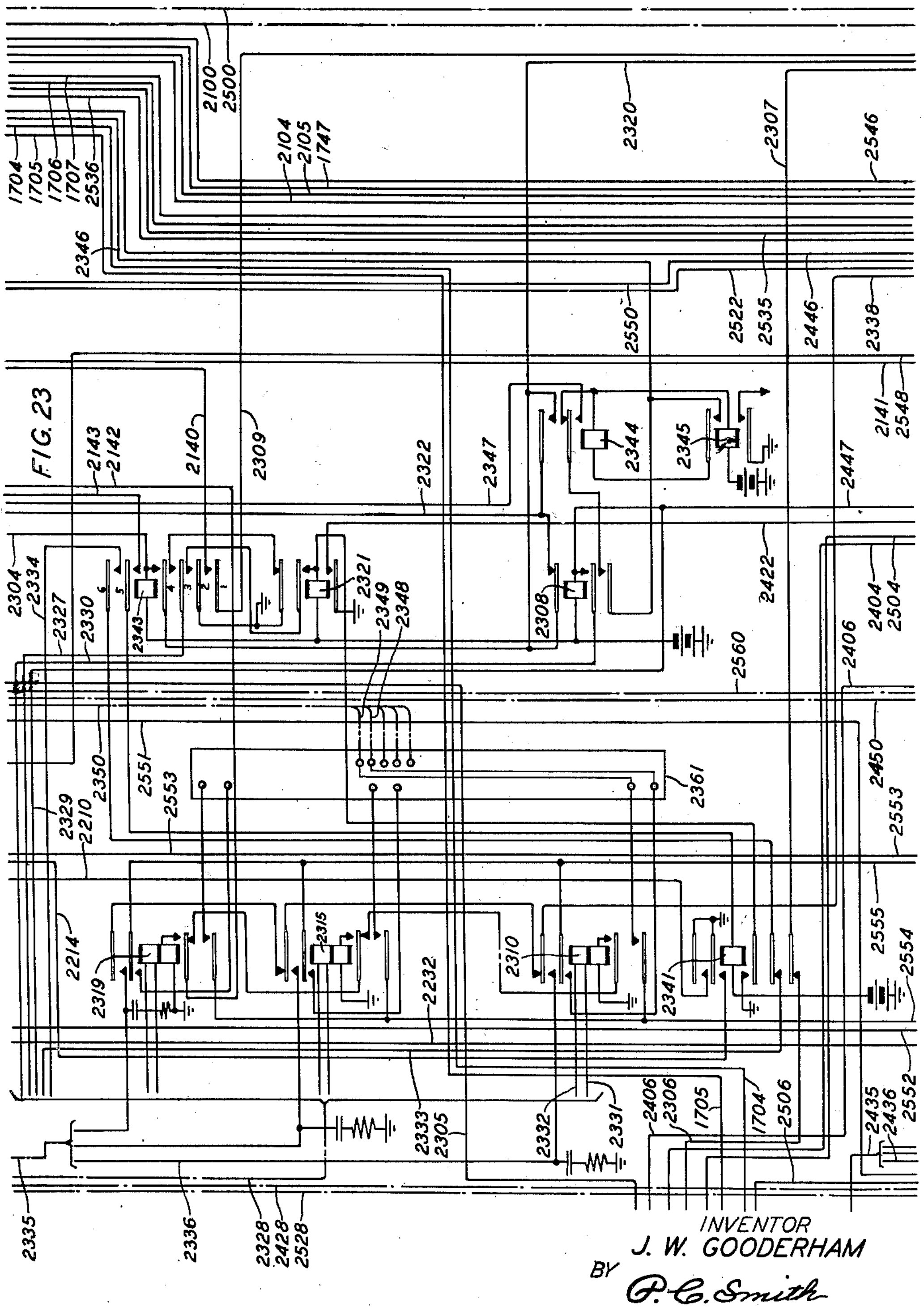
Figure 24:
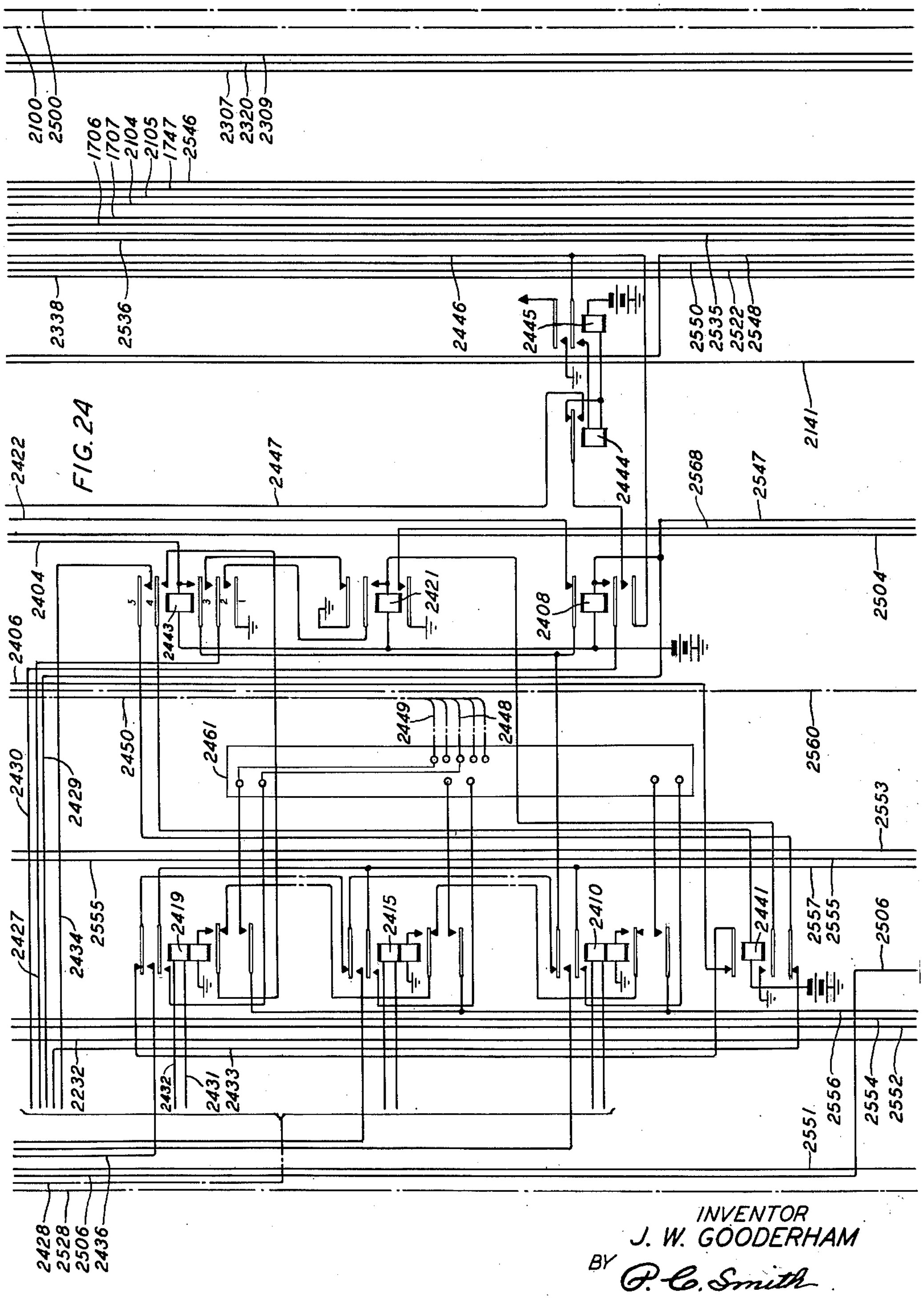
Figure 25:
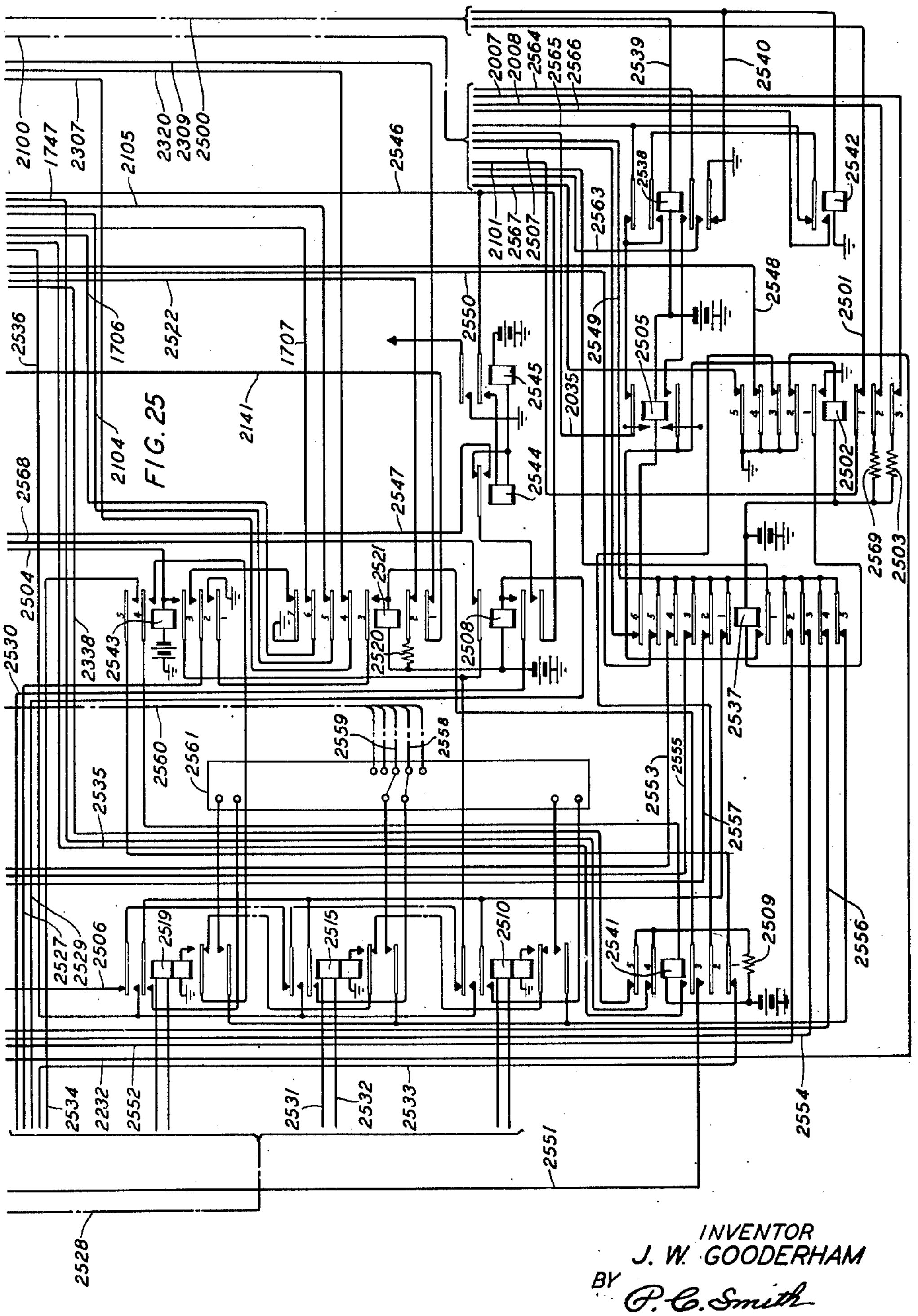
Figure 26:
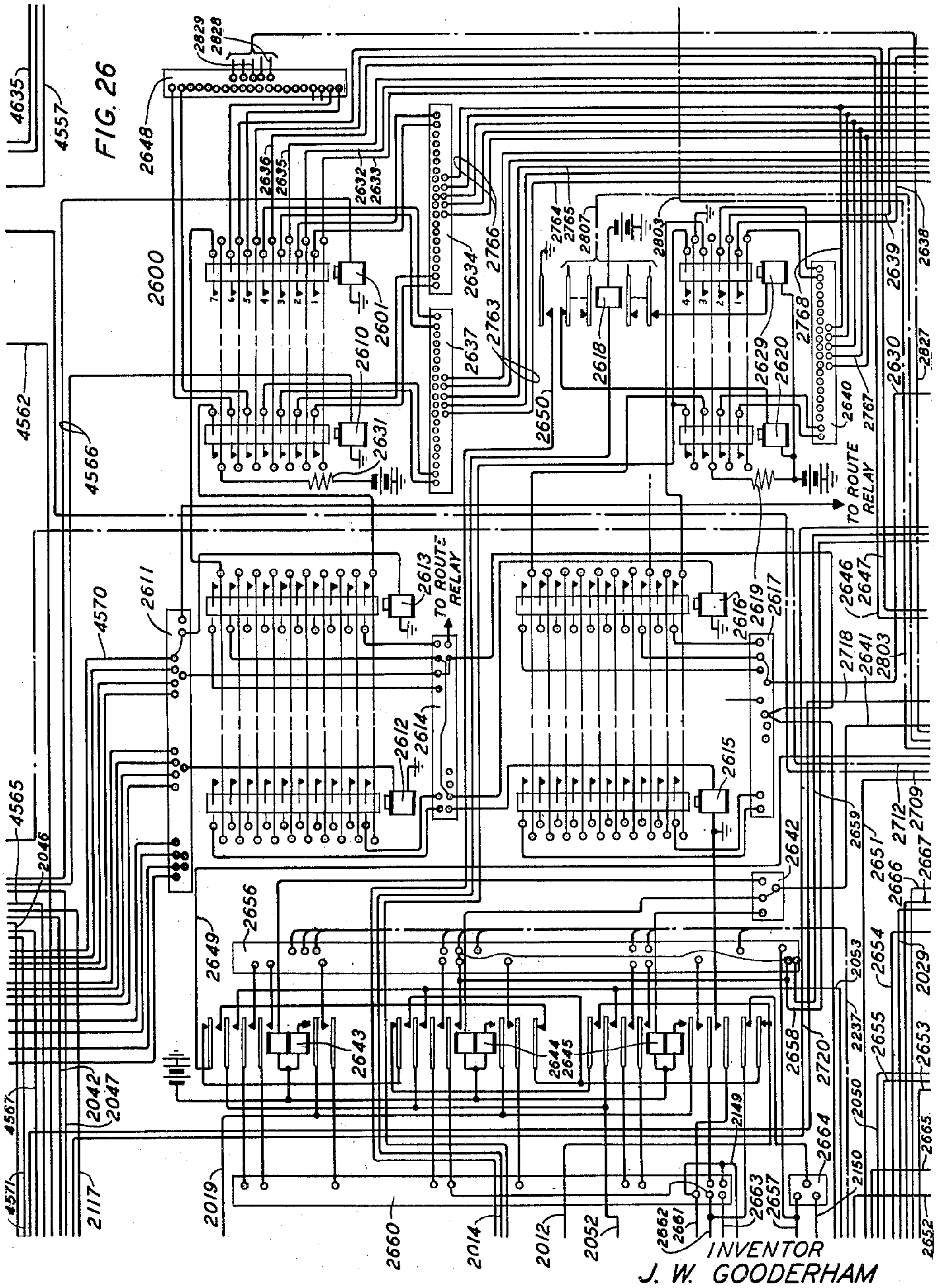
Figure 27:
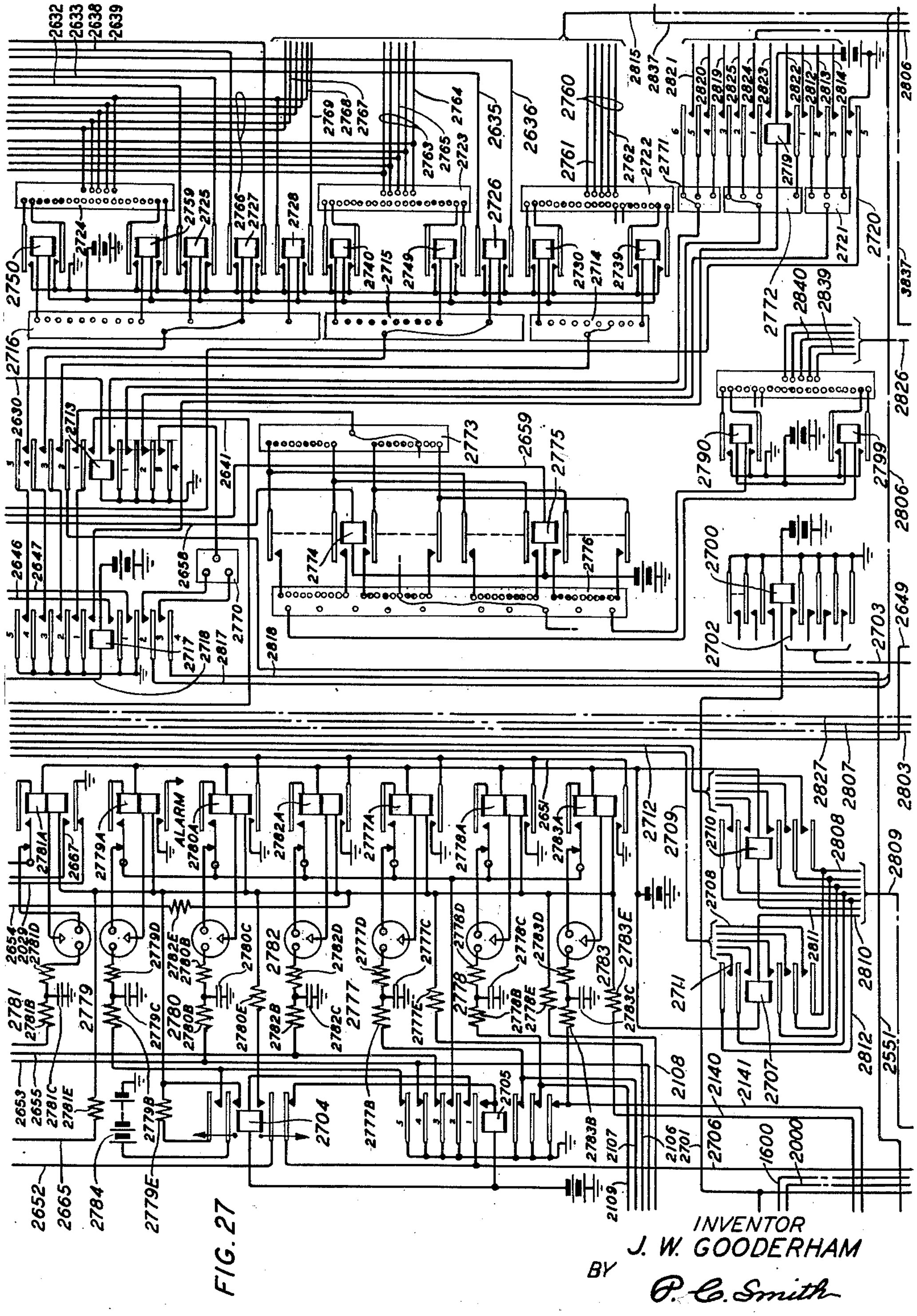
Figure 28:
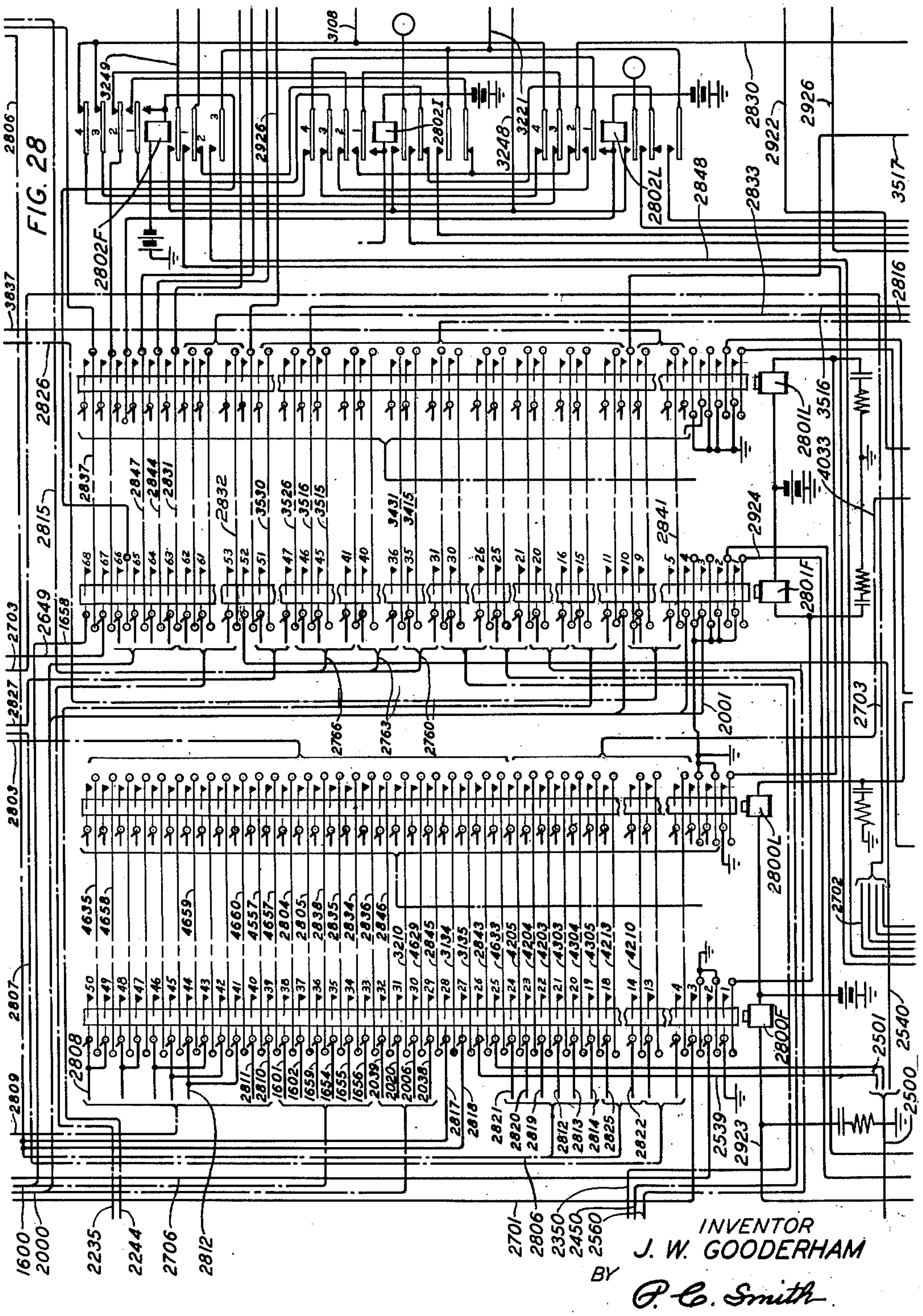
Figure 29:
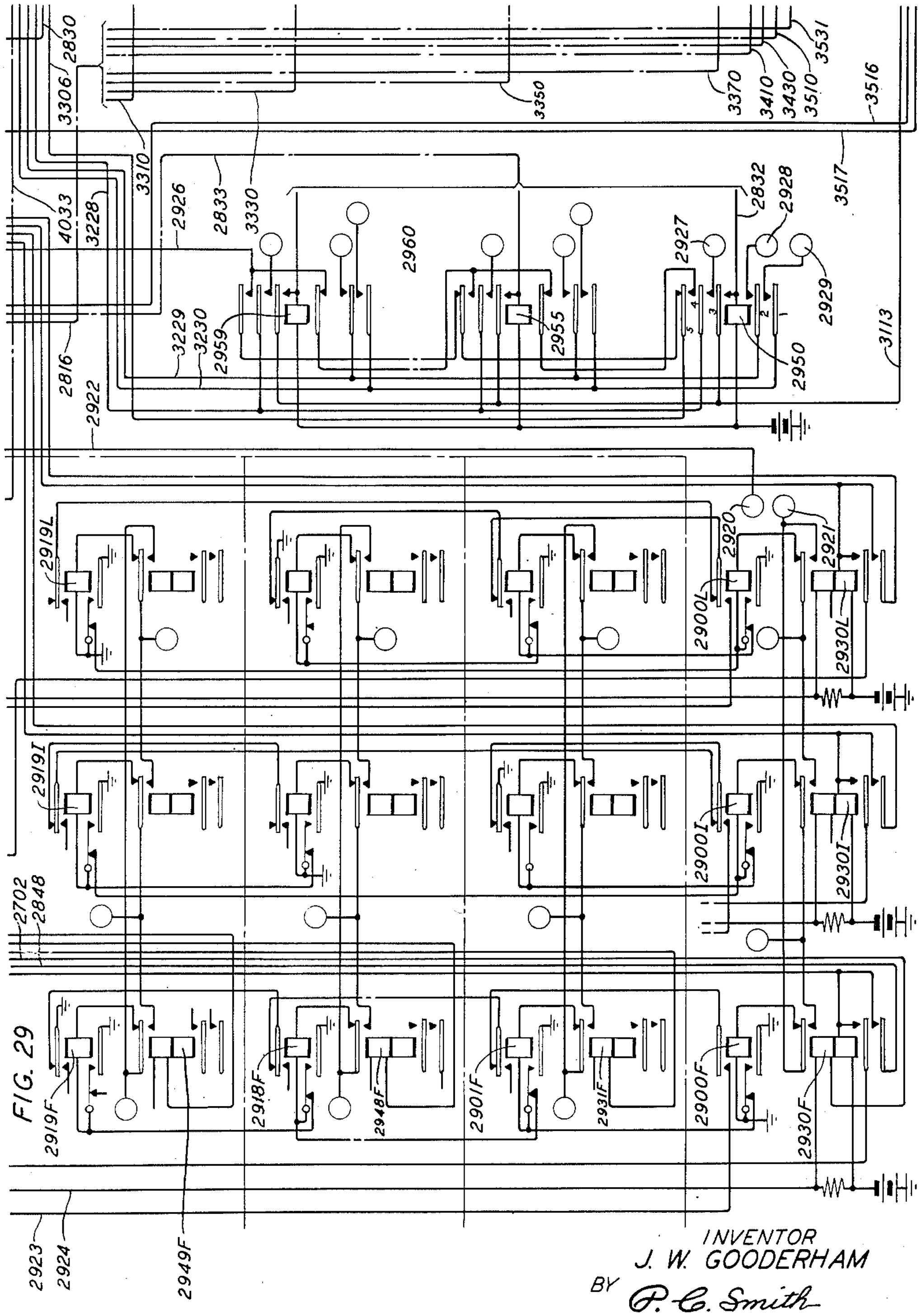
Figure 30:
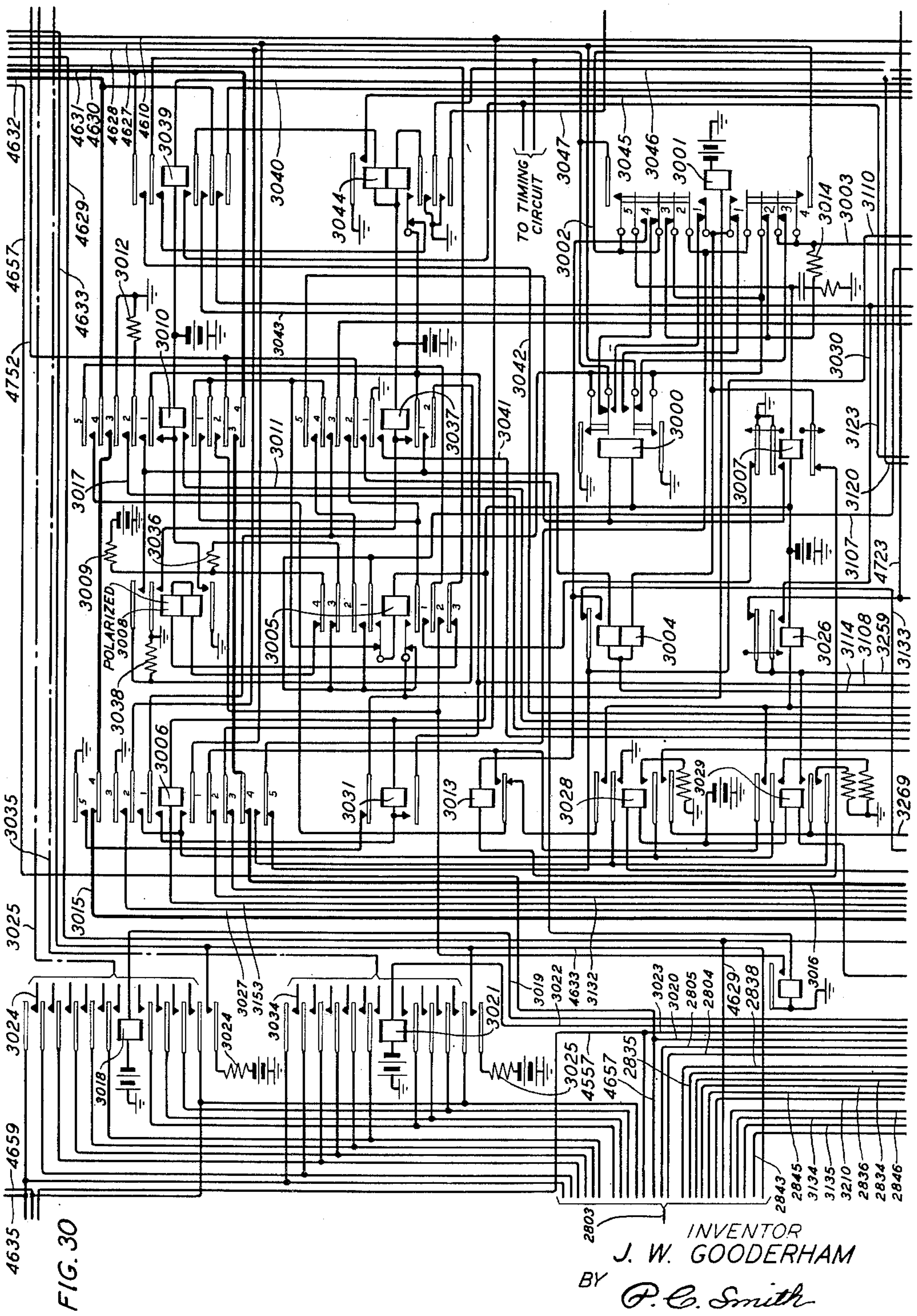
Figure 31:
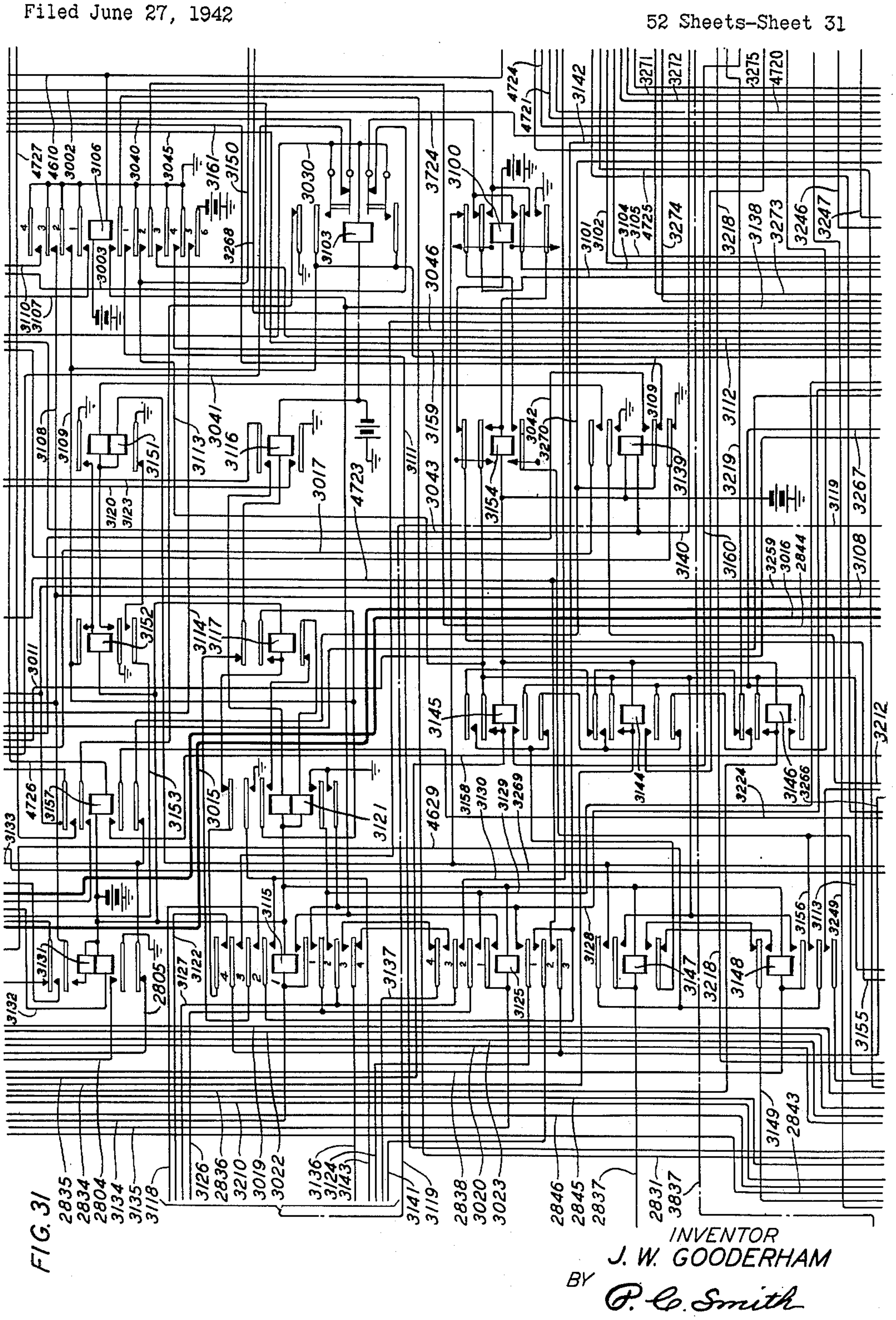
Figure 32:
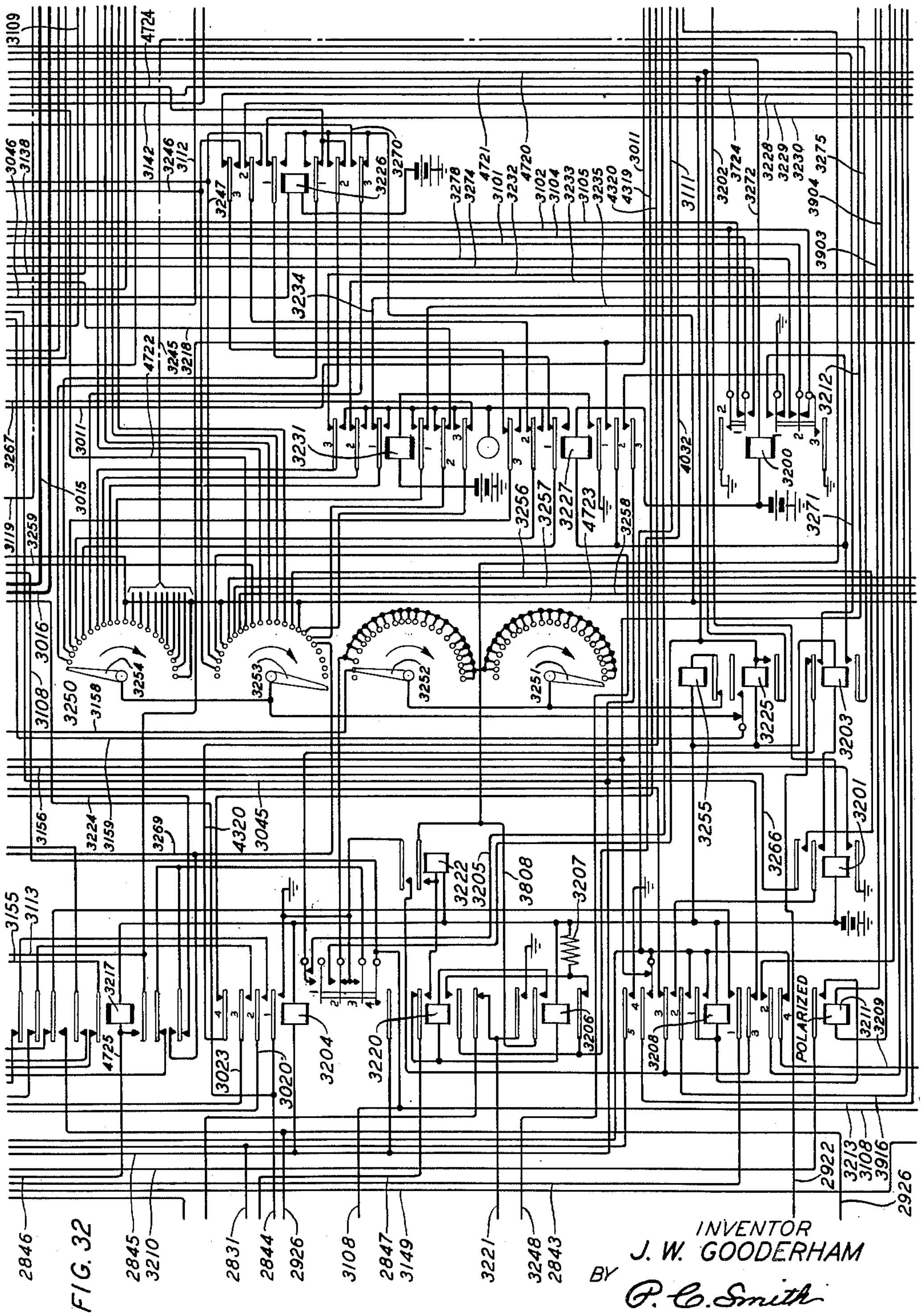
Figure 33:
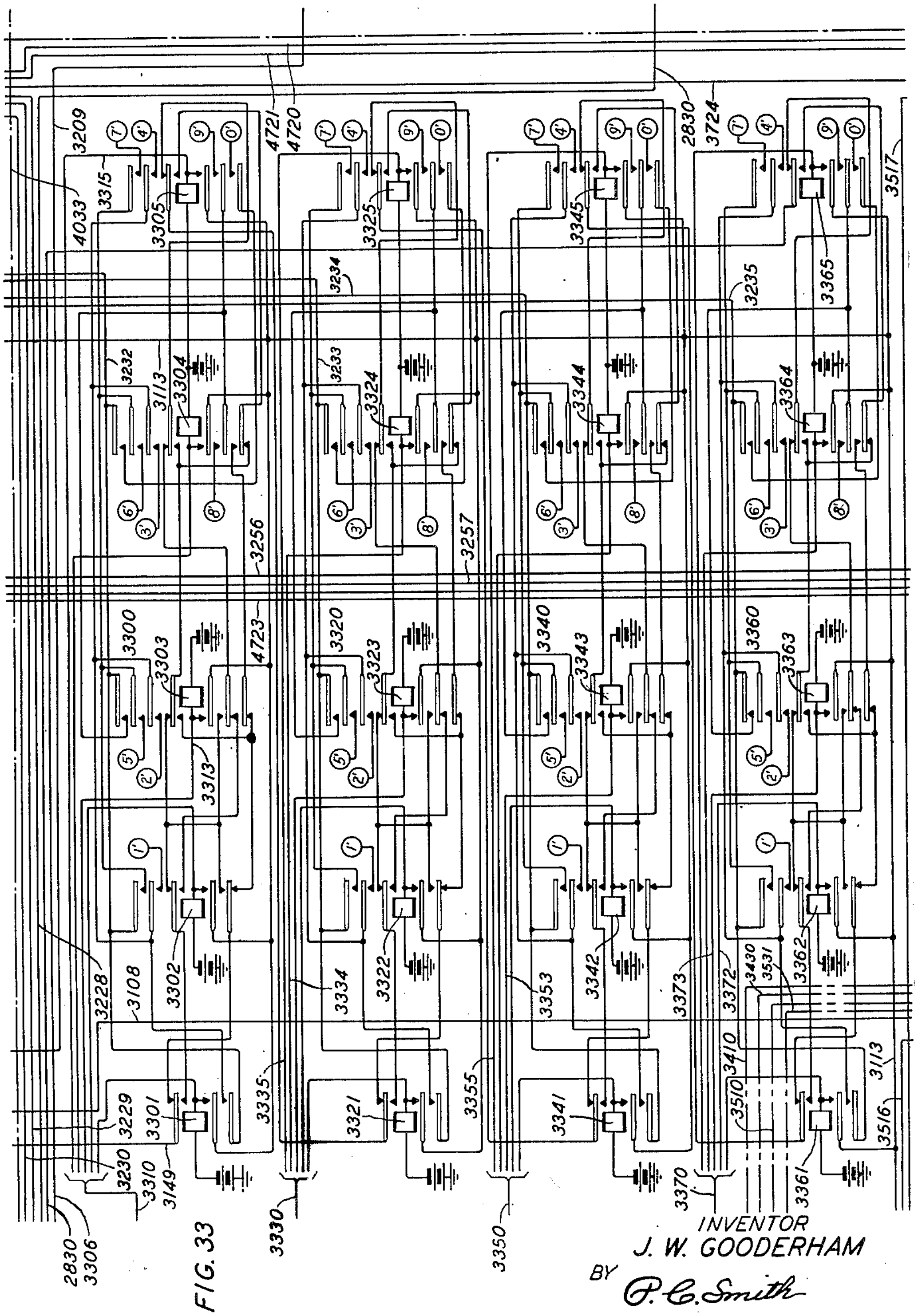
Figure 34:
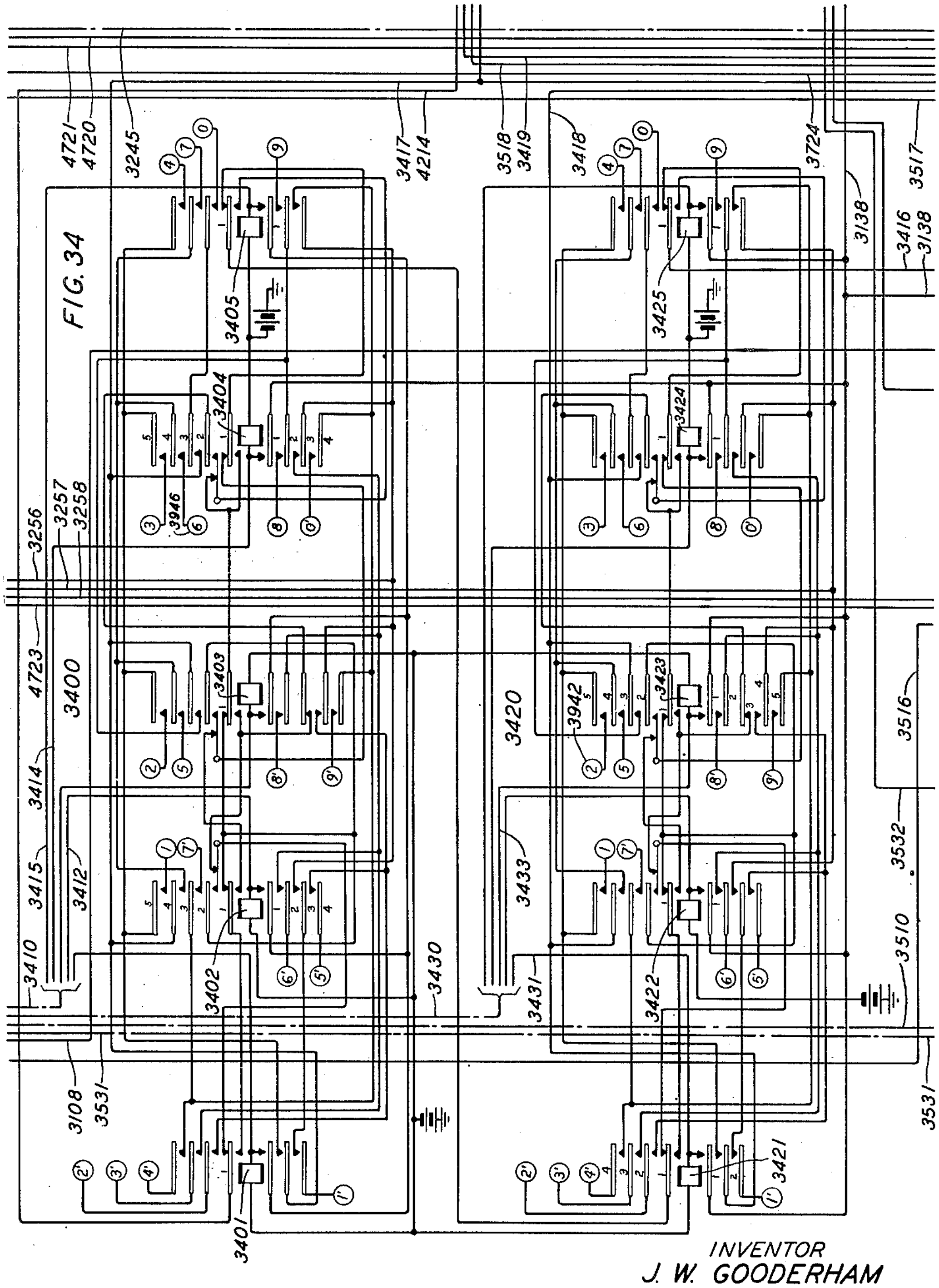
Figure 35:
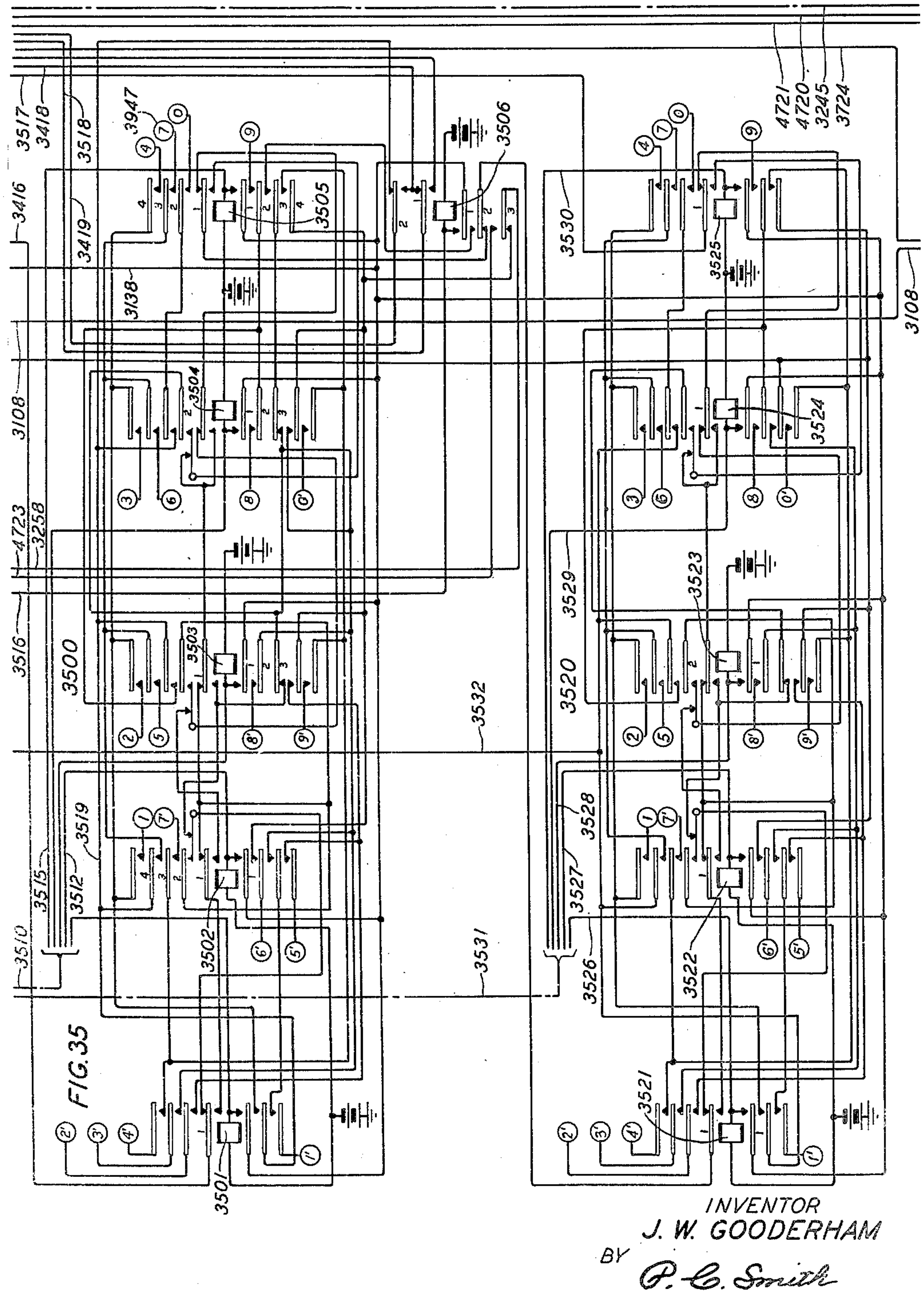
Figure 36:
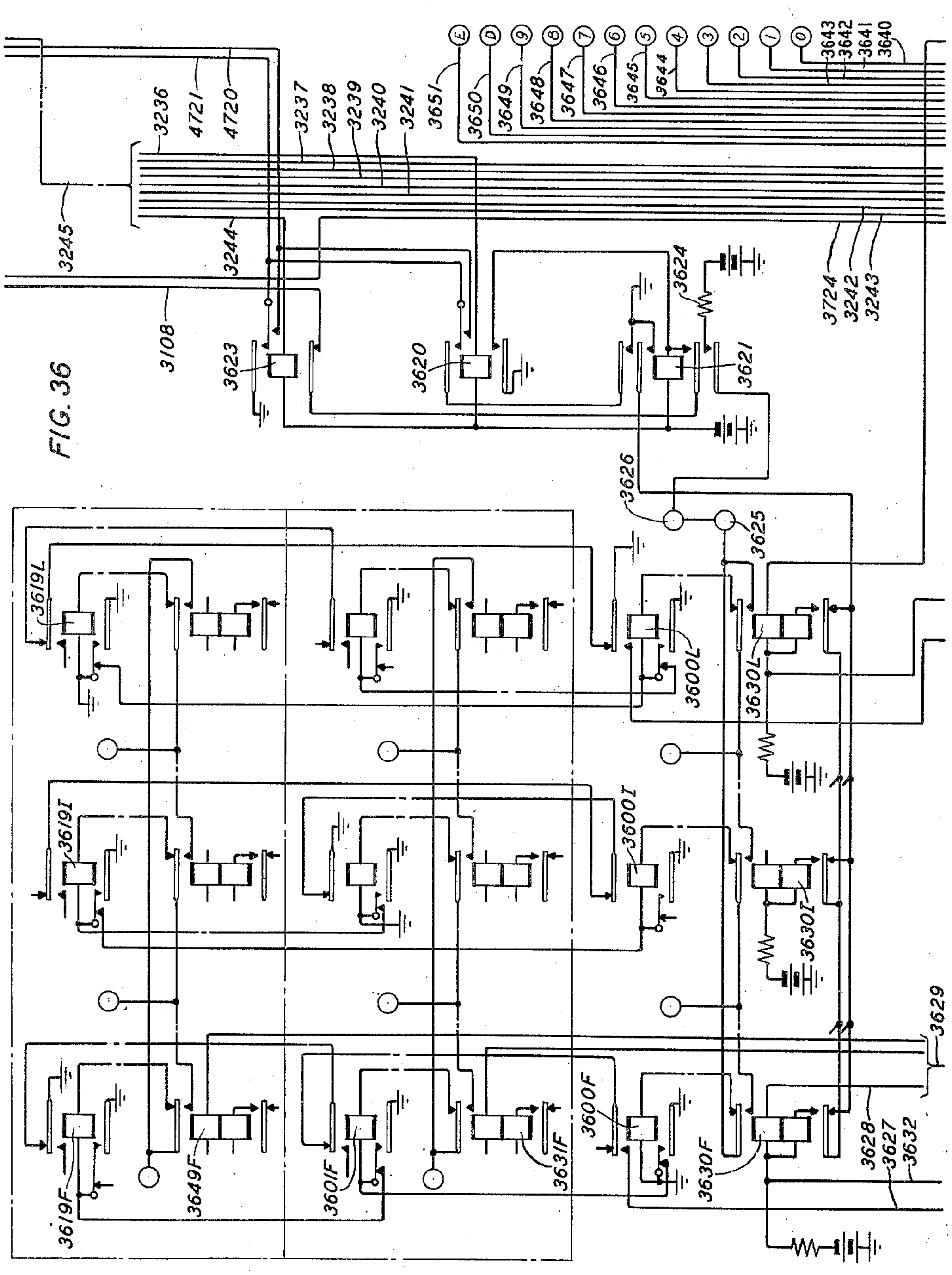
Figure 37:
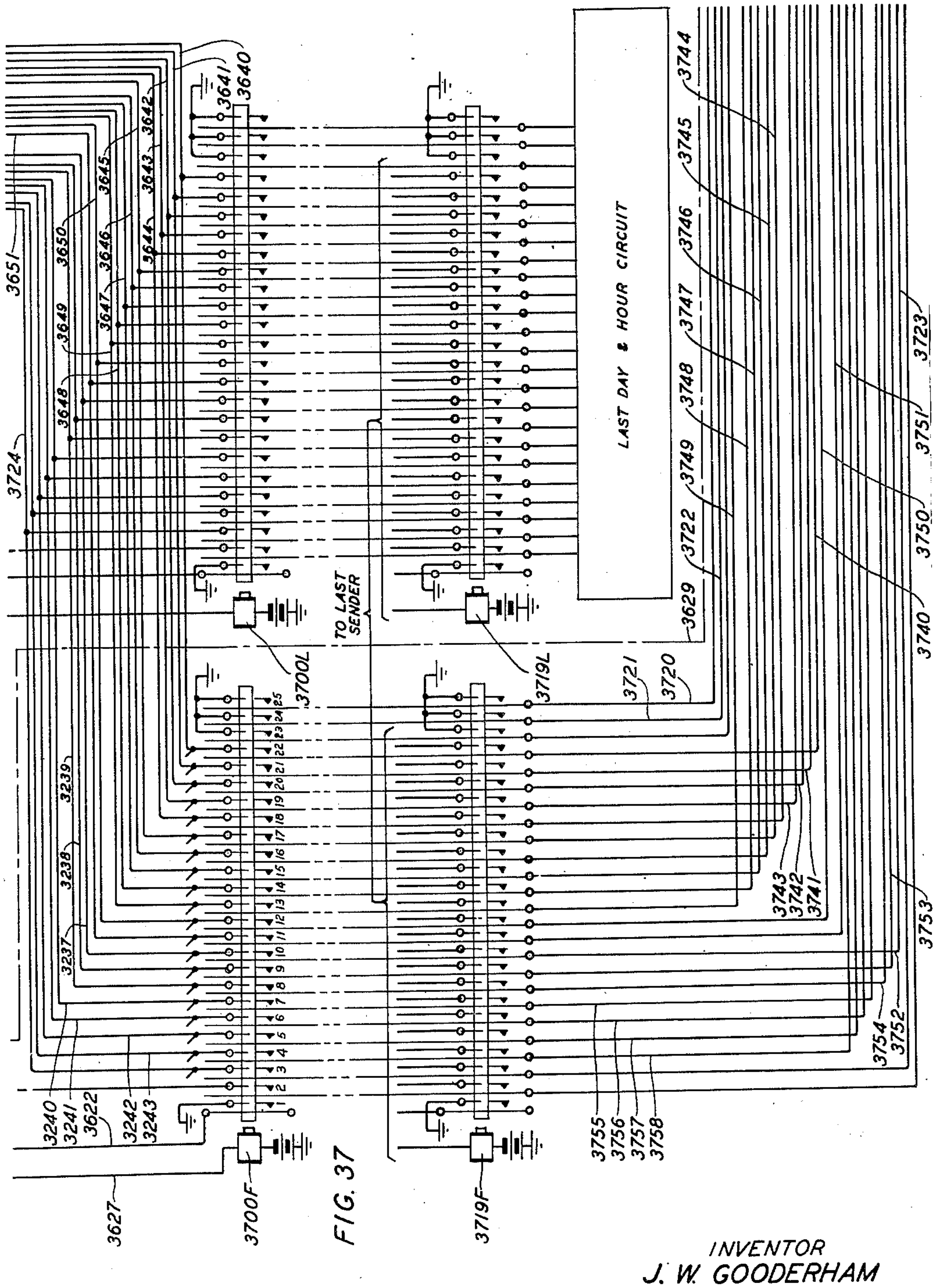
Figure 38:
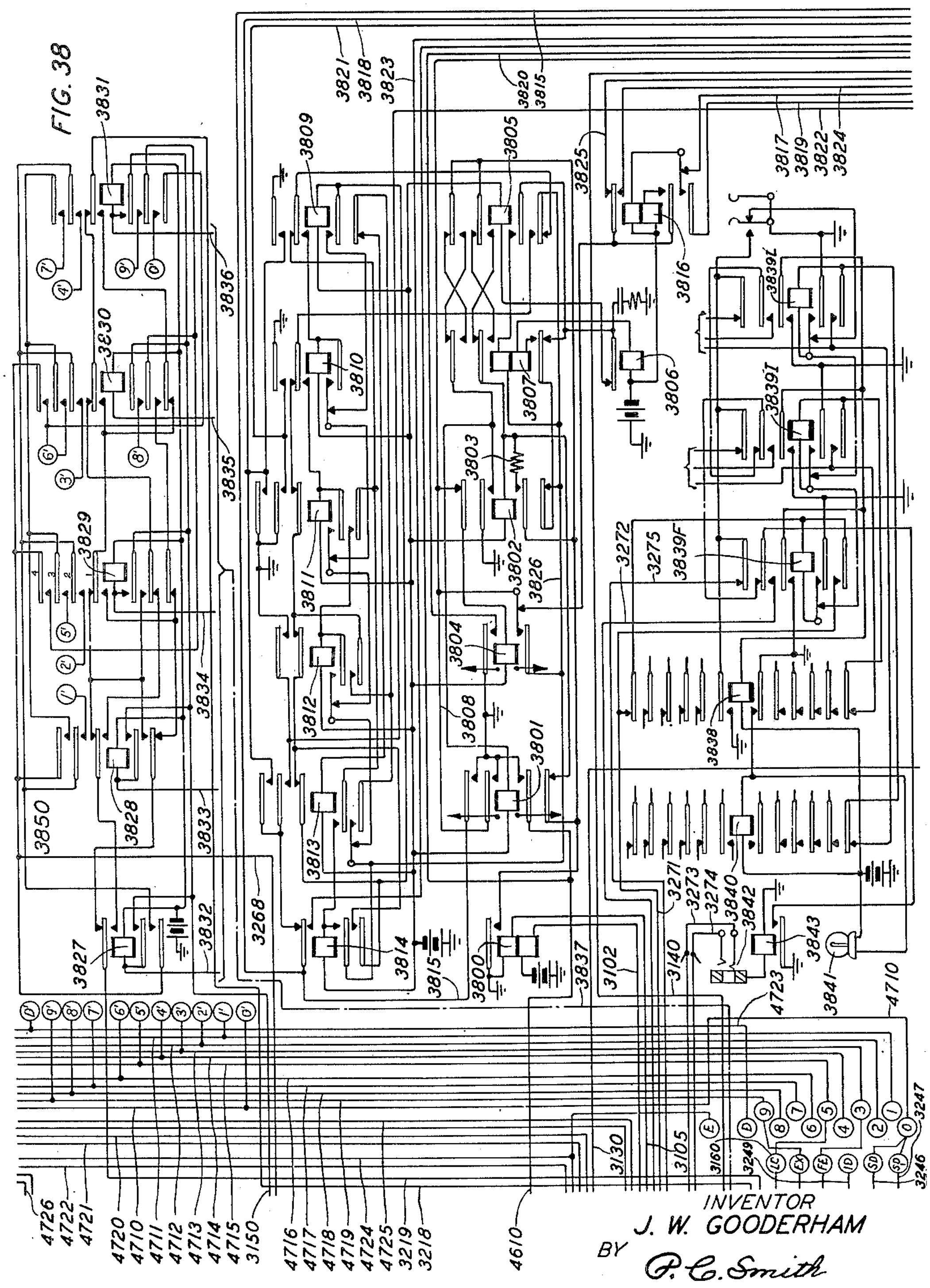
Figure 39:
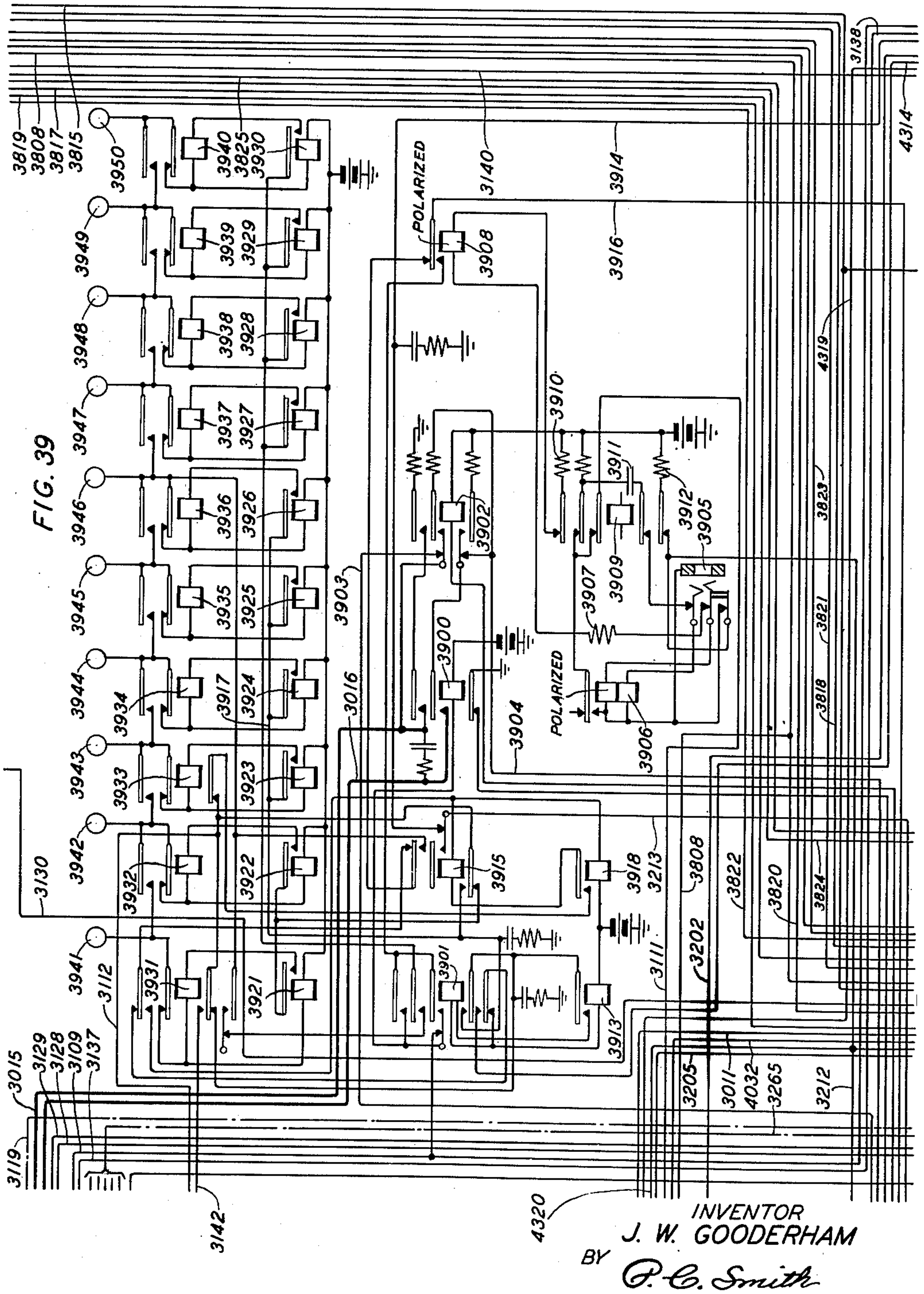
Figure 40:
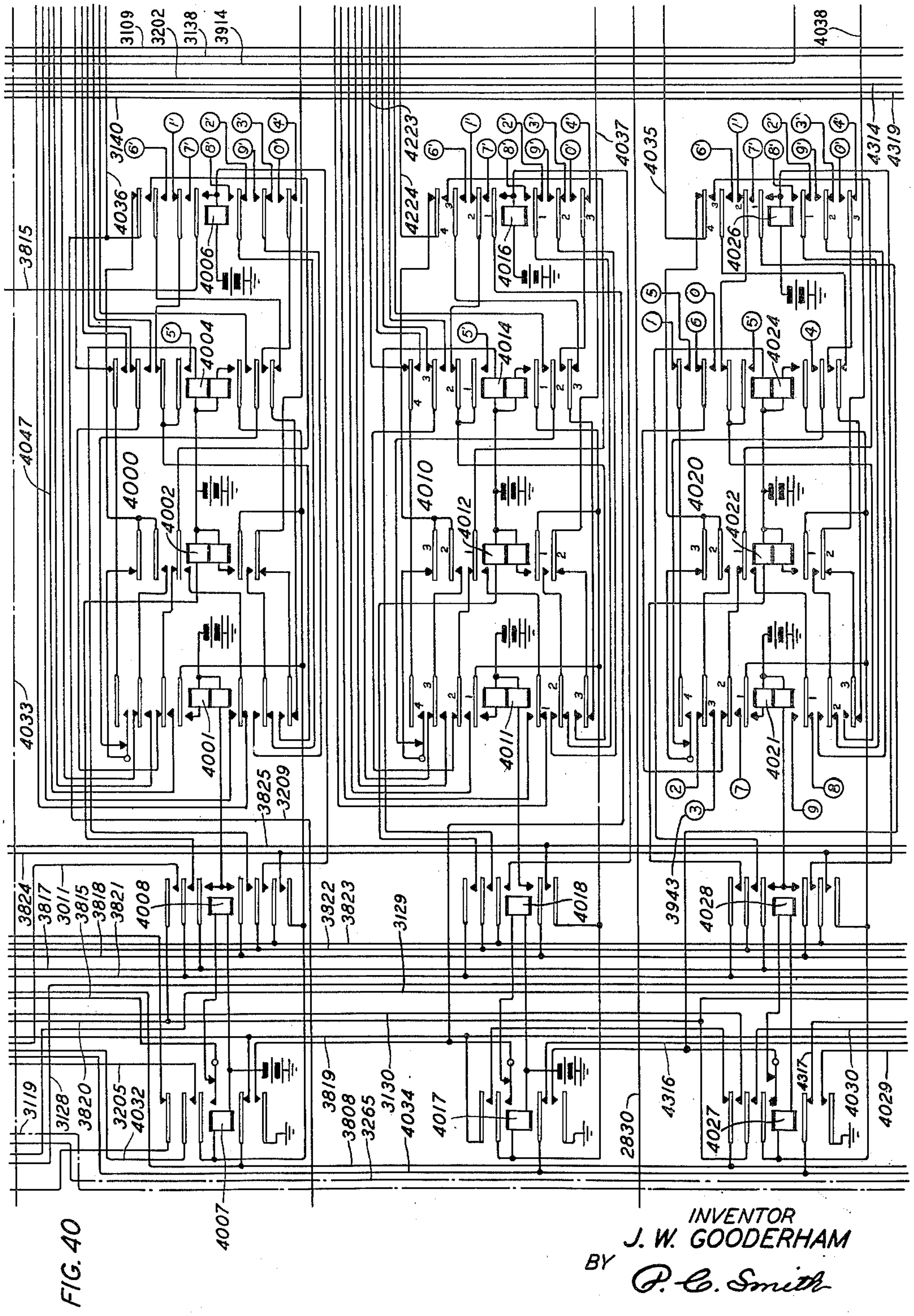
Figure 41:
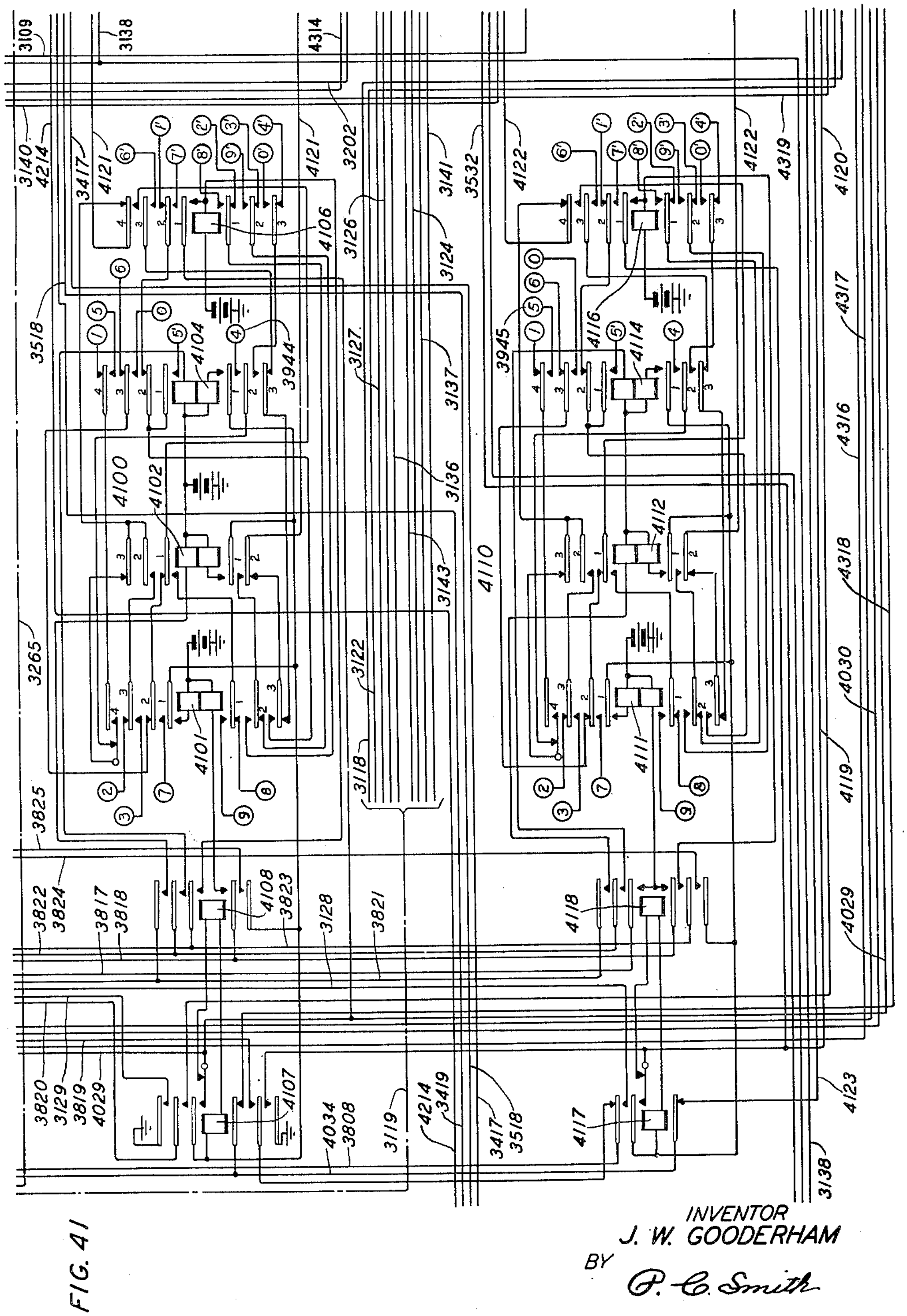
Figure 42:
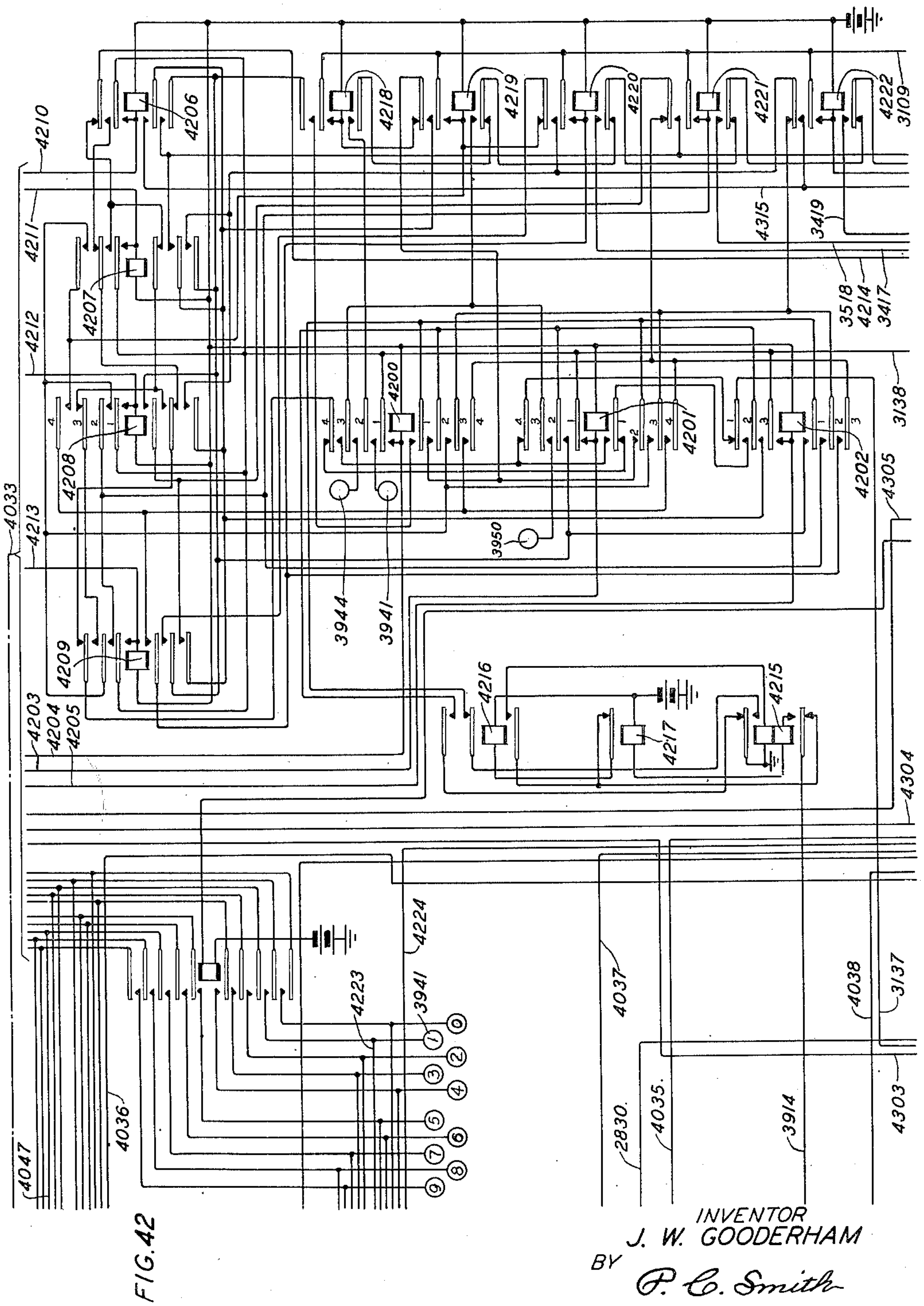
Figure 43:
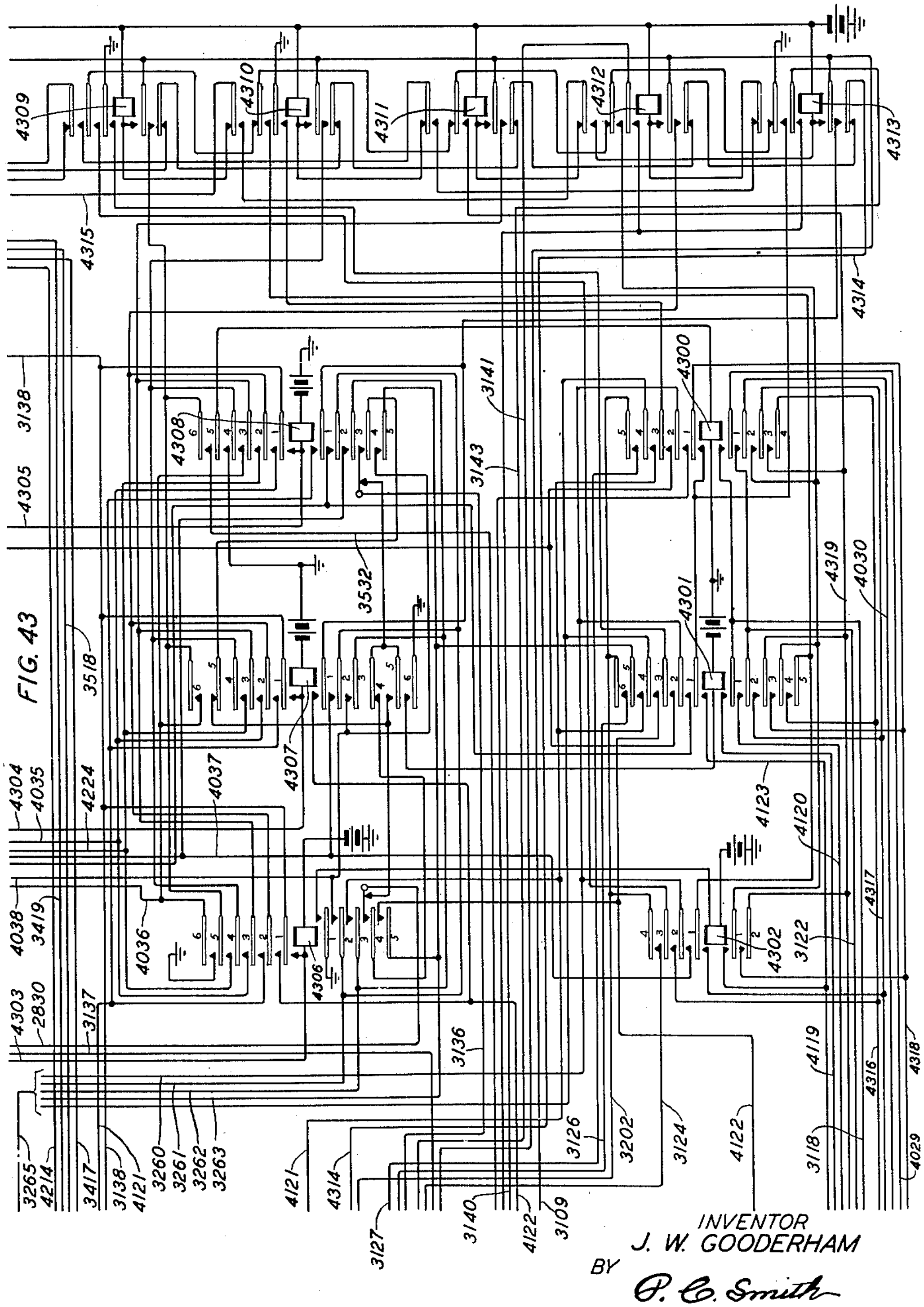
Figure 44:
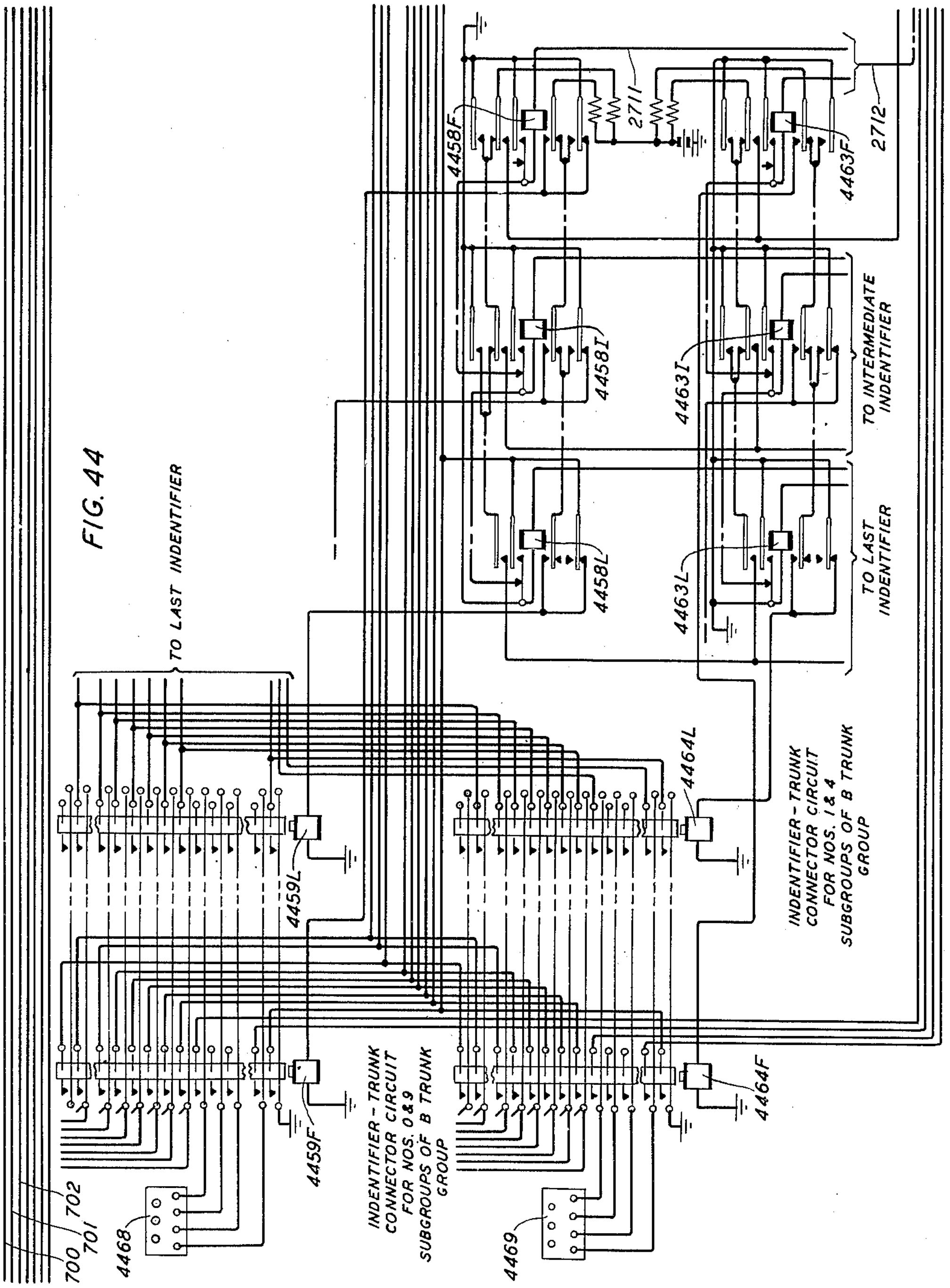
Figure 45:
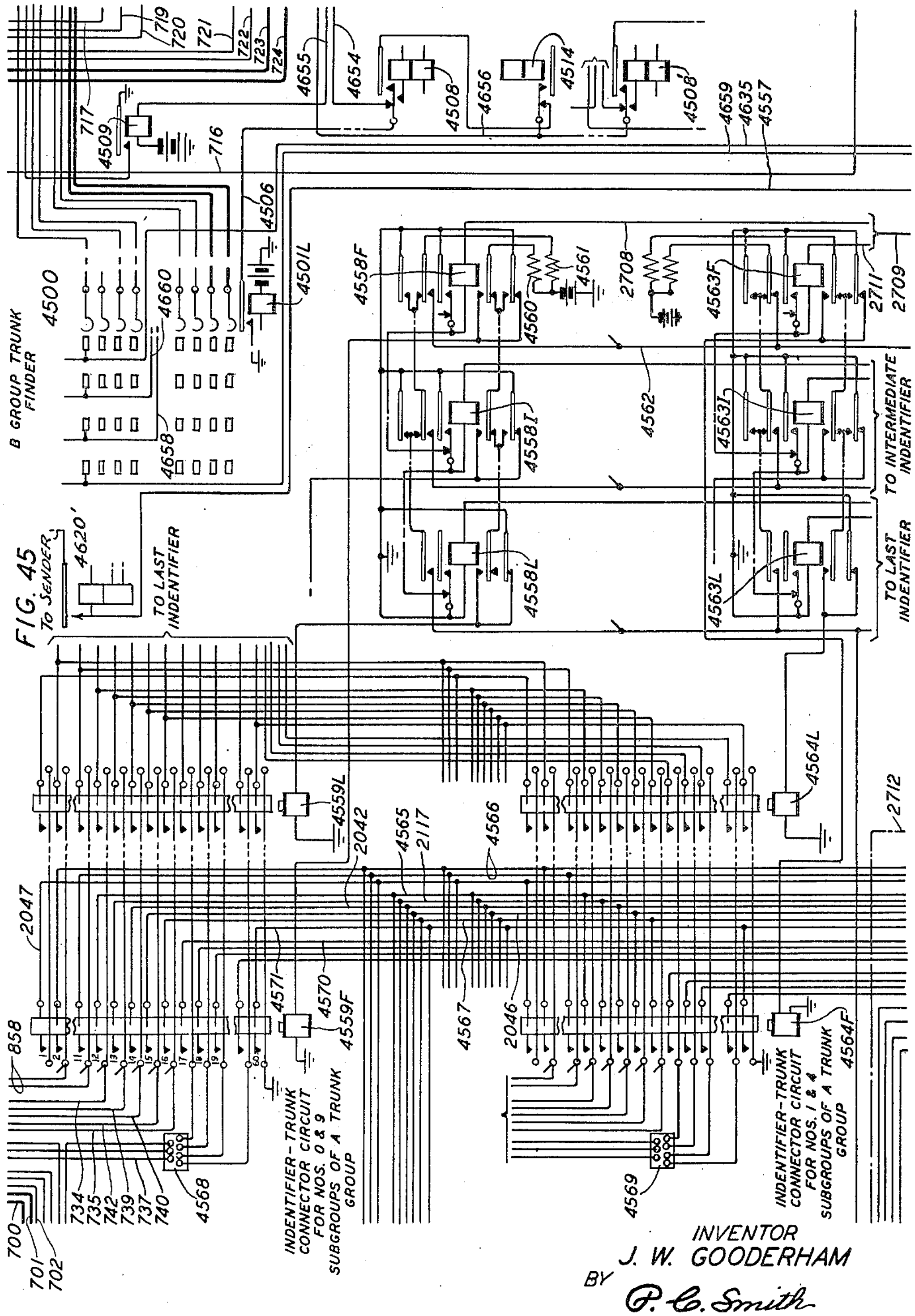
Figure 46:
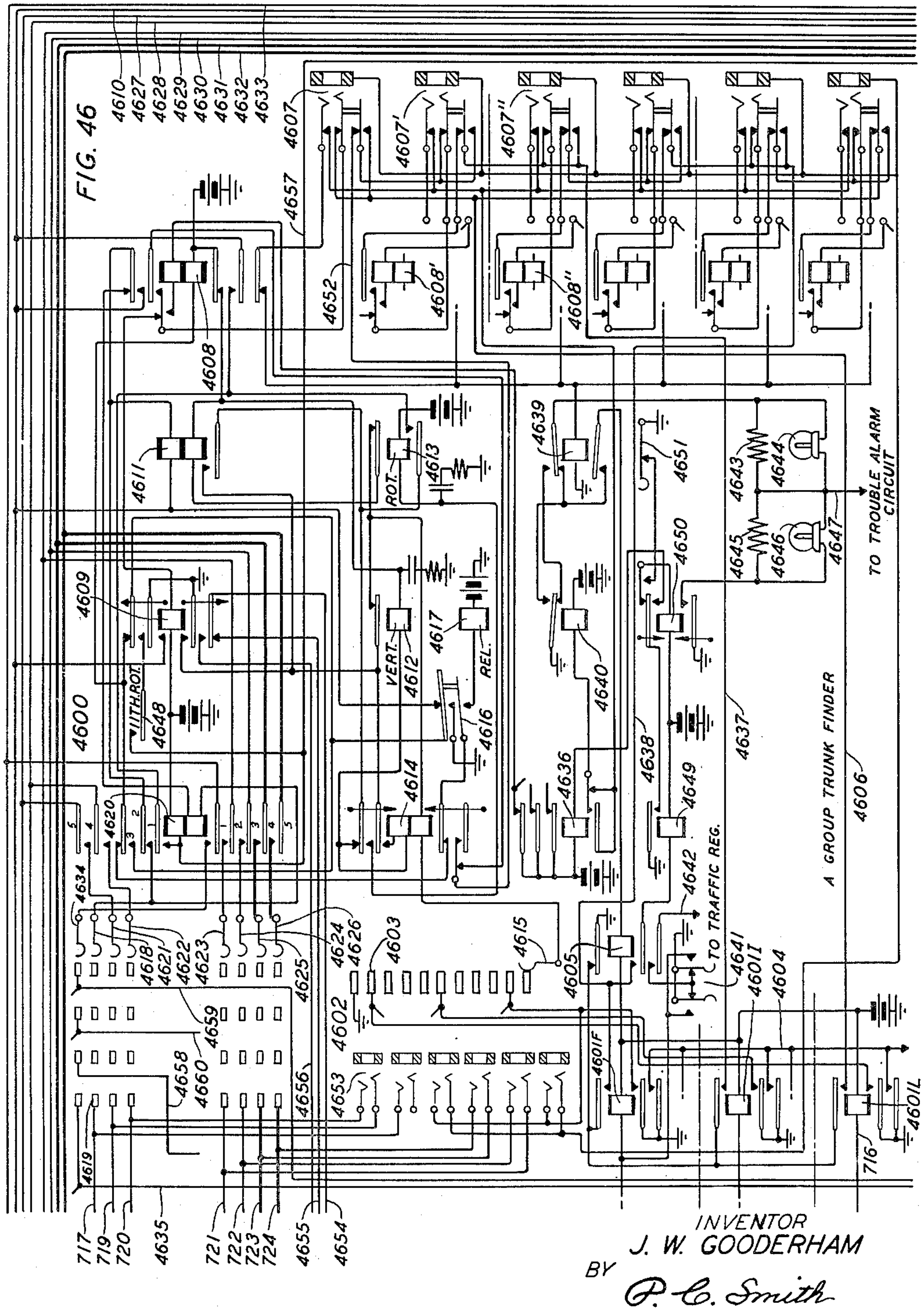
Figure 47:
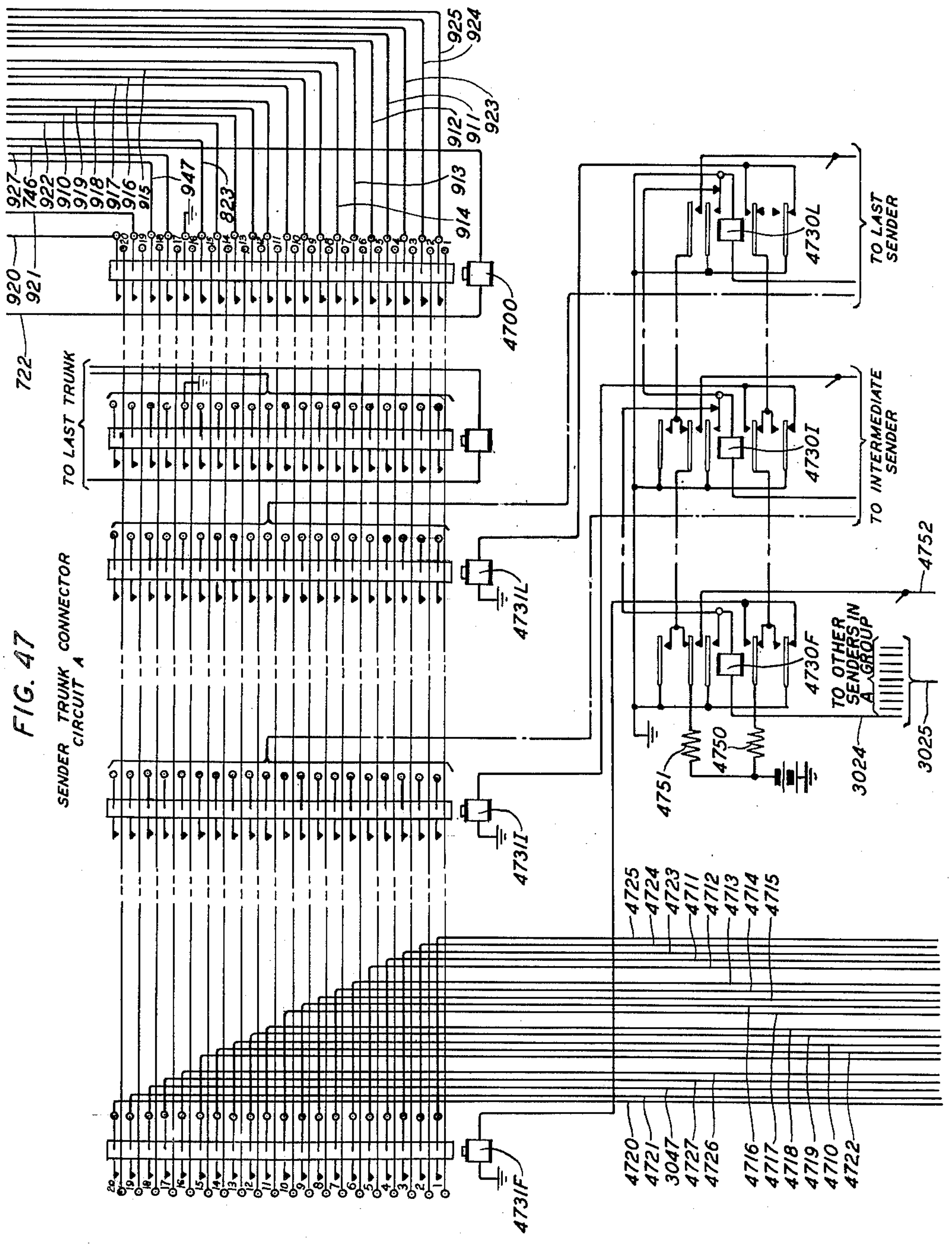
Figure 48:
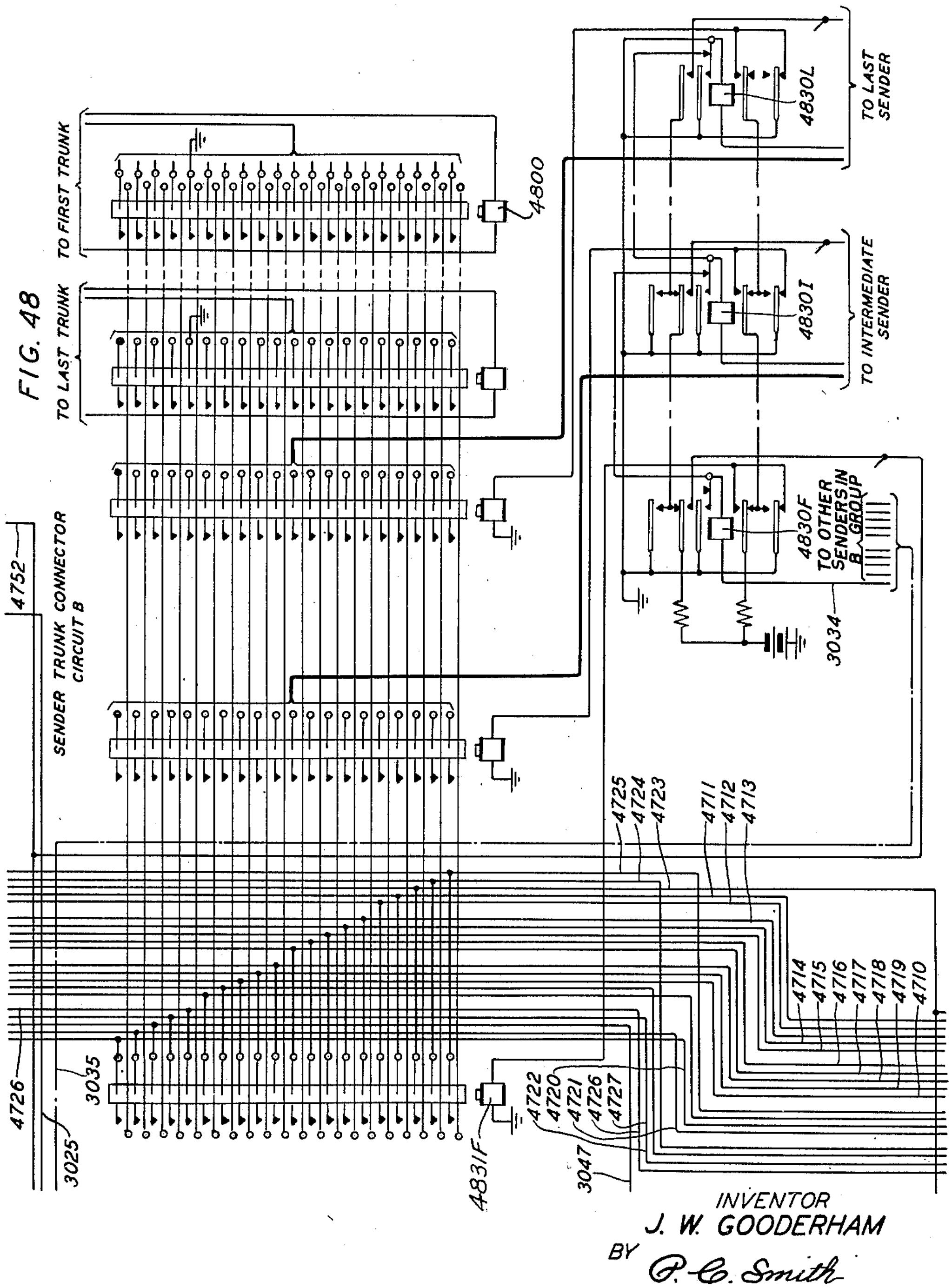

Fig. 3 in the upper portion thereof discloses three line finder-first selector links of different service classes extending between line finders of the first office unit of Figs. 1 and 2 and the first selector switches of Fig. 4; discloses an operator's trunk circuit terminating in a first selector switch of Fig. 4 and in the lower portion thereof shows connecting relays and class transformer coils of the class and number circuit;

Fig. 4 shows schematically trains of first, second and third selector switches over which connections may be extended from the lines of the office units of Figs. 1 and 2 to a ticketing trunk; branches of the incoming end of the ticketing trunk of Figs. 7, 8 and 9 and the incoming end of a trunk terminating in the rotary out-trunk secondary switch of Fig. 6;

Fig. 5 is a diagram showing how the several figures of the drawings should be arranged to disclose the complete invention and, in the right portion thereof, conductors interconnecting Figs. 4 and 6;

Fig. 6 shows an out-trunk secondary switch having access to a plurality of subgroups of automatic ticketing trunks;

Figs. 7, 8 and 9 taken together show a complete ticketing trunk including a digit register, duration of conversation registers and an automatic ticket printer;

Figs. 10, 11 and 12 show thousands number circuits which may be individual to the office unit shown in the left portions of Figs. 1 and 2 and common to the plurality of identifiers serving the office building in which the office units of Figs. 1 and 2 are located; Fig. 10 and the upper portion of Fig. 11 showing four of the ten thousands transformer coils and the associated hundreds transformer coils; Fig. 11 showing in the lower portion thereof two groups of hundreds connector relays having access to corresponding hundreds groups of lines of two of the thousands groups and Fig. 12 showing two of the ten groups of thousands connector relays;

Figs. 13 and 14 together with the lower portion of Fig. 3, show the class and number circuit which is common to all identifiers serving the same office building; Figs. 3 and 13 showing in the left portion thereof switching relays whereby the class and number circuit has access to the thousands transformer coils of all of the thousands number circuits of the building; Fig. 13 showing in the upper portion thereof the class connector relays allocated to the identifiers which have access to the class circuit and showing in the lower portion thereof the number connector relays allocated to the identifiers which have access to the line identification circuits of the several office units of the same office building and Fig. 14 disclosing identifier lock-out circuits and office unit relays;

Figs. 15 to 27, inclusive, show one of the identifiers for serving the office units of an office building. Of these circuits Fig. 15 shows two of the tens transformer coils for identifying the tens groups and tens digits of calling lines, units identifying pads and switching relays for successively rendering different portions of the circuits of Figs. 10, 11 and 15 effective; Fig. 16 shows amplifier and detector circuits indicated by the boxes for detecting the presence of signal current on the line finder sleeve conductors and connector sleeve conductors of any connection established by a calling subscriber to cause the registration of the class of the calling line and if automatic ticketing service is denied to the calling line and associated register and control relays; Fig. 17 shows additional control relays; Fig. 18 shows in the right portion thereof other switching relays and in the left portion thereof amplifier and detector circuits connectable to the several portions of the identification circuit through the operation of the switching relays of Fig. 15 for detecting the presence of signal current on the connected sleeve conductor of any calling line and register relays associable with the detector circuits; Fig. 19 discloses a timing circuit associated with the circuits of Fig. 18; Figs. 20 and 21 show additional control relays; Fig. 22 shows in the upper portion thereof register circuits for registering the office unit indentification of the office unit in which a calling line terminates and in the lower portion thereof register circuits for registering the thousands digit of the calling line; Fig. 23 shows register circuits for registering the hundreds digit of the calling line; Fig. 24 shows register circuits for registering the tens digit of the calling line; Fig. 25 shows register circuits for registering the units digit of the calling line; and Figs. 26 and 27 show the called office code identifying and route relay circuits together with the timing equipment disclosed in the left portion of Fig. 27;

Fig. 28 shows identifier-connector equipment individual to a sender for connecting such sender with an idle one of the identifiers which serve the calling office units of the same office building;

Fig. 29 shows the preference and lock-out circuits appertaining to the identifier-connector of Fig. 8, whereby any one of a plurality of senders may secure access to an idle one of a plurality of identifiers; at the right of said figure is shown one of the registers of the sender;

Figs. 30 to 43, inclusive, show a complete sender; Figs. 30, 31 and 32 showing control relays and Fig. 32 showing a progress switch for successively associating groups of sender registers with the ticket printer of Fig. 9; Fig. 33 showing groups of register relays for registering the thousands, hundreds, tens and units digits of a calling line number transferred thereto from the registers of the associated identifier; Figs. 34 and 35 showing groups of register relays for registering the digits of a called line number dialed by a calling subscriber before the sender was connected and transferred thereto from the identifier; Figs. 36 and 37 showing the control, lock-out and connector circuits for associating an idle day and hour circuit with any sender; Fig. 38 showing the calling rate register relays and dial pulse counting relays and other control relays; Fig. 39 showing the outpulsing circuit; Figs. 40 and 41 showing the registers for registering the digits of the called line number dialed into the sender following the seizure thereof by a ticketing trunk; and Figs. 42 and 43 showing further control relays;

Fig. 44 shows identifier-trunk connectors of the B group for connecting an identifier seized by a sender with a trunk of a B group of one hundred trunks which has been connected to the sender;

Fig. 45 shows identifier trunk connectors of an A group for connecting an identifier seized by a sender with the trunk of an A group of one hundred trunks which has been connected to the sender and in the right portion thereof a trunk finder of a B group of finders individual to a sender for connecting such sender with a calling one of a B group of one hundred ticketing trunks;

Fig. 46 shows a trunk finder of the A group of finders individual to the same sender as the trunk finder of Fig. 45 for connecting the sender with a calling one of an A group of one hundred ticketing trunks;

Fig. 47 shows a sender-trunk connector of an A group for connecting any seized sender with the ticketing trunk in the A group of ticketing trunks which has seized such sender;

Fig. 48 shows a sender-trunk connector of a B group for connecting any seized sender with the ticketing trunk in the B group of ticketing trunks which has seized such sender; and Figs. 49 to 52, inclusive, show one of the month, day and hour circuits associable with any sender through the connector circuits of Figs. 36 and 37.

The line finders schematically illustrated in Figs. 1 and 2 are of the well known step-by-step type, each having two brush sets, of which one has access to an upper bank of terminals in which one hundred lines terminate and the other has access to a lower bank of terminals in which a second one hundred lines terminate. Each group of two hundred lines is accessible from a subgroup of line finders, an idle one of which is started upon the initiation of a call from any line of the group. The line finders shown in the left portions of Figs. 1 and 2 serve lines of one office unit which may comprise ten thousand lines and the line finders shown in the right portion of these figures serve lines of a second office unit, both units being located in the same office building.

Each flat rate subscriber's line is provided with separate appearances in the banks of connector switches of different hundreds groups for the two-party stations of the line and, therefore, each flat rate party line subscriber has a distinguishing directory number. The line sleeve conductors of all lines have branches which are connected through serially connected condensers and resistances to terminals on the cross-connecting rack and other branches which appear in the contacts of hundreds group connector relays. The sleeve conductor branches of the lines in office unit A terminate in the horizontal terminal strips of ten cross-connecting racks of which the racks 1000, 1001, 1008 and 1009 for the Nos. 0, 1, 8 and 9 thousands group of connector sleeve conductors are disclosed in Figs. 10 and 11. Each such terminal may be cross-connected over the vertical strips of the racks to the primary winding of the denied service transformer coil 1010 if it represents a subscriber to whom automatic ticketing service is to be denied; or through the primary winding of the hundreds group transformer coil of the hundreds connector group in which the appertaining subscriber's line terminates, to the primary winding of the thousands group transformer coil of the thousands group in which the appertaining line terminates of a tip field of hundreds transformer coils such, for example, as coils 1HT0—0HT0, 1HT1—0HT1, 1HT8—0HT8 and 1HT9—0HT9 and of a tip field of thousands transformer coils such, for example, as coils 0THT, 1THT—8THT and 9THT if the substation is a tip party substation of a two-party flat rate line; or through the primary winding of a hundreds group transformer coil of the hundreds connector group in which the appertaining subscriber's line terminates, to the primary winding of a thousands group transformer coil of the thousands group in which the appertaining line terminates of a ring field of hundreds transformer coils such, for example, as coils 1HR0—0HR0, 1HR1—0HR1, 1HR8—0HR8 and 1HR9—0HR9 and of a ring field of thousands transformer coils such as 0THR, 1THR—8THR and 9THR if the substation is a ring party substation of a flat rate party line, an individual line, or either a tip or ring party substation of the message rate party line. The horizontal and vertical strips of the racks are insulated from each other by interposed sheets of insulation and any horizontal line terminal strip may be cross-connected to any one of the vertical strips by the insertion of a screw at their point of intersection.

One hundred hundreds group connector relays are provided for each group of ten thousands number circuits, the connector relays 1100, 1101, 1102 and 1109 of the Nos. 0, 1, 2 and 9 hundreds group of the No. 0 thousands group and the connector relays 1190, 1191, 1192 and 1199 of the Nos. 0, 1, 2 and 9 hundreds group of the No. 9 thousands group being disclosed in Fig. 11.

The branches of the sleeve conductors of the lines terminating in office unit B are connected to cross-connecting racks, transformer coils and appear in hundreds connector relays similar to those disclosed in Figs. 10 and 11 and are represented schematically by the box in Fig. 2.

Ten groups of thousands connector relays are provided for each group of ten thousands number circuits, each group having a relay individualized to each of the identifiers serving the office building in which the office unit is located. In Fig. 12 relays 1230F—1230L are the connector relays of the No. 0 thousands group of which relay 1230F appertains to the first of the group of identifiers and relay 1230L appertains to the last of the group of identifiers and relays 1239F—1239L are the connector relays of the No. 9 thousands group of which relay 1239F appertains to the first of the group of identifiers and relay 1239L appertains to the last of the group of identifiers. Ten similar groups of thousands connector relays are included within the box of Fig. 2 for the office unit B.

Each line finder is paired with a first selector switch, such first selector switches and a first selector switch in which an operator's trunk terminates being disclosed schematically by the wiper sets 400 to 403, inclusive, of Fig. 4. For further extending connections from calling lines, second selector switches disclosed schematically by wiper sets 404 and 405 and third selector switches such as disclosed schematically by wiper set 407 of Fig. 4 are provided. These selector switches may be of well-known step-by-step type and controlled directly by a calling subscriber's dial to establish local connections or to establish a connection to an idle ticketing trunk such as is disclosed in Figs. 7, 8 and 9 should the subscriber desire a connection to a subscriber's line which terminates in the toll area adjacent to the exchange area in which the calling line terminates. As disclosed, the ticketing trunk of Figs. 7, 8 and 9 has branches which terminate in banks of first selector switches such as 400, other branches which terminate in banks of second selectors such as 404, other branches which terminate in the banks of third selector switches such as 407 and still other branches which terminate in the banks of rotary out-trunk secondary switches such as 600 of Fig. 6, whereby the trunk may be respectively seized in response to the dialing of the first office code digit of certain distant offices, in response to the dialing of the first and second office code digits of other offices and in response to the dialing of the three office code digits of still other offices. In the commercial use of the invention, however, a plurality of groups of ticketing trunks, for example, twenty groups of ten trunks each, might be required to handle the toll traffic and therefore some of the groups of trunks would be made accessible only from bank levels of first selectors, other groups would be accessible only from bank levels of second selectors and still other groups would be made accessible from bank levels of third selectors. Still other groups might have incoming branches, as disclosed, accessible from bank levels of different selectors. The trunking scheme may therefore be made quite flexible for allocating the trunk groups in accordance with the density of the toll traffic to different parts of the toll area. Secondary out-trunk switches are interposed between selector bank levels and groups of trunks where a single selector bank level is divided to serve branches of two trunk groups. A divided level selector having access to two groups of out-trunk switches is schematically disclosed at 406 of Fig. 4. This selector may be of the type disclosed in Patent No. 2,249,067, granted July 15, 1941 to P. W. Wadsworth.

Figure 49:
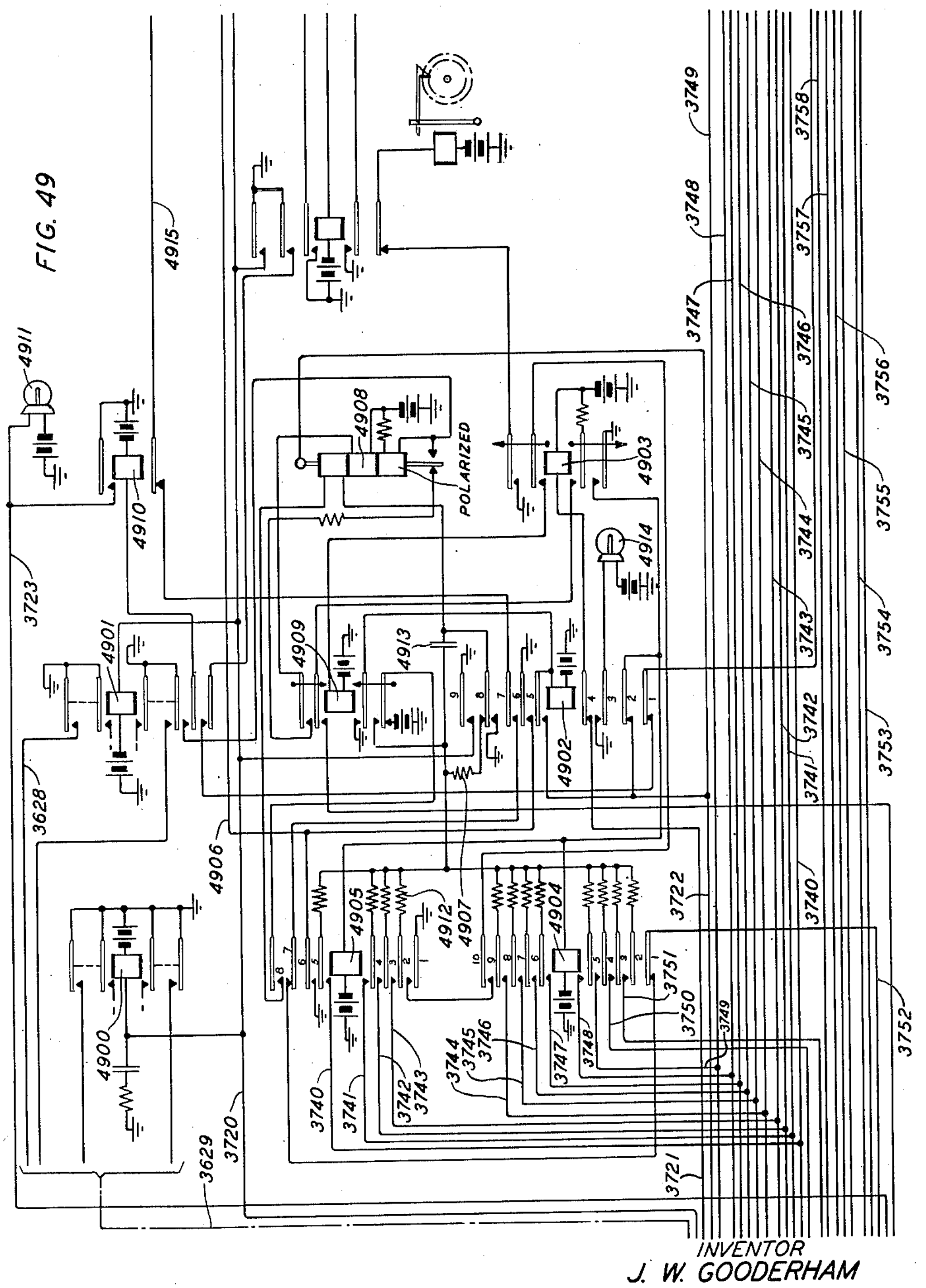
Figure 50:
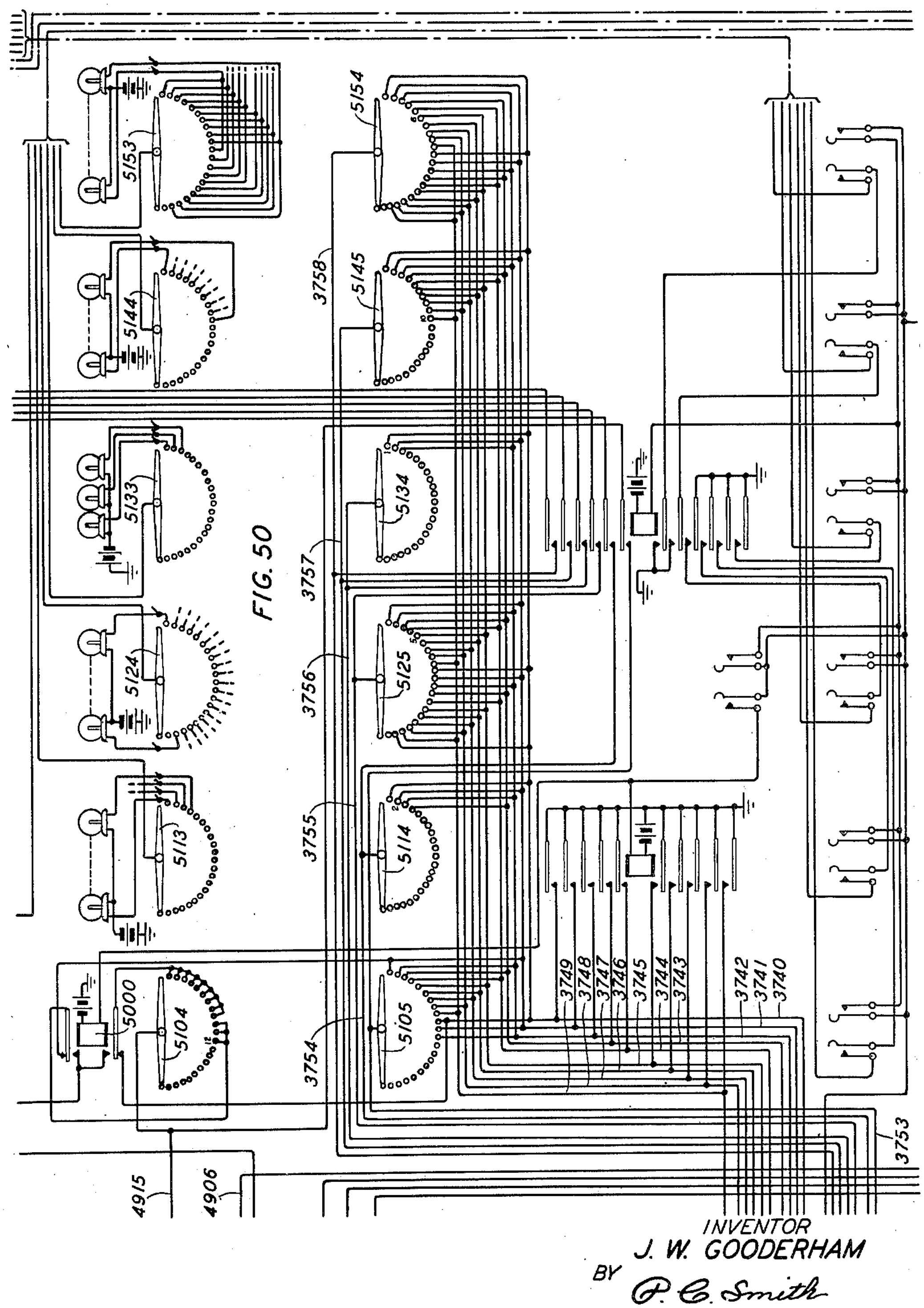
Figure 51:
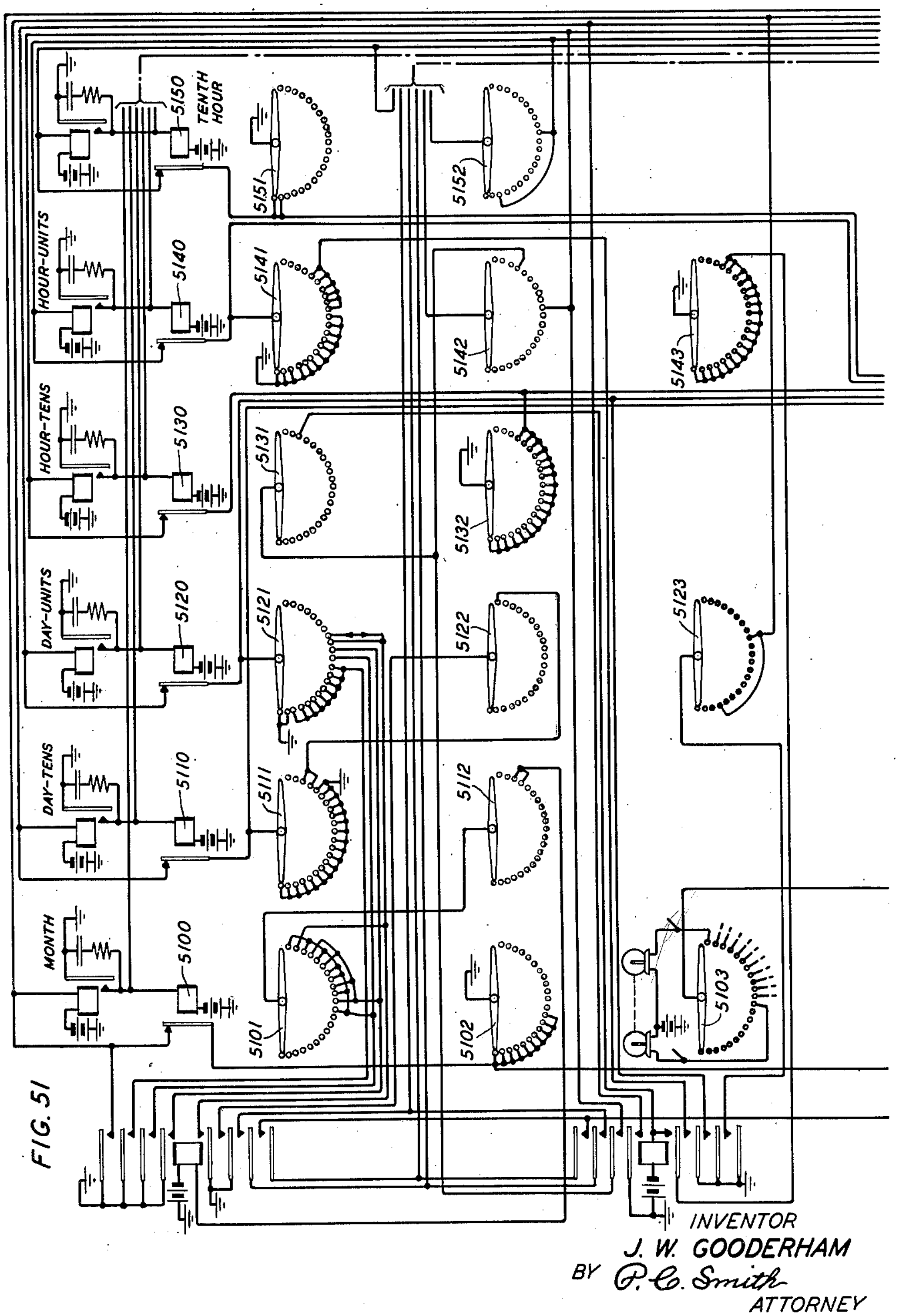
Figure 52:
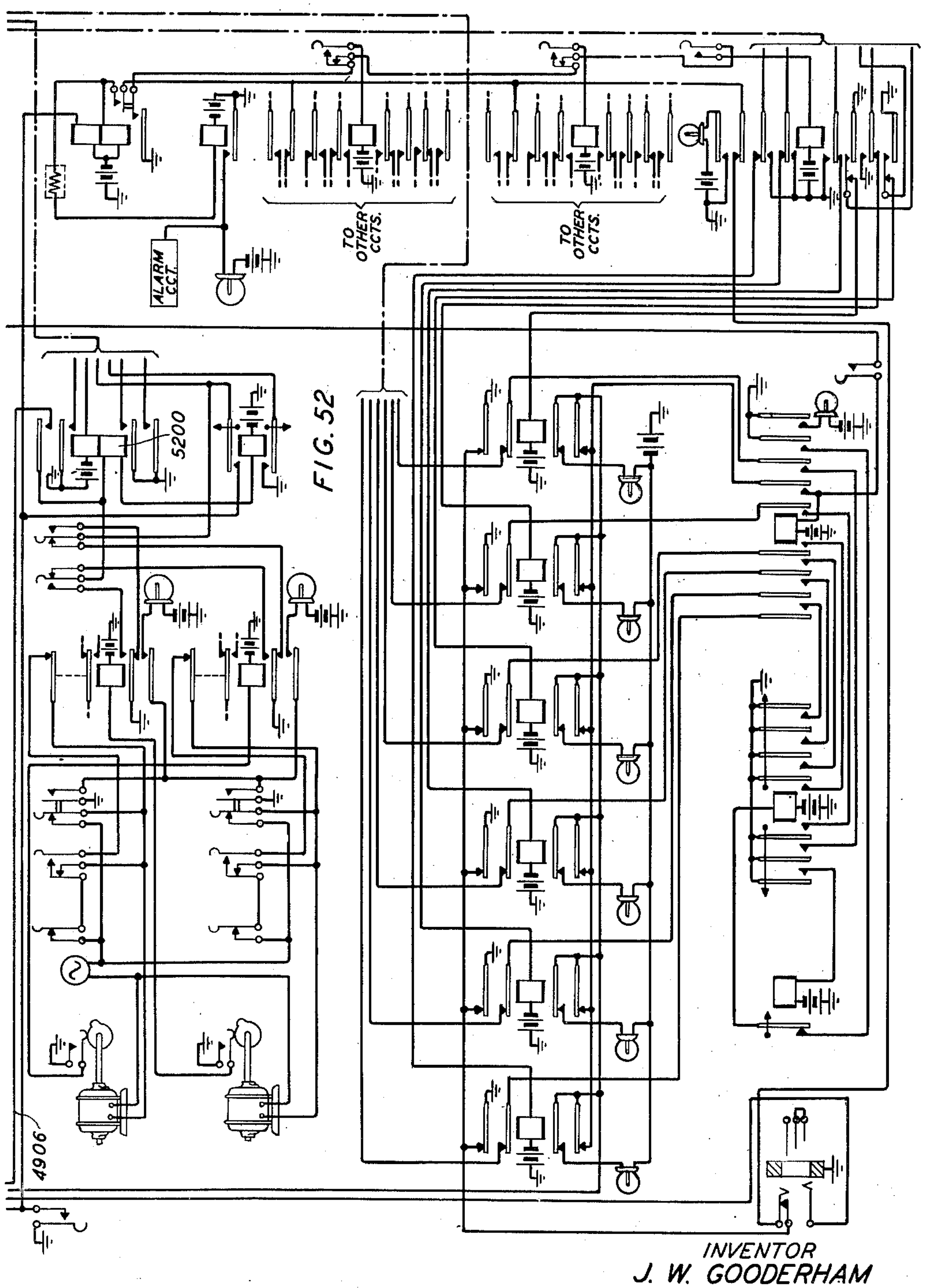

The secondary out-trunk switch 600, digit register 850 and the elapsed time registers 900 and 950 associated with the ticketing trunk, the progress switch 3250 of the sender and the registers of Figs. 49 and 50 of the day and hour circuit may be of the rotary step-by-step type. The out-trunk switch 600 and the registers of Figs. 49 and 50 have no normal position and always advance from the terminal position in which their brushes were last set. The brushes 851 and 852 of digit register 850 are advanced step by step in response to the operation of the stepping magnet 853 and are restored to normal by the operation of release magnet 854, the brushes 901 and 902 of register 900 are advanced by stepping magnet 903 and are restored by release magnet 904, and the brushes of the register 950 and progress switch 3250 are advanced step by step from their normal positions and are returned to their normal positions by a further forward stepping movement.

The ticket printing mechanism 960 associated with the automatic ticketing trunk may be of the type disclosed in Patent No. 2,309,688 issued to W. J. Zenner on February 2, 1943.

Two trunk finders of the step-by-step double brush set type are individualized to each sender. One pair of such trunk finders is disclosed in Fig. 46 and the right portion of Fig. 45. One brush set of the A finder shown in full in Fig. 46 has access to an upper bank of terminals in which control conductors from a first one hundred ticketing trunks terminate and the other brush set has access to a lower bank of terminals in which other control conductors from the same one hundred trunks terminate. One brush set of the B finder, shown schematically in the right portion of Fig. 45, has one brush set which has access to an upper bank of terminals in which control conductors from a second hundred of ticketing trunks terminate and a second brush set which has access to a lower bank of terminals in which other control conductors of the second hundred trunks terminate.

Since a trunk finder does not have sufficient brushes in both of its brush sets to accommodate all of the control conductors required between a trunk and a sender, a plurality of additional trunk-sender connector circuits is provided, that shown in Fig. 47 having a multicontact relay individual to each sender and ten multicontact relays individual, respectively, to ten trunks. Ten of such circuits serve the A group of one hundred trunks. Fig. 48 shows one of the ten similar circuits which serve the B group of one hundred trunks. Ten trunk-identifier-connector circuits are also provided for extending control circuits between any trunk and any one of the identifiers. Each identifier-trunk-connector circuit serves twenty trunks and is provided with a multicontact relay for each identifier. Two of the five connector circuits which serve the one hundred trunks of the A group are shown in Fig. 45 and two of the five connector circuits which serve the one hundred trunks of the B group are disclosed in Fig. 44.

*Call by tip party of flat rate line—ticketing trunk reached from first selector bank*

To more clearly set forth the novel features of the invention, it will first be assumed that the tip party subscriber whose substation is identified by the numeral 100 in Fig. 1 initiates a call for a toll connection to a subscriber's line terminating in an office of a toll area to which the calling subscriber is permitted access by dialing. Upon the removal of the receiver from the switchhook, an idle line finder having access to the calling line, such as the line finder 101, is started in search of the calling line in a well-known manner. When the line finder has found the calling line, the usual dial tone is transmitted over the calling line loop to inform the subscriber that his line has been connected with a first selector 401 paired with the line finder 101 and that he may therefore commence dialing the digits of the wanted line number.

It will first be assumed that the calling subscriber desires a connection with a line whose directory number is MAR–1345 and that a ticketing trunk over which a connection may be extended may be reached from the sixth level of the bank of first selector 401. The calling subscriber upon hearing the dial tone therefore proceeds to dial the office code letters M, A, R and the numerical digits 1, 3, 4 and 5. In response to the dialing of the first office code letter M, which has a numerical equivalent 6, the first selector 401 is operated to elevate its brush set to a position opposite the sixth bank level and to then hunt over the terminals of this level in search of an idle ticketing trunk. It will be assumed that the trunk disclosed in Figs. 7, 8 and 9 is idle and that therefore when the test or sleeve brush of the selector 401 engages the test or sleeve terminal 408 of the branch of this trunk it finds no busy ground potential thereon and therefore the selector seizes the trunk. A circuit is thereupon effective from the usual ground at the selector (not shown) over the sleeve conductor 702 of the trunk, through the lower winding of sleeve relay 703, the upper normal contacts of busy test jack 704, through the winding of relay 705 and in parallel therewith over the back contact of relay 705 and through resistance 706, to battery. Relay 703 operates from the low resistance battery thus supplied; prepares a locking circuit over its upper winding and upper innermost front contacts to aforetraced ground on conductor 702; short-circuits its lower winding and prepares a circuit over its lower front contact for a purpose to be later described. Relay 705 also operates and removes resistance 706 from the parallel connection with its winding.

As soon as the talking circuit is cut through at the selector 401, a circuit is established from ground through the upper winding of relay 707, the No. 2 upper normal contacts of relay 708, the No. 3 upper back contact of relay 709, the No. 2 upper normal contacts of relay 710, tip trunk conductor 700, tip brush of selector 401 and of line finder 101, over the calling line loop through the substation 100, thence returning over the ring brush of line finder 101 and of selector 401, rink trunk conductor 701, the No. 2 lower normal contacts of relay 710, the No. 5 upper back contact of relay 709, the No. 1 lower back contact of relay 708 to battery and ground through the lower winding of relay 707. Relay 707 thereupon operates closing over its front contact a circuit for slow-to-release relay 711 which may be traced from ground over the No. 1 upper normal contacts of relay 709, over the front contact of relay 707 to battery and ground through the winding of relay 711. Relay 711 thereupon operates; establishes an obvious circuit for slow-to-release relay 712; prepares over its inner upper front contact a circuit for the stepping magnet 853 of the digit register 850 and for the slow-to-release relay 713; connects ground from the lower No. 3 back contact of relay 714 over its upper front contact and the No. 2 upper back contact of relay 715 to the trunk finder start conductor 716 which is common to ten trunks of the subgroup; establishes a connection from ground and battery through the winding of relay 715, the No. 3 upper back contact of relay 714, the lower front contact of relay 711 to conductor 717 to mark the trunk as calling so that the started trunk finder will stop on the terminals of such trunk, and connects ground over its middle upper front contact, the No. 5 upper back contact of relay 718, the normal contacts of jack 704, over the upper front contacts of sleeve relay 703 and through the upper winding thereof to battery to hold relay 703 operated and over the sleeve conductor 702 of the trunk to hold the selector 401.

When relay 707 releases due to the opening of the dialing circuit for the first pulse of the second office code letter A, the circuit for magnet 853 and the circuit of relay 713 previously prepared by the operation of relay 711 are completed from ground over the upper No. 1 normal contacts of relay 709, the back contact of relay 707, the upper inner front contact of relay 711, the normal contacts of off-normal contact springs 855 of the digit register 850, the lower normal contacts of relay 713 to battery and ground through the winding of relay 713 and in parallel over the lower No. 1 back contact of relay 800 to battery and ground through the winding of stepping magnet 853. Magnet 853 and relay 713 both operate, relay 713 because of its slow-to-release characteristic remaining operated until the termination of the impulse series. Upon the first step advance of the register brushes 851 and 852, the off-normal contacts 855 become operated whereupon the operating circuits of relay 713 and magnet 853 are extended over the lower alternate contacts of relay 713 to ground over the circuit traced over the contacts of relay 709. Since the second code letter dialed was A, two impulses are transmitted in the impulse series and brushes 851 and 852 are advanced to the second terminal positions of their respective arcs. Upon the termination of this impulse series relay 713 releases.

In the meantime, however, the connection of ground to the trunk finder start conductor 716 has caused the operation of the group start relay 4601L of Fig. 46 which is allocated to the last subgroup of ten trunks of the A group of one hundred trunks. Ten group relays are provided individual respectively to the ten subgroups of trunks of the A group, the group relay of an intermediate group being shown at 4601I and the group relay of the first group being shown at 4601F. Ten similar group relays would be provided for the ten subgroups of the B group of one hundred additional trunks and associated with the B group of trunk finders one of which is disclosed schematically in Fig. 45. Group relay 4601L upon operating connects ground over its inner lower contact to the level segments 4603 of the vertical commutators 4602 of all trunk finders of the A group having access to the A group of trunks; connects ground to the trouble alarm circuit conductor 4604 and causes the operation of the start relay 4609 of the first idle trunk finder. The trunk finders are divided into preference subgroups in accordance with the subgroups of trunks whereby any trunk of a subgroup has the preferential use of trunk finders of a particular subgroup. If at any time all of the trunk finders which are first choice preference of a subgroup of trunks are busy, such subgroup of trunks then has second choice use of the trunk finders of another subgroup which are normally the first choice of another subgroup of trunks.

The trunk finder 4600 disclosed in Fig. 46 is the first finder of the last group of finders allocated as first choice to the last subgroup of trunks to which the group relay 4601L appertains. It will be assumed that this finder is idle and that therefore upon the operation of relay 4601L a circuit is established from ground over the back contact of relay 4605, the upper contacts of relay 4601L, in-start conductor 4606, over the middle normally closed contacts of the test and busy jack 4607 of the trunk finder 4600, the inner upper normal contacts of relay 4608 through the winding of start relay 4609 to battery and ground. Relay 4609 upon operating connects ground over its inner upper front contact to conductor 4610 and causes the operation of the stepping relay 4611 in a circuit extending from ground over the inner lower front contact of relay 4609, interrupter contacts of vertical magnet 4612, interrupter contacts of rotary magnet 4613, lower winding of relay 4611 to battery and ground over the inner lower back contact of relay 4608. Relay 4611 upon operating causes the operation of the vertical stepping magnet 4612 over a circuit extending from ground at the inner lower front contact of relay 4609, over the front contact of relay 4611, the upper back contact of relay 4614, through the winding of magnet 4612 to battery over the inner lower back contact of relay 4608. The brush shaft of the finder is thereby lifted one step placing the commutator brush 4615 on the first wired segment of the vertical commutator 4602. The vertical off-normal springs 4616 are now operated to their alternate positions and the circuit of relay 4611 is opened at the interrupter contacts of magnet 4612. Relay 4611 now releases, in turn releasing magnet 4612 which in turn recloses the circuit of relay 4611, relay 4611 reoperating and causing the reoperation of magnet 4612. In this manner, magnet 4612 is repeatedly operated and released to advance the brush shaft upwardly step-by-step until the commutator brush 4615 engages the grounded segment 4603 whereupon a circuit is established from ground on such segment, over brush 4615, through the lower winding of relay 4614, over the interrupter contacts of rotary magnet 4613, through the lower winding of relay 4611 to battery and ground over the inner lower back contact of relay 4608. Relay 4611 is thus held operated to prevent further stepping and relay 4614, which is slow to operate, operates after an interval sufficient to permit the switch brushes to cease vibrating following the completion of their last vertical stepping movement and before they are started in their rotary stepping movement.

When relay 4614 operates, it locks in a circuit from battery over the inner lower back contact of relay 4608, through the winding of magnet 4612, through the upper winding and inner upper front contact of relay 4614 to ground at the inner lower front contact of relay 4609; opens at its inner lower back contact the circuit extending over the lower contacts of the off-normal springs 4616 through the winding of release magnet 4617 and transfers the stepping circuit control of stepping relay 4611 from the vertical magnet 4612 to the rotary magnet 4613. With stepping relay 4611 now operated, the circuit of the rotary magnet 4613 may be traced from ground over the inner lower front contact of relay 4609, contacts of relay 4611, upper front contact of relay 4614 through the winding of magnet 4613 to battery and ground. Magnet 4613 upon operating advances the brush sets of the finder one step in a rotary direction and opens at its interrupter contacts the holding circuit for relay 4611 previously traced and the operating circuit thereof extending from ground over the inner lower front contact of relay 4609, the interrupter contacts of magnet 4612, the interrupter contacts of magnet 4613, lower winding of relay 4611 to battery over the inner lower back contact of relay 4608, whereupon relay 4611 releases in turn releasing magnet 4613. Magnet 4613 upon releasing reestablishes the operating circuit of relay 4611 which in turn reestablishes the circuit of magnet 4613 to advance the brush sets another step in the rotary direction. In this manner the brush sets are advanced step-by-step until the test brush 4618 encounters the test terminal 4619 of the calling trunk.

It has been assumed that the calling trunk of Figs. 7, 8 and 9 appears in the last terminal set of the levels of the banks of the trunk finder corresponding to the commutator segment 4603, which levels are partly shown. Therefore when the brush sets have been stepped vertically to a position opposite such levels in their banks as illustrated and have been advanced ten steps in the rotary direction into engagement with the last terminal sets of such levels, a circuit will be established from battery applied through the winding of relay 715 of the trunk, upper No. 3 contacts of relay 714, lower outer contacts of relay 711, over conductor 717 to the test terminal 4619, thence over test brush 4618, through the lower winding of relay 4620, upper back contact of relay 4608, through the upper winding of relay 4611 to ground on conductor 4610. Relay 4611 is held operated over this circuit to prevent further rotary stepping of the switch shaft and relay 4620 operates sufficiently to close its inner upper contacts thereby establishing a circuit from battery through its upper winding over such contacts, the lower contacts of rotary magnet 4613, contacts of relay 4611, to ground over the inner lower contacts of relay 4609. Both of its windings being now energized, relay 4620 fully operates to extend control conductors 719 to 724, inclusive of the trunk, over brushes 4621 to 4626, inclusive, of the trunk finder and upper Nos. 4 and 5 and lower Nos. 2 to 5 contacts of relay 4620 to conductors 4627 to 4632, inclusive, extending to the sender; to cause the operation of relay 4608 in a circuit extending from ground over the off-normal springs 4616, the No. 3 upper front contacts of relay 4620 through the lower winding of relay 4608 to battery and ground; to connect sender conductor 4633 over its lower No. 1 contacts and brush 4634 to conductor 4635 which is multipled to corresponding bank terminals in the same vertical row of the upper finder bank; to open at its No. 3 back contact another point in the circuit of release magnet 4617 and to prepare a locking circuit for itself over its No. 1 upper front contacts which will be effective following the operation of relay 4608.

Relay 4608 upon operating extends a connection from the trunk conductor 717 over terminal 4619 and brush 4618, the upper No. 2 contacts of relay 4620 and the upper front contact of relay 4608 to conductor 4610 extending to the sender; completes the locking circuit of relay 4620 extending from battery through the upper winding and No. 1 upper contacts of relay 4620, lower front contacts of relay 4608 to ground on conductor 4610; disconnects the lower winding of relay 4620 from the test brush 4618; transfers at its inner upper contact the in-start conductor 4606 from the winding of start relay 4609 to the out-start conductor 4652 and through the upper winding of relay 4608 to battery at the upper back contact of relay 4636; at its inner lower back contact, removes battery from the lower windings of relays 4611 and 4614 and from the vertical magnet 4612 and at its upper front contact shunts the upper winding of relay 4611. Relays 4611 and 4614 now release and relay 4609 being slow to release, releases after an interval sufficient to allow ground to be applied to conductor 4610 by the sender to hold relay 4620 and relay 715 of the trunk operated after relay 4609 has released.

When relay 4614 releases, the continuity of the out-start conductor is established at its lower contacts whereby if a second trunk in the same subgroup should be in a calling condition, ground placed on the in-start conductor 4606 will be effective to start the second trunk finder of the same subgroup of finders if it is idle, over a circuit extending from conductor 4606 over the middle normal contacts of test jack 4607, the inner front contacts of relay 4608, the lower normal contacts of relay 4614, conductor 4652, the lower normal contacts of test jack 4607, the middle normal contacts of test jack 4607′, associated with the second trunk finder of the same trunk finder group, thence over the upper normal contacts of relay 4608′ to the start relay of such second finder corresponding to relay 4609. Had such second finder of the subgroup of finders been busy and consequently if relay 4608′ had been operated, the start circuit just traced would be extended over the front contacts of this relay, the lower normal contacts of test jack 4607′, the middle normal contacts of test jack 4607″ associated with the first finder of the next subgroup of finders serving as second choice finders to the last subgroup of trunks and first choice to another subgroup of trunks, thence over the normal contacts of relay 4608″ of such finder to the start relay thereof. In a similar manner, the in-start conductors 4606, 4637, 4638, etc. of the ten trunk subgroups may be extended to start trunk finders in their allocated first choice subgroups of finders or in other choice subgroups of finders.

When all finders are busy, all relays 4608, 4608′, etc. will be operated and consequently the parallel circuits over which relays 4639 and 4640 are normally held operated will be opened. One of these parallel circuits may be traced from ground through the winding of relay 4639 over the lower back contact of relay 4608, upper normal contacts of test jack 4607, lower normal contacts of relay 4636 to battery and ground through the winding of relay 4640. With relays 4639 and 4640 both released, a circuit is established for relay 4605 extending from ground at the upper back contact of relay 4640 over the lower back contact of relay 4639 through the winding of relay 4605 to battery. Relay 4605 operates to close a circuit from ground over the normal contacts of test key 4641, the lowermost contacts of relay 4605 and conductor 4642 to the traffic register and removes operating ground at its upper back contact from all group relays 4601L, etc. This removes ground from any in-start conductor 4606, etc. to permit an operated relay such as 4608 of any finder which may become idle to release and to thereby make such finder available for use. When such relay releases, relays 4639 and 4640 again operate releasing relay 4605 and thereby rendering the group relays 4601L, etc. again operable on incoming calls.

Should any part of the chain start circuit disclosed in the right portion of Fig. 46 become crossed with battery or ground, either relay 4639 or 4640 will release, depending upon whether the conductor is crossed with battery or ground. If relay 4639 releases indicating a cross to ground, a circuit will be established from ground over the front contact of relay 4640, over the upper back contact of relay 4639, thence in parallel through resistance 4643 and lamp 4644, over conductor 4647 to battery at the trouble alarm circuit. If relay 4640 releases indicating thereby a cross to battery, a connection will be established from ground over the back contact of relay 4640 and the front contact of relay 4639, thence in parallel through resistance 4643 and lamp 4644 over conductor 4647 to battery at the trouble alarm circuit.

The test line jacks 4653 are common to the A group of one hundred trunks and are used in conjunction with the test jack 4607 individual to a trunk finder such as 4600 for making a routine test of such finder. Test key 4641 is wired to the group relay 4601F of the first subgroup of trunks and is operable to enable the testman to make a quick test of the start conductors and all trunk finders of the A group. Relays 4636, 4649, and 4650, key 4651 and the eleventh rotary step springs 4648 in conjunction with relays 4605, 4639 and 4640 provide means for lighting the trouble lamp 4646 and operating a trouble alarm relay in the trouble alarm circuit in the event one of the start conductors 4606, 4637, etc. becomes grounded due to some trouble in the circuit and all idle trunk finders start one at a time and advance to their eleventh rotary step positions and release. Since these features are only incidental to the invention, no detailed description thereof is considered necessary.

Had the calling trunk been in the subgroup of a second or B group of one hundred trunks, a group relay 4501L, corresponding to one of the group relays 4601 associated with the A group of trunk finders, would have been operated to cause the operation of the start relay of an idle trunk finder such, for example, as the start relay 4509 of the trunk finder 4500 of Fig. 45. It is to be noted that the finder 4500 is paired with the finder 4600 and that the brushes of finder 4500 are connectable to conductors 4610 and 4627 to 4633, inclusive, to which the brushes of finder 4600 are also connectable and which extend to a sender. In order therefore that it may not be possible to connect two trunks to a single sender over the brushes of the paired trunk finders 4500 and 4600, the finder 4600 is made a preference finder and the start circuit for the paired finder 4500 is extended from ground at the contact of the group relay 4501L over conductor 4506, the inner upper normal contacts of relay 4508, of the finder 4500, conductor 4654, over the lower back contact of relay 4609 of finder 4600, conductor 4655 through the winding of start relay 4509 of finder 4500 to battery. If the finder 4600 is in use, its relay 4609 will be operated and consequently the start circuit cannot be completed to start relay 4509 of finder 4500. However, the start circuit will be extended over conductor 4654, the lower front contact of relay 4609, conductor 4656, over the inner upper normal contacts of relay 4508 of the first available finder of the B group, thence over the back contacts of the relay 4609 of the finder of the A group paired therewith to the start relay 4509 of such available finder, if the pair A group finder is not in use, or over a front contact of such relay 4609 and over contacts of similar relays 4609 and 4508 through the start relay 4509 of a B group finder whose paired A group finder is not in use.

When the trunk finder seized the terminals of the calling trunk and completed the circuit previously traced from battery through the winding of relay 715 over conductor 717, relay 715 operates and locks itself directly to ground applied over conductor 717 by the trunk finder and, at a later time, by the sender, over the No. 1 under front contact of said relay. As soon as relay 713 releases following the completion of the registration of the impulse series in the digit register 850, a circuit is completed for transfer relay 709 which may be traced from battery through the winding of said relay over the lower No. 4 back contact of relay 710, the upper No. 3 front contact of relay 715, the upper back contact of relay 713, the upper off-normal contacts 855 of register 850, the No. 1 upper back contact of relay 801, conductor 802, the lower normal contacts of off-normal springs 905 of the elapsed time register 900, the No. 1 lower back contact of relay 906 to ground over the normal position bank terminal and brush 951 of the elapsed time register 950. Thus, if the digit register 850 has been set, the registers 900 and 950 are in their normal or unset positions and a sender has been associated with the trunk, the transfer relay 709 will be operated and prepares a locking circuit over its lower No. 2 contacts, conductor 725, the lower No. 2 back contact of relay 800, conductor 803, to ground at the upper No. 1 front contact of relay 710 when relay 710 later operates. With relay 709 operated, the dialing circuit previously traced over the calling line loop and through the windings of relay 707 is disconnected from the windings of said relay and transferred to the selected sender as subsequently set forth. Relay 707 now releases followed by the release of slow-to-release relay 711, but with relays 715 and 709 now operated, relay 712 is held operated over a circuit extending from battery through its winding, conductor 728, over the lower No. 3 contacts of relay 715 to ground over the upper No. 1 alternate contacts of relay 709.

Should an idle sender not be connected to the trunk before the second train of impulses is received in the trunk, relays 715 and 709 will not have operated and therefore when relay 707 releases on the first impulse of this digit series, a circuit will be established from ground over the upper No. 1 normal contacts of relay 709, back contact of relay 707, inner upper front contact of relay 711, lower off-normal contacts 855, inner upper back contact of relay 713 to battery and ground through the winding of relay 714. Relay 714 therefore operates, locks over its upper No. 1 contacts to ground over the upper front contact of relay 712; establishes an operating circuit for the cut-through relay 710, extending from battery through the winding of relay 710, over the No. 2 upper contact of relay 714 to ground at the upper front contact of relay 712, said relay 714 locking over its lower No. 1 contacts directly to ground over the upper front contact of relay 712; prepares a paths-busy tone circuit; removes starting ground at its lower No. 3 back contact from the trunk finder start conductor 716 and disconnects at its No. 3 upper back contact marking battery through the winding of relay 715 from conductor 717. With relay 710 operated, the windings of relay 707 are disconnected from the calling line loop and the loop is extended over tip conductor 700, the upper No. 2 alternate contacts of relay 710, conductor 726, the upper left winding of repeating coil 804, the upper No. 4 back contact of relay 805 to ground through the upper winding of calling supervisory relay 806, and over ring trunk conductor 701, the lower No. 2 alternate contacts of relay 710, conductor 727, the lower left winding of coil 804, the upper No. 5 back contact of relay 805 to battery through the lower winding of relay 806. Relay 806 operates and closes a circuit for holding relay 712 operated following the release of relays 707 and 711 which occurs upon the operation of relay 710, which circuit may be traced from battery through the winding of relay 712, over conductor 728, contacts of relay 806, conductor 729 to ground over the inner lower front contact of relay 712. Relay 806 is thus under the control of the calling subscriber to control the release of the trunk. The paths-busy circuit is now completed from the source of tone current 730, over the No. 1 lower contacts of relay 714, over the tip trunk conductor 700 and the calling line loop, returning over the ring trunk conductor 701 and thence as traced to battery through the lower winding of supervisory relay 806.

It will be assumed, however, that an idle sender is attached to the trunk prior to the receipt of the second impulse series in the trunk. Prior to the operation of transfer relay 709 a loop circuit is established from battery through the lower winding of dial impulse responsive relay 3800 over conductor 3102, the lower No. 2 back contact of relay 3200, conductor 3101, upper back contact of reversing relay 3100, lower back contact of relay 3103, conductor 3003, lower No. 3 back contact of relay 3001, lower normal contacts of relay 3000, conductor 4627, the upper No. 5 contacts of relay 4620, brush 4621 of trunk finder 4600, conductor 719, the lower No. 1 normal contacts of transfer relay 709, resistance 731, No. 2 lower contacts of relay 714, the lower No. 3 contact of relay 732, conductor 720, brush 4622 of trunk finder 4600, upper No. 4 contacts of relay 4620, conductor 4628, upper normal contacts of relay 3000, No. 3 upper back contact of relay 3001, conductor 3002, lower back contact of relay 3100, conductor 3104, upper back contact of relay 3200, conductor 3105 to ground through the upper winding of relay 3800. Relay 3800 operates over this circuit and establishes a circuit from ground over its contacts, the lower back contact of relay 3801 to battery and ground through the winding of relay 3802 which thereupon operates and locks through resistance 3803 and its lower front contact to ground at the front contact of relay 3800 and at its upper front contact closes an obvious circuit for slow-to-release relay 3801. Relay 3801 upon operating connects ground over its lower front contact to conductor 4610 to replace ground applied thereto by relay 4609 of trunk finder 4600 which latter relay releases after the trunk finder has found the calling trunk. Ground applied to conductor 4610 by trunk finder start relay 4609 or sender relay 3801 causes the operation of off-normal relay 3106 which over its upper Nos. 1 to 4 contacts connects ground to the off-normal conductors 3107 to 3110, inclusive, over its lower Nos. 2, 4 and 5 contacts connecting ground to the off-normal conductors 3111, 3112 and 3113 and over its lower No. 6 contacts connects battery over conductor 3114 to the windings of party test relay 3004.

In addition, relay 3801 upon operating connects ground over its upper front contact, over conductor 3815 and the inner upper normal contacts of steering relay 4007 to battery through the winding of relay 4008. Relay 4008 thereupon operates and prepares circuits for the relays 4001, 4002, 4004 and 4006 for registering the first impulse series dialed into the sender.

After the operation of transfer relay 709, conductor 719 of the loop circuit previously traced through the windings of relay 3800, is connected over the lower No. 1 alternate contacts of relay 709 and the upper No. 2 normal contacts of relay 710, to the tip trunk conductor 701. Conductor 720, on the other hand, is connected over the lower No. 4 contacts of relay 709 and the lower No. 2 normal contacts of relay 710 to the ring trunk conductor 700, whereby relay 3800 is placed under the control of the calling subscriber.

In response to the opening of the dialing loop for the first impulse of the third code letter dialed, which has been assumed to be R and having a numerical equivalent of 7, relay 3800 releases in turn releasing relay 3802, but relay 3801 being slow to release does not release during the transmission of the impulse series. With relay 3801 operated and relay 3802 released, a circuit is established from battery through the winding of slow-to-release relay 3804, the upper back contact of relay 3803, conductor 3808 to ground over the inner upper front contact of relay 3801. Relay 3804 operates and establishes an operating circuit for relay 3805 which may be traced from battery through the winding of relay 3805 over the back contact of relay 3806, lower back contact of relay 3807, the lower back contact of relay 3802, conductor 3826, the lower alternate contacts of relay 3804 to ground on conductor 3808. Relay 3805 upon operating locks itself in a circuit from battery through its winding, the back contact of relay 3806, the inner lower front contact of relay 3805, through the upper winding of relay 3807 thence to ground on conductor 3826, closes a circuit from battery through the winding of relay 3802 over the inner upper back contact of relay 3807 and the inner upper front contact of relay 3805 to the front contact of relay 3800, which becomes effective when relay 3800 again operates and prepares a locking circuit for relay 3802. Relay 3807 does not operate in the locking circuit of relay 3805. At the end of the first impulse, relay 3800 again operates in turn completing the circuit of relay 3802 which operates if relay 3805 has operated. Relay 3802 upon operating locks in a circuit through its winding, over the inner upper back contact of relay 3807, the inner upper and outer upper front contacts of relay 3805, the upper back contact of relay 3807 to ground at its own upper front contact; at its lower back contact opens the shunt around the upper winding of relay 3807 which thereupon operates in the locking circuit of relay 3805 and opens the operating circuit of relay 3804. When relay 3800 releases at the beginning of the second impulse, relay 3802 again releases since its locking circuit has been opened by the operation of relay 3807; recloses the circuit of relay 3804 and establishes an operating circuit for relay 3806, extending from battery through its winding, through the lower winding and front contact of relay 3807, over its own lower back contact to ground on conductor 3826. Relay 3806 now operates and relay 3807 is held operated but the circuit for relay 3805 is opened at its contacts and relay 3805 thereupon releases preparing a circuit from battery through the winding of relay 3802 over the inner upper front contact of relay 3807, the inner upper back contact of relay 3805 to the front contact of relay 3800, which becomes effective upon the reoperation of relay 3800 at the end of the second impulse. Relay 3802, upon reoperating, locks over the inner upper front contact of relay 3807, the upper back contacts of relay 3805, the upper front contact of relay 3807 to ground over its own upper front contact; opens the circuit of relay 3804 and opens the circuit previously traced through the winding of relay 3806 and the lower winding of relay 3807, whereupon these relays release. Subsequent odd and even impulses cause relays 3805, 3807 and 3806 to operate as just described, relay 3805 operating on each odd impulse and releasing on each even impulse. Relay 3804 being slow to release, operates at the beginning of each impulse series and releases at the end of the series.

For counting the impulses, relays 3809 to 3814, inclusive, are provided. When relay 3805 operates on the first dialed impulse, it operates relay 3809 in a circuit from battery through its winding, over the upper back contacts of relays 3813, 3812, 3811 and 3810, over the lower front contact of relay 3805 to ground on conductor 3826. Relay 3809 upon operating locks over its lower front contact and the inner lower normal contacts of relays 3810 to 3813, inclusive, to ground on conductor 3826. Relay 3809 also establishes a circuit from battery through the upper winding and lower normal contacts of relay 3816, conductor 3817, inner upper and lower front contacts of relay 4008, conductor 3818 to ground at the upper front contact of relay 3809. Relay 3816 upon operating locks through its upper winding and lower alternate contacts over conductor 3819, lower back contact of relay 4007 to ground on conductor 3808; prepares a locking circuit through its lower winding and inner lower front contact which becomes effective upon the subsequent release of relay 3804 and prepares a circuit over its upper front contact for operating steering relay 4007 following the release of relay 3804.

When relay 3805 releases upon the receipt of the second impulse, it closes a circuit for counting relay 3810 extending from battery through its winding, the inner upper front contact of relay 3809, the lower back contact of relay 3805, to ground on conductor 3826. Relay 3810 thereupon operates, locks over its lower alternate contacts and the chain locking contacts of relays 3811 to 3813, inclusive, previously traced to ground and opens the locking circuit of relay 3809 which thereupon releases. In a like manner on the third, fourth and fifth impulses, relays 3811, 3812 and 3813 operate and each of these relays upon operating locks, releases the previously operated relay and prepares the operating circuit for the succeeding relay. When relay 3805 releases on the sixth impulse, relay 3814 operates, locks over its inner lower front contact to ground on conductor 3826 and prepares an operating circuit for relay 3809. Relay 3813 does not release at this time. When relay 3805 operates on the seventh impulse, a circuit is established from battery through the winding of relay 3809, over the lower front contact of relay 3814 and the upper back contacts of relays 3812, 3811 and 3810, the lower front contact of relay 3805 to ground on conductor 3826. Relay 3809 now operates; at its lower back contact opens the locking circuit of relay 3813 which now releases; prepares the operating circuit of relay 3810 and with relay 3813 released, locks itself over its lower front contact over the inner lower normal contacts of relays 3810 to 3813, inclusive, to ground on conductor 3826. On the eighth, ninth and tenth impulses, relays 3810, 3811 and 3812 operate and lock in the manner previously described for the second, third and fourth impulses. The counting relays which are operated following each impulse are tabulated in the following table:

TABLE I

| Pulse | Counting Relays Operated |
|---|---|
| 1 | 3809 |
| 2 | 3810 |
| 3 | 3811 |
| 4 | 3812 |
| 5 | 3813 |
| 6 | 3814; 3813 |
| 7 | 3814; 3809 |
| 8 | 3814; 3810 |
| 9 | 3814; 3811 |
| 0 | 3814; 3812 |

As these counting relays operate and release in response to the impulses of a digit series, the relays of the register associated therewith are accordingly operated and released. With steering relay 4008 operated when counting relay 3809 operated in response to the first dial impulse, a circuit was established from battery through the lower winding of register relay 4001, the inner lower front contact of relay 4008, over conductor 3818 to ground at the upper contact of relay 3809. Relay 4001 therefore operated and released upon the subsequent release of relay 3809. When counting relay 3810 operated in response to the second dial impulse, a circuit was established from battery through the upper winding of relay 4002, middle upper front contact of relay 4008 over conductor 3821 to ground at the upper contact of relay 3810. Relay 4002 therefore operated and released upon the subsequent release of relay 3810. When counting relay 3811 operated in response to the third dial impulse, the circuits previously traced through the windings of register relays 4001 and 4002 and over conductors 3818 and 3821 were closed at the upper front contacts of relay 3811, thereby operating both relays 4001 and 4002 and which then released upon the subsequent release of relay 3811. When counting relay 3812 operated in response to the fourth dial impulse a circuit was established from battery through the upper winding of register relay 4004 over the next-to-inner lower contact of relay 4008, conductor 3822 to ground over the upper front contact of relay 3812. Relay 4004 therefore operated and released upon the subsequent release of relay 3812. When counting relay 3813 operated in response to the fifth dial impulse, the circuits previously traced for register relays 4001 and 4004 were completed over conductors 3818 and 3822, the upper front contacts of relay 3813, the upper back contact of relay 3814 to ground on conductor 3815. Relays 4001 and 4004 both operated and then released upon the subsequent release of relay 3813. When counting relay 3814 operated in response to the sixth dial impulse, the circuit of register relay 4006 was established from battery through its winding, over the next to lower contact of relay 4008, conductor 3823, the upper front contact of relay 3814 to ground on conductor 3815. Relay 4006 therefore operated and locked over its No. 1 upper contact to ground on conductor 3815. When counting relay 3809 again operated in response to the seventh dial impulse the circuit of register relay 4001 was again established for the operation of said relay. Relay 4001 released upon the subsequent release of relay 3809. Upon the operation of counting relay 3810 in response to the eighth dial impulse, the circuit of register relay 4002 was again established to operate said relay which then released upon the subsequent release of relay 3810. When counting relay 3811 again operated in response to the ninth dial impulse, the circuits of register relays 4001 and 4002 were again established to operate said relays, which released upon the subsequent release of relay 3812. Finally when counting relay 3812 again operated in response to the tenth dial pulse, the circuit of register relay 4004 was again established to operate said relay. When, however, relay 3804 released at the end of the digit series, it established a locking circuit for any register relay that was at the time operated. The following table indicates the register relays of the dial impulse registers 4000, 4010, 4020, 4100 and 4110 which are operated to register any digit, the table being specific to register 4000.

TABLE II

| Digit | Register Relays Operated |
|---|---|
| 1 | 4001 |
| 2 | 4002 |
| 3 | 4001; 4002 |
| 4 | 4004 |
| 5 | 4001; 4004 |
| 6 | 4006 |
| 7 | 4006; 4001 |
| 8 | 4006; 4002 |
| 9 | 4006; 4001; 4002 |
| 0 | 4006; 4004 |

It has been assumed that the first digit series received in the sender was the third code letter series for the code letter R having a numerical value of 7, and therefore at the end of this series when relay 3804 releases, counting relays 3809 and 3814 will be operated and register relays 4001 and 4006 will be operated in consequence thereof. When relay 3804 releases a locking circuit will be established for register relay 4001 from battery through its upper winding and inner upper front contact, over the lower front contact of relay 4008, conductor 3824, upper front contact of relay 3816, to ground on conductor 3826. Register relay 4006 locks upon its operation to ground on conductor 3815 as previously described. The locking ground for relay 4001 also causes the operation of steering relay 4007 which locks to ground on conductor 3815 over its inner upper alternate contacts maintains the locking circuit of register relay 4001 through such contacts and opens the circuit of steering relay 4008 at such contacts, which relay now releases to disconnect the operating windings of the relays of register 4000 from the contacts of the counting relays. Relay 4007 also establishes a circuit from ground over its lower contacts, the inner upper normal contacts of steering relay 4017, to battery through the winding of steering relay 4018. Relay 4018 now operates to associate the operating windings of the relays of register 4010 with the counting relay contacts preparatory to registering the second dialed digit received in the sender.

When relay 4007 operated, the locking circuit through the upper winding of relay 3816 was opened but this relay remains operated over the locking circuit through its lower winding, inner lower front contacts and the lower normal contacts of relay 3804 until the latter relay reoperates at the beginning of the next dial impulse series. When relay 3804 again operates, relay 3816 releases and, at its upper back contact, prepares a circuit for operating steering relay 4017. In the manner previously described, the counting relay 3809 is operated in response to the receipt of the single impulse of the second series received in the sender and connects ground over conductor 3818, the inner lower front contact of steering relay 4018 to battery through the lower winding of relay 4011 which operates. Since, as assumed, this series of impulses comprises but a single impulse for the thousands digit 1, relay 3804 releases following the transmission of such impulse and establishes a circuit from ground over its lower normal contacts, the upper back contact of relay 3816, conductor 3825, the lower contacts of steering relay 4018, the inner upper contact and upper winding of register relay 4011 to battery. This locking ground also causes the operation of steering relay 4017 which locks over its inner upper alternate contacts to ground at the lower front contacts of relay 4007, extends this locking ground to the locking circuit of register relay 4011, and opens at its inner upper normal contacts the operating circuit of relay 4018 which now releases to disconnect the operating windings of the relays of register 4010 from the counting relay contacts. Relay 4017 also establishes a circuit from ground over its lower front contacts and the inner upper normal contacts of steering relay 4027, to battery through the winding of steering relay 4028 which operates to connect the operating windings of the relays of the register 4020 with the contacts of the counting relays preparatory to registering the next dialed digit. Had the previous digit been of some other value, the counting relays and relays of register 4010 would have operated and released in the manner previously described in connection with the first received digit series, and if register relay 4016 had been operated it would have locked over its own inner upper front contact and the lower front contact of steering relay 4007 to ground.

Impulses for the third digit series received cause the operation and release of the counting relays and the relays of register 4020 in the manner previously described in connection with the first received digit series, relay 3804 reoperating upon the receipt of the first impulse of this series. It has been assumed that three impulses for the dialed hundreds digit 3 are transmitted in this impulse series causing the operation of counting relay 3811 in response to the third and last impulse of this series and the consequent operation of relays 4021 and 4022 of register 4020. The operating circuits for these relays extend from ground placed on conductors 3818 and 3821 by counting relay 3811, over the inner lower and uppermost front contacts of steering relay 4028 to battery through the operating winding of register relays 4021 and 4022. The operating ground placed on conductor 3818 by the operation of counting relay 3809 in response to the first impulse of this series also extended over the inner upper front contact of relay 4028, conductor 3817 through the lower normal contacts and upper winding of relay 3816 to battery thereby causing relay 3816 to operate and lock over its lower alternate contacts, conductor 3819, the upper front contact of relay 4017 and the upper back contact of relay 4027 to ground on conductor 3808. When relay 3804 releases at the end of the impulse series, a further locking circuit is established for relay 3816 from ground on conductor 3808 over the lower normal contacts of relay 3804, the inner front contact and lower winding of relay 3816 to battery. This locking ground is extended over the upper front contact of relay 3816, conductor 3824, the lower front contact of steering relay 4028 through the inner upper front contact and upper winding of register relay 4021, to battery and through the inner lower front contact and lower winding of register relay 4022 to battery to lock these relays in their operated condition. This locking ground also causes steering relay 4027 to operate, lock itself over its inner upper alternate contacts to ground over the lower front contact of relay 4017; to extend its locking ground to the locking windings of operated register relays 4021 and 4022; to open the operating circuit of steering relay 4028 at its inner upper contacts which relay thereupon releases to disconnect the operating windings of the relays of register 4020 from the contacts of the counting relays; to open at its upper back contact, one locking circuit of relay 3816 and to establish an operating circuit from ground over its lower front contact, over conductor 4029 and the inner, upper normal contacts of steering relay 4107 to battery through the winding of steering relay 4108. Relay 4108 upon operating connects the operating windings of the relays of register 4100 to the contacts of the counting relays.

Impulses for the fourth digit series received, cause the operation and release of the counting relays and the relays of register 4100 in the manner previously described in connection with the first received digit series, relay 3804 reoperating upon the receipt of the first impulse of the series to release relay 3816. It has been assumed that four impulses for the dialed tens digit 4 are transmitted in this impulse series, causing the operation of counting relay 3812 in response to the fourth and last impulse of the series and the consequent operation of relay 4104 of the register 4100. The operating circuit for this register relay extends from ground placed on conductor 3822 by counting relay 3812, over the middle upper front contact of steering relay 4108 to battery through the upper winding of register relay 4104. When relay 3804 releases at the end of the impulse series, at which time register relay 4104 is energized, a circuit is established from ground over the lower normal contacts of relay 3804, the upper back contact of relay 3816, conductor 3825, the lower front contact of relay 4108, through the inner lower front contact and lower winding of register relay 4104 to battery for locking relay 4104 operated and through the winding of steering relay 4107 which now operates; locks itself over its inner upper alternate contacts to ground over conductor 4029 and the lower front contact of relay 4027; extends its locking ground to the locking winding of register relay 4104; opens the operating circuit of steering relay 4108 at its inner upper contacts, which relay thereupon releases to disconnect the operating windings of the relays of the register 4100 from the contacts of the counting relays and establishes a circuit from ground over its lower front contact, the inner upper normal contacts of steering relay 4117, to battery through the winding of steering relay 4118 for operating relay 4118 to connect the operating windings of the relays of register 4110 to the contacts of the counting relays.

Impulses for the fifth digit series received cause the operation and release of the counting relays and the relays of register 4110 in the manner previously described in connection with the first impulse series received, relay 3804 reoperating upon the receipt of the first digit of this series and releasing after the last. When counting relay 3809 operates upon the first impulse of this series to connect ground to conductor 3818, with steering relay 4118 operated, the circuit is extended over the inner upper and lower contacts of relay 4118 and conductor 3817, over the lower normal contacts and through the upper winding of relay 3816 to battery, whereupon relay 3816 operates and locks over its lower alternate contacts, conductor 3819, the next to lower front contact of relay 4107 and over the upper back contact of relay 4117 to ground on conductor 3808. It has been assumed that five impulses for the dialed units digit 5 are transmitted in this impulse series causing the operation of counting relay 3813 in response to the fifth and last impulse and the consequent operation of relays 4111 and 4114 of register 4110. The operating circuits for these two relays extend from ground placed on conductors 3818 and 3822 by counting relay 3813, over the inner lower and middle upper front contacts of relay 4118 to battery through the operating windings of these register relays. When relay 3804 releases at the end of the impulse series, a further locking circuit is established for relay 3816 from ground on conductor 3808 over the lower normal contacts of relay 3804, the inner front contact and lower winding of relay 3816 to battery and this locking ground is extended over the upper front contact of relay 3816, conductor 3824, the lower front contact of relay 4118, the inner upper front contact and upper winding of register relay 4111 to battery and through the inner lower front contact and lower winding of register relay 4114 to battery to lock these register relays in their operated condition. This locking ground also causes steering relay 4117 to operate, lock itself over its own inner upper front contacts to ground on the lower front contact of relay 4107; to extend its locking ground to the locking circuit of the operated register relays 4111 and 4114; to open the circuit of relay 4118 which now releases to disconnect the operating windings of the relays of the register 4110 from the contacts of the counting relays and at its upper back contact to open one locking circuit of relay 3816.

When it is not known definitely whether a six or a seven-digit number is to be dialed, the sender-delay relay 3115 will be operated from the identifier as later described and relay 3116 will operate. The circuit for operating relay 3116 is under the control of steering relay 4027 and relay 4300 if the first digit registered in the sender is the hundreds numerical digit, and relay 4300 has therefore been operated, and may be traced from battery through the winding of relay 3116, upper back contact of relay 3117, middle upper front contact of relay 3115, conductor 3118 of the cable 3119, the lower No. 1 front contact of relay 4300 over conductor 4029 to ground at the lower front contact of relay 4027. The circuit for operating relay 3116 is under the control of steering relay 4107 and relay 4301 if the first digit registered in the sender is the thousands digit and relay 4301 has therefore been operated. This circuit may be traced as previously to conductor 3118, thence over the lower No. 1 front contact of relay 4301, over conductor 4119 to ground at the lower front contact of relay 4107. The operation of relay 3116 closes a circuit from ground over its lower contact and conductor 3120 to a sender-timing circuit which starts a four-second timing interval. If the calling subscriber starts to dial the fifth numerical digit before the expiration of this interval relay 3117 operates in a circuit from battery through its winding, upper back contact of relay 3121, upper front contact of relay 3115, conductor 3122 of cable 3119, lower No. 2 contact of relay 4300, conductor 4030, middle upper front contact of relay 4027 to ground on conductor 3820 if the first digit registered in the sender is the hundreds numerical digit or from conductor 3122 over the lower No. 2 contacts of relay 4301, conductor 4120, the middle upper front contact of relay 4107 to ground on conductor 3820 if the first digit registered in the sender is the thousands digit. Relay 3117 upon operating locks over its inner upper front contact to ground on conductor 3109 and at its upper back contact opens the circuit of relay 3116 to cancel the timing. If the subscriber does not start dialing within the timing interval, relay 3121 operates after the interval of four seconds measured by the timing circuit over a circuit which may be traced in part from battery through the upper winding of relay 3121, the front contact of relay 3116 to conductor 3123 and the call proceeds as a four-digit numerical number.

When relay 3117 operates, relay 3201 is operated to record the end of dialing. If the first digit recorded in the sender is a third code digit, the circuit for relay 3201 extends from battery through its winding, conductor 3202, upper No. 4 front contact of relay 4302 which, with relay 4306, will be operated at this time from the identifier, conductor 3124 of cable 3119, inner lower front contact of relay 3125 which will have been operated from the identifier, over conductor 3128, over the upper front contact of steering relay 4117 to ground on conductor 3808, or over the lower front contact of relay 3121 at the end of the timing interval. If the first digit recorded in the sender is a thousands digit and relays 4301 and 4307 and the no-sender delay relay 3125 are operated, the circuit of relay 3201 extends as traced over conductor 3202, thence over the upper No. 6 front contact of relay 4301, conductor 3126 of cable 3119, the upper No. 2 front contact of relay 3125, over conductor 3129 and the upper front contact of steering relay 4107 to ground, or to ground over the inner lower front contact to relay 3121 at the end of the timing interval or as traced to conductor 3126, thence over the lower No. 2 contacts of sender-delay relay 3115 if at the time operated, over conductor 3128 and the upper front contact of steering relay 4117 to ground on conductor 3808 or to ground over the lower front contact of relay 3121 at the end of the timing interval. If the first digit recorded in the sender is a hundreds digit and relays 4300 and 4308 and the no-sender delay relay 3125 are operated, the circuit of relay 3201 extends as traced over conductor 3202, the upper No. 5 contacts of relay 4300, conductor 3127 of cable 3119, the upper No. 3 contacts of relay 3125, conductor 3130, over the upper front contact of steering relay 4027 to ground on conductor 3808, or as traced to conductor 3127, thence over the lower No. 3 contact of sender-delay relay 3115 if at the time operated, conductor 3129 to ground at the upper front contact of steering relay 4107 or to ground at the inner lower front contact of relay 3121 at the end of the timing interval. Relay 3201 upon operating performs functions to be later described.

*Party identification test*

When the sender was cut through to the calling trunk by the operation of relay 4620 of the trunk finder 4600, a circuit was established from ground over the lower No. 2 back contact of relay 708, conductor 746, through the winding of trunk connector relay 4700 individual to the calling trunk, conductor 722, brush 4624 of the trunk finder, the lower No. 3 contact of relay 4620, conductor 4630, over the lower No. 3 back contact of relay 3005, through the windings of the three-position polarized relay 3008, the upper No. 4 back contact of relay 3005, through resistance 3009, to battery thereby operating relay 3008. Relay 3008 operates in this circuit but relay 4700 does not. Relay 3008 upon operating its lower contacts caused the operation of relay 3010 in a circuit from battery through its winding to ground over the lower front contact of relay 3008. Relay 3010 then locked over its upper No. 1 front contact to ground applied to conductor 3108 by the operation of relay 3106 as previously described, and relay 3010 established a circuit from battery on conductor 3114 through the upper winding of relay 3004, the upper No. 2 contact of relay 3010, through resistance 3012 to ground for preparing relay 3004 for operation. A circuit was also established by the operation of relay 3106 for party test start relay 3001 over a circuit from battery through its winding, over the lower No. 1 normal contacts of relay 3005 to ground applied to conductor 3107 by the operation of relay 3106. Relay 3001 upon operating bridged at its upper No. 5 contacts the upper back contact of relay 3000, bridged at its lower No. 4 contacts the lower back contacts of relay 3000 and established a circuit from battery on conductor 3114 through the lower winding of relay 3004 and inner alternate contacts of relay 3001, over the lower No. 5 back contact of relay 3306, to ground on conductor 3110. Relay 3004 upon operating establishes a circuit from ground on conductor 3110 over its front contact, the upper No. 4 front contact of relay 3001 to battery through the winding of slow-to-release relay 3007 which thereupon operates and establishes an obvious circuit for relay 3000 which also operates.

When relay 3804 operates at the start of the first digit to be registered in the sender, it establishes a circuit for relay 3005 which may be traced from battery through its winding and upper No. 1 normal contacts, over the lower No. 1 contacts of relay 3010, conductor 3011, the upper front contact of steering relay 4008, conductor 3820 to ground over the upper contact of relay 3804. Relay 3005 upon operating locks over its upper No. 1 alternate contacts to ground on conductor 3107 and transfers at its lower No. 1 contacts the operating circuit of relay 3001 from ground on conductor 3107 controlled by off-normal relay 3106 to ground placed on conductor 3011 by relay 3804 over the lower Nos. 1 and 2 contacts of relay 3010. When relay 3804 releases at the end of the first digit series, it releases relay 3001 which in turn opens the operating circuit of slow-to-release relay 3007. Since relay 3000 cannot release until relay 3007 releases during the interdigital pause between the first and second digit, the lower winding of relay 3004 is presented to the tip and ring conductors of the calling line until relay 3007 releases, over a circuit from battery through the lower winding of relay 3004, the inner normal contacts of relay 3001, the inner alternate contacts of relay 3000 to conductors 4627 and 4628 and thence as traced to the tip and ring conductors of the calling line. If, as assumed, the tip party substation 100 is calling, there will be a connection to ground through the winding of the ringer at such substation and relay 3004 should, therefore, be held operated from this substation ground over conductor 4627. When relay 3007 releases approximately .05 to .10 second after relay 3001 releases, it closes a locking circuit for relay 3004 if relay 3004 has remained operated from the tip station ground, over a circuit from battery, through the lower winding of relay 3004, over the lower back contact of relay 3007 through the winding of relay 3013 and the front contact of relay 3004 to ground on conductor 3110. Relay 3013 operates in this locking circuit and establishes a circuit for relay 3131 from battery through its lower winding, conductor 3132, lower No. 2 back contact of relay 3006, front contact of relay 3013, upper No. 5 front contact of relay 3010, lower No. 2 front contact of relay 3005 to ground at the upper back contact of relay 3007. Relay 3137 operates and locks in a circuit from battery through its upper winding and inner upper front contact to ground on conductor 3108 to register a tip party call. Had relay 3004 released when its winding was connected to the conductors of the calling line because of no direct ground encountered thereon, it remains released and with relay 3131 not therefore operated a ring party call will be registered. The tip and ring conductors of the dialing loop are handled over continuity contacts of relays 3000 and 3001 in order not to introduce any false operation of the impulse responsive relay 3800. During the time relay 3004 is presented to the calling line, relay 3800 is held operated in a loop circuit extending from battery through its lower No. 2 winding over conductor 3102, lower back contact of relay 3200, conductor 3101, inner upper back contact of relay 3100, lower normal contacts of relay 3103, conductor 3003, then through resistance 3014, over the lower No. 2 back contact of relay 3001 to ground at the outer front contacts of relay 3000.

*Seizure of an idle identifier*

The first digit dialed in the sender may be the last letter of a three-digit office code, the first or thousands digit or the second or hundreds digit of a numerical number depending upon whether the tandem ticketing trunk was selected from the bank of a first, second or third selector. In order to determine the classification of the first digit registered in the sender, the sender communicates with an identifier which has access to the selectors in such a manner that it can reconstruct the office code dialed by the subscriber and give this information to the sender. When the first digit has been received in the sender and steering relay 4007 has operated, a circuit is closed for the preference relay of the first available identifier. It will be assumed that the first identifier disclosed in Figs. 15 to 27, inclusive, has been constituted the first preference identifier to the sender disclosed in Figs. 28 to 43, inclusive, by the cross-connection of terminal 2920 to the terminal 2921 in Fig. 29 and that this identifier is at the time available. A circuit is therefore effective from ground through the identifier preference relay 2900F allocated to this identifier and to the No. 0 sender, over the upper back contact of the identifier busy relay 2930F allocated to this identifier and to the No. 0 sender, over the strapped terminals 2920 and 2921, conductor 2922, the back contact of relay 3203, the No. 1 lower normal contacts of relay 3204, conductor 3205, upper front contact of relay 4007, conductor 4032, back contact of relay 3206, through resistance 3207 to battery. Relay 2900F thereupon operates, locks to ground over its lower alternate contacts; removes operating ground for preference relays 2901F to 2919F inclusive allocated to the same identifier and to all other senders so that no other sender may cause the seizure of this identifier; and establishes a circuit from ground over the upper normal contacts of preference relay 2919F, thence in series over the upper normal contacts of other preference relays allocated to the same identifier, over the upper front contact of relay 2900F, conductor 2923, through the winding of connector relay 2800F allocated to the first identifier, to battery and ground. Relay 2800F thereupon operates to extend control conductors from the seized sender to the first identifier and closes an obvious circuit through the winding of relay 2801F which operates to extend further control conductors.

Had the first identifier been busy then its busy relay 2930F would have been operated and the circuit previously traced over conductor 2922 would have extended over the upper front contact of relay 2930F and the upper front contacts of the busy relays of succeeding busy identifiers, thence over the upper back contact of the busy relay of the first idle identifier to ground through the winding of the preference relay of such identifier. If it should be assumed that all identifiers except the last are busy then this circuit will extend over the upper back contact of relay 2930L through the winding of the preference relay 2900L of such identifier to ground over the normal contacts of preference relay 2919L of such identifier allocated to the last sender. It is to be noted that the last identifier is the first choice preference for the senders in the last group and the last choice preference for the sender in the first group, it being understood that the senders are divided into a plurality of groups with the senders in each group having a common channel of access to all identifiers.

With connector relay 2800F operated a circuit is established from ground over its No. 3 contacts and conductor 2701 to battery through the winding of relay 2700 of the identifier. This relay operates and connects ground to conductors, such as 2702 of the cable 2703, extending to the upper windings of all busy relays 2930F to 2949F allocated to the first identifier and thence through such relays to battery as illustrated in connection with relay 2930F and all such busy relays therefore operate with the exception of relay 2930F whose upper winding is shunted over conductor 2924 and the No. 1 contacts of relay 2801F to ground. Relay 2800F also establishes a circuit for preparing the timing circuit of Fig. 27 extending from ground over its No. 2 contacts, conductor 2706, over the lower back contact of relay 2704 to battery through the winding of start relay 2705 which thereupon operates and locks over its upper No. 1 contacts to ground on conductor 2706. Relay 2705 upon operating completes an obvious circuit for relay 2704 and the latter relay, upon operating, primes the timing circuit 2779 to measure an over-all holding period for the identifier during which period it should complete all of its functions. This priming circuit may be traced from 130-volt source 2784 of positive potential, over the inner upper contacts of relay 2704, through resistance 2779E, over the upper contacts of relay 2704 and resistance 2779B to ground through the condenser 2779C. After approximately nine seconds condenser 2779C will become fully charged if the identifier has not been dismissed and the potential applied from the source 2784 through resistance 2779B will be applied through resistance 2779D to the control cathode of the tube of the timer. Since ground potential is applied over the No. 3 front contact of relay 2705 and over the normal contacts of anode relay 2779A to the other cathode of the tube, the tube will fire across its cathode gap discharging the condenser 2779C and will operate anode relay 2779A in a circuit from ground on the right cathode of the tube across the gap between such cathode and the anode, through the lower winding of anode relay 2779A to battery 2784. Relay 2779A locks over its upper winding and upper alternate contacts to ground over the No. 3 front contact of relay 2705, extinguishes the tube and closes a major alarm circuit over its lower contacts. This alarm circuit is maintained until the identifier is released as indicated by the release of relays 2704 and 2705.

Relay 2704 upon operating also primes the timing circuit 2780 to measure a period during which the identifier awaits the operation of an identifier trunk connector. This timing circuit may be traced from battery 2784 over the inner upper contacts of relay 2704, through resistance 2780E, the inner lower contacts of relay 2704, conductor 2652, the back contact of relay 2022, conductor 2653, through resistance 2780B and condenser 2780C to ground. After approximately 3.4 of a second condenser 2780C will become fully charged if the identifier trunk connector, such as 4559F, has not become operated and relay 2022 has not therefore operated. Thereupon the potential applied from the source 2784 through resistance 2780B will be applied through resistance 2780D to the control cathode of the tube of the timer 2780 and since ground potential is applied over the No. 3 front contact of relay 2705 and over the normal contacts of anode relay 2780A to the other cathode, the tube will fire across its cathode gap discharging the condenser thereover and will operate anode relay 2780A over the right cathode of the tube across the gap between such cathode and the anode, through the lower winding of anode relay 2780A to battery 2784, whereupon relay 2780A locks over its upper winding and upper alternate contacts to ground over the No. 3 front contact of relay 2705, extinguishes the tube and closes a circuit from ground at its lower contacts, conductor 2651, the winding of relay 2025 to battery, and to the trouble indicator circuit (not shown). Relay 2025 upon operating locks in a circuit over its lower front contact, the upper back contact of relay 2028 and conductor 2029, to ground over the lower back contact of relay 2781A; closes an obvious circuit for relay 2026 which operates and locks over its No. 4 contacts to ground over the upper No. 2 contacts of start relay 2002, said last-mentioned relay having operated in the meanwhile, as will be explained hereinafter, and over its inner upper contacts connects ground to conductor 2701 to operate identifier busy relay 2700 to prevent the seizure of the identifier by any sender until the identifier is released after the rectification of the trouble encountered.

With connector relay 2801F operated a circuit is established from ground over its No. 3 contacts and conductor 2001 of cable 2000 to battery through the winding of start relay 2002 of the identifier which thereupon operates to start the functioning of the identifier. A circuit is also established from ground at the upper back contact of relay 2003 of the identifier, conductor 2004 of cable 2000, the No. 66 contact of relay 2801F to battery through the winding of relay 2802F of the sender group including the sender taken into use which has the first identifier as first choice. Relay 2802F thereupon operates and locks over its No. 1 upper front contact, No. 3 back contacts of relays such as 2802I allocated to the same sender group allocated to intermediate identifiers, over the No. 4 upper back contact of relay 2802L allocated to the last identifier to ground on conductor 3108. A circuit is also established for either the tip station relay 1700 or the ring station relay 1701 of the identifier. If the sender found the call to be from the ring station and consequently on the party station test relay 3004 did not remain operated and relay 3131 did not operate, a circuit was established from battery through the winding of relay 1701, conductor 1602 of cable 1600, No. 37 contact of relay 2800F, conductor 2805 of cable 2803, lower back contact of relay 3131, conductor 3133, back contact of relay 3004 to ground on conductor 3110. If the sender found the call to be from the tip station, as assumed, and consequently test relay 3004 remained operated during and after party test to cause the operation of relay 3131, a circuit was established from battery through the winding of relay 1700, conductor 1601 of cable 1600, the No. 38 contacts of relay 2800F, conductor 2804 of cable 2803 to ground at the lower front contact of relay 3131.

*Operation of identifier-trunk-connector*

Upon its seizure the identifier is also informed that the calling trunk is located in the A group of one hundred trunks by a circuit established from ground placed on conductor 4610 by the sender, over the lower front contact of relay 4600 and the upper No. 1 contacts of relay 4620 of the trunk finder 4600, conductor 4657 of cable 2803, the No. 39 contact of identifier connector relay 2800F, conductor 2810 of cable 2809 to battery through the winding of relay 2707. Had the calling trunk been in the B group of one hundred trunks a similar circuit would have been established from ground applied over a relay such as relay 4620′ through a trunk finder of the B group (corresponding to relay 4620 of the A group) to a conductor, such as 4557 of cable 2803, over the No. 40 contacts of relay 2800F, conductor 2811 of cable 2809 to battery through the winding of relay 2710.

Start relay 2002 of the identifier upon operating also established a circuit from battery through resistance 2005 over its lower No. 3 contacts, conductor 2101 of cable 2100, lower No. 1 back contact of relay 2502, conductor 2501 of cable 2500, the No. 25 contacts of identifier connector relay 2800F, conductor 4633 of cable 2803, lower No. 1 contact of relay 4620 of trunk finder 4600, trunk finder brush 4634, the No. 0 group conductor 4635 of cable 2803, the No. 50 contacts of identifier connector relay 2800F, conductor 2806 of cable 2809, the lower front contact of relay 2707, conductor 2708 of cable 2709, through the winding of lock-out relay 4558F allocated to the first identifier and to the identifier-trunk-connector having access to the Nos. 0 and 9 subgroups of the A group of trunks, over the inner upper normal contacts of similar lock-out relays allocated to other identifiers to ground. Relay 4558F operates, locks over its upper inner alternate contacts to ground, establishes an operating circuit for the multicontact connector relay 4559F from ground through the winding of such relay over the inner lower front contact of relay 4558F, through resistance 4560 to battery. Relay 4558F further establishes a circuit from battery through resistance 4561 over its middle upper front contact, conductor 4562, upper No. 4 contacts of identifier start relay 2002, conductor 2006 of cable 2000, the No. 30 contacts of identifier connector relay 2800F, conductor 4629 of cable 2893, lower No. 2 contacts of relay 4620, trunk finder brush 4623, conductor 721 through the windings of the three-position polarized relay 718 of the trunk, through resistance 738 to battery. Multicontact relay 4559F of the identifier-trunk-connector circuit and relay 718 of the trunk circuit both operate, relay 4559F extending a plurality of control conductors from the calling trunk to the identifier.

It is to be noted that the ten subgroups of ten trunks each of the A group of one hundred trunks appear in the vertical rows of terminal sets of the banks of the trunk finders of the A group and that each of the identifier-trunk-connectors of which two are shown in Fig. 45 serve two of such subgroups, the connector circuit comprising the lock-out relays 4558F to 4558L and the connector relays 4559F to 4559L serving the Nos. 0 and 9 subgroups of trunks or twenty trunks, the connector circuit comprising the lock-out relays 4563F to 4563L and the connector relays 4564F to 4564L serving the Nos. 1 and 4 subgroups and the three other connector circuits (not shown) serving, respectively, subgroups 2 and 5, 3 and 6 and 7 and 8. The manner in which the subgroup conductors such as conductors 4635 . . . 4660 for the No. 0 subgroup which extend over the No. 41 to 50 contacts of the identifier connector relay 2800F are paired to cause the operation of the identifier-trunk-connector circuit which has access to the subgroup of trunks in which the calling trunk is located, is indicated by the multipling at the left of the contacts Nos. 41 to 50 of relay 2800F. For example, the subgroup conductors 4635 and 4658 for the Nos. 0 and 9 subgroups are connected over the Nos. 50 and 49 contacts of relay 2800F to conductor 2808 for operating the connector relay 4559F as previously described and the subgroup conductors 4660 and 4659 for the Nos. 1 and 4 subgroups are connected over the Nos. 41 and 44 contacts of relay 2800F, conductor 2812 of cable 2809, the upper contacts of relay 2707, conductor 2714 of cable 2709 to ground through the winding of relay 4563F operative to cause the operation of connector relay 4564F.

Had relay 2710 been operated, indicating thereby that the calling trunk was in the B group of one hundred trunks, then battery would have been placed on one of the subgroup conductors 4635, 4658, etc. over a brush of a B group trunk finder, over one of the contacts Nos. 41 to 50 of identifier connector relay 2800F, over one of the conductors of cable 2809 and a contact of relay 2710, over one of the five conductors of cable 2712 and thence to ground through the winding of the preference relay of a B group identifier-trunk-connector of Fig. 44 which has access to the pair of subgroups of the B trunk group in which the calling trunk is located in the manner previously described.

Fig. 44 shows the lock-out relays 4458F to 4458L and the connector relays 4459F to 4459L allocated to the several identifiers and to the identifier-trunk-connector circuit serving the Nos. 0 and 9 subgroups of the B group of trunks and the lock-out relays 4463F to 4463L and the connector relays 4464F to 4464L allocated to the several identifiers and to the identifier-trunk-connector circuit serving the Nos. 1 and 4 subgroups of the B group of trunks, the other three identifier trunk connector circuits serving the remaining subgroups of the B group of trunks being omitted. Relay 4559F upon operating establishes a circuit from ground over its No. 60 contacts and conductor 4571 to battery through the winding of relay 2022.

Relay 2022 upon operating opens at its lower back contact the previously traced timing circuit for the timer 2780 to arrest the measurement of the time interval during which the trunk identifier connector should function and at its lower front contact establishes a timing circuit for timer 2782 to measure a period during which the identifier should complete the reconstruction of the called office code, which interval is terminated by the operation of relay 2016. This timing circuit may be traced from battery 2784, over the inner upper contacts of relay 2704, through resistance 2782E, conductor 2654, lower front contact of relay 2022, the back contact of relay 2016, conductor 2655, through resistance 2782B and condenser 2782C to ground. After approximately .8 of a second condenser 2782C will become fully charged if the reconstruction of the called office code has not been completed and relay 2016 has therefore not operated. Thereupon the potential applied from the source 2784 through resistance 2782B will be applied through resistance 2782D to the control cathode of the tube of timer 2782 and, since ground potential is applied over the No. 3 front contacts of relay 2705 and over the normal contacts of anode relay 2782A to the other cathode, the tube will fire across its cathode gap discharging the condenser thereover and will operate anode relay 2782A across the gap between its right cathode and the anode, through the lower winding of anode relay 2782A to battery 2784. Relay 2782A thereupon locks over its upper winding and upper alternate contacts to ground over the No. 3 front contact of relay 2705, extinguishes the tube and connects ground over its lower contacts and conductor 2651 to battery through the winding of relay 2025 and to the trouble indicator. Relay 2025 locks under the control of anode relay 2781A, causes the operation of relay 2026 and establishes the circuit for busy relay 2700 in the manner previously described.

Relay 718 of the trunk circuit is polarized, and in response to the closure of the operating circuit therefor previously traced operates to open the shunt around retardation coil 733 at its upper No. 5 back contact to permit the identifier to transmit 270-cycle alternating current over the sleeve towards the calling line, and establishes a circuit from battery through resistance 2503 over the lower No. 3 back contact of relay 2502, conductor 2007 of cable 2100, the lower No. 1 contacts of identifier start relay 2002, conductor 4565, the No. 12 contact of identifier connector relay 4559F, conductor 734, the No. 2 contacts of relay 718, conductor 857, brush 851 of the digit register 850, which it will be recalled was advanced to the No. 2 terminal of its arc, over a conductor of the group 858 and a contact in the No. 2 to No. 11 contacts of connector relay 4559F, a conductor of group 4566 to ground through the winding of one of the group of trunk code relays represented by relays 2601 and 2610 thereby operating 2602 (not shown) of this group. The second code letter A is thus transferred from the register 850 of the trunk to the trunk register 2600. Relay 718 also establishes a circuit from battery through resistance 2569 over the lower No. 2 normal contact of relay 2502, conductor 2003 of cable 2100, lower No. 2 contacts of relay 2002, conductor 4567, No. 16 contact of connector relay 4569F, conductor 735, upper No. 3 contacts of relay 718 and conductor 736 to the lower contacts of the sleeve relay of each trunk appearance on the banks of the selectors in order that the identifier may reconstruct the digits which may have been dialed to reach the trunk. This circuit is then further completed as will be later described.

*Reconstructing dialed office code*

The arrangement for reconstructing the called office code in the identifier provides for the use of a sleeve relay such as 703 connected to the sleeve of each trunk appearance on the banks of selectors. The code leads associated with any trunk are connected to the contacts of sleeve relays in all appearances of the particular trunk involved. These trunk appearances may be at the banks of the first, second and/or third selectors. Where the bank appearances are terminated in rotary out-trunk switches, such as that shown in Fig. 6, the code leads are connected to a bank of such a rotary out-trunk switch involved, over the brush associated with such bank, over contacts of the sleeve relay of the trunk appearance and over a second brush of the switch and associated bank. With this arrangement, when a connection is set up through a particular bank appearance the code lead for the trunk is connected over the contact of a sleeve relay to the identifier-trunk-connector. There will be a number of code leads connected between the sleeve relays and the identifier-trunk-connector, one lead for each route appearance of the twenty trunks of the two subgroups served by the connector. Therefore, the battery connected as previously traced to conductor 736 will be connected through the lower contacts of some sleeve relay to one of the code leads through the trunk-identifier-connector to the identifier and this will determine the route appearance to which the call has been set up. The number of code leads through the connector to the identifier, therefore, will depend upon the number of possible route appearances of the trunk at the banks of selectors. For example, if eight of the levels of the first selector were involved in ticketed traffic there would be a maximum of eight code leads corresponding to the eight appearances through the first selector. In a like manner, the maximum number of route appearances that might occur for the bank levels of the second selectors available for ticketed traffic would be eight times eight or sixty-four route appearances or code leads, if all two-digit codes were involved in the outgoing ticketing traffic. The number of route appearances from the banks of third selectors is an indeterminate number depending upon the number of routes involved through the banks of the third selectors. Cross-connection racks, such as 4462 and 4469 of Fig. 44 and 4568 and 4569 of Fig. 45, are associated with the identifier-trunk-connector circuits so that the code leads from the sleeve relays which are associated with the same route appearance can be connected together, the only code leads brought through the connector circuits being those required for separate route appearances. In some cases there may be alternate routes to some offices in which event the sleeve relays for the last two or three trunk appearances in a bank level would connect the code leads from the trunk to a separate code lead through the connector circuit to the identifier to cause the operation of a special route relay which would cause the call to be set up over an alternate route. At the identifier the code leads terminate in cross-connection rack 2611 of Fig. 26 so that they may be cross-connected to operate a route relay, such as 2713, or to operate one of the trunk translator relays 2612, 2613, etc.

The identifier is provided with one or more route relays, such as 2713, for each called office route (building). The contacts of the route relay are associated with cross-connection racks 2714, 2715 and 2716 so as to convey to the sender all of the information relating to the setting up of the connection to the called office route involved. The route relay for a called office route will, in some cases, be operated directly from the code lead while in other cases it may require a combination of the information obtained from the code lead and the digit which has been dialed into the trunk before the route relay can be operated. In still other cases, it may require a combination of information from the code lead, the digit dialed into the trunk and also the first digit dialed into the sender to determine the operation of the proper route relay. For example, in case the trunk appearance is from the bank of a third selector it is apparent that the route relay will be operated directly from the code lead since the subscriber has dialed the entire three digits of the office code which will determine the route relay to be operated. When the trunk appearance is from the banks of second selectors and all three code letters are required to determine the route, then the code lead will be cross-connected at the rack 2611 to the winding of a trunk translator relay of the group 2612, 2613, etc. The operation of one of the relays of the trunk code group 2601 to 2610 in accordance with the setting of the digit register 650 of the trunk in response to the dialed third code digit will cause the connection of battery to one of the conductors extending over contacts of the operated relay of the group 2612, 2613, etc. and terminating in the rack 2614 to operate the proper route relay connected to a terminal of the rack 2614.

In case the trunk appearance is from the bank of a first selector and all three code digits are required to determine the route, then the code lead of the first selector appearance will be connected to a relay of group 2612, 2613, etc. and through the operation of one of the relays of the group 2601, 2610 battery will be connected to one of the conductors terminating in the rack 2614 which may be cross-connected to one of the sender translator relays 2615, 2616, etc. thereby causing the operation of one of such translator relays. The sender code relays 2620 to 2629 are operable over the identifier sender connector in accordance with the setting of the first register 4900 of the sender and the operation of one of these relays will connect battery over contacts of the operated relay of the group 2615, 2616, etc. and terminals of the cross-connecting rack 2617 to the proper route relay. It will be apparent that with this arrangement various combinations of bank appearances with two or three digit office codes will cause the operation of route relays over the various paths involved. To simplify the drawings but one of the route relays, 2713, has been disclosed but possible connections to other similar route relays have been indicated.

There are some instances where different route relays will be required for routes to the same office building due to differences in operation such as, for example, in some exchange areas, where 6 and 7 digit numbers are involved in the same thousands group and it is therefore necessary to indicate the two or three-digit office code to the sender, and also in some cases to add a sender delay time in the sender for such calls. For such connections, several route relays may be required, one for the two-digit code, one for the three-digit code and also one for the particular thousands number of the code where sender delay is involved. The operation of a route relay for sender delay may be involved only where a two-digit office code is to be printed. Thus the third digit dialed, thousands, will determine whether it is one of the conditions where a six or a seven-digit number has been dialed and the sender delay route relay must be operated, or whether the regular route relay to this office with no sender delay is to be operated. It is apparent that the third digit may be registered either in the trunk or as the first digit in the sender depending upon whether the trunk appears on the bank of a first or a second selector. In some areas the fourth digit dialed in the above cases will always determine definitely whether the called number will have six or seven digits. Therefore, whenever the fourth digit dialed is the first digit received in the sender, the route relay will be able to signal the sender whether the called number will be a six or seven-digit number and no sender delay will be involved. However, in those cases where the fourth digit dialed is the second digit registered in the sender the route relay will have to give the sender the sender delay signal as it has no access to the registration of such digit in the sender to determine whether it is a digit of a six or seven-digit number. Thus the sender delay will be involved only when the route appearance is from the banks of first selectors.

The route relay 2713 is arranged to control the sending of all the information to the sender relative to the called office code, including the digit which has been registered in the trunk. The functions of the route relay are as follows: To inform the sender whether the called office code has two or three digits; whether a repeater is required at the tandem point and whether the called office code should be prefixed by a one or two-digit repeater code; whether the sender delay should be added for those cases where either a six-digit or a seven-digit number may be dialed; to inform the sender as to the number of called office code digits to be sent out by the sender in setting up a call to the distant point since the ticketing trunks may be direct trunks or may terminate at a tandem office or at a partial tandem point; to send the three office code digits to the sender or to control the sending of those digits to the sender when they are registered in the trunk or sender; to inform the sender as to whether the first digit dialed into the sender is an office code digit, a thousands or a hundreds digit and directly or in conjunction with the calling office register relays of the identifier to inform the sender or the trunk or both whether the ticketing of the call should be cancelled or whether the route should be denied or whether a code has been dialed for which there is no existing office.

It has been assumed that the calling line was associated with the ticketing trunk of Figs. 7, 8 and 9 over a first selector appearance and that sleeve relay 703 associated with that appearance was operated. Consequently, when battery was applied to conductor 736 in the manner previously described, a circuit was completed from said conductor over the lower contacts of relay 703, code conductor 737, strapped terminals of rack 4568, the No. 17 contacts of connector relay 4559F, code conductor 4570, strapped over rack 2611 to the winding of trunk translator relay 2613, whereupon relay 2613 operates. Since it has been assumed that relay 2602 (not shown) of the trunk code register 2600 has been operated, a circuit is established from battery through resistance 2631 over the No. 7 contacts of relay 2602, the next to upper contacts of relay 2631, to a terminal of rack 2614, cross-connected through the winding of relay 2616 of the sender translator relays to ground thereby operating relay 2616.

In the meantime upon the operation of the identifier start relay 2002, a circuit was established from ground over its upper No. 1 contacts, over the inner upper back contact of relay 2003, to battery through the winding of relay 2010 and in parallel over conductor 2507 of cable 2100, over the upper No. 6 back contact of relay 2537 to battery through the winding of relay 2505. Relays 2010 and 2505 both operated. A circuit was also established from battery through the winding of relay 2717 over conductor 2718, the lower No. 5 front contacts of relay 2002, lower back contact of relay 2003 to ground over the middle upper back contact of relay 2009. Relay 2717 upon operating in turn operated relay 2719 over an obvious circuit established over its upper No. 1 contact. Relay 2719 upon operating established a locking circuit for relay 2010 extending from ground over its lower No. 5 contacts and conductor 2720 to battery through the winding of relay 2010, said locking circuit being utilized to prevent the release of relay 2010 after the operation of the relay 2003 as subsequently set forth. Relays 2719 and 2717 also prepared circuits to be later established by the operation of the route relay 2713. With the relays 4001 and 4006 of digit register 4000 of the sender operated, a circuit is established from ground on conductor 3111 over the lower No. 4 back contact of relay 3208, conductor 3209, thence over contacts of the relays of digit register 4000 to one of the group of ten conductors within the cable 4033 extending over the Nos. 4 to 13 contacts of the identifier connector relay 2800F, over conductors of cable 2807 and the back contacts of relay 2618 to battery through the windings of the sender code register relays 2620 to 2629 of the identifier. In the case assumed, register relays 4001 and 4006 are energized so a circuit is established from ground on conductor 3209 over the upper front contact of register relay 4006, the inner upper back contact of register relay 4002, the next to inner upper front contact of register relay 4001, conductor 4047 of cable 4033, the No. 10 contacts of relay 2800F, a conductor of cable 2807, over a back contact of relay 2618 to battery through the winding of sender code relay 2627 (not shown) to battery. Relay 2627 thereupon operates and connects battery through resistance 2619 over its next to upper contacts, the third from bottom contact of the operated relay of the sender translator relays, such for example as relay 2616 to a terminal on the rack 2617 cross-connected over conductor 2630 through the winding of route relay 2713 to ground.

*Transmitting the called office code digits to the sender*

The identifier is arranged to send the office code digits to the sender using five leads for each digit, two out of each group of five leads being grounded in each case. If all three code digits were dialed to reach the trunk, the upper Nos. 3, 4 and 5 contacts of the operated route relay, such as relay 2713, which are connected to terminals of the racks 2714, 2715 and 2716, will be cross-connected to terminals connected to the windings of relays of the first code digit group 2730 to 2739, of the second code digit group 2740 to 2749 and of the third code digit group 2750 to 2759 for operating relays of these groups corresponding to the three code digits dialed. Each of these relays is arranged upon its operation to connect ground to a pair of terminals in the associated cross-connecting rack. Rack 2722 is associated with the relays of group 2730 to 2739 and has five terminals in which terminate the group 2760 of five conductors over which the first code digit is transmitted to the sender and to which terminals the other pairs of terminals of the rack are cross-connected in the proper combinations of two for the ten values of the first code digit. Rack 2723 is associated with the relays of group 2740 to 2749 and has five terminals in which terminate the group 2763 of five conductors over which the second code digit is transmitted to the sender and to which terminals the other pairs of terminals of the rack are cross-connected in the proper combinations of two for the ten values of the second code digit. Rack 2724 is associated with the relays of group 2750 to 2759 and has five terminals in which terminate the group 2766 of five conductors over which the third code digit is transmitted to the sender and to which terminals the other pairs of terminals of the rack are cross-connected in the proper combinations of two for the ten values of the third code digit. In the case assumed, that is, that all three digits were dialed to reach the trunk and the thousands digit therefore would be registered in the trunk register 850 and the hundreds digit would be registered in register 4000 of the sender, the lower No. 3 front contact of the route relay 2713 is connected to a terminal on the cross-connecting rack 2721 cross-connected to a terminal connected over the lower No. 3 front contact of relay 2719 to conductor 2813 of cable 2806 to cause the operation of relay 4307 of the sender to inform the sender that the digit registered in the sender register 4000 was the hundreds digit.

If the entire office code cannot be sent from the identifier to the sender by the route relay, and the third code digit has been registered in the trunk and transferred to the trunk code register 2600, the first code digit will be transmitted under the control of the route relay through the operation of one of the relays of the group 2730 to 2739, the second code digit will be transmitted under the control of the route relay through the operation of one of the relays of the group 2740 to 2749, and the third code digit will be transmitted under the control of one of the trunk code relays 2600 to 2610. In this case the upper No. 5 contact of the route relay would be connected to a terminal on rack 2716 cross-connected to the winding of relay 2725 which relay upon operating connects ground over conductor 2632 and 2633 to the Nos. 1 and 2 multiple contacts of the relays of register 2600 the cooperating front contacts of which relays terminate in pairs of terminals on the cross-connecting rack 2634 which are cross-connected to the proper combinations of two out of the five terminals connected to the conductors of the group 2766 for the ten values of the third code digit. In this case the lower No. 3 front contact of the route relay which is connected to a terminal on the cross-connecting rack 2721, is cross-connected to a terminal connected over the lower No. 4 front contacts of relay 2719 to conductor 2814 of cable 2806 to cause the operation of relay 4308 of the sender to inform the sender that the digit registered on the register 4000 thereof was the thousands digit.

In case the second code digit dialed was registered in the trunk and transferred to the trunk code register 2600, and the third code digit dialed was registered in the sender and transferred to the sender code relays 2620 to 2629 in the manner previously described, the operated route relay would cause the transmission of the first code digit through the operation of one of the relays of the group 2730 to 2739 in the manner previously described. The second code digit would be transmitted under the control of the operated relay of the trunk code register 2600 and the third code digit would be transmitted under the control of the operated relay of the sender code group 2620 to 2629. In this case the upper No. 4 contacts of the route relay would be connected to a terminal on rack 2715 cross-connected to the winding of relay 2726 which upon operating connects ground over conductors 2635 and 2636 to the Nos. 3 and 4 multiple contacts of the relays of register 2600, the cooperating front contacts of which relays terminate in pairs of terminals on the cross-connecting rack 2637 which are cross-connected to the proper combinations of two out of five terminals connected to the conductors of the group 2763 for the ten values of the second code digit. The upper No. 5 contacts of the route relay would be connected to a terminal on rack 2716 cross-connected to the winding of relay 2727 which upon operating connects ground over conductors 2638 and 2639 to the Nos. 1 and 2 multiple contacts of the relays of the group 2620 to 2629, the cooperating front contacts of which relays terminate in pairs of terminals on the cross-connecting rack 2640 which are cross-connected to the proper combinations of two out of five terminals connected to the conductors of the group 2766 for the ten values of the third code digit. The lower No. 3 front contact of the route relay is connected to a terminal on rack 2721, cross-connected to a terminal connected over the lower No. 2 contacts of the relay 2719 to conductor 2812 of cable 2806 to cause the operation of relay 4306 of the sender to inform the sender that the digit registered in register 4000 thereof was the third code digit.

In certain cases the identifier will obtain the thousands digit from the sender in order to operate a route relay. This occurs for those conditions where the thousands digit dialed determines whether the called office code is a two or a three-digit code or where it is necessary to give a sender delay signal to the sender. If a route relay has been operated on a call for which a two-digit code was dialed, and there is therefore no third code digit to be considered, the upper No. 5 contact of the route relay would be cross-connected over the cross-connecting rack 2716 to a terminal connected with the winding of relay 2728 which upon operating connects ground over conductors 2768 of group 2766 and conductor 2769 to cause the operation of register relays 3505 and 3506 in the sender to inform the sender that no third code digit was dialed. The circuit over conductor 2768 may be traced over cables 2815 and 2766, the No. 45 contacts of identifier connector relay 2801F, conductor 3515 of cables 2816 and 3510, to battery through the winding of relay 3505 of the third code digit register 3500. The circuit over conductor 2769 may be traced through the cables 2815 and 2766, over the No. 46 contacts of relay 2801F, conductor 3516 to battery through the winding of relay 3506.

The lower No. 4 contacts of the route relay involved with sender delay are arranged to be cross-connected over the cross-connecting rack 2770 to the terminal connected over the lower No. 3 contacts of relay 2717, thence over conductor 2817 of cable 2806, the No. 28 contacts of identifier connector relay 2800F, conductor 3134 of cable 2803, to battery through the winding of sender delay relay 3115 of the sender or to the terminal connected over the lower No. 4 contacts of relay 2717 thence over conductor 2818 of cable 2806, the No. 27 contacts of relay 2800F, conductor 3135 of cable 2803 to battery through the winding of the no-sender delay relay 3125 of the sender to inform the sender, whether or not a sender delay time should be used since the subscriber may dial either a six or a seven-digit number. This sender delay signal is only given where it is not possible for the identifier to determine definitely from the digit dialed that the call is to a six or a seven-digit point.

The lower No. 1 contacts of each route relay are arranged to be cross-connected over the cross-connecting rack 2771 to one of the three terminals connected over the upper Nos. 4, 5 and 6 contacts of relay 2719, conductors 2819, 2820 and 2821 of cable 2806, the Nos. 22, 23 and 24 contacts of identifier connector relay 2800F, conductors 4203, 4204 and 4205 of cable 4033 through the winding of either relay 4200, 4201 and 4202 of the sender to battery, depending upon whether the connection requires the insertion of a low gain repeater in which event relay 4200 is operated, a high gain repeater in which event relay 4201 is operated or no repeater in which event relay 4202 is operated.

The lower No. 2 contacts of each route relay are arranged to be cross-connected over the cross-connecting rack 2772 to one of the four terminals connected over the upper Nos. 1, 2 and 3 contacts and the lower No. 1 contacts of relay 2719, conductors 2822 to 2824, inclusive, of cable 2806, the Nos. 14 to 18 contacts of identifier connector relay 2800F, conductors 4210 to 4213 of cable 4033, through the winding of one of relays 4206 to 4209 of the sender to battery depending upon whether the sender is required to send out all of the office code digits, part of such digits or none of such digits.

The upper No. 1 contacts of each route relay are arranged to be connected over conductor 2641 and the cross-connection rack 2642 to the operating winding of one of the relays 2643 to 2645 for determining whether a ticket shall or shall not be made for the connection or whether the call shall be denied to the calling subscriber.

The upper No. 2 contacts of each route relay are arranged to be cross-connected over terminals of cross-connecting rack 2773, over contacts of relays 2774 and 2775 and the terminals of cross-connecting rack 2776 to the windings of the ten rate register relays of the group 2790 to 2799 whereby under the joint control of the route relay and relays 2774 and 2775, one of the rate register relays becomes operated to inform the sender concerning the rate to be charged for the connection. Each one of these rate relays upon operating connects ground to two terminals of the cross-connection rack associated therewith, cross-connected to two out of the five terminals in which the five conductors of cable 2826 terminate, which conductors extend over the Nos. 5 to 9 contacts of identifier connector relay 2801F, conductors 3832 to 3836, inclusive of cable 3837 to battery through the windings of rate register relays 3827 to 3831, inclusive, of the rate register of the sender.

The identifier will always transfer the digit registered in the trunk code register 2600 to the sender. For this purpose, relay 2717 upon operating connects ground over its lower Nos. 1 and 2 contacts and conductors 2646 and 2647 to the Nos. 5 and 6 multiple contacts of relays of the register 2600, the cooperating front contacts of which relays terminate in pairs of terminals on the cross-connecting rack 2648 which are cross-connected to the proper combinations of two out of five terminals connected to the conductors of cable 2827 for the ten values of the digit dialed to the trunk. These conductors extend over the Nos. 47 to 51 contacts of identifier connector relay 2801F and the conductors 3526 to 3530 of cables 2816 and 3531 to battery through the windings of the relays 3521 to 3525 of the trunk register 3520 of the sender.

It has been assumed that the calling subscriber has dialed the office code MAR and, as a consequence, relay 2602 of the trunk code register 2600, relay 2627 of the sender code register comprising relays 2620 to 2629, and route relay 2713 have been operated. With relay 2717 and route relay 2713 operated, a circuit is established from ground over the upper No. 3 contacts of these relays and strapped terminals of cross-connecting rack 2714 to battery through the winding of relay 2637 (not shown) of the group 2730 to 2739 which operates and connects ground over conductors 2761 and 2762 of cables 2760 and 2815, the Nos. 32 and 34 contacts of identifier connector relay 2801F, conductors 3412 and 3414 of cables 2816 and 3410 to battery through the windings of relays 3402 and 3404, respectively, of the first code digit register 3400 of the sender. A circuit is also established from ground over the upper No. 4 contacts of relays 2717 and 2713 and strapped terminals of cross-connecting rack 2715 to battery through the winding of relay 2726 which operates and connects ground over conductors 2635 and 2636, contacts of the operated register relay 2602 of the register 2600, conductors 2764 and 2765 of cables 2763 and 2815, the Nos. 36 and 38 contacts of connector relay 2801F, conductors 3431 and 3433 of cables 2816 and 3430 to battery through the windings of relays 3421 and 3423, respectively, of the second code digit register 3420 of the sender. A circuit is also established from ground over the upper No. 5 contacts of relay 2717 and 2713 and strapped terminals of cross-connecting rack 2716 to battery through the winding of relay 2727 which operates and connects ground over conductors 2638 and 2639, contacts of the operated register relay 2627 (not shown) of the sender code register, conductors 2767 and 2768 of cables 2766 and 2815, the Nos. 42 and 45 contacts of relays 2801F, conductors 3512 and 3515 of cables 2816 and 3510 to battery through the windings of relays 3502 and 3505, respectively, of the third code digit register 3500 of the sender. A further circuit is also established from ground over the lower Nos. 1 and 2 contacts of relay 2717, conductors 2646 and 2647, contacts of the operated relay 2602 of the register 2600, conductors 2828 and 2829 of cable 2827, Nos. 47 and 48 contacts of relay 2801F, conductors 3526 and 3528 of cables 2816 and 3531 to battery through the windings of relays 3521 and 3523, respectively, of the trunk register 3500 of the sender.

For transferring each digit value of any digit from the identifier to the office code or trunk registers of the sender, the conductors of a cable extending to the identifier connector are grounded and the relays of the proper sender register are operated in accordance with the following table.

TABLE III

| Digit | Cable Conductors Grounded | Sender Register Relays Operated |
|---|---|---|
| 1 | 1, 2 | XX01, XX02 |
| 2 | 1, 3 | XX01, XX03 |
| 3 | 1, 4 | XX01, XX04 |
| 4 | 1, 5 | XX01, XX05 |
| 5 | 2, 3 | XX02, XX03 |
| 6 | 2, 4 | XX02, XX04 |
| 7 | 2, 5 | XX02, XX05 |
| 8 | 3, 4 | XX03, XX04 |
| 9 | 3, 5 | XX03, XX05 |
| 0 | 4, 5 | XX04, XX05 |

Since in the case assumed, the third office code digit was registered in register 4000 of the sender and the sender must be informed of this fact, a circuit is also established by the operation of the route relay 2713 from ground over its lower No. 3 contact, strapped terminals of cross-connecting rack 2721, the lower No. 2 contacts of relay 2719, conductor 2812 of cable 2806, the No. 21 contacts of relay 2800F, conductor 4303 of cable 4033 to battery through the winding of relay 4306 of the sender, which relay operates and closes an obvious circuit for relay 4302. Had the number dialed been one in which the thousands digit was the first digit registered in register 4000, then the operated route relay would have its lower No. 3 contact so strapped at rack 2721 as to cause the operation of relays 4307 and 4301 of the sender or had the number dialed been one in which the hundreds digit was the digit registered in register 4000, then the lower No. 3 contacts of the operated route relay would be so strapped at rack 2721 as to cause the operation of relays 4308 and 4300.

It will be assumed that the operated route relay 2713 has also established a circuit for causing the operation of relays 4202, 4209, 2644 and 3125. The circuit for relay 4202 may be traced from ground over the lower No. 1 contacts of relay 2713, strapped terminals of cross-connecting rack 2771, the upper No. 6 terminals of relay 2719, conductor 2821 of cable 2806, the No. 24 contacts of identifier connector relay 2800F, conductor 4205 of cable 4033 to battery through the winding of relay 4202, the operation of which relay informs the sender that no repeater is required for the connection. The circuit for relay 4209 extends from ground over the lower No. 2 contacts of route relay 2713, cross-connected terminals of rack 2772, the upper No. 3 contacts of relay 2719, conductor 2825 of cable 2806, the No. 18 contacts of relay 2800F, conductor 4213 of cable 4033 to battery through the winding of relay 4209, the operation of which relay informs the sender that all of the office code digits registered in the sender are to be retransmitted by the sender. The circuit for relay 3125 extends from ground over the lower No. 4 contacts of the route relay 2713, cross-connected terminals of rack 2770, the lower No. 4 contacts of relay 2717, conductor 2818, the No. 27 contacts of relay 2800F, conductor 3135 of cable 2803 to battery through the winding of relay 3125 which, upon operating informs the sender that no delay of the functions of the sender to await the dialing of a seventh digit is required. A circuit is also established from ground over the upper No. 2 contacts of relay 2717, the upper No. 1 contacts of route relay 2713, conductor 2641, strapped terminals of cross-connecting rack 2642 to battery through the upper winding of relay 2644.

Following the registration of the three code digits and the trunk digit in the registers 3400, 3420, 3500 and 3520 of the sender, a checking circuit is established through contacts of the relays of these registers which should be continuous if two relays of each register have been operated, if one relay of the group 4206 to 4209 has been operated, if one relay of the group 4200 to 4202 has been operated, if one of the relays 4306, 4307 or 4308 has been operated, if one of the relays 2643, 2644 and 2645 has been operated and either relay 3115 or 3125 has been operated. This circuit may be traced, for the specific digits and conditions registered as above noted, from battery through the winding of relay 2011 of Fig. 20 of the identifier over conductor 2012, the lower back contact of relay 2645, the upper front contact of relay 2644, the upper back contacts of other relays of the group, the upper back contact of relay 2643, conductor 2649, the No. 67 contacts of identifier connector relay 2801F, the No. 2 upper front contact of relay 2802F, lower back contact of relay 2802I, No. 2 upper back contact of relay 2802L, conductor 2830, lower No. 4 alternate contacts of relay 4306, lower No. 4 back contact of relay 4307, lower No. 4 normal contacts of relay 4308, conductor 3136 of cable 3119, lower No. 4 back contact of relay 3115, upper No. 4 front contact of relay 3125, conductor 3137 of cable 3119, upper No. 1 front contact of relay 4202, lower No. 1 back contact of relay 4201, upper No. 4 back contact of relay 4200, upper front contact of relay 4209, upper No. 3 back contact of relay 4208, lower back contact of relay 4207, upper back contact of relay 4206, conductor 4214 to the first code digit register 3400, thence over the upper No. 1 back contact of relay 3401, the upper No. 2 front contact of relay 3402, the upper No. 1 back contact of relay 3403, the upper No. 1 front contact of relay 3404 and the No. 1 upper back contact of relay 3405 thereof, over the upper No. 1 front contact of relay 3421, the No. 1 upper back contact of relay 3422, the No. 2 upper alternate contact of relay 3423, the No. 1 upper back contact of relay 3424, and the No. 1 upper back contact of relay 3425 of register 3420, conductor 3416, the upper No. 1 back contact of relay 3501, the upper No. 2 alternate contact of relay 3502, the upper No. 1 back contact of relay 3503, the upper No. 2 normal contacts of relay 3504, and the upper No. 1 front contact of relay 3505 of register 3500, the lower No. 2 back contact of relay 3506, the upper No. 1 front contact of relay 3521, the upper No. 1 back contact of relay 3522, the upper No. 2 alternate contacts of relay 3523, the upper No. 1 back contact of relay 3524, and the upper No. 1 back contact of relay 3525 of register 3520, conductor 3517, the No. 10 contacts of identifier connector relay 2801F, conductor 2013 of cable 2000 to ground over the upper back contact of relay 2011 and in parallel to ground through the winding of relay 2015 of the identifier. With this circuit established relay 2011 operates.

If no third office code digit was registered on the relays of register 3500, relays 3505 and 3506 would have been operated as previously described, thereby maintaining the continuity of the above-traced checking circuit from conductor 3416 over the upper No. 1 back contact of relay 3501, the upper No. 2 normal contacts of relay 3502, the lower No. 3 back contact of relay 3503, the lower No. 3 back contact of relay 3504, the lower No. 3 front contact of relay 3505, the lower No. 2 front contact of relay 3506, and thence as traced.

With relay 2010 previously operated, the operation of relay 2011 establishes a circuit from ground over its inner upper front contact and the inner upper front contact of relay 2010 to battery through the winding of relay 2003 which thereupon operates and locks over its inner upper front contact to ground over the upper No. 1 contacts of relay 2002; opens at its lower back contact the previously traced circuit for relay 2717, which thereupon releases and in turn releases relay 2719, followed after an interval by the release of slow-to-release relay 2010, and closes a circuit from ground over its inner lower front contact and conductor 2014 through the winding of relay 2618, to battery which relay operates to disconnect the windings of the relays of the sender code register 2620 to 2629 from the conductors of cable 2607 and to establish a circuit from ground over its upper front contact, conductor 2650 and the upper back contact of relay 2010 to battery through the winding of relay 2021. When relay 2011 operated, a circuit was established from ground over the upper back contact of relay 2009, the inner lower front contact of relay 2011, conductor 2017 of cable 2000, the No. 63 contacts of identifier connector relay 2801F, conductor 2831, the lower No. 1 contacts of off-normal relay 3106 of the sender, thence in parallel branches over the upper No. 1 contacts and through the winding of operated relay 3125 to battery; to conductor 3138 over the upper No. 1 front contact and through the winding of relay 4306 to battery; from conductor 3138 over the inner upper front contact and through the winding of relay 4202 to battery; from conductor 3138 over the inner upper front contact and through the winding of relay 4209 to battery; from conductor 3138 through the No. 1 lower front contacts and windings of register relays 3402, 3405, 3421, 3423, 3502, 3505, 3521 and 3523 to battery and over conductor 2019 and the lower No. 1 contacts and through the lower winding of relay 2645 to battery. If these locking paths are effective then these relays will remain operated when the previously traced operating circuits therefore are opened upon the release of relays 2717 and 2719 and consequently, relays 2011 and 2015 of the identifier will remain operated. If relay 2011 releases because of a faulty locking path or relay 2015 releases due to a trouble ground in the sender, an alarm circuit will be established from ground over the upper front contact of relay 2003, the lower back contact of relay 2010, over the lower back contact of relay 2011 to conductor 2018 extending to the alarm circuit or over the lower front contact of relay 2011 and the back contact of relay 2015 to conductor 2018. If the locking paths in the sender are satisfactory, a circuit will be established from ground over the upper front contact of relay 2003, the lower back contact of relay 2010, the lower front contacts of relay 2011 and 2015 to battery through the winding of relay 2016 which operates to establish a circuit from ground over its front contact, conductor 2020 of cable 2000, the No. 31 contacts of identifier connector relay 2800F, conductor 3210 of cable 2803, over the front contact of relay 3211, which is operated as will be presently described, to battery through the winding of relay 3208. Relay 3208 thereupon operates to inform the sender that it may proceed to set up the connection to the wanted line and locks over its upper No. 1 contacts to off-normal ground on conductor 3111.

*Setting up the connection*

At the time the sender was taken for use and the off-normal relay 3106 operated, a circuit was established for relay 3900 which may be traced from battery through its winding over the inner upper normal contacts of relay 3901, conductor 3109, to ground on the upper No. 2 contacts of relay 3106. Relay 3900 upon operating connects the winding of relay 3211 across the tip and ring conductors of the out-pulsing or fundamental circuit which may be traced in part from ring conductor 810 of the ticketing trunk, lower No. 3 contacts of relay 709, conductor 724, brush 4626 and lower No. 5 contacts of relay 4620 of the trunk finder 4600, conductor 4632, upper No. 4 contacts of relay 3010, upper No. 4 back contact of relay 3006, conductor 3015, inner upper normal contacts of relay 3902, conductor 3903, winding of polarized relay 3211, conductor 3904, lower normal contacts of relay 3902, inner upper contacts of relay 3900, conductor 3016, lower No. 4 back contact of relay 3006, lower No. 4 front contact of relay 3010, conductor 4631, the lower No. 4 contacts of relay 4620 and brush 4625 of trunk finder 4600, conductor 723, upper No. 2 contacts of relay 709, to the tip conductor 809 of the ticketing trunk. If the trunk is in a standard condition and the battery and ground connected thereto at the distant end are poled in the proper direction, polarized relay 3211 operates and completes the circuit previously traced for the checking relay 3208 of the sender which operates to inform the sender that it may proceed to set up the connection to the wanted line. Relay 3208 upon operating locks over its upper No. 1 contacts to off-normal ground on conductor 3111 and at its upper No. 5 contacts connects ground to conductor 2831 to lock the operated register relays of the sender in their operated condition independent of the identifier.

The operation of the off-normal relay 3106 of the sender connected ground over its lower No. 2 contacts to conductor 3111, the No. 4 upper normal contacts of relay 3208, conductor 3212, the lower normal contacts of testing jack 3905, through the upper winding of polarized relay 3906 middle normal contacts of jack 3905 through resistance 3907 and winding of polarized relay 3908 over the upper back contact of relay 3909 through resistance 3910 to battery. Relay 3908 operated in this circuit and relay 3906 was so energized as to hold its armature against its back contact. A circuit was also established from battery through resistance 3912, the lower back contact of relay 3909, the lower normal contacts of jack 3905 through the lower winding of relay 3906, over the upper normal contacts of jack 3905, the inner lower back contact of relay 3909, through condenser 3911, over the inner upper and middle back contacts of relay 3909 to ground on conductor 3111, but this circuit is ineffective to charge the condenser since it is shunted by the ground applied over conductor 3212 and the lower normal contacts of jack 3905 to the junction between the windings of relay 3906. As soon, however, as the checking relay 3208 operates as previously described it removes ground from conductor 3212 whereupon the previously traced charging circuit for condenser 3911 becomes effective and polarized relay 3906 is energized by such charging current in such a manner as to operate its armature against its front contact. The previously traced circuit for relay 3908 is also opened by the removal of ground from conductor 3212 and relay 3908 releases. Relay 3906 upon closing its front contact establishes a shunt for condenser 3911 extending over the upper middle back contact of relay 3909, the front contact of relay 3906, through the lower winding of relay 3906, the upper normal contacts of jack 3905 and the inner lower back contact of relay 3909 to the other terminal of the condenser and the discharge current flowing through the lower winding of relay 3906 again operates the armature of such relay to its back contact. The charging circuit for condenser 3911 is now reestablished from battery through resistance 3910 over the upper back contact of relay 3909 through the winding of relay 3908, resistance 3907, the middle normal contacts of jack 3905, through both windings of relay 3906, the upper normal contacts of jack 3905, the inner lower back contact of relay 3909, through condenser 3911 over the inner and middle upper back contacts of relay 3909 to ground on conductor 3111 and relays 3906 and 3908 are again operated in response to the charging current. This cycle of operations continues until ground is again connected to the junction point between the windings of relay 3906 over conductor 3212.

Upon the first release of relay 3908 following the operation of relay 3208, an operating circuit for relay 3913 is established from battery through its winding, over the lower back contacts of relay 3901, upper back contact of relay 3931, upper back contact of relay 3915, back contact of relay 3908, conductor 3916, upper No. 2 contacts of relay 3208 to ground on conductor 3111, and relay 3913 operates, locking through the winding of relay 3901 and over its front contact, the inner lower back contact of relay 3931 to ground on conductor 3112. Relay 3901 being shunted does not operate in this locking circuit until relay 3908 again operates. With relay 3901 operated, relay 3900 is held operated over the inner upper alternate contacts of relay 3901, over the front contact of relay 3908, to ground on conductor 3916 and thus holds the out-pulsing circuit closed through the winding of relay 3211 as previously traced so long as polarized relay 3908 remains operated. When thereafter relay 3908 releases, relay 3900 releases to open the fundamental circuit and to thus transmit the first impulse thereover. Other impulses are then transmitted upon the subsequent operations and releases of relay 3900 in response to the intermittent operation of relay 3908.

When relay 3208 operated, a circuit was also established from ground on conductor 3111, over its upper No. 4 alternate contacts, conductor 3213, inner upper normal contacts of relay 3915, conductor 3914, lower back contact of relay 4215, back contact of relay 4217, to battery through the winding of relay 4216. Relays 4215 to 4217, inclusive, control the progress of selections in conjunction with the progress relays 4219 to 4222 and 4309 to 4313. Relay 4216 upon operating, with relay 4209 operated to indicate that all office code digits are to be sent and with relay 4202 operated to indicate that no preliminary series of impulses are required to include a repeater, establishes the circuit of progress relay 4220 which may be traced from battery through its winding, the lower No. 3 contacts of relay 4202, the upper back contact of progress relay 4221, the lower front contact of relay 4209, the upper No. 2 contacts of relay 4202, the upper front contact of relay 4216, to ground at the upper back contact of relay 4215. Relay 4220 operates and locks over its inner upper front contact to off-normal ground on conductor 3109, and establishes a circuit for operating one of the counting relays 3921 to 3930 in accordance with the value of the first code digit registered in the register 3400. Since it has been assumed that the first code digit registered was 6 and therefore register relays 3402 and 3404 are operated, a circuit is established from battery through the winding of the No. 6 counting relay 3926 over the back contact of its mate relay 3936, terminal 3946 cross-connected to the similarly numbered terminal of register 3400 of Fig. 34, over the upper No. 4 front contact of relay 3404, the upper No. 4 front contact of relay 3402, conductor 3417, the lower front contact of progress relay 4220, thence in series over the lower back contacts of progress relays 4221, 4222, 4309 to 4313, conductor 4314, outer lower front contact of relay 3901, upper back contact of counting relay 3931, upper back contact of relay 3915, back contact of relay 3908 to ground on conductor 3916. Thus upon the first release of relays 3900 and 3908 to open the fundamental circuit to transmit the first impulse of the first code digit series, counting relay 3926 is operated and upon operating locks through the winding of its mate relay 3936 and over its front contact to ground applied to conductor 3917 over the inner lower front contact of relay 3901, the inner lower back contact of relay 3931, from off-normal ground on conductor 3112. When relays 3908 and 3900 again operate to terminate the first impulse, relay 3936 operates in the locking circuit of relay 3926 and extends the previously traced circuit over the strapped terminals 3946, the upper front contact of relay 3936, the back contact of counting relay 3935, to battery through the winding of counting relay 3925. Upon the next operation of relays 3908 and 3900 to transmit the next impulse, counting relay 3925 operates. In this manner, successive impulses are transmitted and counted until, upon the transmission of the fifth impulse, counting relay 3932 operates and locks over a locking circuit extending serially through its winding and the winding of its mate relay 3922 over the lower back contact of relay 3915 to ground on conductor 3112. Upon the termination of the fifth impulse, relay 3932 operates in the locking circuit of relay 3922 and extends the counting relay operating circuit previously traced to terminal 3946 over the upper front contacts of the operated counting relays 3932 to 3936, inclusive, over the inner upper back contact of relay 3931 to battery through the winding of the No. 1 counting relay 3921. When the sixth impulse is transmitted through the operation of relays 3908 and 3900, relay 3921 operates and locks through the winding of its mate relay 3931 over its own front contact and the lower back contact of relay 3915 to ground on conductor 3112.

Relay 3931 upon operating opens the locking circuit of relays 3901 and 3913 which now release in turn releasing the operated counting relays 3923 to 3926 and 3933 to 3936. Relay 3931 also establishes a circuit for relay 3918 extending from battery through its winding, over the upper front contact of relay 3931 and the upper back contact of relay 3915 to ground on conductor 3916 as soon as relay 3908 releases to terminate the transmission of the sixth impulse. Relay 3918 thereupon operates and locks through the winding of relay 3915 over its own front contact and the lower back contact of counting relay 3933, now released, to ground on conductor 3112. With relay 3901 released, relay 3900 is held operated over its original operating circuit and consequently no further impulses are transmitted upon the subsequent intermittent operation of relay 3908. Upon the next operation of relay 3908, the operating ground for relay 3918 is removed and relay 3915 now operates in the locking circuit of relay 3918 and opens at its lower back contact, the locking circuit for counting relays 3921, 3922, 3931 and 3932 which release. All of the counting relays which were operated to count the impulses of the first code digit series have now been released.

Relay 3915 also removes ground from the operating circuit of relay 4216 whereupon relay 4215 now operates in a circuit from ground through its upper winding, over the lower front contact of relay 4216 and the back contact of relay 4217 to battery through the winding of relay 4216 and at its upper back contacts opens the previously traced circuit over which progress relay 4220 was operated. When relay 3908 again releases following the operation of relay 3915, a circuit is established from ground over conductor 3916, over its back contact, the upper front contact of relay 3915, over the upper back contact of relay 3936 to battery through the winding of counting relay 3926 and relay 3926 operates and locks in a circuit through its winding and the winding of relay 3936 over its own front contact, conductor 3917, the lower front contact of relay 3915, to ground on conductor 3112 and relay 3936 operates in this locking circuit upon the next operation of relay 3908. In response to subsequent releases and operations of relay 3908 counting relays 3923 to 3925 and 3933 to 3935 are operated and locked to count an interval of approximately .6 second sufficient to allow the selector switch operated by the transmission of the first code digit impulse series to hunt for an idle trunk in the sixth bank level to which its brushes have been raised. When relay 3933 operates, it opens the locking circuit for relays 3915 and 3918 which thereupon release in turn releasing the operated counting relays. A circuit is now established from ground on conductor 3916 over the back contact of relay 3908, upon the next release of such relay, over the upper back contact of relay 3915, the upper back contact of relay 3931, the lower back contact of relay 1991 to battery through the winding of relay 3913 and relay 3913 operates and locks through the winding of relay 3901 over its own front contact, the inner lower back contact of relay 3931 to ground on conductor 3112, relay 3901 operating in this locking circuit upon the next operation of relay 3908. With relay 3901 reoperated and relay 3915 released, the impulse transmitting and counting circuits are restored to the condition for controlling the transmission and counting of the next impulse series.

When relay 3915 released, ground was reapplied to conductor 3914 thereby establishing a circuit over the lower front contact and through the lower holding winding of relay 4215 to battery through the winding of relay 4217 whereupon relay 4217 operated to open the locking circuit of relay 4216 previously traced through the upper winding of relay 4215. Relay 4216 now releases and establishes a circuit for operating progress relay 4221 which may be traced from battery through the winding of such relay over the lower No. 2 contacts of relay 4202, the upper back contacts of progress relay 4222, the upper front contact of progress relay 4220, the middle lower front contact of relay 4209, the lower No. 1 contacts of relay 4202, the back contact of relay 4216, to ground at the upper front contact of relay 4215. Relay 4221 upon operating locks over its inner upper front contact to ground on conductor 3109, opens at its lower back contact the counting relay control circuit extending from the first code digit register 3400 and at its lower front contact establishes the counting relay control circuit from the second code digit register 3420. Since it has been assumed that the second code digit registered was 2 and therefore register relays 3421 and 3423 are operated, a circuit is established from battery through the winding of the No. 2 counting relay 3922 over the back contact of the mate relay 3932, terminal 3942, cross-connected to the similarly numbered terminal of register 3420, over the upper No. 5 contacts of relay 3423, the lower No. 2 contacts of relay 3421, conductor 3418, the upper No. 1 back contact of relay 3506, conductor 3518, over the lower front contact of progress relay 4221, over the lower back contacts of succeeding progress relays, conductor 4314, the lower front contact of relay 3901, the upper back contact of relay 3931, the upper back contact of relay 3915, the back contact of relay 3908, to ground on conductor 3916. In the manner previously described the counting relays 3922, 3921, 3932 and 3931 are operated in response to the operations and releases of relay 3908 to count the transmission of the second code digit series of two impulses. Upon the operation of relay 3931, relays 3901 and 3913 are released, relays 3915 and 3918 are operated and the operated counting relays are released as previously described, whereupon the counting relays are reoperated to count a time interval sufficient to permit the selector switch operated by the second code digit series to hunt for an idle trunk in the second level of its bank to which its brushes have been raised. At the end of this interval the operated counting relays are released, relays 3915 and 3918 are released and relays 3901 and 3913 are reoperated in the manner previously described.

When relay 3915 operated, it removed ground from conductor 3914 thereby releasing relays 4215 and 4217 and when it released at the termination of the counting of the time interval and reapplied ground to conductor 3914, the previously traced operating circuit for relay 4216 was established. A circuit is now established for progress relay 4222 extending from battery through its winding over the upper back contact of progress relay 4309, the upper front contact of relay 4221, thence over the circuit previously traced over the upper front contact of relay 4216, to ground at the upper back contact of relay 4215. Progress relay 4222 upon operating locks over its inner upper front contact to ground on conductor 3109, opens at its lower back contact the counting relay control circuit extending from the second code digit register 3420, and at its lower front contact establishes the counting relay control circuit from the third code digit register 3500. Since it has been assumed that the third code digit registered was 7 and therefore register relays 3502 and 3505 are operated, a circuit is established from battery through the winding of the No. 7 counting relay 2927, over the back contact of the mate relay 3937, terminal 3947 cross-connected to the similarly numbered terminal of register 3500, over the upper No. 3 contacts of relay 3505, the upper No. 4 contacts of relay 3502, conductor 3519, the upper No. 2 back contact of relay 3506, conductor 3419, the lower front contact of progress relay 4222, over the lower back contacts of succeeding progress relays, over conductor 4314, the lower front contact of relay 3901, the upper back contact of relay 3931, the upper back contact of relay 3915, the back contact of relay 3908, to ground on conductor 3916. In the manner previously described, the counting relays 3921 to 3927 and 3931 to 3937 are operated in response to the functioning of relay 3908 to count the transmission of the third code digit series of seven impulses. Upon the operation of relay 3931, relays 3901 and 3913 are released, relays 3915 and 3918 are operated and the operated counting relays are released as previously described, whereupon the counting relays are reoperated to count a time interval sufficient to permit the selector switch operated by the third code digit series to hunt for an idle trunk in the seventh level of its bank to which its brushes have been raised. At the end of this interval, the operated counting relays are released, relays 3915 and 3918 are released and relays 3901 and 3913 are reoperated in the manner previously described.

When relay 3915 operated, it removed ground from conductor 3914 thereby permitting relay 4215 to operate in the locking circuit of relay 4216 and when it released at the termination of the counting of the time interval and reapplied ground to conductor 3914, relay 4217 operated, relay 4216 was released and relay 4215 was held operated. A circuit is now established for progress relay 4309 extending from battery through its winding over the upper back contact of progress relay 4310, conductor 4315, the upper front contact of progress relay 4222, the upper front contact of progress relay 4220, thence as traced over the back contact of relay 4216 to ground at the upper front contact of relay 4215. Progress relay 4309 upon operating locks over its inner lower front contact to ground on conductor 3109, opens at its lower back contact the counting relay control circuit extending from the third code digit register 3500 and at its lower front contact establishes the counting relay control circuit from the digit register in which the thousands numerical digit has been registered. Relays 4302 and 4306 have been operated from the identifier to inform the sender that the third code digit dialed has been registered in the register 4000 and consequently that the thousands digit 1 has been registered in the register 4010 by the operation of relay 4011 thereof. With progress relay 4309 operated and relay 4017 operated indicating that the thousands digit has been registered, a circuit is established from battery through the winding of counting relay 3921 over the inner upper back contact of relay 3931, terminal 3941 cross-connected to the similarly numbered terminal of Fig. 42, conductor 4223, the upper No. 4 back contact of relay 4014 of register 4010, the upper front contact of relay 4011, the upper No. 3 back contact of relay 4012, the upper No. 4 back contact of relay 4016, conductor 4224, the upper No. 5 contacts of relay 4306, the lower front contact of progress relay 4309, the lower back contacts of succeeding progress relays, conductor 4314, the lower front contact of relay 3901, the upper back contact of relay 3931, the upper back contact of relay 3915, the back contact of relay 3908 to ground on conductor 3916. In the manner previously described, the counting relays 3921 and 3931 are operated in response to the functioning of relay 3908, to count the transmission of the single impulse of the thousands digit series. Upon the operation of relay 3931, relays 3901 and 3913 are released, relays 3915 and 3918 are operated and the operated counting relays are released as previously described, whereupon the counting relays are reoperated to count a time interval sufficient to permit the selected switch operated by the thousands digit series to hunt for an idle selector in the first level of its bank to which its brushes have been raised. At the end of this interval, the operated counting relays are released, relays 3915 and 3918 are released and relays 3901 and 3913 are reoperated in the manner previously described.

If the thousands digit had not been registered at the time progress relay 4309 operated, the transmission of impulses for the thousands digit series would have been blocked by the connection of ground over the middle upper back contact of progress relays 4313, 4312, 4311 and 4310 over the middle upper front contact of progress relay 4309, the upper No. 3 contacts of relay 4302, conductor 4316, the lower back contact of relay 4017 which will not have been operated, conductors 4034 and 3212 to the junction point between the windings of relay 3906 thereby arresting the operation of pulsing relays 3906 and 3908. As soon as the thousands digit becomes registered, this blocking circuit is opened by the operation of relay 4017 and the transmission of the thousands digit series then proceeds.

When relay 3915 operated, it removed ground from conductor 3914 thereby releasing relays 4215 and 4217 and when it released at the termination of the counting of the time interval and reapplied ground to conductor 3914, the previously traced operating circuit of relay 4216 was established. A circuit is now established for progress relay 4310 extending from battery through its winding over the upper back contact of progress relay 4311, the upper front contact of progress relay 4309, the upper front contact of progress relay 4221, thence as traced to ground at the upper back contact of relay 4215. Progress relay 4310 upon operating locks over its inner lower front contact to ground on conductor 3109, opens at its lower back contact the counting relay control circuit extending from the digit register 4010, and at its lower front contact establishes the counting relay control circuit from the digit register 4020. Since it has been assumed that the hundreds digit 3 has been registered in the register 4020 and therefore register relays 4021 and 4022 thereof have been operated, a circuit is established from battery through the winding of the No. 3 counting relay 3923 over the back contact of the mate relay 3933, terminal 3943, cross-connected to the similarly numbered terminal in Fig. 40, over the upper No. 3 front contacts of register relay 4021, the upper No. 2 front contacts of register relay 4022, the upper No. 4 back contact of register relay 4026, conductor 4035, the upper No. 4 contacts of relay 4306, the lower front contact of progress relay 4310, over the lower back contacts of succeeding progress relays, conductor 4314, the lower front contact of relay 3901, the upper back contact of relay 3931, the upper back contact of relay 3915, the back contact of relay 3908 to ground on conductor 3916. In the manner previously described, the counting relays 3921 to 3923 and 3931 to 3933 are operated in response to the functioning of relay 3908 to count the transmission of the hundreds digit series of three impulses. Upon the operation of relay 3931, relays 3901 and relay 3913 are released, relays 3915 and 3918 are operated and the operated counting relays are released as previously described, whereupon the counting relays are reoperated to count a time interval sufficient to permit the selector switch operated by the hundreds digit series to hunt for an idle connector in the third level of the bank to which its brushes have been raised. At the end of this interval, the operated counting relays are released, relays 3915 and 3918 are released and relays 3901 and 3913 are reoperated in the manner previously described. If the hundreds digit had not been registered at the time progress relay 4310 operated, the transmission of impulses for the hundreds digit series would have been blocked by the connection of ground over the middle upper back contact of progress relays 4313, 4314 and 4311, the middle upper front contact of relay 4310, the upper No. 1 contacts of relay 4302, conductor 4317, lower back contact of relay 4027, which will not have operated, conductors 4034 and 3212 to the junction of the windings of relay 3906 thereby arresting the operation of pulsing relays 3906 and 3908. As soon as the hundreds digit becomes registered, this blocking circuit is opened by the operation of relay 4027 and the transmission of the hundreds digit series proceeds.

When relay 3915 operated, it removed ground from conductor 3914, thereby permitting relay 4215 to operate in the locking circuit of relay 4216 and when it released at the termination of the counting of the time interval and reapplied ground to conductor 3914, relay 4217 operated, relay 4216 released and relay 4215 was held operated. A circuit is now established for progress relay 4311 extending from battery through its winding, over the upper back contact of progress relay 4312, the upper front contact of progress relay 4310, conductor 4315, the upper front contact of progress relay 4222, the upper front contact of progress relay 4220, thence as traced over the back contact of relay 4216 to ground at the upper front contact of relay 4215. Progress relay 4311 upon operating locks over its inner lower front contact to ground on conductor 3109, opens at its lower back contact the counting relay control circuit extending from the register 4020 and at its lower front contact establishes the counting relay control circuit from the register 4100. Since it has been assumed that the tens digit 4 has been registered in the register 4100 and therefore relay 4104 has been operated, a circuit is established from battery through the winding of the No. 4 counting relay 3924 over the back contact of the mate relay 3934, terminal 3944 cross-connected to the similarly numbered terminal in Fig. 41, over the lower No. 2 contacts of relay 4104, the upper No. 4 normal contacts of relay 4101, the upper No. 3 back contact of relay 4102, the upper No. 4 back contact of relay 4106, conductor 4121, the upper No. 3 contacts of relay 4306, the lower front contact of progress relay 4311, the lower back contact of progress relays 4312 and 4313, conductor 4314, the lower front contact of relay 3901, the upper back contact of relay 3931, the upper back contact of relay 3915, the back contact of relay 3908 to ground on conductor 3916. In a manner previously described the counting relays 3921 to 3924 and 3931 to 3934 are operated in response to the functioning of relay 3908 to count the transmission of the tens digit series of four impulses. Upon the operation of relay 3931, relays 3901 and 3913 are released, relays 3915 and 3918 are operated and the operated counting relays are released as previously described, whereupon the counting relays are reoperated to count a time interval. At the end of this interval the operated counting relays are released, relays 3915 and 3918 are released and relays 3901 and 3913 are reoperated in the manner previously described.

The sending of the tens digit series, however, depends upon whether the calling subscriber has dialed the digit and upon whether from the identification of the calling line number by the identifier, the subscriber is entitled to have a connection established to the desired line. If the tens digit has not yet been dialed, relay 4107 will not have been operated, and the operation of the impulse generating relays 3906 and 3908 will be blocked by the connection of ground to the junction of the windings of relays 3906 over a circuit which may be traced from ground over the middle back contacts of progress relays 4313 and 4312, the middle upper front contact of relay 4311, conductor 4319, the lower No. 2 contacts of relay 4302, conductor 4318, the lower back contact of relay 4107, conductors 4034 and 3212 to the junction of the windings of relay 3906. If the calling subscriber is not entitled to make the call as determined by the identification of his line which will have been completed by this time, relay 3204 will not have been operated from the identifier as will be later described, and a second blocking circuit will be effective as previously traced from ground over the upper middle front contact of progress relay 4311, over conductor 4319, the upper No. 4 back contact of relay 3204, conductors 4320 and 3212 to the junction between the windings of relay 3906. It will be assumed, however, that neither of these blocking circuits is effective and that the pulsing relays have proceeded to transmit impulses for the tens digit.

When relay 3915 operated, it removed ground from conductor 3914 thereby releasing relays 4215 and 4217 and when it released at the termination of the counting of the time interval and reapplied ground to conductor 3914, the previously traced operating circuit for relay 4216 was established. A circuit is now established for progress relay 4312 extending from battery through its winding over the upper back contact of relay 4313, the upper front contact of relay 4311, the upper front contact of relays 4309 and 4221, thence as traced to ground at the upper back contact of relay 4215. Progress relay 4312 upon operating locks over its inner lower front contact to ground on conductor 3109, opens at its lower back contact the counting relay control circuit extending from the digit register 4100, and at its lower front contact establishes the counting relay control circuit from the digit register 4110. Since it has been assumed that the units digit 5 has been registered in the register 4110 and therefore relays 4111 and 4114 thereof have been operated, a circuit is established from battery through the winding of the No. 5 counting relay 3925, over the back contact of the mate relay 3935, terminal 3945 cross-connected to the similarly numbered terminal in Fig. 41, over the upper No. 4 front contact of relay 4114, the upper No. 4 front contacts of relay 4111, the upper No. 3 back contact of relay 4112, the upper No. 4 back contact of relay 4116, conductor 4122, the upper No. 2 contacts of relay 4306, the lower front contact of relay 4312, the lower back contact of relay 4313, conductor 4314, the lower front contact of relay 3901, the upper back contact of relay 3931, the upper back contact of relay 3915, the back contact of relay 3908 to ground on conductor 3916. In the manner previously described, the counting relays 3921 to 3925 and 3931 to 3935 are operated in response to the functioning of relay 3908 to count the transmission of the units digit series of five impulses. Upon the operation of relay 3931, relays 3901 to 3913 are released, relays 3915 to 3918 are operated and the operated counting relays are released as previously described.

It will be recalled that relay 3125 was operated to inform the sender that no delay is necessary to await the dialing of an additional digit and therefore when the counting relay 3931 operates, a circuit is established for the end of pulsing relay 3139 which may be traced from battery through its winding over conductor 3140, the inner upper front contact of progress relay 4312, conductor 3141 of cable 3119, the lower No. 2 front contact of relay 3125, conductor 3142, the inner lower front contact of relay 3931 to ground on conductor 3112. Relay 3139 operates and at its inner upper front contact connects ground to conductor 3212 extending to the junction point between the windings of relay 3906 to block the further operation of this relay and the generation of impulses.

Had the third code digit dialed by the subscriber been registered in the trunk and the thousands digit been registered in the first digit register 4000 of the sender, then the identifier route relay would have caused the operation of relays 4301 and 4307 of the sender rather than relays 4302 and 4306. In this case, when progress relay 4309 operates preparatory to controlling the transmission of the thousands digit series of impulses, a control circuit is established between the winding of the appropriate one of the counting relays 3921 to 3930, over contacts of the relays of register 4000, conductor 4036, the upper No. 6 contacts of relay 4307, over the lower front contact of progress relay 4309, thence to ground over the lower back contacts of succeeding progress relays and conductor 4314 as previously traced. Following the transmission of the thousands digit series, progress relay 4310 operates and establishes a control circuit between the winding of the appropriate one of the counting relays over contacts of the relays of register 4010, conductor 4224, the upper No. 4 contacts of relay 4307 over the lower front contact of progress relay 4310, thence to ground over the lower back contacts of succeeding progress relays and conductor 4314 as previously traced. In the event that the hundreds digit has not been registered in register 4010 prior to the operation of progress relay 4310, the previously traced impulse blocking circuit is extended over the lower back contact of relay 4017, conductor 4316, the lower No. 5 contacts of relay 4301, over the middle upper front contact of progress relay 4310 and thence to ground over the middle upper back contacts of succeeding progress relays. Following the transmission of the hundreds digit series progress relay 4311 operates and establishes a control circuit between the winding of the appropriate one of the counting relays, over contacts of the relays of register 4020, conductor 4035, the upper No. 3 contacts of relay 4307, the lower back contacts of progress relay 4312 and lower front contact of progress relay 4311, the 4313 and conductor 4314 to ground as traced. In the event that the tens digit has not been registered in register 4020 prior to the operation of progress relay 4311 the previously traced impulse blocking circuit is extended over the lower back contact of relay 4027, conductor 4317, the lower No. 3 contacts of relay 4301, conductor 4319, the inner upper front contact of progress relay 4311, over the middle upper back contacts of progress relays 4312 and 4313 to ground. Following the transmission of the tens digit series progress relay 4312 operates and establishes a control circuit between the winding of the appropriate one of the counting relays, over contacts of the relays of register 4100, conductor 4121, the upper No. 2 contacts of relay 4307, over the lower front contact of progress relay 4312, the lower back contact of relay 4313 and conductor 4314 to ground as traced. In the event that the units digit has not been registered prior to the operation of progress relay 4312, the previously traced impulse blocking circuit is extended over the lower back contact of relay 4107, conductor 4318, the lower No. 4 contacts of relay 4301 and the middle upper front contact of relay 4313 to ground at the middle upper back contact of relay 4313. Following the termination of the transmission of the units digit series, the end of pulsing relay 3139 is operated in the manner previously described if the no-delay relay 3125 has been operated to indicate that a fifth numerical digit will not be dialed.

If sender-delay relay 3115 was operated, then relay 3139 does not operate following the transmission of the units, impulse series and the counting relays are reoperated as previously described to count a time interval following which the operated counting relays are released, relays 3915 and 3918 are released and relays 3901 and 3913 are reoperated in the manner previously described. When relay 3915 operates at the end of the transmission of the units digit series it removes ground from conductor 3914 thereby permitting relay 4215 to operate in the locking circuit of relay 4216 and when it releases at the termination of the counting of the time interval and reapplies ground to conductor 3914, relay 4217 operates, relay 4216 releases and relay 4215 is held operated. A circuit is now established for progress relay 4313 extending from battery through the winding of such relay, over the upper front contacts of relays 4312, 4310, 4222 and 4220, thence as traced over the back contact of relay 4216 to ground at the upper front contact of relay 4215. Progress relay 4313 upon operating locks over its inner lower front contact to ground on conductor 3109, opens at its lower back contact the counting relay control circuit extending from the register 4100 and establishes a counting relay control circuit from battery through the appropriate one of the counting relays, over contacts of the relays of register 4110, conductor 4122, the lower No. 1 contacts of relay 4307, over the lower front contact of progress relay 4313 and conductor 4314 to ground. In the event the extra numerical digit has not been registered in the register 4110 prior to the operation of relay 4313, the previously traced blocking circuit is established over the lower back contact of relay 4117, conductor 4123, the upper No. 1 contacts of relay 4301 to ground at the middle upper front contact of progress relay 4313.

When counting relay 3931 operates to count the last impulse of this digit series, with sender-delay relay 3115 operated, a circuit is established for the end of pulsing relay 3139, extending from battery through its winding, over conductor 3140, the inner upper front contact of relay 4313, conductor 3143 of cable 3119, the upper No. 1 front contact of relay 3115, conductor 3142, the inner lower front contact of relay 3931 to ground on conductor 3112.

Had the thousands digit dialed by the subscriber been registered in the trunk and transferred to the trunk register 3520 of the sender and the hundreds digit been registered in the first digit register 4000 of the sender, then the identifier route relay would have caused the operation of relays 4300 and 4308 of the sender. In this case, when progress relay 4309 operates preparatory to controlling the transmission of the thousands digit series, a control circuit is established between the winding of an appropriate one of the counting relays 3921 and 3930, over contacts of the relays of register 3520, conductor 3532, the upper No. 6 contacts of relay 4308, over the lower front contact of progress relay 4309, the lower back contacts of succeeding progress relays and conductor 4314 to ground as traced. Following the transmission of the thousands digit series, progress relay 4310 operates and establishes a control circuit between the winding of the appropriate one of the counting relays over contacts of the relays of register 4000, conductor 4036, the upper No. 4 contacts of relay 4308, the lower front contact of progress relay 4310 over the lower back contacts of succeeding progress relays and conductor 4314 to ground. Following the transmission of the hundreds digit series, progress relay 4311 operates and establishes a control circuit between the winding of the appropriate one of the counting relays, over contacts of the relays of register 4010, conductor 4224, the upper No. 3 contacts of relay 4308, the lower front contact of progress relay 4311, over the lower back contacts of succeeding progress relays and conductor 4314 to ground. In the event that the tens digit has not been registered in the register 4010 prior to the operation of progress relay 4311, the previously traced impulse blocking circuit is extended over the lower back contact of relay 4017, conductor 4316, the lower No. 4 contacts of relay 4300, the inner upper front contact of progress relay 4311, thence over the middle upper back contacts of progress relays 4312 and 4313 to ground. Following the transmission of the tens digit series, progress relay 4312 operates and establishes a control circuit between the winding of the appropriate one of the counting relays, over contacts of the relays of register 4020, conductor 4035, the upper No. 2 contacts of relay 4308, the lower front contact of progress relay 4312, the lower back contact of progress relay 4313 and conductor 4314 to ground. In the event the units digit has not been registered in the register 4020 prior to the operation of progress relay 4312, the previously traced impulse blocking circuit is extended over the lower back contact of relay 4027 and conductor 4317, the lower No. 3 contacts of relay 4300, the middle upper front contact of progress relay 4312, to ground at the upper middle back contact of relay 4313.

If the no-delay relay 3125 has been operated, the end of pulsing relay 3139 is operated following the operation of progress relay 4312 and the counting of the last impulse of the units series by counting relay 3931 as previously described. If, however, delay relay 3115 has been operated indicating that an additional digit will be dialed and registered in register 4100, then following the measurement of the time interval after the transmission of the units digit impulse series, progress relay 4313 will be operated to establish a counting relay control circuit between the winding of the appropriate one of the counting relays, over contacts of relays of register 4100, conductor 4121, the lower No. 1 contacts of relay 4208, the lower front contact of progress relay 4313 and conductor 4314 to ground. In the event the extra digit has not been registered in the register 4100 prior to the operation of progress relay 4313, the previously traced impulse blocking circuit is extended over the lower back contact of relay 4107, conductor 4318, the upper No. 1 contact of relay 4300 to ground at the upper middle front contact of progress relay 4313. Following the transmission of the extra digit series the end of pulsing relay 3139 is operated under the control of sender delay relay 3115 and progress relay 4313 over the circuit previously traced.

In the preceding discussion of the transmission of the impulse series to set up the connection it was assumed that the sender transmitted all of the three code digit series and did not transmit any preliminary series of impulses for including a repeater in the established connection. For this purpose, relays 4202 and 4209 were operated from the identifier. It will now be assumed that relays 4201 and 4209 are operated from the identifier to indicate to the sender that a series of impulses to include a high gain repeater in the connection is to be transmitted ahead of the three code digit series and the numerical digit series of the called line number. In this case, upon the operation of relay 4216 at the initiation of impulsing, a circuit is established from battery through the winding of progress relay 4219, over the upper back contact of progress relay 4220, the middle lower front contact of relay 4209, the upper No. 2 contacts of relay 4201, the upper front contact of relay 4216, to ground at the upper back contact of relay 4215. With relay 4219 operated and locked over its inner upper front contact to ground on conductor 3109, a counting relay control circuit is established from battery through the winding of the No. 0 counting relay 3930, the back contact of mate relay 3940, terminal 3950 strapped to the similarly numbered terminal in Fig. 42, over the upper No. 3 contacts of relay 4201, the lower front contact of progress relay 4219 and thence over the lower back contacts of succeeding progress relays and conductor 4314 to ground as traced. At the end of the transmission of this preliminary series of ten impulses and the measurement of a time interval, relay 4216 releases, relay 4217 operates and relay 4215 is held operated whereupon the circuit of progress relay 4220 is established from battery through its winding, over the inner lower front contact of relay 4209, the lower No. 4 contacts of relay 4201, the upper back contact of progress relay 4221, the lower front contact of relay 4209, the upper front contact of progress relay 4219, the lower No. 2 contacts of relay 4201, the back contact of relay 4216, to ground at the upper front contact of relay 4215. Progress relay 4220 upon operating locks and establishes a control circuit from the counting relays to the first code digit register 3400. From this point the control of selections proceeds in the manner previously described.

If the connection requires the insertion of a low gain repeater and the transmission of all of the office code digits, relays 4200 and 4209 are operated from the identifier. In this case, upon the operation of relay 4216 at the initiation of impulsing, a circuit is established from battery through the winding of progress relay 4218, the upper back contact of relay 4219, the lower No. 2 contacts of relay 4200, the upper front contact of relay 4216 to ground at the upper back contact of relay 4215. Relay 4218 operates and locks over its inner upper front contact to ground on conductor 3109 and establishes a circuit from battery through the winding of the No. 1 counting relay 3921, over the back contact of mate relay 3931, terminal 3941 cross-connected to the similarly numbered terminal in Fig. 42, the upper No. 2 contacts of relay 4209, the lower contacts of progress relay 4219, thence over the lower back contacts of succeeding progress relays and conductor 4314 to ground as traced. At the end of the transmission of this preliminary impulse series and the counting of a time interval, relay 4216 releases, relay 4217 operates, relay 4215 remains operated and a circuit is established for progress relay 4219 from battery through its winding, over the upper back contact of relay 4220, the middle lower front contact of relay 4209, the upper front contact of progress relay 4218, the lower No. 1 contacts of relay 4200, the upper back contact of relay 4216 to ground at the upper front contact of relay 4215. A control circuit is now established from battery through the winding of the No. 4 counting relay 3924, over the back contact of mate relay 3934, terminal 3944 cross-connected to the similarly numbered terminal in Fig. 42, over the upper No. 3 contacts of relay 4209, the lower front contact of progress relay 4219, over the lower back contacts of succeeding progress relays and conductor 4314 to ground as traced. Following the transmission of this series of four impulses progress relay 4220 is operated to control the transmission of the first code digit series and the remaining series of impulses are transmitted in accordance with the called line number in the manner previously described.

In some cases, the sender may be required to send only two of the registered code digits in which case relay 4208 will be operated from the identifier, and if it be assumed that relay 4202 is also operated to indicate that no repeater is required the circuit of progress relay 4221 will be established at the outset of impulsing over a circuit extending from battery through its winding, over the lower No. 2 contacts of relay 4202, the upper back contact of relay 4222, the lower contacts of relay 4208, the No. 2 upper contacts of relay 4202, the upper front contact of relay 4216 to ground at the upper back contact of relay 4215. Relay 4221 thereupon operates, locks and establishes a counting relay control circuit from battery through the appropriate one of the counting relays, over the contacts of the relays of the first code digit register 3409, conductor 3417, the upper No. 1 front contact of relay 3506 (which will be operated from the identifier to inform the sender that only two office code digits have been dialed), conductor 3518, the lower front contact of progress relay 4221, thence over the lower back contacts of succeeding progress relays and conductor 4314 to ground as traced. Following the transmission of the first office code digit series and the counting of the time interval, relay 4216 releases, relays 4217 and 4215 operate, and progress relay 4222 becomes energized in a circuit extending from battery through its winding, over the upper back contact of progress relay 4309, the upper front contact of progress relay 4221, the inner lower front contact of relay 4208, the lower No. 1 contacts of relay 4202, the upper back contact of relay 4216 to ground at the front contact of relay 4215. Relay 4221 upon operating locks and establishes a counting relay control circuit from battery through the appropriate one of the counting relays, over the contacts of the relays of the second code digit register 3420, conductor 3418, the upper No. 2 front contact of relay 3506, conductor 3419, the lower front contact of progress relay 4222 and thence to ground as traced over conductor 4314. The following numerical digit series are then transmitted in the manner previously described.

If a high gain repeater is required in a connection of this type, relay 4201 will be operated from the identifier rather than relay 4202 and with relay 4208 operated when relay 4216 operates at the initiation of impulsing, a circuit is established from battery through the winding of progress relay 4219, over the upper No. 4 contacts of relay 4208, the lower No. 4 contacts of relay 4201, the upper back contact of progress relay 4221, the inner lower front contact of relay 4208, the upper No. 2 contacts of relay 4201, the upper front contact of relay 4216 to ground at the upper back contact of relay 4215. Progress relay 4219 upon operating controls the transmission of a preliminary series of ten impulses in the manner previously described following which, upon the operation of relay 4215 and the release of relay 4216, a circuit is established for progress relay 4221 which may be traced from battery through its winding, over the upper No. 2 contacts of relay 4208, the lower No. 3 contacts of relay 4201, the upper back contact of progress relay 4222, the lower contacts of relay 4208, the upper front contact of relay 4219, the lower No. 2 contacts of relay 4201, the upper back contact of relay 4216 to ground at the upper front contact of relay 4215. Progress relay 4221 thereupon operates to control the transmission of the first of the two code digit series, the remaining digit series of the called number then being transmitted in the manner previously described.

If a low gain repeater is required on a connection of this type, relay 4200 will be operated from the identifier rather than relay 4202 and with relay 4208 operated when relay 4216 operates at the initiation of impulsing, a circuit is established from battery through the winding of progress relay 4218, over the upper back contact of progress relay 4219, the lower No. 2 contacts of relay 4200, the upper front contact of relay 4216 to ground at the upper back contact of relay 4215. Relay 4218 upon operating controls the transmission of a first preliminary series of one impulse following which, upon the release of relay 4216 and the operation of relay 4215, a circuit is established for progress relay 4219 extending from battery through its winding over the upper No. 4 contacts of relay 4208, the lower No. 4 contacts of relay 4200, the upper back contact of progress relay 4221, the inner lower contacts of relay 4208, the upper front contact of progress relay 4218, the lower No. 1 contacts of relay 4200, the upper back contact of relay 4216 to ground at the upper front contact of relay 4215. Progress relay 4219 upon operating controls the transmission of a second preliminary series of four impulses following which, upon the reoperation of relay 4216 and the release of relay 4215, the circuit of progress relay 4221 is established from battery through its winding, over the upper No. 2 contacts of relay 4208, the lower No. 3 contacts of relay 4200, the upper back contact of progress relay 4222, the lower contacts of relay 4208, thence as traced to ground over the upper front contact of relay 4216 and the upper back contact of relay 4215. Progress relay 4221 upon operating controls the transmission of the first of the code digit series following which the transmission of the remaining digit series of the called line number proceeds in the manner previously described.

In some cases it may be necessary for the sender to transmit but a single office code digit in which case relay 4207 will be operated from the identifier. If it be assumed that no repeater is required in this type of connection and therefore that relay 4202 is operated, then with relay 4216 operated at the outset of impulsing a circuit is established from battery through the winding of progress relay 4222, over the upper back contact of progress relay 4309, the middle lower contacts of relay 4207, the upper No. 2 contacts of relay 4202, the upper front contact of relay 4216, to ground at the upper back contact of relay 4215. Relay 4222 operates, locks to ground on conductor 3109, and establishes a counting relay control circuit from battery through the winding of the appropriate one of the counting relays, thence over contacts of relays of the third code digit register 3500 or relays of the second code digit register 3420 depending upon whether a three- or a two-digit office code has been dialed and relay 3506 is unoperated or operated, thence over conductor 3419, the lower front contact of progress relay 4222 and to ground as previously traced on conductor 4314. Following the transmission of this code digit series, relay 4216 releases and with relay 4215 operated a circuit is established from battery through the winding of progress relay 4309, over the upper back contact of progress relay 4310, over the upper front contact of progress relay 4222, the lower contacts of relay 4207, the lower No. 1 contacts of relay 4202, the upper back contact of relay 4216 to ground at the upper front contact of relay 4215. Relay 4309 upon operating controls the transmission of the thousands digit series following which the remaining digits series of the called number are transmitted in the manner previously described.

In other cases, for example, if the trunk is a direct trunk to a particular office it is not necessary to transmit any of the registered code digits in which case relay 4206 will be operated from the identifier. On a direct trunk call no repeater would be required and therefore relay 4202 would also be operated. When, therefore, relay 4216 operates at the outset of impulsing a circuit is established from battery through the winding of progress relay 4309 over the upper back contact of progress relay 4310, the inner lower front contact of relay 4206, the upper No. 2 contacts of relay 4202, the upper front contact of relay 4216 to ground at the upper back contact of relay 4215. Relay 4309 upon operating controls the transmission of the registered thousands digit following which the circuit of progress relay 4310 is established from battery through its winding over the upper back contact of progress relay 4311, over the upper front contact of relay 4309, the lower front contact of relay 4206, the lower No. 1 contacts of relay 4202, the upper back contact of relay 4216 to ground at the upper front contact of relay 4215. Progress relay 4310 upon operating controls the transmission of the registered hundreds digit series following which the remaining digit series of the called line number are transmitted in the manner previously described.

*Calling line identification*

It will be recalled that following the seizure of the identifier and its association with the ticketing trunk, a route relay was operated in accordance with the called office code registrations which, in turn, operated relay 2644. Before the first check test was made to determine if the identifier has properly transferred the called office code digits to the sender, the termination of which test caused the operation of relay 2021, a test is made to determine if the denied service register relay 2023 has been falsely operated by an unstandard ground condition. If this is found to be the case, a circuit is established from battery through the winding of relay 2051, over conductor 2052, the next to upper contacts of relay 2644, conductor 2053, the lower back contact of relay 2021, the upper contacts of denied service register relay 2023, the upper back contact of relay 2024 to ground over the upper back contact of relay 2031. Relay 2051 will therefore operate, lock over its inner lower contacts to ground over the upper No. 2 contacts of relay 2002 and establish obvious circuits for relay 2027 and to the trouble indicator. Also at this time a circuit is established from battery through the winding of relay 2054, over the inner upper back contact of relay 2021 to conductor 2046 and to the No. 15 contacts of the operated identifier trunk connector relay 4559F to test for a false ground which might be connected at such connector relay. If relay 2054 operates in response to such a false ground, it closes obvious circuits for relay 2027 and to the trouble indicator. In case relay 2023 is operated during these checking periods due to the operation of vacant code relay 2045, relay 2011 would not be operated since its circuit would not be completed by the operation of one of the relays 2643, etc. through the operation of a route relay and therefore the previously traced circuit for relay 2021 would not have been completed. Under this condition relay 2021 is operated under the control of relay 2033 associated with the timing circuit shown in the lower left portion of Fig. 20.

When relay 2022 operates following the operation of connector relay 4559F of the identifier trunk connector of Fig. 45, an obvious circuit is established thereby for relay 2032, which, upon operating, opens at its upper back contact the shunt of timing condenser 2058; closes a circuit from the source 2056 of 130-volts positive potential over its inner upper contacts, upper back contacts of relay 2033, through resistance 2057 and condenser 2058 to ground and, at its lower contacts, prepares a circuit for the anode relay 2034. After a time interval of approximately .2 second, condenser 2058 becomes fully charged whereupon the potential of source 2056 becomes applied through resistances 2057 and 2059 to the left cathode of the tube 2060 and, since the right cathode of this tube is connected over the lower normal contacts of relay 2033 to ground over the upper front contact of relay 2032, the tube fires across its cathode gap, discharging condenser 2058 thereover and completing the circuit of anode relay 2034 across its cathode-anode gap. Relay 2034 thereupon operates and causes the operation of relay 2033 which operates, locks over its inner lower alternate contacts to ground over the upper contacts of relay 2032, removes ground from the right cathode of the tube thereby extinguishing the tube and releasing anode relay 2034, establishes a discharge path for condenser 2058 over its upper front contact and establishes the circuit of relay 2021 over its lower contacts. With relay 2021 now operated and relay 2023 operated because of a vacant code condition, a denied service signal will be sent to the trunk over conductor 2046 in the manner to be later described.

Relay 2022 upon operating also establishes a circuit for operating relay 2101 if at this time either relay 1700 or 1701 has been operated in response to the party test. This circuit may be traced from battery through the winding of relay 2101, over conductor 2102, the upper front contact of relay 1700, it having been assumed that the party test made by the sender indicated a tip party call, the upper back contact of relay 1701, conductor 1702, the No. 4 lower contacts of relay 2002, the lower back contact of relay 2023, the lower back contact of relay 2024, to ground over the upper contacts of relay 2022. Relay 2101, upon operating, establishing a circuit for the thousands group start relay 1743 which may be traced from battery through its winding, over conductor 1704, over the lower contacts of normally operated relay 1900 to insure that the detector timing circuit of Fig. 19 is normal, over conductor 1705, the normally closed back contacts of the thousands group register relays 1710 to 1719, inclusive, which should be unoperated at this time, over conductor 1706, the No. 6 back contact of relay 2521, conductor 1707, the lower back contact of relay 1708, conductor 1709 to ground over the No. 1 contacts of relay 2101. Relay 1743 upon operating locks over its No. 3 contacts and the lower back contact of relay 1708 to ground on conductor 1709 and establishes a circuit for relay 1720 extending from battery through its winding, over the No. 7 contacts of relay 1743, the upper back contact of advance relay 1721, conductor 1722, the back contact of relay 2103, conductor 2104, the No. 5 back contact of relay 2521, conductor 2105 to ground over the No. 6 contacts of relay 2101. Relay 1720 upon operating locks over its No. 3 contacts to ground over its operating circuit, just traced, independent of the contacts of advance relay 1721 and connects battery through resistance 1723 over its No. 1 contacts, conductor 1724, over the upper normal contacts of transfer relay 1300 of the common number and class circuit, comprising Figs. 13 and 14 and the lower portion of Fig. 3, conductor 1301, winding of lock-out relay 1400F, allocated to the seized identifier assumed to be the No. 1 identifier, thence to ground over the inner lower normal contacts of succeeding intermediate lock-out relays, such as 1400I, and the last lock-out relay 1400L, allocated to other identifiers if the common number connector circuit has not been taken into use by another identifier.

Relay 1720 also primes the tube of the common connector timer 2777 of Fig. 27 by connecting the 130-volt source 2784 of positive potential over the inner upper front contact of relay 2704, through resistance 2777E, over conductor 2106, the No. 5 contacts of relay 1720, the back contact of relay 1725, conductor 2107, through resistance 2777B, and condenser 2777C to ground. The condenser starts to charge over this circuit and if the identifier lockout relay of the common number circuit has not been operated before it becomes fully charged after an interval of approximately 3.4 seconds, the potential from battery 2784 applied through resistances 2777B and 2777D to the left or control cathode of the gas-filled tube of the timer tube is effective to fire the timer tube since its right cathode is connected over the normal contacts of the anode relay 2777A of the timer to ground over the No. 3 upper front contact of relay 2705. When the tube fires the condenser 2777C discharges over the cathode gap of the tube and the cathode-anode circuit through the tube is established from ground applied to the right cathode, thence to the anode, through the lower winding of anode relay 2777A to battery 2784 as traced. Relay 2777A operates, locks from battery through its upper winding and upper alternate contacts to ground at the upper No. 3 front contact of relay 2705, extinguishes the tube, and establishes a circuit from ground over its lower contacts, conductor 2851 to battery through the winding of relay 2025 and to the trouble indicator. Relay 2025 upon operating locks over its lower front contact, the upper back contact of relay 2026, conductor 2029 to ground over the lower back contact of relay 2781A; closes an obvious circuit for relay 2026 which operates and locks over its No. 4 contacts to ground over the upper No. 2 contacts of relay 2002; and over its inner upper contacts connects ground to conductor 2701 to operate identifier busy relay 2700 to prevent the seizure of the identifier by any sender until the identifier is released after the rectification of the trouble encountered.

It will be assumed, however, that the common number circuit lock-out relay 1400F is operated at once and closes a circuit for the connector relay 1302F, allocated to the identifier over a circuit which may be traced from ground through its winding over conductor 1303, inner upper back contact of transfer relay 1300, conductor 1401 over the inner upper front contact of relay 1400F to battery through resistance 1402. Relay 1302F, upon operating, establishes a circuit for relay 1725 extending from battery through its winding, over conductor 1726, to ground over the lower contacts of connector relay 1302F. Relay 1725, upon operating, opens the priming circuit of timer 2777 at its upper back contact to arrest the timing function; primes the tube of the common number circuit timer 2778 of Fig. 27 over a circuit which may be traced from battery 2784, over the inner upper contact of relay 2704, through resistance 2778E, conductor 2108, the No. 2 contacts of the relay 1720, the lower contacts of relay 1725, conductor 2109, through resistance 2778B and condenser 2778C to ground. Condenser 2778C thereupon commences to charge to measure the time that the common number circuit is held by the identifier, which should not be longer than 3.8 seconds and is terminated by the release of relay 1720, and establishes a circuit from ground over the inner upper back contact of relay 1721, the inner lower contacts of relay 1725, conductor 1727 to battery through the winding of the thousands switching relay 1520 and in parallel therewith to battery through the winding of switching relay 1820. Relay 1520 upon operating connects the input sides of the ten amplifier-detector circuits 1800 to 1809, inclusive, over cable 1501 to the common number circuit. Relay 1820, upon operating, connects the contacts of the register relays 1810 to 1819, inclusive, associated with the output sides of the amplifier-detector circuits, over conductors of cables 1728 with the windings of the thousands group register relays 1710 to 1719, inclusive.

Had the identifier seized for the call been an intermediate identifier, then its lock-out relay 1400I would have been operated over the outer upper back contact of transfer relay 1306, through its winding and the inner lower normal contacts of succeeding relays of the lock-out group, if the common number circuit had not at the time been taken for use by a succeeding identifier, and upon operating would have established the circuit of its allocated connector relay 1302I if a preceding identifier had not seized the connector circuit and its lock-out relay, such as 1400F, had not been operated. This circuit may be traced from ground, through the winding of relay 1302I, the inner upper back contact of transfer relay 1306, the upper front contact of relay 1400I, the inner upper back contact of relay 1400F, through resistance 1402 to battery. Relay 1302I would have established a circuit from ground over its lower contacts and a conductor of cable 1304 thence to battery through the winding of the relay corresponding to relay 1725 in the associated identifier. Had the identifier seized for the call been the last, then its lock-out relay 1400L would have been operated over the inner lower back contact of transfer relay 1307 to ground through its winding and would have established the circuit of its allocated connector relay 1302L if a preceding identifier had not seized the connector circuit and the lock-out relay such as 1400I or 1400F had not been operated, over a circuit which may be traced from ground through the winding of relay 1302L, the lower back contact of transfer relay 1307, the upper front contact of relay 1400L, the inner upper back contact of intermediate lockout relays such as 1400I, the inner upper back contact of lockout relay 1400F to battery through resistance 1402. Relay 1302L would have established a circuit which may be traced in part from ground over its lower contacts and a conductor of cable 1305 thence to battery through the winding of the relay of the identifier corresponding to relay 1725.

The identifier now proceeds to make a test through the contacts of relay 1729 and 1730 to determine whether any other identifier is making an identification in the opposite party field. That is, it having been assumed that the seized identifier is to make the party identification in the tip field, then it makes a test to insure that no other identifier is making a test in the ring party field. In case some other identifier is making a test in the opposite party field, the seized identifier must wait for the other identifier to complete its identification before it can proceed. This is to prevent the possibility of an identifier encountering two alternating current signals in the common number circuit. This condition would occur in case the other identifier were identifying in the ring field on a party line which also has a tip subscriber whose seized network would be connected to the common number circuit through the tip field. In case the other identifier was making an identification in the tip field or the same field as this identifier desires to test in, there will be no delay as in this case there can be only one signal in the common circuit. It has been assumed that the called identifier is to test in the tip party field and therefore when relay 1725 operates, a circuit is established for relay 2110 extending from battery through its winding, over conductor 2111, the right-back contact of relay 1730, the middle upper contacts of operated relay 1700, the upper front contact of relay 1725 to ground applied to conductor 1722 as previously traced. Had the relay 1701 been operated, then the circuit previously traced for relay 2110 would have extended over the right back contact of relay 1729 and the middle upper contacts of relay 1701.

The windings of relays 1729 and 1730 are connected to contacts of relays 1731 and 1732, respectively, in other identifiers so that either relay 1729 or 1730 will be operated depending upon whether other identifiers are testing in the tip or ring field. If, for example, the last identifier is testing in the tip field and its relay 1731L is therefore operated thereby causing the operation of relay 1729, the operation of relay 2110 would be delayed should the first identifier be signaled by the operation of relay 1701 to make a test in the opposite or ring field, or if an intermediate identifier is testing in the ring field and its relay 1732I is therefore operated thereby causing the operation of relay 1730, the operation of relay 2110 would be delayed should the first identifier be signalled by the operation of relay 1700 to make a test in the opposite or tip field. It will be assumed that relay 2110 operates at once, locks over its inner lower contacts to ground on conductor 1722, and establishes a circuit extending from battery through the winding of relay 1731, over the inner upper contacts of relay 1700, the No. 4 contacts of relay 1743, conductor 1703 to ground over the lower middle contacts of relay 2110. Relay 1731, upon operating, locks over its inner right contacts and conductor 1733 to ground on conductor 2104 and establishes operating circuits over its left contacts for relays 1729I and 1729L of other identifiers to inform them that it is testing in the tip party field. Had relay 1701 been operated, then relay 1732 would have been similarly operated following the operation of relay 2110 and would have caused the operation of relays 1730I and 1730L of other identifiers to inform them that it is testing in the ring party field. At the time relay 1700 operated, an obvious circuit was established over its lower middle contacts for relay 1404T, relay 1404T, upon operating, in turn operating relay 1405T. Had relay 1701 been operated, relays 1404R and 1405R would have been operated instead.

*Thousands group identification*

Relay 2110, upon operating, connects the source 2113 of 270-cycle signaling current over its middle and upper front contacts, conductor 2114, the upper back contact of relay 1735, conductor 2115, the lower back contact of relay 2116, conductor 2117, the No. 13 contacts of identifier trunk connector 4559F, conductor 739, the No. 5 upper front contacts of relay 718, the upper normal contacts of jack 704, the upper contacts of trunk sleeve relay 703, trunk sleeve conductor 702, thence over the sleeve circuit of the connection established from the calling line including the sleeve brush 102 of the line finder 101, sleeve conductor 103 of the calling line, conductor 104, through resistance 1030 and condenser 1031 to a horizontal cross-connecting strip 1032 on the cross-connecting rack 1009. It will be assumed that the connector sleeve or numerical directory number of the calling line is 9095 and that the strip 1032 is therefore cross-connected to the vertical strip 1033 as by a screw inserted through holes at their intersections. The signaling current will therefore flow through the primary winding of the No. 0 hundreds coil 0HT9 to ground through the lower primary winding of the No. 9 thousands coil 9THT which is located in the tip party field of coils. To guard against battery noise which might interfere with identification signals, the primary windings of each thousands transformer coil are wound differentially with their inner terminals connected to ground so that battery noises on the connector sleeve conductors of lines connected to one primary winding will balance out the battery noises on the connector sleeve conductors of lines connected to the other primary winding.

Relay 2110 also establishes a circuit from battery through resistance 1734, over the lower back contact of advance relay 1721, the No. 1 contacts of relay 1743, conductor 1739, the inner upper contacts of relay 2110, the upper normal contacts of relay 2116, conductor 2118, the lower contacts of relay 1700, conductor 2119, the No. 6 back contact of walking relay 2120, conductor 2124 of cable 2125, contacts of connector relay 1302F, and conductor 1303 to ground through the winding of the tip field switching relay 1309 allocated to ten thousands number circuits which may or may not be in the same office unit. The operation of switching relay 1309 connects the secondary windings of the ten thousands transformer coils over the conductors of cable 1501 and contacts of the operated switching relay 1520 to the input circuits of the ten amplifier-detector circuits of Fig. 18.

Each amplifier detector-detector circuit, for example, 1809 comprises an input transformer 1824, a pentode type amplifying tube 1825, a detector tube 1826 and an anode relay 1827. The anode relay of each circuit is a polarized relay whose armature is normally held against its back contact by a secondary polarizing winding as disclosed. The filaments of the amplifier tubes of five circuits 1805 to 1809, inclusive, two of which are shown in full, are heated in a series circuit from negative battery connected to the filament of the amplifier tube in circuit 1805, serially through intermediate filaments, to ground on the filament of circuit 1809. The filaments of the detector tubes are heated in a series circuit from battery 1828 through the resistance network 1829 and grid biasing potential for all of the five detector tubes is derived from battery 1828 and the resistance network 1829. Battery 1830 supplies anode potential through the upper windings of the five anode relays, such as 1827, to the anodes of all five of the detector tubes and through resistances such as 1831 to the anodes of the five amplifier tubes. The five amplifier-detector circuits 1800 to 1804, of which one is indicated by the box 1800, are similarly supplied with heating, biasing and anode potentials.

When relay 1309 of the common number circuit operated, a circuit was established from ground over the outer right contact of relay 1731, conductor 1736, the upper contacts of relay 1405T, conductor 1406, the lower contacts of switching relay 1309, conductor 1504 of cable 1501, to battery through the winding of relay 1505. With switching relays 1502 and 1820 both operated, a start circuit is established for the amplifier-detector timing circuit of Fig. 19, which may be traced from ground over the upper contacts of relay 1505, the No. 21 contacts of switching relay 1520, conductor 1839, the No. 1 contacts of switching relay 1820, conductor 1901 to battery through the winding of start relay 1902. Relay 1902, upon operating, establishes a circuit from ground over its inner lower front contacts and conductor 1904 through the lower winding of relay 1832 to battery, but this relay being marginal does not operate at this time, and establishes an operating circuit for relay 1905 which extends from battery through the winding of relay 1905 over its upper contacts, over the No. 2 back contacts of relay 1906, conductor 1907, over the lower back contacts of all of the register relays 1810 to 1819, inclusive, to ground. With all of the register relays normal, relay 1905 now operates; locks over its No. 4 contacts to ground over the lower contacts of relay 1902; opens the operating circuit of relay 1900 at its No. 2 back contact thereby opening the initial start circuits for start relays 1743, 2343, 2443 and 2543 of the identifier register circuits; connects ground over its No. 3 contacts and the No. 5 back contact of the relay 1908, conductor 1909 to the armatures of all anode relays such as 1827 to prepare an operating circuit for one of the register relays 1810 to 1819; and starts timing by connecting the source 1910 of 130-volt positive potential through resistance 1911, over its No. 5 contacts, through resistances 1912 and 1913 to timing condenser 1914 associated with the first timing tube 1915 and by removing the short circuit of condenser 1914 extending over its No. 7 back contact and through resistance 1916.

It has been assumed that the signaling current was applied through the lower primary winding of the thousands transformer coil 9THT and therefore such current is now induced over a circuit which may be traced from the upper terminal of the secondary winding of such transformer, over the No. 6 back contact of relay 1029, conductor 1034, the upper contacts of relay 1309, conductor 1502 of cable 1501, the No. 20 contacts of switching relay 1520, conductor 1821, through the filter 1823 of the No. 9 amplifier-detector circuit 1809 tuned to pass the 270-cycle tone current, the primary winding of input transformer 1824, back through the filter, conductor 1822, the No. 19 contacts of relay 1520, conductor 1503 of cable 1501, the next to upper contacts of relay 1309, conductor 1035, the No. 5 back contact of relay 1029 to the lower terminal of the secondary winding of transformer 9THT. The current thus impressed by transformer 1824 upon the input circuit of amplifier tube 1825 is amplified by such tube and impressed upon the input circuit of detector tube 1826 which upon detecting the presence of tone current operates the anode relay 1827 to close its contacts. Register relay 1819 now operates over a circuit extending from ground on conductor 1909, over the contacts of anode relay 1827, through the winding and inner lower normal contacts of relay 1819, conductor 1917, the No. 7 back contact of relay 1906 to battery and locks over its inner lower alternate contacts directly to battery under the control of relay 1827.

The timing circuit of Fig. 19 is used in connection with the amplifier-detector circuits in making each of the four identification tests. Due to using the sleeve circuit of selectors for conducting the identification tests, there may be a number of surges involved on the sleeve circuit during the making of the tests. These surges may be due to the charge and discharge of the condensers connected to the sleeve circuits such as the condenser 1031 because of calls being initiated and disconnected on lines being served by line finders involved in each call. Also surges will be involved due to selectors hunting past selector blank terminals over which an identification test is being made. Also very short surges would be involved due to the bridging condition at the connector and the line-finder bank of the sleeve circuit under identification. In order to avoid false operation of the register relays 1810 to 1819 at the outputs of the amplifier-detector circuits, the connection of the circuits from the contacts of the anode relays such as relay 1827 to the register relays is controlled by the timing circuit.

This timing circuit is provided with three cold-cathode tubes 1915, 1925 and 1935 for which anode current is supplied from the source 1910 over the No. 5 contacts of relay 1905 and conductor 1918, through the windings of their associated anode relays 1919, 1929 and 1939. It will be recalled that when relay 1905 operated as previously described, it established the charging circuit for condenser 1914 associated with the tube 1915. After an interval in the order of one-tenth of a second, condenser 1914 becomes charged and potential from the source 1910 applied through resistances 1911, 1912, 1913 and 1920 to the left or control cathode of tube 1915 is effective to fire the tube over a circuit traced from the source 1910 to the control cathode, thence across the cathode gap of the tube over the No. 3 normal contacts of relay 1906 to ground at the middle lower contacts of relay 1902. Condenser 1914 discharges over the cathode circuit and anode relay 1919 is operated over a circuit extending from source 1910, over conductor 1918, through resistance 1921, the winding of relay 1919, the anode cathode path of the tube to ground connected to the right cathode of the tube. Relay 1919 upon operating establishes a circuit for relay 1906 extending from battery through its winding over the contacts of relay 1919 to ground over the middle lower contacts of relay 1902. Relay 1906 operates, locks over its No. 3 alternate contacts to ground over the middle lower contacts of relay 1902; removes ground potential from the right cathode of tube 1915 thereby extinguishing the tube and releasing anode relay 1919; removes operating battery at its No. 7 back contact from the circuits of register relays 1810 to 1819; opens at its No. 5 contacts a second point in the operating circuit of relay 1900; establishes at its No. 1 contacts a charging circuit for condenser 1924 through resistances 1922, 1943 and 1923 to battery on conductor 1918 and, at its No. 2 front contact, establishes a circuit for the repeat test relay 1708 of the thousands group register circuit of Fig. 17 if no register relay of the group 1810 to 1819 has been operated. This latter circuit may be traced from battery through the winding of relay 1708 over conductor 1834 of cable 1728, the inner upper contacts of relay 1505, conductor 1835, the No. 2 contacts of switching relay 1820, conductor 1836, the No. 2 front contact of relay 1906, conductor 1907 thence to ground over the lower normal contacts of relays 1810 to 1819, inclusive. Relay 1708, if operated, locks over its lower front contact, conductor 1737 of cable 1728, the lower contacts of relay 1505, conductor 1837 to ground over the No. 3 contacts of switching relay 1820 and functions in a manner to be later described. The operation of relays 1919 and 1906 thus terminates the first timing interval. At this time any of the register relays 1810 to 1819 which have been operated due to the detection of an alternating current signal on the sleeve conductor or due to surge conditions on the sleeve conductors are held operated over their locking circuits under the control of the operated anode relays of the amplifier-detector circuits, ground being supplied to such locking circuits over conductor 1909, the No. 5 back contact of relay 1908 and the No. 3 contacts of relay 1905.

Condenser 1924 charges over the circuit just traced since the short circuit thereof through resistance 1926 is open at the No. 6 back contact of relay 1905 and, after another one-tenth of a second interval, becomes fully charged, whereupon potential from the source 1910 applied over conductor 1918, over the No. 1 contacts of relay 1906 through resistances 1922, 1943, 1923 and 1930 to the control cathode of tube 1925 is effective to fire such tube over a circuit traced from the control cathode across the cathode gap of the tube, over the No. 2 normal contacts of relay 1908 to ground over the middle lower contacts of relay 1902. Condenser 1924 discharges over the cathode circuit and the anode relay 1929 is operated over a circuit extending from the source 1910, over conductor 1918, through resistance 1931, the winding of relay 1929, the anode-cathode path through the tube to ground connected to its right cathode. Relay 1929 upon operating establishes a circuit for relay 1908, extending from battery through its winding, over the contacts of relay 1929 to ground over the middle lower contacts of relay 1902. Relay 1908 thereupon operates; locks over its No. 2 alternate contacts to ground over the middle lower contacts of relay 1902; removes ground potential from the right cathode of tube 1925 thereby extinguishing the tube and releasing anode relay 1929; at its No. 4 back contact opens another point in the operating circuit of relay 1900; at its No. 1 contacts establishes a charging circuit for condenser 1934, extending from the source 1910 over conductor 1918, the No. 1 contacts of relay 1908 through resistance 1933; at its No. 3 contacts prepares a circuit for operating a register relay of the thousands group 1710 to 1719 of Fig. 17; and at its No. 5 back contact opens the shunt extending over conductors 1833 and 1909 around the upper winding of relay 1832. The operation of relays 1908 and 1929 terminates the second timing interval. Before the end of this interval any of the register relays 1810 to 1819 which were operated due to surge conditions should have released due to the opening of their locking circuits by the release of the associated anode relays and only the register relay which operated in response to the detection of the signaling current should remain operated. The register relays are made slow to release in order that they will not release during the false ground conditions which occur during selector hunting over the banks of selectors.

If it be assumed that at the end of the second time interval more than one of the register relays remain operated, due to a crossed sleeve conductor condition, the timing circuit will proceed to measure a third time interval by charging condenser 1934 over the circuit previously traced, the short circuit of such condenser extending over conductor 1927, the lower back contacts of relay 1603, conductor 1928 and through resistance 1936 being open at the No. 1 back contact of relay 1905. After an interval of approximately one second, condenser 1934 becomes charged and potential from source 1910 applied over conductor 1918 and over the No. 1 contacts of relay 1908 through resistances 1933 and 1940 to the control cathode of tube 1935 is effective to fire such tube over a circuit traced from the source 1910 to the control cathode and thence across the cathode gap of the tube to ground on the right cathode of such tube. Condenser 1934 now discharges over the cathode circuit and anode relay 1939 is operated over a circuit from the source 1910, over conductor 1918, through resistance 1941, the winding of relay 1939, the anode-cathode path through the tube to ground on the right cathode of the tube. Relay 1939, upon operating, closes an obvious circuit for relay 1932 which closes a circuit from ground over its inner upper contacts and conductors 1944 and 2133 to battery through the winding of relay 2027 and to the trouble indicator whereupon relay 2027 functions in the manner previously described. Under this condition the trouble indicator will indicate that two of the register relays of the group 1810 to 1819 are operated thus enabling the crossed sleeve condition to be traced.

If the repeat test relay 1708 operates because no register relay of the groups 1810 to 1819 has operated, indicating that the calling line is not in the first office unit or that the signaling current has not been detected through some error, it locks as before described and opens at its lower back contact the locking circuit of start relay 1743 which thereupon releases since its operating circuit was opened at the timing circuit by the release of relay 1900. Relay 1743 upon releasing opens at its No. 1 contacts the previously traced circuit for switching relay 1309 of the common number circuit, and establishes a circuit for walking relay 2120 extending from battery through its winding, the No. 4 back contact of walking relay 2121, the No. 7 back contact of walking relay 2123, the back contact of walking relay 2126, conductor 2127, the back contact of relay 1738, the inner upper front contact of relay 1708, conductor 1709 to ground over the No. 1 contacts of relay 2101. Relay 1309, upon releasing, disconnects the thousands transformer coils from the input circuits of the amplifier-detector circuits and opens the circuit of relay 1505 which releases in turn releasing relay 1902 of the timing circuit. With relay 1902 released, all operated relays of the timing circuit are released, the discharge circuits for condensers 1914, 1924 and 1934 are established over the Nos. 1, 6 and 7 back contacts of relay 1905, to insure that the condensers are fully discharged preparatory to another timing operation and the circuit of relay 1900 is reestablished. Relay 1505 upon releasing also releases relay 1708. With relay 1900 reoperated and relay 1708 released, the previously traced operating circuit for relay 1743 is established and relay 1743 operates and locks as previously described. A circuit is now established from battery through the winding of walking relay 2121, the No. 4 contacts of walking relay 2120, the No. 2 back contact of walking relay 2122, the inner lower back contact of walking relay 2128, conductor 2129, the lower back contact of relay 1735, the inner upper back contact of relay 1708, conductor 1709 to ground over the No. 1 contacts of relay 2101. With relays 1743, 2120 and 2121 all operated, a circuit is established from battery through resistance 1734, over the lower back contact of advance relay 1721, the No. 1 contacts of relay 1743, conductor 1739, the inner upper contacts of relay 2110, the upper normal contacts of relay 2116, conductor 2118, the lower contacts of relay 1700, conductor 2119, the No. 6 front contact of walking relay 2120, the No. 7 contacts of walking relay 2121, the No. 6 back contact of an intermediate walking relay similar to walking relay 2122, a conductor of cable 2125, contacts of connector relay 1302F to ground through the winding of a tip field switching relay, corresponding to relay 1209, allocated to an intermediate group of ten thousands number circuits.

This switching relay, upon operating, connects the secondary windings of the ten thousands transformer coils of the intermediate group, corresponding to the coils disclosed in Figs. 10 and 11 of office unit A, over conductors of cable 1501 and contacts of switching relay 1520 to the input circuits of the amplifier-detector circuits of Fig. 18 and establishes the operating circuit of relay 1505 which operates and, in turn, causes the operation of relay 1902 of the timing circuit. The circuits of Figs. 18 and 19 now function in the manner previously described. If no signaling current is detected during these operations, indicating that the calling line is not located in the intermediate group of thousands number circuits being tested, or there is a failure to receive the signaling current, the repeat test relay 1708 will again operate, lock and release the start relay 1743. Relay 1708, upon operating, establishes the circuit of the walking relay corresponding to relay 2122 preparatory to testing in the next succeeding group of thousands number circuits. Relay 1743, upon releasing, opens the circuit of the operated office unit switching relay which releases to disconnect the thousands transformer coils of the associated group from the amplifier-detector circuits and to release relay 1505 which, in turn, releases relay 1902 to restore the timing circuit and to release the repeat test relay 1708. With the testing circuit released and relay 1900 thereof reoperated and with relay 1708 released, start relay 1743 is reoperated. With relay 1708 released the circuit of the walking relay corresponding to relay 2123 is operated whereupon the circuit of the switching relay of the next group of thousands number circuits, corresponding to relay 1309, is operated preparatory to testing in that group. In this manner successive groups are tested.

If no signaling current has by this time been detected in any of the groups tested, relay 1708 will be reoperated when the test of the next to last group is made, will lock and will release relay 1743. When relay 1708 operates, the circuit for operating walking relay 2122 will be established from battery through its winding, over the No. 4 contacts of the preceding walking relay, corresponding to relay 2121, the No. 7 back contact of relay 2123, the lower back contact of relay 2126, conductor 2127, the upper back contact of relay 1738, the inner upper front contact of relay 1708 to ground on conductor 1709. Relay 2122 upon operating locks over its No. 4 contacts and the No. 1 contacts of the preceding walking relay, corresponding to relay 2121, to ground over the No. 2 contacts of relay 2101. Relay 1743, upon releasing, opens the circuit of the operated group switching relay which releases to disconnect the thousands transformer coils thereof from the amplifier-detector circuits and to release relay 1505 which in turn releases relay 1902 to restore the timing circuit and to release relay 1708. With the timing circuit released and relay 1900 thereof reoperated and with relay 1708 released, start relay 1743 is reoperated. With relay 1708 released the circuit of walking relay 2123 is established from battery through its winding over the No. 2 front contact of relay 2122, the inner lower back contact of relay 2128, conductor 2129, the lower back contact of relay 1735, the inner upper back contact of relay 1708 to ground on conductor 1709. Relay 2123, upon operating locks over its No. 4 contacts and the No. 1 contacts of relay 2122 to ground over the No. 2 contacts of relay 2101 and establishes the circuit for the switching relay of the last group of thousands number circuits, assumed to be in the office unit B in Figs. 1 and 2. This circuit may be traced from battery through resistance 1734, over the lower back contact of relay 1721, the No. 1 contacts of relay 1743, conductor 1739, the inner upper contacts of relay 2110, the upper normal contacts of relay 2116, conductor 2118, the lower contacts of relay 1700, conductor 2119, serially over contacts of all operated of walking relays including the No. 6 front contacts of relay 2123, the upper back contact of relay 2128, conductor 2130 of cable 2125, contacts of connector relay 1302F, conductor 1310, to ground through the winding of switching relay 300. Relay 300, upon operating, associates the thousands transformer coils of the office unit B with the amplifier-detector circuits and causes the operation of relay 1505 which, in turn, starts the timing circuit through the operation of relay 1902.

If no signaling current is detected during the testing of this last office unit, relay 1708 will be reoperated to release relay 1743. With relay 1708 operated, walking relay 2128 is operated in a circuit from battery through its winding over the No. 7 front contact of walking relay 2123, the lower back contact of relay 2126 and thence as traced over the inner upper front contact of relay 1708 to ground on conductor 1709. Relay 2128 thereupon operates and locks over its inner upper contact, the No. 1 contacts of relay 2123 to ground over the No. 2 contacts of relay 2101. Relay 1743, upon releasing, opens the circuit of switching relay 300 which releases to disconnect the thousands transformer coils of office unit B from the amplifier-detector circuits and to release relay 1505 which in turn releases relay 1902 to restore the timing circuit and to release relay 1708. With the timing circuit released and relay 1900 thereof reoperated and with relay 1700 released, start relay 1743 is reoperated. With relay 1708 released the circuit of walking relay 2126 is established from battery through its winding, over the inner lower front contact of relay 2128, conductor 2129 and thence as traced over the upper back contact of relay 1708 to ground on conductor 1709. Relay 2126, upon operating, locks over its lower front contact and the lower front contact of relay 2128 to ground over the No. 2 contacts of relay 2101. With all of the walking relays operated, a circuit is established from battery through resistance 1734, the lower back contact of relay 1721, the No. 1 contacts of relay 1743, conductor 1739, the inner upper contacts of relay 2110, the upper normal contacts of relay 2116, conductor 2118, the lower contacts of relay 1700, conductor 2119, over contacts of all operated walking relays including the upper contacts of relay 2128 and the inner upper contacts of relay 2126 to ground through the winding of relay 2116. Relay 2116 thereupon operates, locks over the upper contacts of relay 2126, over its own upper alternate contacts and thence as traced to battery and, at its lower back contact, opens the circuit over which signaling current from the source 2113 was applied to the sleeve conductor 103 of the calling line. The identifier circuit will remain in this condition until all other identifiers have completed testing if any were testing in any thousands number circuit.

When all identifiers have thus completed testing, neither relay 1729 nor 1730 will be operated and with relay 2116 operated, a circuit is established from ground over its inner lower front contact, conductor 2112, the left back contacts of relays 1729 and 1730, conductor 1740, the back contacts of counting relay 2131 to battery through the winding of counting relay 2132 which thereupon operates, locks in a circuit from battery through its winding, through the winding of counting relay 2131 and over its own lower contacts to ground at the No. 2 contacts of relay 2101 and opens at its upper back contact the locking circuit of walking relay 2120 which thereupon releases. Relay 2120, upon releasing, opens the locking circuit of walking relay 2121 at its No. 1 contacts. Relay 2121, upon releasing opens the locking circuit of the next succeeding intermediate walking relay corresponding to relay 2120 at its back contacts which thereupon release. In this manner all of the walking relays including relay 2126 are released. When relay 2126 releases relay 2116 is released whereupon the source of signaling current 2113 is reconnected to the calling line sleeve conductor and the operating ground for counting relay 2132 is removed whereupon counting relay 2131 now operates in the locking circuit of relay 2132. With the walking relays all released and off-normal ground from the No. 2 contacts of relay 2101 applied over the lower contacts of counting relay 2131 to supply locking ground for the walking relays, the circuit will progress in the manner above described to make a repeat test of all the groups of thousands number circuits. When the identifier has completed a repeat test of all of the circuits and still has found no signaling current in any of the circuits tested, the operation of relay 2116 at the completion of said test will close a circuit from ground over its inner lower contacts and thence as traced to conductor 1740, over the upper front contact of counting relay 2131 to battery through the winding of relay 2103. Relay 2103 will thereupon operate, lock to ground over its lower front contact and the No. 6 contacts of relay 2101 and close a circuit for relay 2027 which may be traced from ground over its upper contacts, over conductor 2133 to battery through the winding of relay 2027 and to the trouble indicator. Relay 2027, upon operating, locks over its lower front contact and over the upper back contact of relay 2028 to ground on conductor 2029; closes an obvious circuit for relay 2026 which operates and locks over its No. 4 contacts to ground over the upper No. 2 contacts of relay 2002; and over its inner upper contacts relay 2027 connects ground to conductor 2701 to operate the identifier busy relay 2700 to prevent the seizure of the identifier by any sender until the identifier is released after the rectification of the trouble encountered.

It has been assumed that the calling line is in the first group of thousands number circuits tested, that is, unit A, and that in response to the thousands group test, register relay 1819 was operated and locked. It will also be assumed that when this relay operated no other register relay was operated and therefore at the end of the second timing period when relay 1908 operates as previously described, a circuit was established from battery through resistance 1937, over the No. 3 contacts of relay 1908, conductor 1938, conductor 1840 of cable 1728, the lower normal contacts of relay 1741, conductor 1742 of cable 1728, the upper front contact of register relay 1819, the upper contacts of switching relay 1820, conductor 1744 of cable 1728, through the upper winding of the nine thousands group register relay 1719, over conductor 1745 of cable 1728, the next to upper contacts of relay 1820, the lower front contact of register relay 1819 and thence over the lower back contacts of the other relays of the group to ground at the back contacts of register relay 1810. Relay 1719, upon operating, establishes a circuit from battery through the winding of relay 1741, over the No. 5 contacts of relay 1743, through the lower front contact and locking winding of relay 1719 to ground thereby locking itself operated and causing the operation of relay 1741 and at its lower back contact opening the locking circuit of the next preceding relay so that it is not possible for more than one register relay to remain operated. Relay 1741, upon operating, and with the walking relay 2120 unoperated to register the fact that the calling line was found to be located in the first office unit, a circuit is established from ground over its lower front contact, conductor 1746, the No. 2 back contact of relay 2120 to battery through the winding of office unit relay 2134 to battery. With group register relay 1719 and office unit relay 2134 both operated, a circuit is now established from battery through resistance 2509, over the No. 4 back contact of relay 2541, conductor 1747, the upper front contact of relay 1719, conductor 1748, the No. 9 contacts of relay 2134, connected to the cross-connecting rack 2135 over which a cross connection may be made to the appropriate thousands group connector relay of the office unit A, through the winding of relay 2136 if the call was originated from an operator's trunk, or to the winding of relay 2137 if the call was originated from a line to which automatic ticketing service should be denied.

It has been assumed that the call was originated from the No. 9 thousands group of office unit A and therefore the cross connection on the rack 2135 extends the circuit established by the operation of register relay 1719 over conductor 2138, through the winding of lock-out relay 1219F of the No. 9 thousands number circuit allocated to the first identifier, thence over the lower normal contacts of other lock-out relays 1219I and 1219L allocated to other identifiers to ground if no other identifier has at this time seized the same thousands number circuit and its lock-out relay is not therefore operated. Relay 1219F, upon operating, locks to ground over its lower contact and establishes a circuit from battery through resistance 1229, over its inner upper front contact to ground through the winding of the No. 9 thousands group connector relay 1239F which thereupon operates. At its inner upper back contact, relay 1219F opens the circuit over which battery through resistance 1229 may be applied to operate other connector relays of the No. 9 thousands number circuit allocated to other identifiers. With relay 1239F operated the ten pairs of conductors extending from the secondary windings of the ten hundreds transformer coils of the tip field and the ten pairs of conductors extending from the secondary winding of the ten hundreds coils of the ring field are extended over conductors of cables 1038, 1240 and 1241 to contacts of the tip and ring field relays 1404T and 1405T and 1404R and 1405R of the common number circuit; the windings of the 100 hundreds group connector relays are connected over other of its contacts and ten groups of ten conductors each are extended from the multiple contacts of the ten hundreds groups of hundreds connector relays in preparation for the tens and units identification tests. Relay 1239F also establishes a circuit from ground over its No. 2 contacts and conductor 1500 to battery through the winding of relay 1506 which relay thereupon operates. Relay 1239F also establishes a circuit over its No. 1 contacts and conductor 1242 to battery through the winding of relay 1029 which thereupon operates to disconnect the secondary windings of the 9THT and 9THR transformer coils from the conductors extending toward the common number circuit and to short circuit both the primary and secondary windings of these transformer coils thereby preventing another identifier from receiving a thousands identification signal from this thousands group while the first identifier is making hundreds, tens and units tests within this group.

When relay 1741 operated, it also established an operating circuit for advance relay 1721 which may be traced from ground over the upper contacts of relay 1741, through the winding of relay 1721 to battery. Relay 1721, upon operating, locks over its lower front contact to ground over the No. 2 contacts of relay 1743; at its lower back contact removes battery through resistance 1734 from the circuit previously traced through the winding of the switching relay 1309 thereby releasing such relay; at its upper back contact opens one locking circuit of relay 1720 which does not release unless the class test has been completed; at its inner upper back contact opens the circuit of switching relays 1520 and 1820 and at its upper front contact prepares a circuit for the start relay 2343 of the hundreds register circuit of Fig. 23. Relay 1309, upon releasing, releases relay 1505 which in turn releases start relay 1902 of the amplifier-detector timing circuit. Relay 1902, upon releasing restores the timing circuit whereupon relay 1900 thereof reoperates. With relay 1900 reoperated the circuit for start relay 2343 is now completed and may be traced from battery through its winding, over conductor 2304, the normal contacts of the office unit register relays 2200 to 2209, inclusive, of Fig. 22, conductor 2305, the inner upper contacts of relay 1900, conductor 2306, the lower back contacts of relay 2341, conductor 2307, the No. 4 back contacts of relay 2521, conductor 2320, the back contact of relay 2308, conductor 2322 to ground over the upper front contact of relay 1721. Relay 2343 operates if the office unit register relays are all normal and upon operating locks over its No. 4 contacts, the back contact of relay 2308, to ground over conductor 2322 and starts the hundreds group test. Before describing this test, however, the class test which has been proceeding during the thousands group test will first be described.

*Class identification*

When relay 1743 operated at the start of the calling line identification, a circuit was established from battery through the winding of relay 1604, over the back contact of relay 1605, the back contacts of the register relays 1608, 1609, 1610 and the indicated intermediate but omitted relays of the class identification circuit of Fig. 16, conductor 1611, the No. 6 contacts of relay 1743, conductor 1722, the back contact of relay 2103, conductor 2104, the No. 5 back contact of relay 2521, conductor 2105 to ground at the No. 6 contacts of relay 2101. Relay 1604 operated and locked over its inner upper contacts, the back contact of relay 1612 to ground over its operating circuit and established a circuit for the lock-out relay 1410F of the common class circuit, allocated to the identifier, if the common class circuit had not been taken for use by another identifier. This circuit may be traced from battery through resistance 2520, the No. 2 back contact of relay 2521, conductor 2522, the lower back contact of relay 1749, conductor 1613, the lower contacts of relay 1604, conductor 1614, the lower contacts of relay 2110, conductor 2139 of cable 2125, over the upper back contact of transfer relay 1320, through the winding of lock-out relay 1410F and thence to ground over the inner upper normal contacts succeeding intermediate lock-out relays, such as relay 1410I, and the last lock-out relay 1410L allocated to other identifiers. It will be assumed that lock-out relay 1410F operates at once, locks over its inner upper alternate contacts to ground and closes a circuit for the class connector relay 1312F allocated to the identifier, over a circuit which may be traced from ground through its winding, over the inner upper back contact of transfer relay 1320, conductor 1311, the inner lower front contact of relay 1410F to battery through resistance 1403.

Had the identifier seized for the call been an intermediate identifier, then its lock-out relay 1410I would have been operated over the upper outer back contact of transfer relay 1326, through its winding and the inner upper normal contacts of succeeding relays of the lock-out group if the common class circuit had not at the time been taken for use by a succeeding identifier and, upon operating, would have established the circuit of its allocated connector relay 1312I if a preceding identifier had not seized the class circuit and its lock-out relay such as 1410F had not been operated. This circuit may be traced from ground through the winding of relay 1312I, over the inner upper back contact of transfer relay 1326, the inner lower front contact of relay 1410I, the inner lower back contact of relay 1410F, through resistance 1403 to battery. Had the identifier seized for the call been the last, then its lock-out relay 1410L would have been operated over the middle lower back contact of transfer relay 1327 to ground through its winding and would have established the circuit of its allocated connector relay 1312L if a preceding identifier had not seized the connector circuit and its lock-out relay, such as 1410I or 1410F had not been operated, over a circuit which may be traced from ground through the winding of relay 1312L, the lower back contact of transfer relay 1327, the lower front contact of relay 1410L, the inner lower back contacts of intermediate lock-out relays, such as 1410I, the inner lower back contact of lock-out relay 1410F to battery through resistance 1403.

Relay 1312F, upon operating, establishes a circuit which may be traced from battery through resistance 1313, over the lower contacts of class connector relay 1312F, conductor 1314 of cable 1315, the upper contacts of relay 1604, conductor 1615, the back contact of relay 1750, conductor 1616, the winding of relay 1617, the upper back contact of relay 1603, the upper back contact of relay 1618, thence serially over the lower back contacts of register relays 1621, 1620, 1629 and indicated intermediate relays, to ground if these register relays are all in their normal condition. Relay 1617 thereupon operates and locks to ground over its inner upper contacts and over its next to inner upper contacts establishes a circuit for relay 1622 to start the timing circuit associated with the amplifier-detector circuits of Fig. 16. These circuits are similar to those disclosed in Fig. 18 but to simplify the drawing have been disclosed as boxes. While three such circuits have been indicated by the boxes 1623, 1624 and 1625, it is to be understood that as many would be supplied as would be required for the several class indications to be identified.

With class connector relay 1312F and relay 1617 both operated, the secondary windings of the class transformer coils 301 to 304, disclosed in Fig. 3, are connected over contacts of relay 1312F, conductors of cable 1315 and contacts of relay 1617 to the input sides of the amplifier-detector circuits of Fig. 16. Relay 1622 upon operating connects ground over its upper contacts to the armatures of all of the anode relays of the amplifier-detector circuits, corresponding to anode relay 1827 of Fig. 18. The amplifier-detector circuits are now conditioned to make the class identification test. The class identification test is made to the sleeve conductors of the first selectors or to the sleeve conductors of the two-party message register or coin box trunks involved. The sleeves of these first selectors or trunks are connected through condenser resistance networks each comprising a condenser 306 and a resistance 307, to ground through a primary winding of a class transformer coil. All of the sleeve conductors involved in a single class are connnected to a single primary winding up to the capacity of the winding and one or more primary windings are provided for each transformer coil.

The identifier is arranged to make the following class tests:

A. *Two-party message rate class.*—This class indication will not be printed on the ticket but it is necessary to identify it in order that the sender may send a short reversal of battery to the two-party message rate trunk to cut the trunk through on ticketing calls. This is necessary as ticketing calls will not be registered on the subscribers' line registers and the trunk circuit must be cut through to avoid transmission loss of the split transmission circuit in the usual two-party message rate trunk.

B. *Coin class.*—The coin class of service will not be printed on the ticket. However, it is necessary to obtain an indication when coin subscribers inadvertently dial connections to ticketing trunks in order to deny service to this class of subscriber. The coin box subscribers should obtain toll connections by the assistance of the usual operator. The identification test on the coin box trunk may be made either through the class test or may be made through the common number circuit switching relay in the same manner as the line and operator's coil test. When there are a large number of coin box trunks involved it would be advisable to handle them on a class test basis.

C. Certain subscribers may have dialing access only to the local office area whereas other subscribers may have dialing access to the local and to contiguous areas. The subscribers who are entitled to extended scope service are segregated in separate line-finder groups so as to give them free access to the contiguous areas. As it may be desirable to have the local and extended class information printed on the toll ticket, a positive class test is therefore made to determine if the subscriber is one having local or extended service. When no signal is found on the class test it will be assumed that the class is of the other type. In general, the positive class test will be made on the lines which complete the least number of ticketed calls.

D. In most areas where the local and extended class of service is given, the two-party message rate service is given only to the foreign exchange subscribers but there may be exceptions to this rule. Therefore, if a negative class indication is given for the extended class, it will not be necessary to segregate the two-party message rate class information into more than one class.

With relay 1622 operated, current from the 130-volt source 1626 is connected over the lower front contact thereof, conductor 1627, through resistance 1751 to ground through condenser 1752 and with the short circuit of condenser 1752 over conductor 1628, the upper back contact of relay 1622 and through resistance 1629 open through the operation of relay 1622, condenser 1752 starts to charge and after a period of one-tenth of a second becomes fully charged. During this period the 270-cycle signaling current applied over one of the first selector or trunk sleeve conductors (not shown) will be applied through the primary winding of one of the class transformer coils if the call is of a class for which a class identification should be made. In the case assumed no class identification is required.

When the condenser 1752 becomes fully charged the potential from batery 1626 applied over conductor 1627 and through resistance 1751 becomes applied through resistance 1753 to the control cathode of tube 1754, and with ground potential connected over the inner upper contact of relay 1622, the inner lower normal contacts of relay 1618 and over conductor 1631 to the right cathode of tube 1754, the tube fires across its cathode gap thereby discharging the condenser 1752 thereover and establishing a circuit for operating anode relay 1755 from ground over the right cathode, across the cathode-anode gap through the tube, through the winding of relay 1755 and resistance 1756 to the source 1626 of 130-volt potential. Relay 1755 upon operating establishes a circuit from battery through the winding of relay 1618, over contacts of relay 1755 to ground on conductor 1630 and relay 1618, upon operating, locks over its inner lower alternate contacts to ground on conductor 1630; removes ground potential from the right cathode of tube 1754 thereby extinguishing the tube and releasing anode relay 1755; removes operating battery at its inner upper back contact from the circuit of register relays 1619, 1620, 1621, etc.; opens at its upper back contact a point in the operating circuit of relay 1617; at its lower front contact establishes a charging circuit for condenser 1632 from the source 1626, over the lower front contacts of relays 1622 and 1618, through resistance 1633 and condenser 1632 to ground; and over its upper front contact prepares a circuit for relay 1749. If no signaling current was detected as, for example, on a call from a line for which no positive class registration is required and, consequently, none of the register relays 1619, 1620, 1621, etc. has been operated, the circuit of relay 1749 is completed from ground over the lower back contacts of the register relays, the upper front contact of relay 1618, conductor 1634, to battery through the winding of relay 1749. Relay 1749 thereupon operates, locks over its upper front contact and conductor 1757 to ground over the inner lower contacts of relay 1604 and at its upper back contact opens one locking circuit for relay 1720 extending over the lower back contact of relay 1758, the upper back contact of relay 1749, conductor 1722, the lower back contact of relay 2103, conductor 2104, the No. 5 back contact of relay 2520, conductor 2105 to ground over the No. 6 contacts of relay 2101. If the identifier has completed the thousands group identification test at this time and relay 1721 has therefore operated to open the other locking circuit of relay 1720 at its upper back contact, relay 1720 will now release. The common class and number circuit will thereupon be released in a manner to be described later.

If, however, it be assumed that the call was one for which a positive class registration is necessary, for example a call from a line entitled to only local service and the signaling current is applied from the sleeve conductor of such trunk through the primary winding of the transformer coil 303, current is induced upon the input side of one of the amplifier-detector circuits, for example the circuit 1625, which responds thereto and establishes a circuit for register relay 1621 which may be traced from ground applied over the upper contacts of relay 1622, the contacts of the operated anode relay of the amplifier-detector circuit 1625, through the winding and the inner upper normal contacts of relay 1621 to battery over the inner upper back contact of relay 1618. Relay 1621 upon operating locks over its inner upper alternate contacts to battery and prepares a circuit for a class register relay as will later be discussed. With one or more of the register relays 1619, 1620, 1621, etc. operated to register either the detection of the signal or a false surge condition on the sleeve conductor of the trunk tested, when condenser 1632 becomes fully charged over the circuit previously traced after an interval of approximately one-tenth of a second, potential applied from the source 1626 through resistance 1633 will become applied through resistance 1635 to the right control cathode of tube 1759 and since ground has been applied from conductor 1630 over the inner upper normal contacts of relay 1603 to the left cathode of this tube, the tube fires across its cathode gap, discharging condenser 1632 thereover and causing the operation of anode relay 1760 over a circuit from the source 1626, over the lower front contact of relay 1622, through the winding of anode relay 1760 and resistance 1761 to the anode, thence across the cathode-anode gap of the tube to ground connected to the left cathode. Relay 1760 upon operating establishes a circuit for relay 1603 which may be traced from battery through its winding, over the contacts of relay 1760 to ground on conductor 1630. Relay 1603 thereupon operates; locks over its inner upper alternate contacts to ground on conductor 1630; removes ground potential from the left cathode of tube 1759 thereby extinguishing the tube and releasing anode relay 1760; opens at its upper back contact another point in the operating circuit of relay 1617; opens at its lower normal contacts the discharge circuit for condenser 1934 of Fig. 19 previously traced over conductors 1927 and 1928 and closes a charging circuit for condenser 1934 which may be traced from battery 1626 over conductor 1627, the lower front contact of relay 1603, conductor 1942, through resistance 1933 and condenser 1934 to ground, and at its upper front contact prepares an operating circuit for one of the relays of the register group 1608, 1609, 1610, etc. The operation of relay 1603 terminates the second timing interval. Before the end of this interval any of the register relays 1621, etc. which were operated due to surge conditions should be released due to the opening of their locking circuits by the release of the associated anode relays and only the register relay which operated in response to the detection of the signaling current should remain operated.

If it be assumed that at the end of the second time interval more than one of the register relays 1621, etc. remain operated, then after an interval of approximately two-tenths of a second, condenser 1934 will have become fully charged, potential applied through resistances 1933 and 1940 from the source 1026 becomes effective to fire tube 1935 over its cathode gap whereupon the condenser 1934 discharges over such gap and the anode relay 1939 operates when relay 1908 operates in response to the thousands group test. The circuit of relay 1939 may be traced from battery 1026, thence over the lower outer contacts of relay 1603, conductor 1942, over the No. 1 contacts of relay 1908, through resistance 1941 and the winding of anode relay 1939 across the anode-cathode gap of tube 1935 to ground. Relay 1939 upon operating causes the operation of relay 1932 and the closure of a major alarm circuit as previously described.

If it be assumed that at the end of the second time interval only one of the register relays, for example, relay 1621 remains operated, then upon the operation of relay 1603 a circuit is effective from battery over the upper front contact of relay 1603, through resistance 1636, over the upper front contact of relay 1621, over the outer right back contact of relay 1637, through the upper winding of register relay 1610, over the inner right back contact of relay 1637, over the lower front contact of relay 1621 and the lower back contact of all other register relays, such as 1620 and 1619, to ground. Relay 1610 thereupon operates, locks over its lower winding and lower contacts, thence serially over the lower contacts of other similar relays 1609, 1608, etc. over the middle upper contacts of relay 1604 to battery through the winding of relay 1605. Relay 1605 operates in this locking circuit to indicate that a class has been identified and further establishes a circuit for relay 1759 which may be traced from ground over its upper contacts, conductor 1606, the No. 2 back contact of relay 1607, conductor 1762 through the winding of relay 1759 to battery. Relay 1759 upon operating locks over its inner upper contacts to ground on conductor 1757 and opens the locking circuit of relay 1617 which thereupon releases. Relay 1617 upon releasing releases start relay 1622, which upon releasing releases operated relays 1603 and 1618 and establishes discharge paths for condensers 1632 and 1752 over its back contacts and through resistances 1629 and 1641. With relay 1603 released a circuit is established for relay 1607, extending from battery through its winding, over the lower contacts of relay 1759 to ground over the inner lower back contact of relay 1603. Relay 1607 upon operating locks over its No. 5 contacts to ground over the inner lower front contacts of relay 1604 and over its No. 6 contacts establishes an obvious circuit for relay 1642 which operates and, in turn, causes the operation of relay 1637. When relay 1617 released all of the amplifier-detector circuits were restored to normal whereupon any operated register relay such as 1621 was released.

With relays 1603, 1618 and the register relays 1619, 1620, 1621, etc. all released and relay 1607 operated, the operating circuit for relay 1617 previously traced is reestablished except that it now extends over the No. 1 contacts of relay 1607 rather than over the upper back contact of relay 1750. Relay 1617 reoperates, locks, connects the amplifier-detector circuits to the class transformer coils and establishes the circuit of relay 1622. The timing circuit now functions in the manner previously described to make a check test for the class indication. On the check test only the previously operated register relay, in the case assumed relay 1621, should be reoperated in response to the detection of the signaling current by the amplifier-detector circuit 1625 and, therefore, upon the reoperation of relay 1603 a circuit will be established from battery over its upper front contact, through resistance 1636 over the upper front contact of relay 1621, over the outer right front contact of relay 1637, through the upper winding of relay 1640, over the inner right front contact of relay 1637, over the lower front contact of relay 1621, thence over the lower back contacts of all the other register relays, such as 1620 and 1619 to ground. Relay 1640 thereupon operates and locks through its lower winding and over its lower contacts, thence over the lower back contacts of other relays in the same group, such as relays 1639 and 1638 etc., over the lower front contact of relay 1605 to battery through the winding of relay 1643. With register relays 1610 and 1640 now both operated a circuit is established from ground on conductor 1611, over the upper front contacts of relay 1610 and 1640, over cross-connection terminals on the cross-connecting rack 1644, the No. 8 contacts of relay 1607 to battery through the winding of the class register relay 1657. Relay 1657 upon operating establishes a circuit from ground over its upper contacts, conductor 1646, through the winding of relay 1758 to battery whereupon relay 1758 operates to open the previously traced locking circuit of relay 1749 to initiate the release of the common class and number circuit.

In case the same class identification is not made on the first and check class tests, and corresponding relays of the group 1608, etc. and 1638, etc. are not, therefore, operated, no class register relay will be operated. Under this condition provision is made for making a second trial test of the class identification. When relay 1643 operates on the second or check test, it establishes a circuit from battery through the winding of slow-to-operate relay 1647, over the lower contacts of relay 1643, conductor 1648 to ground at the upper back contact of relay 1758 and, after an interval, relay 1647 closes its contacts to complete a circuit from ground thereover, the upper back contact of counting relay 1649 to battery through the winding of counting relay 1612. Relay 1612 thereupon operates, locks in a circuit through its winding and the winding of relay 1649 and over its own upper front contact to ground on conductor 1611, and at its upper back contact opens the locking circuit of relay 1604 which thereupon releases and releases all operated relays of Fig. 16 except relay 1612. As soon as relay 1647 releases, relay 1649 operates in the locking circuit of relay 1612. With the relays of the register groups 1608, etc. and 1638, etc. all released and relay 1605 also released, the previously traced operating circuit for relay 1604 is reestablished and relay 1604 operates, locks over its inner upper front contact and the lower contact of relay 1649, to ground on conductor 1611 and starts the functioning of the class test circuit. A second trial test including a check test is made in the manner previously described, relay 1605 operating upon the completion of the second trial test and relay 1643 operating upon the completion of said test if a register relay in each of the group 1608, etc. and 1638, etc. operated. If, on the second trial, no class register relay such as 1645 is operated and, consequently, relay 1758 is not operated, the previously traced circuit for relay 1647 is completed and with relay 1649 previously operated the circuit to a major alarm is closed by the application of ground over the contacts of relay 1647 and the upper front contact of relay 1649 to the alarm conductor 2018.

Inasmuch as the common class connector is accessible to all identifiers and as an identifier having seized the class circuit through the operation of relay 1617 has identified the class in it by the operation of a class register relay, the signaling current will continue to be present in the common class circuit. Under this condition it will be necessary for the identifier to hold the class circuit out of service to other identifiers until the hundreds, tens and units identification tests have been completed. This is accomplished by continuing the ground applied to conductor 1611 over the circuit previously traced until the units identification has been completed and relay 2521 has operated, thus maintaining relay 1604 operated. With relay 1604 maintained operated, the previously traced circuit for lock-out relay 1410F is maintained to prevent another identifier from seizing the common class connector to make a class test. When the first identifier has completed its class test, both holding circuits for relay 1720 will be opened and the relay will release to open at its No. 1 contacts the previously traced circuit of lock-out relay 1400F which will release to make the common number connector available to other identifiers. Another identifier may now seize the common number circuit and proceed with the identification of a calling line in the regular manner except that its relay 1720 will not release upon completion of the thousands group identification, thus preventing the release of the common number connector and the seizure of such connector by a third identifier. The second identifier will proceed with its class test as soon as the first identifier has released the class connector during the time of making the calling line identification test or after its units identification test. As soon as the second identifier has completed its class test, it will release the common number connector for use by other identifiers.

When relay 1720 releases upon the completion of both the thousands group and class tests, it opens at its No. 3 contacts the timing circuit of the common number connector timer 2778 to terminate the measurement of the maximum time allowed for the identifier to hold the common number circuit. It will be recalled that relay 2343 was operated upon the completion of the thousands group test. Upon operating it completes a circuit to start timer 2783 to measure the maximum period allowed to complete the hundreds, tens and units identification tests. This circuit may be traced from battery 2784 over the inner upper contacts of relay 2704, through resistance 2783E, conductor 2140 over the No. 4 contact of relay 2343, conductor 2309, the No. 4 back contact of relay 2521, conductor 2141, through resistance 2783B and condenser 2783C to ground. Condenser 2783C starts to charge in this circuit and if the hundreds, tens and units identification tests have not been completed within the period of about 2.4 seconds, the condenser becomes fully charged whereupon the potential applied through resistance 2783B becomes applied through resistance 2783D to the control cathode of the timer tube, and since the other cathode of this tube is connected over the upper normal contacts of anode relay 2783A and the No. 3 front contact of relay 2705 to ground, the tube then fires over its cathode gap. Condenser 2783C now discharges over this gap and the anode relay 2783A is operated in a circuit from battery 2784 over the inner upper contacts of relay 2704, through the lower winding of relay 2783A across the cathode-anode gap of the tube to ground on the right cathode. Relay 2783A upon operating locks through its upper winding and over its upper alternate contacts to ground over the No. 3 front contact of relay 2705, extinguishes the tube and connects ground to conductor 2651 extending to the trouble indicator and to battery through the winding of relay 2025 whereby relay 2025 operates in turn operating relays 2026 and 2700 as previously described.

*Hundreds group test*

With relay 2343 operated a circuit is established for the hundreds switching relays 1550 and 1850 which may be traced from battery through their windings in parallel, over conductor 2327 of cable 2328, over the No. 3 contacts of relay 2343 to ground over the upper back contact of relay 2321. The secondary windings of all of the hundreds transformer coils 0HT9 to 9HT9 are now connected over conductors of cable 1038, contacts of thousands group connector relay 1239F, conductors of cable 1240, contacts of tip field relays 1404T and 1405T, conductors of cable 1404 and contacts of switching relay 1550 to the input sides of the ten amplifier-detector circuits 1800 to 1809, inclusive, of Fig. 18. It was assumed that the calling line was located in the No. 0 hundreds group. The signaling current applied to the sleeve conductor of the calling line, therefore, will be applied through the primary winding of the hundreds transformer coil 0HT9 and, over the No. 7 contacts of operated relay 1029 to ground, thereby inducing current into the secondary winding of such coil which is effective to energize the No. 0 amplifier-detector circuit 1800 and to thereby operate the anode relay thereof corresponding to anode relay 1827.

Switching relay 1850 upon operating establishes a circuit from ground over its lowest set of contacts and conductor 1945 to battery through the winding of relay 1946 which operates to short-circuit resistances 1943 and 1923 to thereby reduce the charging time of timing condenser 1924 to approximately .075 second and to remove one short circuit from the upper winding of marginal relay 1832. With relay 1506 and switching relays 1550 and 1850 operated a circuit is established from ground over the front contact of relay 1506, the uppermost contacts of switching relay 1550, conductor 1507, the next to lower contacts of switching relay 1850, conductor 1901 to battery through the winding of start relay 1902 of the timing circuit of Fig. 19. Relay 1902 thereupon operates, in turn operating relay 1905 which, as previously described, releases relay 1900 to open the initial operating circuit of start relay 2343 of the hundreds group register circuit of Fig. 23; starts the timing cycle of the timing circuit and connects ground over conductor 1909 to the operating circuits of register relays 1810 to 1819, inclusive.

In case no signaling current is detected during the hundreds identification test and, consequently, no register relay of the group 1810 to 1819 is operated, then at the end of the first timing period when relay 1906 operates, a circuit is established from ground over the lower back contacts of all of the register relays, conductor 1907, the No. 2 front contact of relay 1906, conductor 1836, over the third from bottom contacts of switching relay 1850, conductor 2329 of cable 2328 to battery through the winding of relay 2308. Relay 2308 upon operating locks over its inner lower front contact and conductor 2330 of cable 2328 to ground over the fourth from bottom contacts of switching relay 1850; establishes a circuit for counting relay 2345 extending from battery through its winding over the upper back contact of counting relay 2344, the lower contacts of relay 2308 and conductor 2346 to ground over the No. 3 contacts of relay 2101. Relay 2345 thereupon operates and locks through its winding, the winding of relay 2344 and its own upper front contact to ground on conductor 2346. Relay 2308 further releases start relay 2343 by opening the locking circuit thereof at its back contacts. Relay 2343 upon releasing in turn releases the switching relays 1550 and 1850. The latter relays upon releasing release the timing circuit and the repeat test relay 2308. With relay 1900 reoperated following the release of the timing circuit the previously traced circuit for start relay 2343 is established and relay 2343 operates to start a repeat test. When relay 2308 releases it permits counting relay 2344 to operate in the locking circuit of relay 2345.

On the repeat test if no signal current is detected, repeat test relay 2308 reoperates, whereupon a circuit is established from ground on conductor 2346 over the lower contacts of relay 2308, the upper front contact of relay 2344, conductors 2347, 1944 and 2133 to battery through the winding of relay 2027 and to the trouble indicator. Relay 2027 functions in the manner previously described. With relay 2344 operated the holding circuit of relay 2343 is maintained over the lower contacts of the former relay and the hundreds group register circuit will remain in its operated condition until the trouble indicator record has been sent to the sender before the identifier is released as will be later described.

In case two sleeve conductors are cross in this hundreds group which would permit the signal current to be present in two hundreds transformer coils, then two amplifier-detector circuits would respond thereto. Under this condition, two relays of the group 1800 to 1819 would be operated and at the end of the timing period terminated by the operation of relay 1998 a hundreds group register relay could not be operated. The last timing period will then be measured at the end of which relay 1932 will operate. With relays 1908 and 1946 both operated, the short circuits around the upper winding of marginal relay 1832 are removed and this relay operates. Therefore, upon the operation of relay 1932 a circuit is established from ground over the contacts of relay 1832, conductor 1838, the upper front contacts of relay 1932, conductor 1836, and thence as traced to battery through the winding of relay 2027 causing the latter relay to function in the manner described for registering the trouble in the trouble indicator.

The connection of two signal conditions during the hundreds identification test may be due to the fact that another identifier is trying to make an identification in the same thousands group. In this case, relay 1832 upon operating and before relay 1932 has operated will establish a circuit from ground over its contacts, conductor 1838, the back contact of relay 1932, conductor 1947 to cross-connection terminal 1517 connected to similar terminals of all identifiers serving the same office building, thence over the No. 22 contacts of switching relay 1520 of the other identifier which is attempting to make a test in the same thousands group, thence over conductor 1518 and over the lower back contact of relay 1735 to battery through the winding of relay 1738 of such other identifier. Relay 1738 upon operating opens one circuit in said other identifier extending over a front contact of the repeat test relay 1708 for controlling the walking relays and as soon as relay 1708 operates establishes a circuit for relay 1735 which extends from battery through its winding, over the front contact of relay 1738 and the inner upper front contact of relay 1708 to ground on conductor 1703. Relay 1735 thereupon operates, locks over its inner upper contacts to ground supplied to conductor 1737, over contacts of the operated switching relay 1820 of such identifier; opens at its lower back contact the other walking relay control circuit established upon the release of relay 1703; at its upper back contact opens the circuit over which signal current from the source 2113 was transmitted to the sleeve conductor of the calling line; connects ground over its upper front contact, conductor 2115, lower back contact of relay 2116, conductor 2117, and thence as traced to the sleeve conductor of the calling trunk and at its inner lower back contact opens the circuit of relay 1738 which releases after an interval. Relay 1708 upon operating releases relay 1743 which releases switching relays 1520 and 1820 as previously described whereupon relay 1735 is released. During the time that relays 1735 and 1738 are operated the thousands test at such identifier is blocked and, consequently, upon the removal of the signal current by such identifier one of the register relays 1810 to 1819 of the other identifier should release and the hundreds identification test be concluded before the end of the third timing period as indicated by the operation of relay 1932.

After such repeat tests as are required have been made, register relay 1810 should remain operated alone in response to the operation of the anode relay of the No. 0 amplifier-deterctor 1800, and with relay 1998 of the timing circuit operated a circuit is closed from ground over the outer lower front contact of relay 1810, contacts of switching relay 1850, conductor 2331 of cable 2328, through the upper winding of the hundreds group register relay 2310, conductor 2332 of cable 2328, contacts of switching relay 1850, the upper contacts of relay 1810, over the upper back contacts of the other register relays 1815, 1819, etc., conductor 2333 of cable 2328, the next to lower back contact of relay 2341, the No. 6 contacts of start relay 2343, conductor 2334 of cable 2328, conductor 1938, over the No. 3 contacts of relay 1908 and through resistance 1937 to battery. Relay 2310 upon operating locks in a circuit from ground through its lower winding and inner lower front contact, over the inner lower back contacts of the other register relays 2319, etc., conductor 2142, the No. 7 contacts of relay 2101, conductor 2143, the No. 5 contacts of relay 2343 to battery through the winding of relay 2341 and prepares circuits over its inner upper and lower front contacts for transferring its hundreds group registration to a hundreds register in the sender. It will be noted that each register relay, such as 2319, upon operating, opens at its lower back contact the locking circuit of the next preceding relay so that it is not possible for more than one register relay to remain operated.

Relay 2341, which operated in the locking circuit of relay 2310, establishes an obvious operating circuit for advance relay 2321 and at its lower back contact opens the initial operating circuit of start relay 2343, relay 2343, however, remaining operated over its locking circuit. Relay 2321 upon operating locks over its upper front contact and the No. 2 contacts of start relay 2343 and at its upper back contact opens the previously traced circuit of switching relays 1550 and 1850 which release restoring the timing circuit to normal, the latter releasing register relay 1810. When relay 1900 reoperates indicating the normal condition of the timing circuit, relay 2321 closes a circuit for start relay 2443 of the tens group register circuit of Fig. 24 which may be traced from battery through its winding, over conductor 2404, the upper front contact of relay 1900, conductor 2406, the upper back contact of relay 2441, the upper back contacts of register relays 2410 to 2419, the upper back contact of relay 2408, conductor 2422, to ground over the lower contacts of relay 2321. Relay 2443 operates and locks over its No. 3 contacts and the back contacts of relay 2408 to ground over conductor 2422; prepares at its No. 1 contacts a locking circuit for relay 2421; prepares at its No. 4 contacts a locking circuit for the register relays 2410 to 2419; and establishes a circuit from ground over the upper back contact of relay 2421, the No. 2 contacts of relay 2443, conductor 2427 of cable 2428, to battery through the windings of switching relays 1560 and 1860. Switching relay 1860 upon operating establishes the previously traced circuit for relay 1946 over its lower contacts, and relay 1946 upon operating removes one short circuit from the winding of marginal relay 1832 and changes the charging period for timing condenser 1924.

With relay 2310 of the hundreds group register circuit operated, a circuit is established for the No. 0 hundreds group connector relay 1190 of the No. 9 thousands group which may be traced from ground through its winding, over conductor 1243, the No. 5 contacts of thousands group connector relay 1239F, conductor 2336 of cable 2335, the upper front contact of relay 2310, conductor 2338, over the No. 5 back contact of relay 2541 through resistance 2509 to battery. Relay 1190 operates over this circuit to connect the sleeve conductors of the one hundred lines of the No. 0 hundreds group over its contacts and contacts of the operated thousands group connector relay 1239F, through the tens and units transformer coils of Fig. 15. Had the calling line been in the No. 9 hundreds group of the No. 0 thousands group, the thousands group connector relay 1230F would have been operated in response to the thousands group test and the hundreds group register relay 2319 would have been operated in response to the hundreds group test thereby resulting in the operation of the No. 9 hundreds connector relay 1109 of the No. 9 thousands group of hundreds connector relays.

The hundreds connector relay 1190 upon operating establishes a circuit from ground over its lower contacts, conductor 1244, the No. 15 contacts of the thousands connector relay 1239F, conductor 1508, the upper contacts of switching relay 1560, conductor 1509, the next to lower contacts of switching relay 1860, conductor 1901 to battery through the winding of start relay 1902 of the amplifier-detector timing circuit. Relay 1902 thereupon starts the operation of the timing circuit whereupon relay 1900 releases to open the initial operating circuit of start relay 2443 of the tens group register circuit, relay 2443, however, remaining operated over its locking circuit. Relay 1902 then operates relay 1905 over a previously described circuit, and connects ground to conductor 1909 in the operating circuits of the register relays 1810 to 1819.

Relay 2341 upon operating also establishes a circuit from ground over its upper contacts and conductor 2210 to battery through the winding of relay 2211 which operates and extends the conductors of cable 2212 to the windings of the thousands group register relays 2220 to 2229. Since, as assumed, the calling line was found upon the thousands group test to be located in the No. 9 thousands group of office unit A, and the No. 9 thousands group connector relay 1239F was operated, a circuit is now effective from ground over the No. 3 contacts of relay 1239F, conductor 2213 of cable 2212, over the No. 9 contacts of relay 2211 to battery through the winding of thousands group register relay 2229. Relay 2229 thereupon operates, locks over its inner upper contacts to ground over the No. 10 contacts of relay 2211 and over its outer upper and lower contacts prepares circuits to transfer its registration to the sender. Relay 2341 also establishes a circuit from ground over its inner upper contacts, conductor 2214, the upper contacts of previously operated relay 2021, conductor 2215 to battery through the winding of relay 2216. Relay 2216 upon operating extends the conductors of cable 2217 to the windings of the office unit register relays 2200 to 2209. Since, as assumed, the calling line was found upon the thousands group test to be located in the first office unit A and the No. 9 thousands group connector relay 1239F of that office unit was operated, a circuit is now effective from ground over the No. 4 contacts of relay 1239F, conductor 2218 of cable 2217, over the No. 1 contacts of relay 2216 to battery through the winding of relay 2200. Relay 2200 upon operating locks over its inner upper front contact and conductor 2219 to ground over the upper No. 3 contacts of relay 2002 and prepares circuits to be later described for transferring the office unit registration to the sender and for controlling the further functioning of the identifier in accordance with the office unit registration.

*Tens group identification*

As previously stated, when the hundreds group connector relay 1190 operated, and with the thousands group connector relay 1239F operated, the sleeve conductors of one hundred lines in the nine thousands group of the office unit A are extended over contacts thereof and conductors of cable 1248 to the tens group and the terminal identifying circuits of Fig. 15. The one hundred conductors thus extended from the one hundred sleeve conductors are grouped in ten groups of ten conductors each corresponding to the ten lines of the hundreds group which have the same tens identification digits. Each conductor terminates in a serially connected condenser and resistance and each group of ten conductors is multipled to one terminal of the primary winding of a tens group transformer coil such as 1590 to ground. The secondary windings of the transformer coils 1590 to 1599 are connected over conductors of cable 1510 and contacts of switching relay 1560 to the input sides of the amplifier-detector circuits 1800 to 1809 of Fig. 18.

It has been assumed that the tens digit of the calling line identification is 9 and the units digit is 5 and that, therefore, the signaling current on the sleeve conductor 104 of such line is conducted over contacts of relays 1190 and 1239F, conductor 1249 of cable 1248, through condenser 1521, resistance 1522 and the primary winding of the No. 9 transformer coil 1599 to ground. The signal current is thereupon induced into the secondary winding of transformer coil 1599 and is applied over conductors of cable 1510 and contacts of switching relay 1560 to the No. 9 amplifier-detector circuit 1809 to operate the anode relay 1827 thereof. Since the start relay 1902 of the timing circuit has been previously operated, the operation of anode relay 1827 causes the operation of register relay 1819.

In case a cross occurs between two sleeve conductors in different tens groups of the same hundreds group, no relay of the tens register circuit will be operated at the end of the timing cycle terminated by the operation of relay 1908 of the timing circuit as there would be two relays of the group 1810 and 1819 operated. This condition would remain until the end of the last timing cycle when relay 1932 would operate to cause the operation of relay 2027 and the summoning of a trouble indicator.

In case no signal current is detected then when relay 1906 of the timing circuit operates at the end of the first timing period, a circuit is established from ground over the lower back contacts of all of the register relays 1810 to 1819, conductor 1997, the No. 2 front contact of relay 1906, conductor 1836, over the third from bottom contacts of switching relay 1860, conductor 2429 of cable 2428 to battery through the winding of relay 2408. Relay 2408 upon operating locks over its inner lower front contact and conductor 2430 of cable 2428 to ground over the fourth from bottom contacts of switching relay 1860; establishes a circuit for counting relay 2445 extending from battery through its winding, over the upper back contact of relay 2444, the lower contacts of relay 2408, conductor 2446 to ground over the No. 4 contacts of relay 2101, relay 2445 thereupon locking through its winding, the winding of relay 2444 and its own inner upper contact to ground on conductor 2446; and releases start relay 2443 by opening the locking circuit thereof at its back contact. Relay 2443 upon releasing in turn releases the switching relays 1560 and 1860. The latter relays upon releasing release the timing circuit and the repeat test relay 2408. With relay 1900 reoperated following the release of the timing circuit, the previously traced circuit for start relay 2443 is established and relay 2443 reoperates to start a repeat test. When relay 2408 releases, it permits counting relay 2444 to operate in the locking circuit of relay 2445.

On the repeat test, if no signal current is detected and repeat test relay 2408 reoperates, a circuit is established from ground over conductor 2446, over the lower contacts of relay 2408, the upper contacts of relay 2444, and conductor 2447 to battery through the winding of repeat test relay 2308. Relay 2308 will thereupon operate, cause the operation of relay 2345 and at its upper back contact open the circuit of start relay 2343 of the hundreds register circuit whereupon relay 2343 releases in turn releasing all operated relays of the hundreds group register circuit with the exception of relays 2308 and 2345. Relay 2321 upon releasing also releases start relay 2443 which in turn releases the operated switching relays 1560 and 1860 followed by the release of the timing circuit and the release of the repeat test relay 2408 of the tens group register circuit. Relay 2408 upon releasing then releases relay 2308 and relay 2308 upon releasing causes the operation of relay 2344 in the locking circuit of relay 2345 as previously described. Upon the release of the timing circuit and the reoperation of relay 1900 thereof the previously traced energizing circuit for start relay 2343 of the hundreds group register circuit is reestablished. Switching relays 1550 and 1850 are reoperated and a new hundreds group test is made in the manner previously described in order to insure that no error was made in identifying the hundreds group. When the hundreds group test has been repeated and the same or another hundreds connector relay operated in the thousands number group the tens identification test will again be repeated. If no signal is found upon the repeated test the operation of repeat test relay 2408 will again cause the operation of relay 2308. However, in this case when relay 2308 operates with relay 2344 operated a circuit is established from ground over conductor 2346 over the lower contacts of relay 2308, front contacts of relay 2344, conductor 2347 and thence as traced to battery through the winding of relay 2027 and to the trouble indicator.

It will be assumed, however, that the signal is properly detected and that with the register relay 1819 operated alone when relay 1908 of the timing circuit operated a circuit was established from ground over the lower back contact of all preceding relays of the group 1810 to 1819, over the lower front contact of relay 1819, contacts of switching relay 1860, conductor 2431 of cable 2428, through the upper winding of the tens group register relay 2419, conductor 2432 of cable 2428, contacts of switching relay 1860, the upper contacts of relay 1819, conductor 2434 of cable 2428, the lower back contact of relay 2441, the No. 5 contacts of start relay 2443, conductor 2434 of cable 2428, conductor 1938 over the No. 3 contacts of relay 1908, through resistance 1937 to battery. Relay 2419 upon operating locks in a circuit from ground through its lower winding and over its inner lower contacts, over the No. 4 contacts of relay 2443 to battery through the winding of relay 2441 and prepares circuits over its inner upper and lower contacts for transferring its tens group registration to a tens register in the sender. It will be noted that each register relay, such as 2419, upon operating opens at its lower back contact the locking circuit of the next preceding relay so that it is not possible for more than one register relay to remain operated.

Relay 2441 which operated in the locking circuit of relay 2419 establishes an obvious circuit for advance relay 2421 and at its lower back contact and the upper back contact of register relay 2419 the initial operating circuit of start relay 2443 is opened. Relay 2443, however, remains operated over its locking circuit. Relay 2421 upon operating locks over its upper front contact and the No. 1 contacts of relay 2443 and at its upper back contact opens the previously traced circuit for switching relays 1560 and 1860 which release restoring the timing circuit to normal and releasing the operated register relay 1819. When relay 1900 reoperates indicating the normal condition of the timing circuit, relay 2421 closes a circuit for start relay 2543 of the units register circuit of Fig. 25 which may be traced from battery through its winding, bottom contacts of relay 1900, conductor 2506, conductor 2504, over the upper back contacts of register relays 2510 to 2519, over the upper back contact of relay 2508, conductor 2568 to ground over the lower contacts of advance relay 2421. Relay 2543 operates and locks over its No. 3 contacts and the back contact of relay 2508 to ground over conductor 2568, prepares at its No. 1 contacts a locking circuit for relay 2521; prepares at its No. 4 contacts a locking circuit for the register relays 2510 to 2519 and establishes a circuit from ground over the No. 7 back contact of relay 2521, the No. 2 contacts of relay 2543, conductor 2527 of cable 2528 to battery through the windings of switching relays 1570 and 1870. Relay 1870 upon operating establishes a circuit from ground over its lowermost contacts and conductor 1948 to battery through the winding of relay 1949 which operates, at its upper back contact opens one short circuit around the upper winding of marginal relay 1882 and at its front contacts shunts resistance 1923 to change the period required to charge the timing condenser 1924.

*Units identification test*

With relay 2419 of the tens group register circuit operated, a circuit is established for the No. 9 tens group connector relay 1589 which may be traced from battery through its winding over conductor 2436 of cable 2435, over the upper outer front contact of register relay 2419 of the tens group register circuit, over the upper back contacts of other relays of the register group, over the upper back contact of relay 2408 to ground on conductor 2422. Relay 1589 upon operating connects each of the group of tens conductors of cable 1248 connected over the contacts of connector relays 1239F and 1190 to the sleeve conductors of the ten lines having the same tens digit 9 to ground through a condenser resistance network. It has been assumed that the calling line has a units digit 5 and that therefore with the signal current applied to the sleeve conductor 104 this signal current is transmitted over contacts of relays 1190 and 1239F, conductor 1249 of cable 1248, the No. 7 contacts of relay 1589 to ground through condenser 1512 and resistance 1513 of the network 1535 and through resistance 1514 of such network, over a conductor of cable 1515, contacts of switching relay 1570 to the input side of the No. 5 amplifier-detector circuit 1805. In response to the tone current anode relay 1841 of this amplifier-detector circuit is operated. If the calling line had had a tens digit zero and a units digit zero, for example, register relay 2410 of the tens register circuit of Fig. 24 would have been operated upon the tens group identification test thereby causing the operation of tens group connector relay 1580 and upon the units identification test the operation of the No. 0 amplifier-detector cricuit 1800, through the condenser resistance network 1530. It is to be understood that ten connector relays 1580 to 1589 and ten condenser resistance networks 1530 to 1539 would be provided for the identifier.

Relay 1580 upon operating also establishes a circuit from ground over its No. 6 contacts, the uppermost contacts of switching relay 1570, conductor 1516, over the lower contacts of switching relay 1370, conductor 1901 to battery through the winding of the start relay 1902 of the timing circuit. When, therefore, the anode relay 1841 operates, it causes the operation of register relay 1815.

In case a cross occurred between two sleeve conductors in the tens group or in case some other identifier is working in the same group, the circuits will function in the manner described above for the tens group test to call in the trouble indicator.

In case no signal current is detected then when relay 1906 of the timing circuit operates at the end of the first timing period, a circuit is established from ground over the lower back contacts of all the register relays 1810 to 1819, conductor 1907, the No. 2 front contact of relay 1906, conductor 1836, over the third from bottom contacts of switching relay 1870, conductor 2529 of cable 2528, to battery through the winding of repeat test relay 2508. Relay 2508 upon operating locks over its inner lower front contact and conductor 2530 of cable 2528 to ground over the fourth from bottom contacts of switching relay 1860; establishes a circuit for counting relay 2545 extending from battery through its winding, over the upper back contact of counting relay 2544, the lower contacts of relay 2508, conductor 2546 to ground over the No. 5 contacts of relay 2101. Relay 2545 thereupon locks through the winding of relay 2544 and its own inner upper contacts to ground on conductor 2546. Relay 2508 also releases start relay 2543 by opening the locking circuit thereof at its back contact. Relay 2543 upon releasing in turn releases the switching relays 1570 and 1870, the latter relays upon releasing, releasing the timing circuit and the repeat test relay 2508. With relay 1900 reoperated following the release of the timing circuit, the previously traced circuit for start relay 2543 is established and relay 2543 operates to start a repeat test. When relay 2408 releases it permits counting relay 2544 to operate in the locking circuit of relay 2545.

On the repeat test if no signal current is detected and repeat test relay 2508 reoperates, a circuit is established from ground on conductor 2546, over the lower contacts of relay 2508, the upper front contact of relay 2544 and conductor 2547 to battery through the winding of repeat test relay 2408. Relay 2408 will thereupon operate, cause the operation of relay 2445 and at its upper back contact open the circuit of start relay 2443 of the tens group register circuit whereupon relay 2443 releases in turn releasing all operated relays of the tens group register circuit with the exception of relays 2408 and 2445. Relay 2421 upon releasing also releases start relay 2543 which, in turn, releases the operated switching relays 1570 and 1870 followed by the release of the timing circuit and the release of the repeat test relay 2508 of the units register circuit. Relay 2508 upon releasing then releases relay 2408 which, in turn, causes the operation of relay 2444 in the locking circuit of relay 2445 as previously described. Upon the release of the timing circuit and the reoperation of relay 1900 thereof, the previously traced energizing circuit for start relay 2443 of the tens group register circuit is established, the switching relays 1560 and 1860 are reoperated and a new tens group test is made in the manner previously described in order to insure that no error has been made in identifying the tens group. When the tens group test has been repeated and the same or another tens group connector relay has been operated, the units identification test will again be repeated and if no signal is detected on the repeated test the operation of repeat test relay 2508 will again cause the operation of relay 2408. However, in this case when relay 2408 operates with relay 2444 operated, a circuit is established from ground on conductor 2446, over the lower contacts of relay 2408, the front contact of relay 2444, conductor 2447, and thence as traced to battery through the winding of relay 2027 and to the trouble indicator.

It will be assumed, however, that the signal is properly detected and that with register relay 1815 operated alone when relay 1908 of the timing circuit operated, a circuit was established from ground over the lower back contact of all preceding relays of the group 1810 to 1819, over the lower front contact of relay 1815, contacts of switching relay 1870, conductor 2531 of cable 2528, through the upper winding of the units register relay 2515, conductor 2532 of cable 2528, contacts of switching relay 1870, the upper contacts of relay 1815, upper contacts of intermediate relays 1816—1819, conductor 2533 of cable 2528, the No. 1 back contact of relay 2541, the No. 5 contacts of relay 2543, conductor 2534 of cable 2528, conductor 1938, over the No. 3 contacts of relay 1908 through resistance 1937 to battery. Relay 2515 upon operating locks in a circuit from ground through its lower winding and inner lower contacts over the lower back contacts of succeeding register relays 2516—2519, over the No. 4 contacts of relay 2543 to battery through the winding of relay 2541 and prepares circuits over its inner upper and lower contacts for transferring its units registration to a units register of the sender. It will be noted that each register relay, such as 2515, upon operating opens at its lower back contact the locking circuit of the next preceding relay so that it is not possible for more than one register relay to remain operated.

When relay 2541 operates at the end of the units identification test, it opens at its No. 5 back contact the circuit over which the hundreds connector relay 1190 of Fig. 11 was operated whereupon such relay releases. At its No. 4 back contacts relay 2541 also opens the circuit over which the lock-out relay 1219F of Fig. 12 was operated whereupon relay 1219F releases in turn releasing the thousands connector relay 1239F. With relays 1190 and 1239F released the thousands number circuit is now restored to its normal condition. Relay 2521 upon operating disconnects battery at its No. 2 back contacts from the winding of lock-out relay 1410F of the common class circuit to release this circuit when it has been held during the calling line number identification. At its No. 5 back contact relay 2541 further opens the locking circuit of relay 2110 which releases to disconnect the source 2113 of signaling current.

*Thousands group test operation using twenty amplifier detector circuits*

As previously described, the thousands group test is made at one time in ten thousands number circuits. The identifier may, however, by slight modification be arranged to make the thousands group test at the same time in twenty thousands number circuits whereby the number of group tests required to test all of the thousands number circuits of an office building may be decreased thus decreasing the holding times of the common number circuit and of the identifier. This modification should be required only in those office buildings where there are a large number of thousands number circuits and where the traffic is very high. To arrange the identifier to make tests at the same time in twenty thousands number circuits, ten additional amplifier-detector circuits similar to those disclosed in Fig. 18 are provided but which are used only on the thousands group test. Also ten additional register relays are added to the chain 1810 to 1819, ten additional thousands group register relays are added to the chain 1710 to 1719 of Fig. 12 and two switching relays (not shown), corresponding to switching relays 1520 and 1820 and operated over conductors 1523 and 1524 and over the Nos. 23 and 24 contacts of switching relay 1520 upon the operation of such latter relay are provided to extend a cable of conductors, corresponding to cable 1501, from the contacts of another switching relay corresponding to switching relay 1309 to the input sides of the ten additional amplifier-detector circuits and to extend circuits from the contacts of the additional register relays associated with the outputs of such amplifier-detector circuits over a cable corresponding to cable 1728, through the windings of the ten additional thousands group register relays of Fig. 12.

With this modification each relay, such as 2134 of Fig. 21, is common to twenty thousands number circuits rather than to ten such circuits, and upon operating extends one group of circuits over its Nos. 0 to 9 contacts from the contacts of the first ten thousands group register relays 1710 to 1719, to the lock-out relays 1210F to 1219F of ten thousands number circuits, as previously described, and extends a second group of circuits over its Nos. 10 to 19 contacts from the contacts of the ten added thousands group relays of Fig. 17 to the lock-out relays of a second ten thousands number circuits. Also upon each progression step of the walking relays 2120 to 2123, 2126 and 2128 the circuits for the tip or ring field connector relays, such as 1309 and 1329 would be operated by multiplying the circuits extending to two of such tip field connector relays over the conductors of cable 2125 to the cross-connection terminals such as the terminals 2144 and 2145 connected to the Nos. 6 and 5 back contacts of walking relay 2120.

*Ring party identification*

In the foregoing description the identification of the tip party on a two-party flat rate party line has been described. Had the calling subscriber been the ring party on a flat rate party line, either the tip or ring party on a two-party message rate line, the single party of an individual line, a subscriber to whom automatic ticketing service is denied, such as a subscriber on a four-party line, hotel private branch exchange line, etc. or had the call originated on an operator's trunk, the circuits would have functioned in the manner previously described except that when the sender made the party test, a condition would have been set up in the sender whereby, following the association of the identifier, with the sender, relay 1701 of the identifier would have been operated rather than relay 1700 thereby causing the operation of relays 1404R and 1405R rather than relays 1404T and 1405T. Consequently, when the identifier made the thousands group test ring field connector relays such as 1329, 329, etc. would have been successively operated through the operation of the walking relays 2120, 2121, etc.

*Call from denied service line*

If the calling subscriber is one to whom the automatic ticketing service is to be denied, the connector sleeve conductor of such line is strapped from the horizontal strip of the cross-connecting line such as 1009 corresponding to the thousands designation digit of the line number to the vertical strip 1011 and is thus connected through the primary winding of the denied service transformer coil 1010 to ground. The secondary winding of this coil terminates in cross-connection terminals 1012 and 1013 which may be strapped to terminals such as 1036 and 1037, connected with a vacant pair of contacts on one of the ring field switching relays, for example, relay 1329 to which no thousands number circuit is connected. In this case the identifier will not receive a signal from any thousands number group but will receive a signal from the denied service coil in lieu thereof during the thousands group test. For example, if the terminals 1012 and 1013 are strapped to terminals 1036 and 1037, and the terminals of the secondary winding of the 9THR thousands transformer coil are disconnected from the terminals 1036 and 1037, then the No. 9 amplifier-detector circuit 1909 will be allocated during the thousands group test of that particular group of ten thousands number circuits, to the identification of a denied service signal. In this case the circuit controlled through the operation of the thousands group register relay 1719 of Fig. 17 over the No. 9 contacts of relay 2134 will be extended by strapping over the cross-connecting rack 2135 to conductor 2146 thence over the lower contacts of relay 2021, conductor 2147, through the winding of denied service relay 2137, over conductor 2148, to ground on conductor 2219. When, therefore, relay 1719 operates upon detection of the signal current, relay 2137 will operate to indicate a connection for which automatic ticketing should be denied and upon operating will lock over its lower contacts, conductors 1747 and the No. 4 back contacts of relay 2541 through resistance 2509 and battery.

*Call from operator's trunk*

If the call was completed through the automatic ticketing trunk from an operator's position the sleeve of the operator's trunk will be connected through a condenser-resistance network to ground through the primary winding of an operator's class transformer coil 305, the secondary winding of which is connected over conductors 308 and 309 to terminals 1014 and 1015 which may be strapped to terminals such as 1039 and 1040, connected with a vacant pair of contacts on one of the ring field switching relays, for example, relay 1329 to which no thousands number circuit is connected. In this case the identifier will not receive a signal from any thousands number group during the thousands group test but will receive a signal from the operator class coil 305 in lieu thereof. For example, if the terminals 1014 and 1015 are strapped to terminals 1039 and 1040 and the terminals of the secondary winding of the eight 8THR thousands transformer coil are disconnected from such terminals, then the No. 8 amplifier-detector circuit 1808 will be allocated during the thousands group test to the identification of the operator class signal. In this case the circuit controlled through the operation of the thousands group register relay 1718 of Fig. 18, over the No. 8 contacts of relay 2134, will be extended by strapping on the cross-connecting rack 2135 to battery through the winding of the operator class relay 2137. Relay 2137 will thereupon operate and lock over its lower contacts, conductor 1747 and the No. 4 back contact of relay 2541, through resistance 2509 and battery.

*Two-party message rate line call*

If the call was completed from a two-party message rate line, the calling line regardless of which party initiates the call, is identified through a ring party field of thousands and hundreds transformer coils and the sleeve conductor of the line-finder trunk is connected through a condenser-resistance network 306—307 and the primary winding of a class transformer coil, such as 303 to ground, the secondary winding of such coil being connected over contacts of the class connector relays, such as 1312F, to one of the class amplifier-detector circuits of Fig. 16. If the calling subscriber is a tip party, then upon the party test, relay 311 of the line-finder trunk over which the connection was established will be operated and therefore the signaling current applied from the identifier will be applied over conductor 312 and thence over the tip message register terminal, such as 200, of the calling line to a conductor allocated to the tip party substation appearing in the ring field. If the calling subscriber is a ring party, then relay 311 is not operated and the signaling current is then applied over conductor 313 and thence over the sleeve terminal, such as 201, of the calling line to a conductor allocated to the ring party substation also appearing in the ring field. During the class test one of three class register relays 1650, 1651 and 1652, of which the first, 1650, and the last, 1652, are disclosed, may be operated. If there are lines in the same office building some of which are entitled to local service only, others of which are entitled to extended service and others of which are entitled to foreign exchange service, such classes of lines will be segregated into line-finder banks and the sleeve conductors of the line finders serving such classes of line will be connected through condenser-resistance networks to the primary windings of three transformer coils 301, 302 and 303 allocated to such three classes of lines respectively. Thus, during the class test, the type of service to which a calling two-party message rate subscriber is entitled will be registered by one of the three class register relays 1650, 1651 or 1652 and, by the strapping of the inner upper front contacts of these relays over the cross-connecting rack 1653, the sender will be informed over conductors 1654, 1655 or 1656 of the cable 1600 as to whether the calling subscriber is entitled to local, extended or foreign service, respectively. The foreign service indication is given under these circumstances only in offices where the foreign exchange subscribers are not given ticketed service. If upon the class test none of the class or register relays 1650, 1651 and 1652 are operated, a circuit is established over conductor 1658 of cable 1600 upon the completion of the class test to signal the sender that no two-party message rate line was involved in the call. If any one of these relays is operated a circuit is established over conductor 1659 of cable 1600 to signal the sender that a two-party message rate line has made the call.

*Local and extended class calls*

If the office building has offices in which there are only local and extended service lines or all lines are of the same class, then it is necessary to test for only one class of two-party message rate line during the class test. Other lines in the offices of an office building which are not of the two-party message rate, coin or foreign exchange classes and are entitled to either local or extended service are segregated in the line-finder banks and a positive test is made on the local or the extended class line. A positive class test will usually be made for the class of line which completes the least number of ticketed calls. In most cases this will be the local class and therefore the register relays, for example relay 1657, allocated for this class test would, upon operating in response to the signaling current, establish a circuit over the proper strapping on the rack 1653 to the local exchange conductor 1654 of the cable 1600. In this case, if no signaling current is detected during the class test it would be assumed that the calling subscriber was of the extended class type and, therefore, upon the operation of relay 1749 in response to the detection of no signaling current to terminate the class test, a circuit would be established under control of the office unit register relay of the group 2200 to 2209, allocated to the office unit in which the calling line terminates, over cross-connections on the rack 1653 to conductor 1655 of cable 1600 to inform the sender that the calling line was of the extended class. In the event more local class lines complete ticketed calls than extended lines, the above-outlined procedure may be reversed and a positive test be made on the extended class line whereby a circuit is closed over conductor 1655 through the operation of the class register relay, such as relay 1657, and in the event no signal is detected during the class test a circuit is closed under the control of relay 1749 and the office unit register relay over conductor 1654 of cable 1600.

*Coin class calls*

Coin class information is not sent the sender but is used by the identifier to either to deny automatic ticketing service to calls of this class or to complete them on a no-ticketing basis as controlled by cross-connections associated with the type of charge relays 2643 to 2645, inclusive, of Fig. 26. The coin class test may be made during the class test, in which case coin class relay 1645 may be operated as previously described, or it may be made during the number group identification in the same manner as denied service test in which event relay 2137 would be operated to register the coin class.

*Foreign exchange class offices*

All subscribers of an office in a building may be entitled to foreign exchange service. In this case the operation of the office unit identification register relay of the group 2200 to 2209 would be effective through the cross-connections from its lower armature over the cross-connection rack 2230, to establish a signal circuit over conductor 2231 and a cross-connection on the rack 1653 to conductor 1656 of cable 1600 to register in the sender the fact that the call was initiated by a subscriber entitled to foreign exchange service.

*Transmission of calling office unit number and class identification to the sender*

As soon as a relay of the office unit register of Fig. 1 has been operated, as for example relay 2200, indicating that the calling line is in the first or office unit A, a circuit is established from ground over the No. 2 back contact of relay 2502, conductor 2232, the upper front contact of relay 2200, a strapping of cross connection rack 2233, conductor 2234 of cable 2235, the No. 53 contacts of identifier connector relay 2801F, conductor 2832 of cable 2833 to battery through the winding of the No. 0 office unit register relay 2950 of register 2960. There may be a maximum of ten relays 2200 to 2209 in the office unit register of the identifier and a corresponding number of relays in the register 2960 of the sender. Relay 2200 upon operating is also effective to transmit an indication to the sender with respect to the class of the calling line. If the calling line is of the local or extended class, a circuit will be established from ground over the inner lower front contacts of relay 2200, strapped over terminals of cross-connecting rack 2230 and conductor 2236 to the middle lower front contact of relay 1749. Under this condition if no class register relay has been operated during the class test, then relay 1749 upon operating to terminate the class test, would extend the circuit from conductor 2236 over its middle lower front contacts and a cross-connection on rack 1653 to extended class conductor 1655 of cable 1600, over the No. 34 contacts of identifier-connector relay 2800F, conductor 2834 of cable 2803, to battery through the winding of extended exchange register relay 3144 of the sender to battery. If the calling line, had been a local class line then a class register relay, for example relay 1657, would have been operated to complete a circuit from ground over the upper No. 4 back contacts of relay 2502, conductor 2548, over the lower contacts of register relay 1657 strapped over rack 1653 to conductor 1654 of cable 1600, thence over the cable, over the No. 35 contacts of identifier-connector relay 2800F, conductor 2835 of cable 2803 to battery through the winding of local class relay 3145 of the sender. If the calling office had been a foreign exchange office then the inner lower contacts of relay 2200 would have been strapped over rack 2230 to conductor 2231 which would be strapped over rack 1653 to the foreign exchange conductor 1656 of cable 1600 and extended over the No. 33 contacts of identifier-connector relay 2800F and conductor 2836 of cable 2803 to battery through the winding of foreign exchange register relay 3146 of the sender. On any call, only one of the class register relays 3144, 3145 and 3146 of the sender should be operated.

With no one of the two-party message rate class register relays 1650, 1651 and 1652 of the identifier operated a circuit is established upon the operation of relay 1749 in response to the failure to detect a class signal, which may be traced from ground over the inner upper back contact of relay 2009, conductor 2549 of cable 2100, over the upper No. 5 back contact of relay 2537, conductor 2550, the inner lower front contact of relay 1749, the inner upper back contact of relay 1758, thence in series over back contacts of register relays 1652, 1651 and 1650, conductor 1658 of cable 1600, the No. 68 contacts of identifier-connector relay 2801F, conductor 2837 to battery through the winding of relay 3147 of the sender to register the fact that the call is not of the two-party message rate class. If any one of the two-party message rate class register relays 1650, 1651 or 1652 operated, a circuit is established from ground on conductor 2550 over the inner upper front contact of relay 1758 which operated following the operation of any one of the relays 1650, 1651 or 1652, over a front contact of one of these relays, for example relay 1652, conductor 1659 of cable 1600, the No. 36 contacts of identifier-connector relay 2800F, conductor 2838 of cable 2803, to battery through the winding of register relay 3148 of the sender to register the fact that the call is of the two-party message rate class. As previously described, the operation of any one of the class register relays 1650, 1651 or 1652 is instrumental in establishing a circuit from ground on conductor 2548 over one of conductors 1654, 1655 or 1656 of cable 1600 to cause the operation of one of the register relays 3145, 3144 or 3146.

*Transmission of type of charge information to the sender*

The operated office unit register relay 2200 is also instrumental in establishing a circuit to the type of charge circuit disclosed in the left portion of Fig. 26. For this purpose the lower armature of each office unit register relay of the group 2200 to 2209 may be strapped over terminals of rack 2230 to any one of three conductors of cable 2237, terminating in the right-hand multiple terminals of cross-connecting rack 2656 of Fig. 26. Cross-connection is made to conductor 2238 if no ticket is to be made for any call initiated by any subscriber of the calling office to certain called offices as, for example, on calls from certain foreign exchange offices which may be entitled to free calls to such called offices. Cross-connection is made to conductor 2239 if a ticket is to be made for any call initiated by any subscriber of the calling office to certain other called offices and cross-connection is made to conductor 2240 if the call is to be denied.

The type of charge circuit of Fig. 26 comprises a maximum of ten relays 2643 to 2645, the operating windings of which are cross-connected over the cross-connecting rack 2642 with the No. 1 upper contacts of all route relays whereby one of such relays is operated depending upon a predetermined exchange area division of the offices of the area. Associated with these relays are two cross-connecting racks one on either side of the relays. Rack 2656 is provided along one edge with multiples of the three conductors of cable 2237 extending to the calling office unit register relays as just described and a terminal connected over conductor 2657 with a contact of the coin class register relay 1645 and along its other edge with terminals connected to front contacts of all of the ten relays of the group 2643, etc. and also with terminals connected over conductors 2658 and 2659 with the windings of relays 2774 and 2775 of Fig. 27. Rack 2660 has terminals along its right edge connected with armatures of relays of the group 2643, etc. and a terminal connected over conductor 2149 with a contact of the operator class register relay 2136 of Fig. 21 and terminals along its left edge connected over conductors 2661, 2662 and 2663 with the windings of the no-ticketing register relay 2030, with the winding of denied service register relay 2023 and with the winding of ticketing register relay 2031, respectively. By making the proper cross-connections over racks 2656 and 2660 it is possible under the joint control of the calling office unit register relay of the group 2200 and 2209 and of the relays of the group 2643, etc. operated in accordance with the called office zoning, to determine whether a call from any calling office shall be established on a ticketed or non-ticketed basis or whether such call shall be denied.

*Transmission of rate information*

In offices in which foreign exchange subscribers are given ticketing service, relays 2774 and 2775 are provided in the identifier to afford means for sending the proper rate information to the sender depending on both the route relay involved and whether or not a foreign exchange calling subscriber was involved. The upper No. 2 contacts of each route relay are connected, as previously described, over a cross-connecting rack 2773 to any one of twenty terminals connected over contacts of either relay 2774 or 2775, depending upon the initial charge rate for the foreign exchange and the non-foreign exchange subscribers to the route involved, to twenty terminals on rack 2776 which may, in turn be cross-connected to the windings of rate register relays 2790 to 2799. Twenty possible combinations of charge rates may be provided. Some of these charge conditions when the non-foreign exchange relay 2774 is operated or when the foreign exchange relay 2775 is operated are indicated in the following table:

TABLE IV

| Rate Condition | Non-Foreign Exchange | | Foreign Exchange | |
|---|---|---|---|---|
| | Rate Relay Operated | Charges | Rate Relay Operated | Charges |
| 1 | 2791 | 1 | 2790 | 0 |
| 2 | 2791 | 1 | 2792 | 2 |
| 3 | 2791 | 1 | 2793 | 3 |
| 4 | 2792 | 2 | 2790 | 0 |
| 5 | 2792 | 2 | 2791 | 1 |
| 6 | 2792 | 2 | 2793 | 3 |
| 7 | 2793 | 3 | 2790 | 0 |
| 8 | 2793 | 3 | 2791 | 1 |
| 9 | 2793 | 3 | 2792 | 2 |
| 10 | 2793 | 3 | 2793 | 3 |
| 11 | 2793 | 3 | 2794 | 4 |
| 12 | 2794 | 4 | 2792 | 2 |
| 13 | 2794 | 4 | 2793 | 3 |
| 14 | 2794 | 4 | 2794 | 4 |
| 15 | 2795 | 5 | 2794 | 4 |
| 16 | 2795 | 5 | 2795 | 5 |

If rate discrimination between non-foreign and foreign subscribers is not required as, for example, in office buildings where there are no foreign exchange offices, the No. 2 contact of the route relays may be cross-connected directly to the windings of the rate register relay 2790 to 2799.

For the initiated call from the tip party substation 100 of a flat rate two-party line terminating in office unit A and in the identification of which office unit register relay 2200 was operated, it will be assumed that such line is of the local class to which ticketing service is to be given and that there is a foreign exchange office in the same building served by the identifier. In this case the operation of relay 2200 through the cross-connection on the rack 2230 will cause the operation of the local exchange register relay 3145 of the sender, the operation of the non-foreign exchange relay 2774 over a cross-connection on rack 2656 between conductor 2239 of cable 2237 and conductor 2658, and the operation of ticketing relay 2031 over a cross-connection on rack 2656, the inner upper contacts of relay 2644, previously operated by route relay 2713, and a cross-connection on rack 2660 between conductor 2239 and conductor 2263.

With relay 2774 and route relay 2713 both operated and assuming that the rate to be charged for the initial period is two charges, a circuit is established from battery through the winding of rate register relay 2792 (not shown) of the group 2790 to 2799, strapped terminals of rack 2776, contacts of relay 2774, strapped terminals of rack 2773, the upper No. 2 contacts of route relay 2713, conductor 2551, the No. 2 contacts of relay 2541 which operated upon the completion of the units identification test to ground over the upper No. 3 back contact of relay 2502. Relay 2792 operates and connects ground over the Nos. 1 and 3 conductors 2838 and 2840 of cable 2826 in accordance with the preceding Table No. III, over the Nos. 5 and 7 contacts of identifier-connector relay 2801F, conductors 2841 and 2842 of cable 3837 to battery through the windings of relays 3827 and 3829 of the rate register 3850 whereupon these relays operate and lock as will be presently described.

*Transmission of thousands identification digit to the sender*

It will be recalled that in response to the thousands group test, thousands group register relay 2229 was operated and locked to register the thousand digit 9 and accordingly ground on conductor 2549 is applied over the lower No. 2 back contact of relay 2537 and conductor 2552 over the lower contacts of relay 2229 to a terminal of rack 2261 strapped to conductor 2242 of cable 2244. Ground on conductor 2549 is further applied over the upper No. 4 back contact of relay 2537 and conductor 2553 and the upper contacts of relay 2229 to a terminal on rack 2261 strapped to conductor 2243 of cable 2244. Therefore, in accordance with the preceding Table No. III, circuits are completed over the Nos. 13 and 15 (not shown) contacts of identifier-connector relay 2801F and conductors 3313 and 3315 of cables 2816 and 3310 to battery through the windings of relays 3303 and 3305 of the thousands digit register 3300 of the sender whereupon these relays operate and lock as will presently be described.

*Transmission of hundreds identification digit to the sender*

With the hundreds group register relay 2310 operated to register the hundreds digit 0 of the calling line number, ground on conductor 2549 is applied over the lower No. 3 back contact of relay 2537, conductor 2554 and over the lower contacts of relay 2310 to a terminal on rack 2361 strapped to conductor 2349 of cable 2350. Ground on conductor 2549 is further applied over the upper No. 3 back contact of relay 2537, conductor 2555 over the inner upper contacts of relay 2310 to a terminal on rack 2361 strapped to conductor 2348 of cable 2350. Therefore, in accordance with the preceding Table No. III, circuits are completed over the Nos. 29 and 30 contacts of identifier-connector relay 2810F and conductors 3334 and 3335 of cables 2816 and 3330 to battery through the windings of relays 3324 and 3325 of the hundreds digit register 3320 of the sender whereupon these relays operate and lock as will presently be described.

*Transmission of the tens identification digit to the sender*

When the tens group register relay 2419 operated to register the tens digit 9 of the calling line number, ground on conductor 2549 is applied over the lower No. 4 back contact of relay 2537, conductor 2556, over the lower contacts of relay 2419 to a terminal on rack 2461 strapped to conductor 2449 of cable 2450. Ground on conductor 2549 is further applied over the No. 2 upper back contact of relay 2537, conductor 2557, over the inner upper contacts of relay 2419 to a terminal on rack 2461 strapped to conductor 2448 of cable 2450. Therefore, in accordance with the preceding Table III, circuits are completed over the Nos. 23 and 25 contacts of identifier-connector relay 2801F and conductors 3353 and 3355 of cables 2816 and 3350 to battery through the windings of relays 3343 and 3345 of the tens digit register 3340 of the sender whereupon these relays operate and lock as will presently be described.

*Transmission of the units identification digit to the sender*

When the units register relay 2515 operated to register the units digit 5 of the calling line number, ground on conductor 2549 is applied over the lower No. 5 back contact of relay 2537, over the lower contacts of relay 2515 to a terminal on rack 2561 strapped to conductor 2558 of cable 2560. Ground on conductor 2549 is further applied over the upper No. 1 back contact of relay 2537 and the inner upper contacts of relay 2515 to a terminal on rack 2561 strapped to conductor 2559 of cable 2560. Therefore, in accordance with the preceding Table No. III, circuits are completed over the Nos. 17 and 18 contacts of identifier-connector relay 2801F and conductors 3372 and 3373 of cables 2816 and 3370 to battery through the windings of relays 3362 and 3363 of the units digit register 3360 of the sender, whereupon these relays operate and lock as will presently be described.

*Second check test*

When the units digit identification has been completed and the class rate information has been sent to the sender, the sender should have all of the information required from the identifier. Following the registration of the digits of the calling line in the registers 3300, 3320, 3340, 3360 and 2960 of the sender and the registration of the other information concerning the calling line by the operation of relays of the rate register 3850, of either relay 3147 or 3148 and one of the relays 3144, 3145 and 3146, a test circuit is established through the contacts of relays of these registers which should be continuous if two relays of each register 3300, 3320, 3340, 3360 and 3850 have been operated, if either relay 3147 or 3148 has been operated, if one of the relays 3144, 3145 and 3146 has been operated and one relay of register 2960 has been operated. This circuit may be traced from battery through the winding of relay 2538, over conductor 2539 of cable 2580, the No. 26 contacts of identifier-connector relay 2800F, conductor 2843 of cable 2803, the lower No. 1 contacts of relay 3208, the third from upper back contact of relay 3217, conductor 3218 to rate register 3850, thence over the upper back contact of relay 3831 thereof, the upper back contact of relay 3830, the middle lower front contact of relay 3829, the upper back contact of relay 3828, the upper front contact of relay 3827, conductor 3219, the upper back contact of relay 3146, the upper back contact of relay 3144, the upper front contact of relay 3145 assumed to be operated to register the fact that the call was from a local service line, the lower front contact of relay 3147 operated to register the fact that the calling line was not of the two-party message rate class, over the upper back contact of relay 3148, conductor 3149, to thousands digit register 3300, thence over the upper back contact of relay 3301 thereof, over the lower back contact of relay 3302, the inner upper front contact of relay 3303, the lower back contact of relay 3304, the inner upper front contact of relay 3305 to hundreds digit register 3320, thence over the upper back contact of relay 3321 thereof, over the lower back contact of relay 3322, the lower back contact of relay 3323, the lower front contact of relay 3324, the inner upper front contact of relay 3325 to tens digit register 3340, thence over the upper back contact of relay 3341 thereof, over the lower back contact of relay 3342, the inner upper front contact of relay 3343, the lower back contact of relay 3344, the inner upper front contact of relay 3345, to the units digit register 3360, thence over the upper back contact of relay 3361 thereof, over the lower front contact of relay 3362, the middle lower front contact of relay 3363, the upper back contact of relay 3364, the upper back contact of relay 3365, conductor 3366, the No. 5 front contact of relay 2959 of register 2960 which was operated to register the office unit identification, thence in series over the lower back contacts of other relays of the register 2960, conductor 2926, the No. 52 contacts of identifier-connector relay 2801F, conductor 2540 of cable 2500 to ground at the lower back contact of relay 2538 and, in parallel therewith, to ground through the winding of relay 2542. With this circuit established, relay 2538 operates thereby permitting relay 2542 to be operated indicating that there was a complete checking path over contacts of the register relays in the sender without any trouble grounds.

With relay 2538 operated a circuit is established from ground over its lower front contact, conductor 2563 of cable 2100, the lower back contact of relay 2009, conductor 2031 of cable 2000, the No. 64 contacts of identifier-connector relay 2801F, conductor 2844, the No. 3 lower contacts of relay 3106, to conductor 3150, to which the operated relays 3027 and 3029 of the rate register 3050 of the sender now lock over their inner lower front contacts, and to conductor 3113 to which the operated relays of registers 2960, 3300, 3320, 3340 and 3360 and operated relays 3145 and 3147 lock. With relays 2033 and 2505 operated as previously described, a circuit is also established upon the operation of relay 2538 which may be traced from battery through the winding of relay 2502, over the lower front contact of relay 2505, the inner lower front contact of relay 2538, conductor 2564 of cable 2100, the upper contacts of relay 2033, the inner upper back contact of relay 2010 to ground over the inner upper front contact of relay 2011. Relay 2502 thereupon operates in turn operating relay 2537. Relays 2502 and 2537 upon operating open all of the ground paths controlling the operating circuits of the calling line digit registers of the sender. Relay 2537 also opens at its No. 6 back contact the operating circuit of slow-to-release relay 2505. During the releasing time of relay 2505 the operated register relays of the sender will be held operated over the locking paths of such relays. In case any of the register relays in the sender fail to remain operated over their locking circuits, the check circuit previously traced will be opened and relays 2538 and 2542 will release. When relay 2505 becomes fully released, a circuit will be established from ground over the lower contacts of relay 2003, conductor 2035 of cable 2100, over the back contact of relay 2505, the upper back contact of relay 2538, conductor 2565 of cable 2100, conductor 2133 to battery through the winding of relay 2027 and to the trouble indicator to perform the functions to be later described. If the sender register relays remain operated, then relays 2538 and 2542 will remain operated and when relay 2505 releases a circuit will be established from ground over the lower contacts of relay 2003, conductor 2035 of cable 2100, over the back contact of relay 2505, the upper front contact of relay 2538, the front contact of relay 2542, conductor 2566 of cable 2100, the lower back contact of relay 2036, the lower back contact of relay 2030, the lower front contact of relay 2731, conductor 2038 of cable 2000, the No. 29 contacts of identifier-connector relay 2800F, conductor 2845 of cable 2803 to battery through the winding of relay 3204 of the sender to inform the sender that it may release the identifier.

On a call for which no ticket is to be printed, the no-ticketing register relay 2030 instead of ticketing relay 2031 would be operated in response to the identification of the calling line. In this case an obvious circuit is established for relay 2030. Relay 2024 upon operating establishes a circuit from ground over the upper back contact of relay 2040, the inner upper front contact of relay 2030, the upper back contact of relay 2036, conductor 2042, the No. 14 contacts of the identifier trunk connector relay 4459F, conductor 740, the No. 1 contacts of relay 710 of the trunk, conductor 741 to battery through the lower winding of relay 805. Relay 805 upon operating notifies the trunk that the call is not to be ticketed and locks through its lower winding and lower No. 4 contacts over conductor 811 to ground over the upper front contact of relay 712. Relay 2024 upon operating establishes a circuit from ground over the No. 5 back contact of relay 2502, conductor 2567 of cable 2100, the upper front contact of relay 2024, conductor 2039 of cable 2000, the No. 32 contacts of identifier-connector relay 2800F, conductor 2846 of cable 2803 to battery through the winding of no-ticketing register relay 3217 of the sender. On this type of call as no ticket will be printed the sender will not require any of the calling number or class information. However, with relay 3217 operated, the check circuit is completed from battery through the winding of relay 2538, over conductor 2539 of cable 2500, the No. 26 contacts of identifier-connector relay 2800F, conductor 2843 of cable 2803, the lower No. 1 contacts of relay 3208, the upper front contact of relay 3217, conductor 2926, and thence as traced to ground at the lower back contact of relay 2538 and, after relay 2538 operates, to ground through the winding of relay 2542. Relay 2538 upon operating will connect ground to conductor 3113 to lock relay 3217 and will cause the operation of relays 2502 and 2537 followed by the release of relay 2505. If relay 3217 now remains operated over its locking circuit, a circuit will be established upon the release of relay 2505 from ground over the lower contacts of relay 2003, conductor 2035 of cable 2100, over the back contact of relay 2505, the upper front contact of relay 2538, the front contact of relay 2542, conductor 2566 of cable 2100, the lower back contact of relay 2036, the lower front contact of relay 2030 to battery through the winding of relay 2040. Relay 2040 upon operating removes ground from the operating circuit of the no-ticketing relay 805 of the trunk and over its lower front contact connects one winding of relay 2043 to conductor 2042 over which relay 805 was operated. If relay 805 is locked operated, relay 2043 will now operate from such locking ground and will establish a circuit from ground over the lower front contact of relay 2040, the front contact of relay 2043, the lower back contact of relay 2031 and thence as traced to battery through the winding of relay 3204 of the sender to inform the sender that it may proceed to release the identifier.

On calls from an operator's position, in which case relay 2136 is operated, as previously described, a circuit is established from ground over its upper contacts, conductor 2149, strapped over terminals of cross-connecting rack 2660, to conductor 2661, and to battery through the winding of the no-ticketing register relay 2030. Relay 2030 thereupon functions as just described to inform both the trunk and the sender that no ticket is required.

On calls which are to be denied service, relay 2023 is operated over conductor 2662 which may be strapped at cross-connecting rack 2660 to be operated through the joint operation of one of the called office area relays and the calling office unit register relay if a subscriber of the calling office is to be denied service to the particular office called, or relay 2023 may be operated over cross-connections on the rack 2664 and over conductor 2150 when relay 2137 is operated in response to the detection of signaling current over the sleeve conductor of a calling line during the thousands group test, or over a circuit from ground over the middle upper front contact of relay 2021, conductor 2044, the upper contacts of coin class register relay 1645 when operated on a coin class call, and conductor 2657 over strapping on block 2664. Relay 2023 may also be operated over an obvious circuit controlled by the vacant code relay 2045, the circuit of the latter relay being completed over cross-connections on racks 2617, 2614 and 2611 should the calling subscriber dial a vacant code point. When relay 2023 operates it establishes a circuit from ground over the upper back contact of relay 2031, the upper back contact of relay 2024, the upper front contact of relay 2023, the inner front contacts of relay 2021, conductor 2046, the No. 15 contacts of identifier trunk connector relay 4559F, conductor 742, over the No. 4 contacts of relay 718 to battery through the winding of relay 732 of the trunk. Relay 732 thereupon operates to inform the trunk to release the subscriber with a proper tone signal or to complete the connection to a special operator's position. Relay 732 upon operating, locks over its No. 1 contacts and conductor 811 to ground over the upper front contacts of relay 712.

When the trunk involved in the connection is of the no-ticketing type, its relay 718 will be arranged to establish a circuit from ground over the No. 1 contacts of the trunk identifier connector relay which has associated such trunk with the identifier as, for example, a relay corresponding to relay 4569F in which the No. 1 contact is shown unwired, thence over conductor 2047 to battery through the winding of relay 2036 to inform the identifier that no ticket should be printed. Relay 2036 upon operating causes the operation of relay 2024 which, as previously described, signals the sender that the call is of the no-ticketing type. To insure that relay 2036 was not operated by a trouble ground a check test is made while it is operated by connecting the winding of relay 2037 to conductor 2042 over its inner upper front contact. In case relay 2036 has been operated by a false ground on a trunk circuit that was not of the no-ticketing type, relay 2037 will be operated in the circuit previously traced to battery through the winding of relay 805 of the ticketing trunk and, over its lower contacts, will connect ground through the winding of relay 2027 to battery and to the trouble indicator to give a trouble indication. As no identification signal current will be transmitted to the sleeve of the calling line, and no calling number or class identification will be made on calls from a no-ticketing trunk, the call will always be completed on a no-ticketing basis and no provision is made to deny service to any routes.

With either relay 2023 operated on a denied-service call, or relay 2024 operated on any no-ticketed call the circuit of relay 2101 is opened either at the lower back contact of relay 2023 or at the lower back contact of relay 2024 so that relay 2101 cannot be operated to start the calling number and class identification test as previously described, or if such test has been started prior to the operation of either relay 2023 or 2024, then to stop such test.

To insure that there is no false ground on the circuit which extends from the winding of relay 805 in the trunk, thence as traced to conductor 2042, which might give the trunk a false no-ticketing indication, a circuit is effective from conductor 2042, over the upper back contact of relay 2036 and the upper back contact of relay 2030 to battery through the winding of relay 2048 as soon as the trunk identifier connector has connected the calling trunk with the identifier. If a false ground is found, relay 2048 will operate to establish the circuit of relay 2027 and to give a trouble indication. Also to insure that there is no false ground on the circuit including conductor 2041 which extends over the contacts of the identifier connector to the sender and over which circuit a trouble release signal is sent to the sender when any of the previously-described trouble conditions arise in the identifier, the upper winding of test relay 2049 is connected over the lower back contact of relay 2009 and conductor 2041 as soon as the identifier is seized by the sender. If a false ground is detected, relay 2049 will operate, lock through its lower winding over its lower contacts to ground over the upper No. 2 contacts of relay 2002, cause the operation of relay 2027 and give the trouble indicator a signal.

Whenever either relay 2025 or 2027 operates on any trouble condition as previously described, relay 2026 is operated and a circuit is established from battery over its No. 2 contacts, the lower back contacts of relay 2028, to the trouble indicator. Assuming that the trouble indicator is idle, the closure of this circuit operates a relay in the trouble indicator which is instrumental in connecting various leads from the identifier to the trouble indicator for making a lamp record of the condition of the identifier at the time the trouble was encountered. A circuit is also established from the 130-volt battery 2784 over the inner upper contacts of relay 2704, through resistance 2781E, conductor 2695, over the No. 7 front contact of relay 2026, conductor 2050, through resistance 2781B and condenser 2781C to ground. Condenser 2781C starts to charge over this circuit and after an interval of approximately two seconds if the trouble indicator has not performed its functions, the potential from source 2784 becomes applied through resistance 2781D to the left cathode of the tube of timer 2781 and, since the right cathode of the tube is connected over the upper normal contacts of anode relay 2781A and conductor 2666 to ground over the upper No. 2 contacts of relay 2002, the tube will fire across its cathode gap thereby discharging condenser 2781C and operating the anode relay 2781A in a circuit from ground over the cathode-anode gap of the tube through the lower winding of anode relay 2781A to battery 2784. The anode relay upon operating locks over its upper alternate contacts to ground on conductor 2666, extinguishes the tube and establishes a circuit from ground over its lower contact, conductor 2667, the No. 5 contacts of relay 2026 to battery through the winding of relay 2009. If it be assumed that the trouble indicator completes its functions before the expiration of the two-second time period, it causes the operation of relay 2028 in the identifier, which locks over its lower winding and its lower front contact to ground over the No. 1 front contact of relay 2026; opens at its lower back contact the circuit over which the trouble indicator was summoned thus releasing the trouble indicator and establishes the circuit of relay 2009 which may be traced from battery through its winding, over the No. 5 contacts of relay 2026, the upper front contact of relay 2028, conductor 2029 to ground over the back contact of anode relay 2781A of the trouble indicator timer 2781.

With relay 2009 operated a signal is transmitted to the sender from ground over its front contact, conductor 2041 of cable 2000, the No. 65 contacts of identifier-connector relay 2801F, conductor 2847, over the upper back contact of relay 3220 to battery through the winding of relay 3206 of the sender. Relay 3206 operates, locks over a circuit through its own winding, the winding of relay 3220, over its inner upper front contact, conductor 3808 to ground over the inner upper front contact of relay 3801. At its lower back contact relay 3206 opens the previously-traced operating circuit for preference relay 2900F of Fig. 29 which releases in turn releasing the identifier-connector relays 2800F and 2801F. All direct connections between the sender and identifier are now opened and any operated apparatus of the identifier is returned to its normal condition. Relay 3206 also establishes a circuit from ground over its upper contacts, conductor 3221, the lower contacts of operated relay 2802F, conductor 2848 and to battery over the lower contacts and the lower winding of relay 2930F allocated to the identifier which gave the trouble release signal. The purpose of keeping relay 2930F operated is to force the sender to be connected to another identifier for a second trial.

When relay 2801F released, the circuit over which relay 3206 was operated from the identifier is opened whereupon relay 3220 operates in the locking circuit of relay 3206 and recloses the start circuit over its lower front contacts whereupon, with relay 2930F operated, the start relay of another idle identifier, such for example as 2900L, is operated to in turn cause the operation of the associated identifier-connector relays such as 2800L and 2801L to associate the sender with such other identifier. If the second identifier is successful in handling the call, relays 3204 and 3208 will be operated in the manner previously described. If the second identifier is, for any reason, unable to handle the call, such identifier will in the manner described connect ground to conductor 2847 which is now extended over the upper front contact of relay 3220, through the winding of relay 3222 to battery whereupon the latter relay will operate and lock over its inner contacts to ground on conductor 3803. If the trouble which caused the failure was in connection with the reconstruction of the called office code, relay 3208 will not have operated and consequently relay 3222, upon operating, establishes a circuit from ground over the lower No. 4 back contact of relay 3208, through the winding of relay 3204 to battery and the sender will proceed to send an all-paths-busy signal to the trunk as later described. However, if the trouble which caused the trouble release was with the identification of the calling line, relay 3208 will have operated and, in this case, the sender will proceed to establish a connection to the sender monitor operator's position as soon as the calling subscriber completes dialing.

*Emergency relays of common class and number circuit*

Since only one common class and number circuit is provided for each office building and a trouble condition therein might prevent the identification of any calling line in such building, a set of emergency number circuit lock-out relays, corresponding to the group of relays 1400F, 1400I and 1400L, and a set of emergency class circuit lock-out relays, corresponding to the group of relays 1410F, 1410I and 1410L, are provided. When all of the relays 1400F, etc. of the group which is in normal service are normal, a chain circuit is established from battery through the left winding of relay 1330, over normal contacts of key 1331, the middle upper back contact of transfer relay 1307, thence in series over the lower normal contacts of all lock-out relays 1400F, etc. to ground, and a second chain circuit is established from battery through the right winding of relay 1330, over the inner upper back contact of transfer relay 1307, thence in series over the upper back contact of lock-out relay 1400L and the inner upper back contacts of the other lock-out relays of the group, through resistance 1402 to battery. Relay 1330, however, being differentially wound does not operate so long as both chain circuits are either closed or open. If, however, due to a trouble condition one chain circuit remains open while the other remains closed, relay 1330 operates and establishes a circuit from ground over its front contact and the outer left normal contacts of key 1332 to battery through the winding of transfer relay 1300. Relay 1300 operates in turn establishing obvious circuits for transfer relays 1306 and 1307 which also operate. With transfer relays 1300, 1306 and 1307 all operated the control conductors extending to and from the regular group of lock-out relays 1400F, etc. are transferred to the similar emergency group of lock-out relays. The previously traced circuits through the windings of relay 1330 are now opened and relay 1330 differentially releases but the slow-to-release relay 1300 has sufficient time to become locked over its inner lower front contact and the inner left normal contacts of key 1332 before its operating circuit is opened by the release of relay 1330. With transfer relay 1307 operated, the circuit of alarm lamp 1333 is established from battery therethrough, over the upper front contact of relay 1307, over the outer right normal contacts of key 1332 to ground and the circuit to an audible alarm is established from ground over the inner right normal contacts of key 1332 and the lower front contact of relay 1307.

To extinguish the lamp 1333 and to silence the audible alarm the key 1332 is operated, thereby transferring the holding circuit of transfer relay 1300 over the inner left alternate contacts of key 1332 and the back contact of relay 1330 to ground. Relay 1330 is now enabled to function with the emergency group of lock-out relays to detect a trouble condition therein and if operated to release the operated transfer relays, to restore the regular group of lock-out relays to service.

Relay 1340, keys 1341 and 1342 and lamp 1343 are associated with the transfer relays 1320, 1326 and 1327 and perform similar functions with respect to the substitution of an emergency group of class circuit lock-out relays for the regular group of lock-out relays 1410F, 1410I and 1410L.

*Cut through of connection at the ticketing trunk*

It will be recalled that following the completion of out-pulsing, relay 3139 was operated. It is desirable to cut the ticketing trunk through to the transmission condition as soon thereafter as possible so that there will be no unnecessary delay to the calling subscriber in completing the call. If the call is not from a two-party message rate subscriber's line, relay 3147 will be operated as previously described whereupon a circuit will be established from ground over the upper No. 3 contacts of relay 3010, conductor 3017, the upper contacts of relay 3139 through the two windings of relay 3151 in series, the upper contacts of relay 3147, conductor 4629, the lower No. 2 contacts of cut-through relay 4620 of trunk finder 4600, brush 4623, conductor 721, over the lower contacts of relay 718 to battery through the winding of the cut-through relay 710 of the trunk. With both windings of relay 3151 included in this circuit, trunk relay 710 does not operate but relay 3151 operates and establishes an obvious circuit for relay 3152 which operates and locks over its upper contacts to ground on conductor 3109 and, over its inner lower contact, short-circuits the upper winding of relay 3151 to increase the current through trunk relay 710 in the trunk, causing said trunk relay to operate and lock over its lower No. 1 contacts and conductor 811 to ground over the upper front contact of relay 712. This locking ground now applied over the circuit previously traced through the windings of relay 3151 shunts the lower winding of relay 3151 whereupon relay 3151 releases. With relay 3151 released and relay 3152 operated a circuit is now established from ground over the back contact of relay 3151, the lower front contact of relay 3152, conductor 3153, to battery through the winding of relay 3006 which thereupon operates and, at its upper and lower No. 4 back contacts, opens the circuit previously traced over which out-pulsing has been controlled. Relay 3006 over its upper No. 2 and lower No. 1 contacts establishes a loop across the tip and ring conductors 4627 and 4628 extending from the trunk finder to the sender whereby relay 3800 of the sender is maintained operated after its previously traced circuit has been opened through the operation of relay 710 of the trunk as will be presently described.

At the trunk upon the operation of relay 710 the circuit of relay 709 is opened at the lower No. 4 back contact of the former relay but relay 709 is now held operated over its lower No. 2 contacts, conductor 725, the lower No. 2 back contact of relay 800, conductor 803, to ground over the upper No. 1 contacts of relay 710. Relay 710 at its upper and lower No. 2 alternate contacts transfers the circuit previously traced through the windings of relay 3800 of the sender to the windings of supervisory relay 806. Relay 806 in the trunk now operates over a circuit from the tip conductor of the calling line, to trunk conductor 700, thence over the upper No. 2 alternate contacts of relay 710, conductor 726, the upper left winding of repeating coil 804, the upper No. 4 back contact of relay 805 to ground through the upper winding of relay 806 and, over the ring conductor from the calling line to trunk conductor 701, thence over the lower No. 2 alternate contacts of relay 710, conductor 727, the lower left winding of coil 804 and the upper No. 5 back contact of relay 805 to battery through the lower winding of relay 806. Relay 806 operates and closes a circuit for holding relay 712 operated, said circuit extending from battery through the winding of relay 712, over conductor 728, contacts of relay 806, conductor 729 to ground over the inner lower front contacts of relay 712. Relay 806 is thus under the control of the calling subscriber to control the holding of the trunk. Relay 710 also establishes a circuit extending to the called subscriber's line which may be traced in part from tip conductor 809, over the upper No. 4 contacts of relay 710, conductor 812 through the upper right winding of repeating coil 804, through the winding of called supervisory relay 813, conductor 814, the upper No. 4 back contact of relay 714, conductor 815, through the lower right winding of coil 804, conductor 816 and the lower No. 3 contacts of relay 710 to ring conductor 810. Relay 813, however, is polarized and does not receive current in the right direction at this time to cause its operation. Relay 710 also connects ground over its upper No. 3 front contact, the lower front contact of relay 712, through retard coil 733 and thence to the sleeve conductor 702 of the trunk.

*Response of the called subscriber*

When the called subscriber answers, the direction of current flowing through the winding of supervisory relay 813 is reversed whereupon it operates to in turn establish an obvious circuit for reversing relay 817 which operates. Thereafter when ground is applied to conductor 907 from the miscellaneous interrupter frame, a circuit is completed from ground on said conductor, over the lower No. 2 normal contacts of relay 818, over the lower contacts of relay 817, the lower No. 3 back contact of relay 801, conductor 819, the inner upper contacts of relay 712, conductor 820 to battery through the lower winding of relay 818. Relay 818 thereupon operates locking to the direct ground over its lower No. 2 alternate contacts and connecting ground over its upper No. 4 contacts and over the lower No. 3 back contact of relay 800 to start conductor 908 extending to the miscellaneous interrupter frame to start the measurement of a time interval. After two-seconds delay ground will be applied to conductor 899 at the interrupter frame thereby completing a circuit over the upper No. 2 contacts of relay 818, through the upper No. 1 normal contacts and winding of relay 800, to battery whereupon relay 800 operates and locks over its upper No. 1 alternate contacts, over the upper No. 1 back contact of relay 805 and conductor 821 to ground at the upper No. 4 back contact of transfer relay 700 which latter relay released upon the operation of relay 800 and the opening of the lower No. 3 back contact thereof.

*Timing the conversation*

With relay 800 operated a circuit is established from ground over contacts of relay 743, which is operated once every fifteen seconds by the telechron clock operated timer 744, over conductor 745, the lower No. 5 contacts of relay 800, the lower No. 3 back contact of relay 805, over the upper No. 1 contacts and through the upper winding of relay 818 to battery to hold such relay operated and over conductor 822 to battery through the winding of stepping magnet 957 of the units timing switch 950. Thus at fifteen-second intervals the brushes of such timing switch are advanced step by step. If the conversation continues until the switch 950 advances its brushes 952, 954 and 956 to the No. 16 terminals of their associated arcs, a circuit will be closed from ground applied to conductor 822, thence as traced through the winding of stepping magnet 957 of switch 950 and also over the upper No. 2 back contact of relay 806, over brush 956 and the No. 16 terminal of its arc, over the lower No. 3 back contact of relay 906 to battery through the winding of the stepping magnet 903 of the tens timing switch 900. The operation of magnet 903 will advance the brushes 901 and 902 of switch 900 one terminal thereby causing the brushes of this switch to advance one step for each revolution of switch 950. In this manner, switch 950 is used as a measure of the units of conversation time while switch 900 measures the tens. The terminals 1, 39 and 40 on the arcs of the units switch 950 are passed by when the tens switch 900 has made one step or more until switch 900 reaches its tenth step position. The units switch 950 always passes by its No. 22 position terminal by the establishment of a circuit from ground on brush 951, the No. 22 position terminal of its arc and over the interrupter contacts and through the winding of stepping magnet 957 to battery. The advance of switches 900 and 950 continue in this manner throughout the conversation until 99 minutes have elapsed at which time, after printing 99 on the ticket as subsequently set forth, the switches are restored to normal and another cycle of 99 minutes is begun and proceeds as above described.

*Call from two-party message rate line*

If the call is from a two-party message rate line it is necessary to give a momentary reversal from the ticketing trunk toward the calling line to cut the trunk through for supervision. This reversal starts as soon as the calling subscriber completes dialing and the end of dialing relay 3201 has been operated as previously described. When relay 3201 operates and with register relay 3148 operated from the identifier to register the fact that the call was from a two-party message rate line, a circuit is established from battery through the winding of reversing relay 3100, over the back contact of relay 3154, conductor 3155, the inner upper back contact of relay 3217, the lower front contact of relay 3148, conductor 3156 to ground over the lower contacts of relay 3201. Relay 3100 upon operating reverses the tip and ring conductors of the dialing circuit previously traced from the windings of relay 3800 over the calling line loop and causes the operation of a polarized relay in the first selector trunk of the established connection to cut through the connection. Relay 3100 also establishes an obvious circuit for slow-to-operate relay 3154 which operates and locks over its upper front contact to the locking ground of relay 3148 and at its upper back contact opens the circuit of slow-to-release relay 3100. Relay 3100 upon releasing restores the tip and ring conductors to their former condition and with relay 3154 operated establishes a circuit from ground over the upper No. 3 contacts of relay 3010, conductor 3017, the upper contacts of relay 3139 as soon as out-pulsing has been completed, through the two windings of relay 3151 in series, the upper back contact of relay 3100, the lower contacts of relay 3154, the middle lower contacts of relay 3148, conductor 4629, the lower No. 2 contacts of relay 4620 of the trunk finder 4600, brush 4623, conductor 721, over the lower contacts of relay 718 to battery through the cut-through relay 710 of the trunk. From this point the trunk circuit functions as previously described.

*Operation of sender-trunk connector*

After the identifier transmitted all of the information to the sender required for the completion of the connection, relay 3204 was operated as a signal to the sender to complete the establishment of the connection and that a ticket should be printed. Relay 3204 upon operating locked over its lower No. 4 contacts to ground on off-normal conductor 3103; connected ground over its upper No. 1 contacts to conductor 2844 for holding the various register relays of the sender previously operated from the identifier to register the calling number and class information; opened at its lower No. 1 contacts the previously traced circuit of the identifier preference relay 2990F which thereupon released to in turn release identifier connector relays 2800F and 2891F which completely disconnect the identifier from the sender and thereby initiate the release of all operated apparatus of the identifier and, through the release of relay 2707, the release of lock-out relay 4558F and connector relay 4559F of the identifier trunk connector of Fig. 45. At its upper No. 4 back contact relay 3204 opened one blocking circuit for blocking the establishment of the connection if the calling line was not entitled thereto; at its upper No. 2 contact established a circuit for relay 3018 extending from battery through the winding thereof over conductor 3019, the upper back contact of relay 3217, the upper No. 2 contacts of relay 3204, conductor 3020, conductor 4657, over the upper No. 1 contacts of relay 4620 of the trunk finder, over the lower front contact of relay 4608 to ground applied to conductor 4610 from the sender. Had the calling trunk been selected by the B trunk finder 4500, a similar circuit would have been established for relay 3021 over conductor 3022, the next to upper back contact of relay 3217, the upper No. 3 contacts of relay 3204 and conductors 3023 and 4557, over contacts of a relay of the trunk finder 4500 corresponding to relay 4620, and thence to ground over conductor 4610 at the sender.

Relay 3018 upon operating connects battery through resistance 3024, over its lower contact to conductor 4633, thence over the lower No. 1 contacts of relay 4620, brush 4634 of trunk finder 4600, conductor 4635, the upper contacts of relay 3018, conductor 3024 of cable 3025 allocated to the group of ten ticketing trunks appearing in the tenth vertical group of the bank of trunk finder 4600 and in which group the calling trunk is located, through the winding of lock-out relay 4730F of the sender trunk connector circuit A of Fig. 47 allocated to the first sender assumed to be in use for the connection and to the vertical group of trunks in which the calling trunk is located, thence to ground over the inner upper normal contacts of the lock-out relays of all other senders having access to the same group of trunks if the sender trunk connector circuit is not being used by another sender. Relay 4730F operates, locks over its upper alternate contacts to ground, establishes an operating circuit for the multi-contact connector relay 4731F from ground through the winding of such relay, over the inner lower front contacts of relay 4730F, through resistance 4750 to battery and establishes a circuit from battery through resistance 4751, over the middle upper front contact of relay 4730F, conductor 4752, over the lower No. 3 contacts of relay 3010, the lower No. 3 front contact of relay 3005, conductor 4630, over the lower No. 3 contacts of relay 4620 and brush 4624 of trunk finder 4600, conductor 722, through the winding of multi-contact relay 4700, conductor 746 to ground over the lower No. 2 back contact of relay 708. With multicontact relays 4731F and 4700 now both operated a plurality of circuit paths are established from the ticketing trunk to the sender for the purpose of transferring registered information from the sender to the ticket printer of the trunk.

It is to be noted that ten subgroups of ten trunks each of the A group of one hundred trunks appear in the vertical rows of terminal sets of the banks of the trunk finders of the A group, and that each of the sender trunk connector circuits of which one is disclosed in Fig. 47, serves a group of ten trunks, such connector circuit having a relay such as 4731F for each sender and ten relays, such as 4700, for the ten trunks of the subgroup which it serves. Nine similar sender trunk connectors would be provided to serve the other nine subgroups of trunks. Similarly ten sender trunk connector circuits are provided in a B group to serve the ten subgroups of trunks of the B group which appear in the vertical rows of terminal sets of the banks of the trunk finders of the B group, such as finder 4500. One of such B group sender trunk connector circuits is disclosed in Fig. 48. Had the calling trunk been in a subgroup of the B group of trunks and sender relay 3021 been operated, then a circuit would have been established from battery through resistance 3025, over the lower contacts of relay 3021, conductor 4622, thence over the lower No. 1 contacts of the relay of trunk finder 4500 corresponding to relay 4620, a brush of such finder, over conductor 4635, the upper contacts of relay 3021, conductor 3034 of cable 3035, through the winding of lock-out relay 4830F allocated to the first sender and to the sender trunk connector circuit of Fig. 48, thence over the inner upper normal contacts of other lock-out relays to ground. Relay 4830F upon operating causes the operation of multicontact relay 4831F and the operation of such relay together with the operation of relay 4800 individual to the calling trunk extends control conductors from the sender to the ticket printer of the trunk.

With relays 4700 and 4731F both operated a circuit is established from ground over the No. 16 contacts of these relays, conductor 4726 to battery through the winding of relay 3157. Relay 3157 now operates as a signal to the sender that connections have been established to the trunk through the operation of a sender trunk connector. With relay 3157 now operated a circuit is established from ground over the lower No. 3 contacts of relay 3204, over the lower back contact of relay 3217, conductor 3224, the lower front contact of relay 3157, conductor 3158, brush 3252 of switch 3250 and the normal terminal of its associated arc through the winding and interrupter contacts of stepping magnet 3255 to battery. Magnet 3255 thereupon operates and releases to advance the brushes of switch 3250 one step whereupon the circuit of magnet 3255 is opened at brush 3252.

*Initiation of ticket printing*

With the brushes 3252 and 3254 of switch 3250 on the No. 2 terminals of their arcs and the printer control conductors 910 to 925 extended over contacts of relays 4700 and 4731F of the sender trunk connector and conductors 4710 to 4725 respectively of the sender, a circuit is established from ground over the lower No. 5 contacts of relay 3106, conductor 3159, over the normal contacts of relay 3225, brush 3254 and the No. 2 terminal of its arc, over the lower No. 2 back contact of relay 3226, conductor 4724, the No. 2 contacts of relays 4731F and 4700, conductor 924 to the (*) segment of the distributor of the printer 960. A circuit is also established from a source of alternating current through the driving motor 961 of the printer, which is coupled to the driving shaft of the printer through a friction clutch (not shown), conductor 925, the No. 1 contacts of relays 4700 and 4731F, conductor 4725, over the inner lower back contact of relay 3217 to ground over the lower No. 3 front contact of relay 3204 whereupon the motor operates to rotate the typewheel and to advance the distributor brush 962 over the distributor segments until it engages the segment to which ground potential has been applied, at which time a circuit is completed from ground over that segment, over the brush 962 and ring 963 to battery through the winding of print magnet 964. The armature of magnet 964 carries a stabber which enters a slot in the distributor when the selected character has been positioned for printing thereby arresting the rotation of the printer shaft and pressing the ticket tape against the typewheel to print the selected character, in this case an asterisk. When the stabber enters the slot the contacts shown associated with the magnet 964 are closed whereupon ground is connected over conductors 920 and 921, the Nos. 20 and 19 contacts of relays 4700 and 4731F, to conductors 4720 and 4721. With ground connected to conductor 4721 the circuit of relay 3225 is completed and relay 3225 operates, locking over its lower contacts to ground connected to conductor 4720; establishing a circuit for stepping magnet 3255 which may be traced from ground on conductor 4720, over the lower contacts of relay 3225, the lower No. 2 front contact of relay 3204, the No. 2 terminal of the arc of switch 3250 with which brush 3252 is engaged, over the interrupter contacts and through the winding of magnet 3255 to battery and opening at its upper contacts the previously traced circuit of print magnet 964. Magnet 964 thereupon releases and when the stabber is entirely removed from the slot the locking circuit of relay 3225 is opened and relay 3225 releases in turn releasing magnet 3255 to advance the brushes 3252 and 3254 of switch 3250 to the No. 3 terminals of their arcs. Magnet 964 upon releasing also permits the motor 961 to again rotate the typewheel and brush arm 962 of the printer. When the brush 3254 engages with the No. 3 terminal of its arc, the ticket printer is controlled in the manner just described to print a second asterisk on the ticket whereupon the brushes 3252 and 3254 of switch 3250 are again advanced to the No. 4 terminals of their arcs.

*Printing calling office code*

It having been assumed that relay 2950 of the office unit register 2960 has been operated to register the office unit designation of the calling line, the sender now proceeds to control the ticket printer to print the three office code digits of the directory number of the calling line. For this purpose the cross-connection terminals 2927, 2928 and 2929 are cross-connected to the terminals disclosed in the lower left portion of Fig. 38 whose digit values correspond to the three code letters of the calling office designation. It will be assumed that the calling office has the office name Audubon and that consequently terminal 2927 is connected to the No. 2 terminal of Fig. 38, terminal 2928 is connected to the No. 8 terminal and terminal 2929 is connected to the No. 3 terminal.

When brush 3254 engages the No. 4 terminal of its arc, a circuit is established from ground applied thereto over the normal contacts of relay 3225, the upper No. 3 back contact of relay 3227, the upper No. 3 back contact of relay 3226, conductor 3228, the No. 4 contacts of relay 2950, terminal 2927 strapped to the No. 2 terminal of Fig. 38, conductor 4712, the No. 5 contacts of relays 4731F and 4700, conductor 912 to the No. 2 distributor segment of the printer. In the manner previously described the rotation of the printer typewheel is arrested by the operation of print magnet 964 when the brush 962 engages the No. 2 segment, the numeral 2 is printed on the ticket and switch 3250 of the sender is controlled to advance its brushes 3252 and 3254 to the No. 5 terminals of their arcs.

With brush 3254 engaged with the No. 5 terminal of its arc, a circuit is established from ground thereover, over the upper No. 2 back contact of relay 3227, the upper No. 2 back contact of relay 3226, conductor 3229, the No. 2 contacts of relay 2950, terminal 2928 strapped to the No. 8 terminal of Fig. 38, conductor 4718, the No. 11 contacts of relays 4731F and 4700, conductor 918, to the No. 8 distributor segment of the printer. In the manner previously described the rotation of the printer typewheel is arrested by the operation of print magnet 964 when the brush 962 engages the No. 8 segment, the numeral 8 is printed on the ticket and switch 3250 of the sender is controlled to advance its brushes 3252 and 3254 to the No. 6 terminals of their arcs.

With brush 3254 engaged with the No. 6 terminal of its arc, a circuit is established from ground thereover, over the upper No. 1 back contact of relay 3227, the upper No. 1 back contact of relay 3226, conductor 3230, the No. 1 contacts of relay 2950, terminal 2929 strapped to the No. 3 terminal of Fig. 38, conductor 4713, the No. 6 contacts of relays 4731F and 4700, conductor 913 to the No. 3 distributor segment of the printer. In the manner previously described the rotation of the printer typewheel is arrested by the operation of print magnet 964 when the brush 962 engages the No. 3 segment, the numeral 3 is printed on the ticket and switch 3250 of the sender is controlled to advance its brushes 3252 and 3254 to the No. 7 terminals of their arcs.

With brush 3254 engaged with the No. 7 terminal of its arc, a circuit is established from ground thereover, over the lower No. 3 back contact of relay 3226, conductor 4723, the No. 3 contacts of relays 4731F and 4700, conductor 923 to the (—) distributor segment of the printer. In the manner previously described the rotation of the printer typewheel is arrested by the operation of the print magnet 964 when the brush 962 engages the (—) segment, a dash is printed on the ticket and switch 3250 of the sender is controlled to advance brushes 3252 and 3254 to the No. 8 terminals of their arcs.

*Printing the calling line number*

It has been assumed that the calling line number was 9095. Consequently with brush 3254 engaged with the No. 8 terminal of its arc, a circuit is established from ground thereover, over the upper No. 3 back contact of relay 3231, conductor 3232, the upper contacts of relay 3303 and the middle lower contacts of relay 3305 of the thousands digit register 3300, the No. 9′ terminal strapped to the No. 9′ terminal of Fig. 38, conductor 4719, the No. 12 contacts of relays 4731F and 4700 and conductor 919, to the No. 9 distributor segment of the printer. In the manner previously described, the rotation of the printer typewheel is arrested by the operation of print magnet 964 when the brush 962 engages the No. 9 segment, the numeral 9 is printed on the ticket and switch 3250 of the sender is controlled to advance its brushes 3252 and 3254 to the No. 9 terminals of their arcs.

With brush 3254 engaged with the No. 9 terminal of its arc, a circuit is established from ground thereover, over the upper No. 2 back contact of relay 3231, conductor 3233, the upper contacts of relay 3324 and the lower contacts of relay 3325 of the digit register 3320, the No. 0′ terminal strapped to the No. 0′ terminal of Fig. 38, conductor 4710, the No. 13 contacts of relays 4731F and 4700, and conductor 910 to the No. 0 distributor segment of the printer. In the manner previously described the rotation of the printer typewheel is arrested by the operation of print magnet 964 when the brush 962 engages the No. 0 segment, the numeral 0 is printed on the ticket and switch 3250 of the sender is controlled to advance its brushes 3252 and 3254 to the No. 10 terminals of their arcs.

With brush 3254 engaged with the No. 10 terminal of its arc, a circuit is established from ground thereover, over the upper No. 1 back contact of relay 3231, conductor 3234, the upper contacts of relay 3343 and the middle lower contacts of relay 3345 of the tens register 3340, the No. 9′ terminal strapped to the No. 9′ terminal of Fig. 38, conductor 4719, the No. 12 contacts of relays 4731F and 4700 and conductor 919 to the No. 9 distributor segment of the printer. In the manner previously described the rotation of the printer typewheel is arrested by the operation of the print magnet 964 when the brush 962 engages the No. 9 segment, the numeral 9 is printed on the ticket and switch 3250 of the sender is controlled to advance its brushes 3252 and 3254 to the No. 11 terminals of their arcs.

When the brush 3254 engages with the No. 11 terminal of its arc, a circuit is established from ground thereover, over the lower No. 1 back contact of relay 3231, conductor 3235, the upper contacts of relay 3362 and the middle upper contacts of relay 3363 of the units register 3360, the No. 5′ terminal strapped to the No. 5′ terminal of Fig. 38, conductor 4715, the No. 8 contacts of relays 4731F and 4700 and conductor 915 to the No. 5 distributor segment of the printer. In the manner previously described the rotation of the printer typewheel is arrested by the operation of the print magnet 964 when the brush 962 engages the No. 5 segment, the numeral 5 is printed on the ticket and the switch 3250 of the sender is controlled to advance its brushes 3252 and 3254 to the No. 12 terminals of their arcs. With brush 3254 engaged with the No. 12 terminal of its arc ground is connected thereover to conductor 4723 and thence as traced to the (—) distributor segment of the printer whereupon a dash is printed upon the ticket and switch 3250 is controlled to advance the brushes 3252 and 3254 into engagement with the No. 13 terminals of their arcs.

*Seizure of the month, day and hour circuit*

With brush 3254 engaged with the No. 13 terminal of its arc a circuit is established from ground thereover, over conductor 3236 of cable 3245 to battery through the winding of relay 3620 whereupon this relay operates and establishes an obvious circuit for relay 3621 which also operates and locks over its inner lower contacts, the lower back contacts of relay 3623 to ground on conductor 3103. Relay 3621 further closes a circuit for the preference relay of the first available month, day and hour circuit. It will be assumed that the first month, day and hour circuit disclosed in full in Figs. 49 to 52, inclusive, has been constituted the first preference to the sender disclosed in Figs. 28 to 43, inclusive, by the cross-connection of terminal 3625 to terminal 3626 in Fig. 36 and that this month, day and hour circuit is at the time available. A circuit is therefore effective from ground through the winding of the month, day and hour preference relay 3600F, allocated to this month, day and hour circuit and to the No. 0 sender, over the upper back contact of the month, day and hour circuit busy relay 3630F, allocated to this month, day and hour circuit and to the No. 0 sender, over the strapped terminals 3625 and 3626 and the lower contacts of relay 3621 and through resistance 3624 to battery. Relay 3600F thereupon operates; locks to ground over its lower alternate contacts; removes operating ground from preference relays 3601F to 3619F, allocated to the same month, day and hour circuit and to all other senders, so that no other sender may cause the seizure of this month, day and hour circuit; and establishes a circuit from ground over the upper normal contacts of preference relay 3619F, thence in series over the upper normal contacts of other preference relays allocated to the same month, day and hour circuit, over the upper front contact of relay 3600F, conductor 3627, through the winding of connector relay 3700F, allocated to the first month, day and hour circuit, to battery and ground. Relay 3700F then operates to extend control conductors from the sender to the first month, day and hour circuit.

Had the first month, day and hour circuit been busy, then its busy relay 3630F would have been operated and the circuit previously traced over terminal 3625 would have been extended over the upper front contact of relay 3630F and the upper front contacts of the busy relays of succeeding busy month, day and hour circuits, thence over the upper back contacts of the busy relay of the first idle month, day and hour circuit to ground through the winding of the preference relay of such month, day and hour circuit. If it should be assumed that all month, day and hour circuits except the last are busy, then this circuit will be extended over the upper back contact of relay 3630L, through the winding of the preference relay 3600L of such month, day and hour circuit to ground over the normal contacts of preference relay 3619L of such month, day and hour circuit allocated to the last sender. It is to be noted that the last month, day and hour circuit is the first choice preference for the last sender and the last choice preference for the first sender.

With connector relay 3700F operated, a circuit is established from ground over its No. 25 contacts, conductor 3720 to battery through the windings of relays 4900 and 4901 in parallel, which operate and connect ground to conductors such as 3628 of cable 3629 extending to the upper windings of all busy relays 3630F to 3649F allocated to the first month, day and hour circuit and thence through such relays to battery as illustrated in connection with relay 3630F. All such busy relays therefore operate with the exception of relay 3630F whose upper winding is shunted over conductor 3622 and the No. 1 contacts of relay 3700F to ground. Relay 3700F upon operating also connects ground over its No. 24 contacts to conductor 3721 and over the No. 4 back contacts of relay 4902 to battery through the winding of relay 4903 which thereupon operates and connects ground over its lower outer contacts, to battery through the windings of relays 4904 and 4905 and over the No. 2 contacts of relay 4902 to conductor 3722. Relay 4905 when operated establishes a circuit from ground over its No. 6 contacts, conductor 4906, over the upper contacts and through the upper winding of relay 5200 to battery to prevent relay 5200 from releasing if at the time operated, and to cause the switches of the month, day and hour circuit to advance during the time that the circuit is in use with a sender. Relays 4904 and 4905 also extend the control conductors 3640 to 3651 from the terminals of Fig. 36 which are cross-connected to the similarly designated terminals of Fig. 38, over contacts of connector relay 3700F, conductors 3740 to 3751, inclusive, over contacts of relays 4904 and 4905, through associated resistances, through the common resistance 4907, over the No. 8 back contact of relay 4902 through the upper winding of polarized relay 4908, the No. 8 contacts of relay 4905 and the back contact of relay 4909 to battery. A circuit is also established from ground over the No. 1 contacts of relay 4905, the No. 10 contacts of relay 4904, the inner upper contacts of relay 4903 to battery through the winding of start relay 4909. Relay 4909 operates over this circuit and after an interval as determined by its slow-to-operate characteristic, removes battery at its lower back contact from the circuit traced through the upper winding of relay 4908 and over the control conductors extending to the segments of the ticket printer. If a ground does exist on any control conductor relay 4908 will operate prior to the operation of relay 4909 and will in turn cause the operation of relay 4910 over a circuit extending from ground on conductor 3722 over the right contact of relay 4908, over the next-to-bottom contacts of relay 4901 to battery through the winding of relay 4910 which will operate to light the alarm lamp 4911 and to establish a circuit from ground over its upper contacts, conductor 3723, the No. 3 contacts of connector relay 3700F, conductor 3724 to the sender timing circuit as a signal that trouble exists on a control conductor.

It will be assumed, however, that no ground condition is found and that relay 4909 operates, in turn operating relay 4902. Relay 4902 then locks over its No. 5 contacts to ground over conductor 3722; lights lamp 4914 over its No. 3 contacts; connects ground over its No. 6 contacts and conductor 4906 for holding relay 5200 operated; establishes a holding circuit for relays 4900 and 4901 over its No. 9 contacts and opens the operating circuit of relay 4903 at its No. 4 contacts. With relays 4902 and 4909 both operated, the control conductors are connected over the lower front contact of relay 4909, the No. 8 contacts of relay 4905, through the upper winding of relay 4908 to ground over the No. 8 front contact of relay 4902 in order to check for crosses between the control conductors. During the time that the winding of relay 4908 is thus connected to the control conductors, the printer distributor brush 962 is rotating and successively connecting battery through the print magnet 964 to the control conductors for approximately .013 second. If a cross occurs between two of these conductors this battery current will be closed through two of the resistances shown at the right of relays 4904 and 4905, such as 4912, thereby increasing the current through the upper winding of relay 4908 to a value required for its operation. To render relay 4908 slightly slow to operate to prevent its operation by the momentary short-circuit established between adjacent control conductors as the distributor brush 962 advances from one segment to the next, condenser 4913 is connected in parallel with the upper winding of relay 4908 by the opening of the No. 8 back contact of relay 4902. If a cross is found, relay 4908 upon operating causes the operation of relay 4910 to light alarm lamp 4911 and to return a trouble signal to the sender.

It will be assumed that no cross is found and that therefore relays 4908 and 4910 do not operate and that therefore with relays 4902 and 4909 operated and relay 4903 released, relays 4904 and 4905 are released whereby the month, day and hour circuit is prepared for the transfer of information concerning the month, the day, the hour, and the fractional part of the hour to the ticket printer. In the present case it will be assumed that when the month, day and hour circuit is associated with the sender its switches have been positioned to record the time, month and day as December 25, 9.36.

*Printing the month*

It will be recalled that when switch 3250 of the sender advanced brush 3254 into engagement with the No. 13 terminal of its arc, relays 3620 and 3621 were operated. When these relays are operated ground is applied over the upper contacts of relays 3621 and 3620 to conductors 4720 and 4721 whereby stepping relay 3225 of the sender is controlled in the manner previously described in connection with the operation of print magnet 964 to cause the operation and release of stepping magnet 3255 to advance the brushes 3252 and 3254 of switch 3250 to the No. 14 terminals of their arcs. When brush 3254 is in engagement with the No. 14 terminal of its arc, a circuit is established from ground thereover, over conductor 3237 of cable 3245, the No. 10 contacts of relay 3700F, conductor 3752, the No. 1 back contact of relay 4904, the No. 7 back contact of relay 4905, the No. 7 contacts of relay 4902, the back contact of relay 4910, conductor 4915, brush 5104 of the month switch (the brushes 5101 to 5105 of which are assumed to be engaging the No. 12 terminals of their arcs to register the month to be December), thence over the upper back contact of relay 5000, conductor 3741, the No. 21 contacts of relay 3700F, conductor 3641 to the No. 1 terminal of Fig. 36 strapped to the No. 1 terminal of Fig. 38, conductor 4711, the No. 4 contacts of relays 4731F and 4700, conductor 911 to the No. 1 distributor segment of the printer. In the manner previously described the rotation of the printer typewheel is arrested by the operation of the print magnet 964 when the brush 962 engages the No. 1 segment, the numeral 1 is printed on the ticket and switch 3250 of the sender is controlled to advance its brushes 3252 and 3254 to the No. 15 terminals of their arcs.

With brush 3254 engaged with the No. 15 terminal of its arc, a circuit is established from ground thereover, over conductor 3238 of cable 3245, the No. 9 contacts of relay 3700F, conductor 3753, brush 5105 of the month switch engaged with the No. 12 terminal of its arc, conductor 3742, the No. 20 contacts of relay 3700F, conductor 3642, the No. 2 terminal of Fig. 36 strapped to the No. 2 terminal of Fig. 38, conductor 4712, the No. 5 contacts of relays 4731F and 4700, conductor 912 to the No. 2 distributor segment of the printer. In the manner previously described the rotation of the printer typewheel is arrested by the operation of print magnet 964 when the brush 962 engages the No. 2 segment, the numeral 2 is printed on the ticket and switch 3250 of the sender is controlled to advance its brushes 3252 and 3254 to the No. 16 terminals of their arcs.

*Printing the day of the month*

With brush 3254 engaged with the No. 16 terminal of its arc, a circuit is established from ground thereover, over conductor 3239 of cable 3245, the No. 8 contacts of relay 3700F, conductor 3754, brush 5114 of the day-tens switch (the brushes 5111 to 5114 of which are assumed to be engaging the No. 3 terminals of their arcs to register the tens digit 2 of the twenty-fifth day of the month), thence over conductor 3742 and as previously traced to the No. 2 distributor segment of the printer. In the manner previously described, the rotation of the printer typewheel is arrested by the operation of the print magnet 964 when the brush 962 engages the No. 2 segment, the numeral 2 is printed on the ticket and switch 3250 of the sender is controlled to advance its brushes 3252 and 3254 to the No. 17 terminals of their arcs.

With brush 3254 engaged with the No. 17 terminal of its arc, a circuit is established from ground thereover, over conductor 3240 of cable 3245, the No. 7 contacts of relay 3700F, conductor 3755, brush 5125 of the day-units switch (the brushes 5121 to 5125 of which are assumed to be engaging the No. 5 terminals of their arcs to register the units digit 5 of the twenty-fifth day of the month), thence over conductor 3745, the No. 17 contacts of relay 3700F, conductor 3645, the No. 5 terminal of Fig. 36 strapped to the No. 5 terminal of Fig. 38, thence over conductor 4715, the No. 8 contacts of relays 4731F and 4700, conductor 915 to the No. 5 distributor segment of the printer. In the manner previously described, the rotation of the printer typewheel is arrested by the operation of the print magnet 964 when the brush 962 engages the No. 5 segment, numeral 5 is printed on the ticket and switch 3250 of the sender is controlled to advance its brushes 3252 and 3254 to the No. 18 terminals of their arcs.

*Printing the hour of the day*

With brush 3254 engaged with the No. 18 terminal of its arc, a circuit is established from ground thereover, over conductor 3241 of cable 3245, the No. 6 contacts of relay 3700F, conductor 3756, brush 5134 of the hour-tens switch (the brushes 5131 to 5134 of which are assumed to be engaging the No. 1 terminals of their arcs to register the tens digit zero of the hour of the day), conductor 3740, the No. 2 contacts of relay 3700F, conductor 3640, the No. 0 terminal of Fig. 36 strapped to the No. 0 terminal of Fig. 38 and thence as previously traced to the No. 0 distributor segment of the printer. In the manner previously described the rotation of the printer typewheel is arrested by the operation of the print magnet 964 when the brush 962 engages the No. 0 segment, the numeral 0 is printed on the ticket and switch 3250 of the sender is controlled to advance its brushes 3252 and 3254 to the No. 19 terminals of their arcs.

With brush 3254 engaged with the No. 19 terminal of its arc, a circuit is established from ground thereover, over conductor 3242 of cable 3245, the No. 5 contacts of relay 3700F, conductor 3757, brush 5145 of the hour-units switch (the brushes 5141 to 5145 of which are assumed to be engaging the No. 10 terminals of their arcs to register the units digit 9 of the hour of the day), conductor 3749, the No. 13 contacts of relay 3700F, conductor 3649, the No. 9 terminal of Fig. 36 strapped to the No. 9 terminal of Fig. 38 and thence as previously traced to the No. 9 distributor segment of the printer. In the manner previously described, the rotation of the printer typewheel is arrested by the operation of print magnet 964 when the brush 962 engages the No. 9 segment, the numeral 9 is printed on the ticket and switch 3250 of the sender is controlled to advance its brushes 3252 and 3254 to the No. 20 terminals of their arcs.

With brush 3254 engaged with the No. 20 terminal of its arc, a circuit is established from ground thereover, over conductor 3243 of cable 3245, the No. 4 contacts of relay 3700F, conductor 3758, brush 5154 of the tenth of an hour switch (the brushes 5151 to 5154 of which are assumed to be engaging the No. 7 terminals of their arcs to register the sixth tenth of an hour division or the thirty-sixth minute of the hour), conductor 3746, the No. 16 contacts of relay 3700F, conductor 3646, the No. 6 terminal of Fig. 36 strapped to the No. 6 terminal of Fig. 38, conductor 4716, the No. 9 contacts of relays 4731F and 4700, conductor 916 to the No. 6 distributor segment of the printer. In the manner previously described, the rotation of the printer typewheel is arrested by the operation of the print magnet 964 when the brush 962 engages the No. 6 segment, the numeral 6 is printed on the ticket and switch 3250 of the sender is controlled to advance its brushes 3252 and 3254 to the No. 21 terminals of their arcs.

With brush 3254 engaged with the No. 21 terminal of its arc, a circuit is established from ground thereover, over conductor 3244 of cable 3245 to battery through the winding of relay 3623. Relay 3623 upon operating releases relay 3621 which in turn releases preference relay 3600F followed by the release of connector relay 3700F. Connector relay 3700F upon releasing disassociates the month, day and hour circuit from the sender whereupon the operated relays 4900, 4901, 4902 and 4909 thereof release. The operated busy relays 3631F, etc. are now released and the first month, day and hour circuit is again made available to other senders. Relay 3623 upon operating also connects ground to conductors 4720 and 4721 whereby stepping relay 3225 of the sender is operated and then released to advance the brushes 3252 and 3254 of switch 3250 to the No. 22 terminals of their arcs. When brush 3254 engages the No. 22 terminal of its arc, ground is connected thereover to conductor 4723 whereby the printer is controlled to print a dash on the ticket and the switch 3250 is controlled to advance its brushes 3251 and 3253 into engagement with the No. 1 terminals of their arcs.

*Printing the sender and identifier numbers*

Upon the engagement of brush 3253 with the first terminal of its arc, a circuit is established from ground thereover, over conductor 3246 to terminal (SD) of Fig. 38 which is cross-connected to one of the digit terminals in accordance with the tens digit of the number of the sender used. It has been assumed that the first sender of the group has been used for the call and may be designated by the number 00. Therefore, the terminal (SD) is cross-connected to the No. 0 terminal which is in turn connected as previously described to the No. 0 distributor segment of the printer. When, therefore, the brush 962 has been rotated into engagement with the No. 0 segment, print magnet 964 is energized to arrest the rotation of the type-wheel, to print the tens digit 0 of the sender number on the ticket and to control the advance of the brushes and of switch 3250 of the sender into engagement with the No. 2 terminals of their respective arcs in the manner previously described. With brush 3253 engaged with the No. 2 terminal of its arc, a circuit is now established from ground thereover over conductor 3247 to terminal (SD1) of Fig. 38 which is cross-connected to the No. 0 terminal in turn connected with the No. 0 distributor segment of the printer. In the manner previously described the units digit 0 of the sender number is printed on the ticket and the switch 3250 of the sender is controlled to advance its brushes 3251 and 3253 into engagement with the No. 3 terminals of their arcs.

With brush 3253 engaged with the No. 3 terminal of its arc, a circuit is now established from ground thereover, over conductor 3248, the lower No. 1 contacts of relay 2802F, conductor 3249, to the terminal (ID) in the lower portion of Fig. 38. Under the assumption that the first or No. 0 identifier has been used on the call and therefore relay 2802F is operated, the terminal (ID) is strapped to the No. 0 terminal connected as previously described to the No. 0 distributor segment of the printer whereby the numeral 0 is printed on the ticket and switch 3250 of the sender is controlled to advanced its brushes to their respective No. 4 position terminals. Had the identifier used been other than the No. 0, then the terminal (ID) associated with the relay 2802— individual thereto would be connected to the corresponding digit terminal of Fig. 38 indicative of the number of such identifier. When the brush 3253 engages the No. 4 terminal of its arc, ground is applied thereover to conductor 4723 whereby the printer is controlled to print a dash on the ticket after which the brushes 3251 and 3253 are advanced to the No. 5 terminal of their arcs.

*Printing the called office code*

With brush 3253 engaged with the No. 5 terminal of its arc a circuit is established from ground thereover over conductor 3256, over the lower No. 3 contacts of relay 3404 and the lower No. 2 contacts of relay 3402 of the A code digit register 3400, the No. 6′ terminal cross-connected to the No. 6′ terminal of Fig. 38, conductor 4716, thence as previously traced to the No. 6 distributor segment of the printer. In the manner previously described, when the brush 962 engages the No. 6 segment, print magnet 964 will arrest the rotation of the type-wheel, the number 6 is printed on the ticket and the switch 3250 of the sender is controlled to advance its brushes 3251 and 3253 into engagement with the No. 6 terminals of their arcs.

A circuit is now established over brush 3253, conductor 3257, over the lower No. 4 contacts of relay 3423 and the upper No. 2 contacts of relay 3421 of the B code digit register 3420, the No. 2′ terminal strapped to the No. 1 terminal of Fig. 38, conductor 4712, thence as previously traced to the No. 2 distributor segment of the printer. In the manner previously described when the brush 962 engages the No. 2 segment, print magnet 964 operates to arrest the rotation of the type-wheel, the numeral 2 is printed on the ticket and the switch 3250 of the sender is controlled to advance its brushes 3251 and 3253 into engagement with the No. 7 terminals of their arcs.

A circuit is now established over brush 3253, conductor 3258, over the No. 3 lower back contact of relay 3506, the lower No. 4 contacts of relay 3505 and the upper No. 3 contacts of relay 3502 of the C code digit register 3500, terminal No. 7′ strapped to the No. 7′ terminal of Fig. 38, conductor 4717 over the No. 10 contacts of relays 4731F and 4700, and conductor 917 to the No. 7 distributor segment of the printer. In the manner previously described, when the brush 962 engages the No. 7 segment, print magnet 964 operates to arrest the rotation of the type-wheel, the numeral 7 is printed on the ticket and switch 3250 of the sender is controlled to advance its brushes and into engagement with the No. 8 terminals of their respective arcs. The three digits 6, 2, 7 corresponding to the assumed office code MAR have now been printed.

*Cutting off the ticket printed for the previous call*

With brush 3253 engaged with the No. 8 terminal of its arc, a circuit is completed from ground thereover, over conductor 4722, the No. 14 contacts of relays 4731F and 4700 and conductor 922 to battery through the cut magnet 965 of the printer. Magnet 965 upon operating cuts off the tape just ahead of the first notation of the incident call whereby the ticket made for the previous call is detached for dispatch to the business office and ground is connected to conductors 920 and 921 and thence as traced to conductors 4720 and 4721 for controlling switch 3250 of the sender to engage its brushes 3251 and 3253 with the No. 9 terminals of their arcs and to release the cut magnet 965 of the printer. With brush 3253 engaged with the No. 9 terminal of its arc, a circuit is established from ground thereover, over conductor 3259, the back contact of relay 3026, conductor 4723 and thence as traced to the (−) distributor segment whereupon the printer is controlled to print a dash on the ticket and the switch 3250 of the sender is controlled to advance its brushes and into engagement with the No. 10 terminals of their respective arcs.

*Printing the called line number*

With brush 3253 in engagement with the No. 10 terminal of its arc a circuit is established from ground thereover, over conductor 3260 of cable 3265, the upper No. 2 contacts of relay 4302, which was operated from the identifier to indicate that the first digit dialed in the sender was the third code digit and consequently that the thousands digit of the called number has been registered in the register 4010, over conductor 4037, the lower No. 2 back contact of relay 4012, the lower No. 3 front contact of relay 4011, the upper No. 2 back contact of relay 4014 and the upper No. 2 back contact of relay 4016 of register 4010 (it having been assumed relay 4011 thereof has been operated to register the thousands digit 1 of the called line number), terminal No. 1′ strapped to terminal No. 1′ of Fig. 38 and thence as traced to the No. 1 distributor segment of the printer. In the manner previously described the rotation of the type-wheel of the printer is arrested in a position to print the numeral 1 on the ticket and the switch 3250 of the sender is controlled to advance its brushes and into engagement with the No. 11 terminals of their operative arcs.

With brush 3253 in engagement with the No. 11 terminal of its arc, a circuit is established from ground thereover, over conductor 3261 of cable 3265, the lower No. 2 contacts of relay 4306 which, together with relay 4302, were operated from the identifier, conductor 4038, the lower No. 2 front contact of relay 4022, the lower No. 2 front contact of relay 4023 and the lower No. 2 back contact of relay 4026 of the register 4020 (it having been assumed that relays 4021 and 4022 thereof have been operated to register the hundreds digit 3 of the called line number), terminal No. 3′ strapped to terminal No. 3′ of Fig. 38 and thence as traced to the No. 3 distributor segment of the printer. In the manner previously described, the rotation of the type-wheel of the printer is arrested in a position to print the numeral 3 on the ticket and the switch 3250 of the sender is controlled to advance its brushes and into engagement with the No. 12 terminals of their respective arcs.

With brush 3253 in engagement with the No. 12 terminal of its arc a circuit is established from ground thereover, over conductor 3262 of cable 3265, the lower No. 3 contacts of relay 4306, conductor 4121, the lower No. 2 back contact of relay 4102, the lower No. 3 back contact of relay 4101, the lower No. 3 front contact of relay 4104, the lower No. 3 back contact of relay 4106 of the register 4100 (it having been assumed that relay 4104 thereof has been operated to register the tens digit 4 of the called line number), terminal No. 4′ strapped to terminal No. 4′ of Fig. 38, conductor 4714, the No. 7 contacts of relays 4731F and 4700, conductor 914 to No. 4 distributor segment of the printer. In the manner previously described the rotation of the type-wheel of the printer is arrested in a position to print the numeral 4 on the ticket and the switch 3250 of the sender is controlled to advance its brushes and into engagement with the No. 13 terminals of their respective arcs.

With brush 3253 in engagement with the No. 13 terminal of its arc a circuit is established from ground thereover, over conductor 3263 of cable 3265, the lower No. 5 contacts of relay 4306, conductor 4122, the lower No. 2 back contact of relay 4112, the lower No. 3 front contact of relay 4111 and the upper No. 1 contacts of relay 4114 of the register 4110 (it having been assumed that relay 4111 and relay 4114 thereof have been operated to register the units digit 5 of the called line number), terminal No. 5' strapped to terminal No. 5' of Fig. 38 and thence as traced to the No. 5 distributor segment of the printer. In the manner previously described the rotation of the type-wheel of the printer is arrested in a position to print the numeral 5 on the ticket and the switch 3250 of the sender is controlled to advance its brushes and into engagement with the No. 14 terminals of their respective arcs.

It has been assumed that the no-sender delay relay 3125 has been operated from the identifier and therefore when the brush 3253 engages the No. 14 terminal of its arc, a circuit is established from ground thereover, over the upper contacts of the end-of-dialing relay 3201, conductor 3266, the lower No. 3 contacts of relay 3125, conductor 4723 and thence as traced to the (—) distributor segment of the printer. In the manner previously described, a dash is printed on the ticket and the switch 3250 of the sender is controlled to advance its brushes into engagement with the No. 15 terminals of their respective arcs. Upon engaging the No. 15 terminal of its arc brush 3253 reconnects ground directly to conductor 4723 whereupon an additional dash is printed on the ticket and the brushes of the switch 3250 are advanced into engagement with the No. 16 terminals of their respective arcs.

*Printing the class of the calling line*

It has been assumed that the calling subscriber is entitled to local class service and that therefore local class register relay 3145 has been operated. Since the ticket printer is not arranged to print letters, the class registration must be printed as an identifying numeral on the ticket. It will be assumed that for the local class the numeral 5 must be printed, for the extended class the numeral 9 must be printed and for the foreign exchange class the numeral 3 must be printed and that for the purpose of printing the numeral 5 to indicate the local class the terminal (LC) of Fig. 38 connected over conductor 3160 to the inner lower front contact of local class register relay 3145 is strapped to terminal 5; that for the purpose of printing the numeral 9 to indicate the extended class the terminal (EX) of Fig. 38 connected over conductor 3161 to the inner lower front contact of extended service register relay 3144 is strapped to terminal 9 and that for the purpose of printing the numeral 3 to indicate the foreign class the terminal (FE) of Fig. 38 connected over conductor 3162 to the inner lower front contact of the foreign exchange register delay 3146 is strapped to terminal 3. Since it has been assumed that register relay 3145 has been operated, then when brush 3253 engages the No. 16 terminal of its arc, a circuit is completed from ground applied thereover, over the lower No. 3 back contact of relay 3231, conductor 3267, the inner lower front contact of relay 3145, conductor 3160, terminal (LC) of Fig. 38 strapped to terminal No. 5, conductor 4715 and thence as traced to the No. 5 distributor segment of the printer. In the manner previously described the numeral 5 is printed on the ticket and switch 3250 of the sender is controlled to advance its brushes into engagement with the No. 17 terminals of their respective arcs.

*Printing the charge rate*

It has been assumed that the charge rate relays 3827 and 3829 of Fig. 38 have been operated from the identifier to register the rate at which the call should be charged. When therefore brush 3253 engages the No. 17 terminal of its arc, a circuit is established from ground thereover, over the lower No. 2 back contact of relay 3231, conductor 3268, the lower contacts of relay 3827 and the upper No. 2 contacts of relay 3829 of the rate register 3850, to terminal No. 2' strapped to the No. 2' terminal connected to conductor 4712 and thence as traced to the No. 2 distributor segment of the printer. In the manner previously described the numeral 2 is printed on the ticket and switch 3250 of the sender is controlled to advance its brushes 3251 and 3253 into engagement with the No. 18 terminals of their arcs.

It will be recalled that when the party test was made by the sender, relay 3131 operated to register the fact that the calling subscriber was a tip party on a two-party line. With relay 3106 operated, as previously described, a circuit was established from ground over the upper No. 3 contact of relay 3006, conductor 3027, the upper front contact of relay 3131 to battery through the winding of relay 3028, whereupon relay 3028 operated. If relay 3131 had not operated, then relay 3029 would have operated from ground on conductor 3027 over the upper back contact of relay 3131. With relay 3028 operated a circuit is established from battery through the winding of relay 3026 over the upper contacts of relay 3028, the back contact of relay 3013, the upper No. 5 contacts of relay 3010, the lower No. 2 contacts of relay 3005, to ground at the upper back contact of relay 3007, and relay 3026 operates. When brush 3253 of switch 3250 engages the No. 18 terminal of its arc, a circuit is established thereover, conductor 3269, the lower contacts of relay 3028, the upper front contact of relay 3157, conductor 4727, the No. 17 contacts of relays 4731F and 4700, conductor 927 through the lower winding of relay 708 to battery. Relay 708 thereupon operates and locks from battery through resistance 749, its upper winding and upper No. 1 contacts, over conductor 747 to ground over the upper No. 5 contacts of relay 800, and also locks in another circuit from battery through its lower winding and over its lower No. 4 contacts and conductor 811 to ground over the upper contacts of relay 712. On "Don't answer" calls, relay 708 releases upon the release of relay 712, but on "Answer" calls, relay 708 remains operated. Relay 708, upon operating, opens at its lower No. 2 back contact the previously traced circuit for relay 3157 of the sender, which now releases and, with relay 3026 operated, establishes a circuit from ground over brush 3253 and the No. 18 terminal of its arc, conductor 3269, the lower contacts of relay 3028, the upper back contact of relay 3157, conductor 3259, the front contact of relay 3026, conductor 3030 to battery through the winding of sender release relay 3103. Relay 3103 thereupon operates, locks over its lower contacts to off-normal ground on conductor 3109 and, at its inner normal contacts, opens the circuit through the windings of relay 3800.

Relay 3800 thereupon releases in turn releasing relays 3801, 3802 and 3106 and removing holding ground from conductor 4610 extending to the trunk finder to initiate the release of the trunk finder. Relay 3106, upon releasing, removes off-normal ground from all of the off-normal ground conductors of the sender, thereby releasing all other operated relays of the sender. When relay 3204 releases it establishes a circuit from ground over its lower No. 2 back contact, over the strapped terminals of arcs of switch 3250 associated with brushes 3251 and 3252, over the interrupter contacts and through the winding of stepping magnet 3255 whereby the magnet is intermittently operated to advance the brushes of switch 3250 to their normal positions. Relay 3204 also releases relay 3018 which, in turn, releases the lock-out relay 4730F of the sender trunk connector which, in turn, releases the connector relays 4731F and 4700, thereby restoring the sender trunk connector to its normal condition.

When ground is removed at the sender from conductor 4610, relay 4620 of trunk finder 4600 releases whereupon the circuit of release magnet 4617 is established from battery over the lower contacts of off-normal switch 4616, the inner lower back contact of relay 4614, the upper No. 3 contacts of relay 4620, the upper back contact of relay 4609 to ground over the upper contacts of off-normal switch 4616. When the switch is restored to normal the contacts of switch 4616 open thereby releasing the release magnet 4617. When the switch is restored to normal, relay 4608 releases and the previously traced circuit of relay 715 of the trunk is opened and relay 715 of the trunk releases.

If on the party test the test indicated that the calling subscriber is not a tip party, then relays 3013 and 3004 will remain locked operated at the end of the test and thereafter when relay 3029 operates as previously described, a circuit for relay 3026 would be established from battery through its winding, over the upper contacts of relay 3029, the front contact of relay 3013, the upper No. 5 contacts of relay 3010, the lower No. 2 contacts of relay 3005, to ground over the upper back contact of relay 3007. With relay 3026 operated when brush 3253 of switch 3250 engages the No. 18 terminal of its arc, a circuit for release relay 3103 is established from ground over brush 3253, conductor 3269, the inner lower contacts of relay 3029, the front contact of relay 3026, over conductor 3030 to battery through the winding of relay 3103. The release of the sender, trunk finder and sender trunk connector then proceed in the manner previously described.

At the end of the conversation when the calling subscriber restores his receiver to the switchhook, relay 806 of the trunk circuit releases in turn releasing relay 712. If it be assumed that the call was not originated by a tip party subscriber on a two-party flat rate line, the tip party relay 708 will not be operated and therefore the release of relay 712 will remove holding ground from the sleeve conductor 702 of the trunk applied over its lower front contact, thereby initiating the release of the selector switches which were operated to connect the calling line with the trunk. Relay 712 upon releasing will also establish a circuit for relay 801, which may be traced from battery through its upper winding, the lower No. 6 contacts of relay 800, conductor 748, the lower No. 4 back contact of relay 715, the upper No. 3 back contact of relay 708 to ground over the upper back contact of relay 712. Relay 801, upon operating, extends its operating ground over its upper No. 2 contacts, the lower No. 2 back contact of relay 805, conductor 823 to battery through the winding of relay 714 whereupon relay 714 operates and reconnects ground over its lower No. 3 front contact to the trunk sleeve conductor to mark the trunk busy to all selector switches. Relays 801 and 714 are made slow to operate so as to provide sufficient time for the release of the selectors toward the calling line. Relays 801 and 714 remain operated until the completion of the printing of the elapsed conversation time on the toll ticket.

If the call had been from a tip party substation on a two-party flat rate line and relay 708 had therefore been operated, then upon the release of relay 712 as just described and the removal of ground from the sleeve conductor 702 of the trunk, the selectors toward the calling line would not be released since a substitute ground would be connected to the sleeve conductor over the upper No. 5 contacts of relay 708. With relay 708 operated when relay 712 releases, a circuit is established from ground over the upper back contact of relay 712, the upper No. 3 front contact of relay 708, the upper No. 2 back contact of relay 715, thence over the trunk finder start conductor 716 through the winding of the group relay 4601L, allocated to the subgroup of ten trunks in which the calling trunk is located, to battery and ground. In the manner previously described, an idle trunk finder, for example trunk finder 4600 is started to hunt for the trunk. When the trunk is found, relay 715 is operated over a circuit from ground applied to conductor 717 over brush 4618 of the trunk finder, thence over the lower No. 3 contacts of relay 708, the lower back contact of relay 712, the upper No. 4 back contact of relay 714 to battery through the winding of relay 715. Relay 715 thereupon operates to open the start circuit and locks over its upper No. 2 contacts to ground on conductor 717.

When the sender becomes associated with the trunk over the brushes of the trunk finder 4600, relays 3800, 3801, 3802 and 3106 of the sender operate in the manner previously described and with relay 708 operated, a circuit is established from battery over the lower No. 2 contacts of relay 708, conductor 746, through the winding of sender trunk connector relay 4700, conductor 722, brush 4646 of trunk finder 4600, the lower No. 3 contacts of relay 4620, conductor 4630, over the lower No. 3 back contact of relay 3005, through the winding of polarized relay 3008, over the upper No. 4 back contact of relay 3005, through resistance 3036, the upper No. 3 back contact of relay 3005 to ground applied to conductor 3107 by the operation of relay 3106. Relay 3008 thereupon recognizes the call as a second seizure for making a false ground test on the calling line and establishes the circuit of relay 3037 rather than the circuit of relay 3010. The circuit of relay 3037 may be traced from battery through its winding to ground over the inner upper contacts of relay 3008. Relay 3037 upon operating locks over its lower No. 1 contacts to ground applied to conductor 3108 by the operation of relay 3106; establishes the operating circuit for relay 3039 which extends from battery through its winding, over conductor 3040, the upper inner normal contacts of release relay 3103 and conductor 3041 to ground over the upper No. 1 contacts of relay 3037 and supplies a weaker adjustment for the party test relay 3004 by biasing its upper winding over a circuit from battery on conductor 3114, through such winding, over the lower No. 2 contacts of relay 3037 and through resistance 3038 to ground, which resistance is higher than resistance 3012 used for the original party identification test. Relay 3004 under this condition will hold on any condition which caused relay 3004 of the same or another sender to hold on the original test. With relay 3039 operated, a circuit is established from ground over the upper No. 4 contacts of trunk relay 708, the lower No. 3 back contacts of relay 709, conductor 724, brush 4626 of the trunk finder, the lower No. 5 contacts of relay 4620, conductor 4632, the middle lower contacts of relay 3039, conductor 3043, to battery through the winding of end of pulsing relay 3139. Relay 3139 thereupon operates.

Relay 3001 operates over a circuit through its winding over the No. 1 normal contacts of relay 3005 to ground on conductor 3107, following the operation of relay 3106; bridges at its upper No. 5 contacts the upper back contact of relay 3000; bridges at its lower No. 4 contacts the lower back contact of relay 3000 and establishes a circuit from battery on conductor 3114, through the lower winding of relay 3004 and the inner alternate contacts of relay 3001 over the lower No. 5 back contact of relay 3006 to ground on conductor 3110. Relay 3004 upon operating establishes a circuit from ground on conductor 3110, over its front contact, the upper No. 4 front contact of relay 3001 to battery through the winding of slow-to-release relay 3007 which operates and establishes an obvious circuit for relay 3000. Relay 3000 upon operating establishes the circuit of relay 3005 which may be traced from ground over its upper contacts, the upper No. 4 contacts of relay 3037, over the upper No. 1 normal contacts and through the winding of relay 3005 to battery. Relay 3005 operates, locks over its upper No. 1 alternate contacts to ground on conductor 3107; opens the previously traced circuit for relay 3100 and establishes a holding circuit for relay 3000 which may be traced from battery through the winding thereof, over the upper No. 5 contacts of relay 3037 and over the upper No. 2 contacts of relay 3005 to ground on conductor 3107. When relay 3007 operates, it opens the previously traced circuit through the lower winding of relay 3004 and the lower winding of relay 3004 is now presented to the tip and ring conductors of the calling line over a circuit from battery through such winding, the inner normal contacts of relay 3001, the inner alternate contacts of relay 3000 to conductors 4627 and 4628, thence over the upper Nos. 5 and 4 contacts of relay 4620, brushes 4621 and 4622 of the trunk finder, conductors 719 and 720, over the upper No. 2 and the lower No. 1 contacts of relay 708, the upper Nos. 3 and 5 contacts of relay 709 and the upper and lower No. 2 normal contacts of relay 710 (which released following the release of relay 712), thence as traced to the tip and ring conductors of the calling line.

If relay 3004 releases at this time indicating that the tip station ground has been removed and that no false ground condition was encountered, a circuit is established from ground on conductor 3110, over the back contact of relay 3004, conductor 3133, lower back contact of relay 3157, lower front contact of relay 3139, conductor 3042, the upper contacts of relay 3039, conductor 4631, the lower No. 4 contacts of relay 4620, brush 4625 of the trunk finder, conductor 723, the upper No. 3 back contact of relay 709, to a point between the upper winding of relay 708 and resistance 749 whereupon relay 708 is shunted down and releases and opens the previously traced circuit of relay 3139. With relay 3139 released ground applied as previously traced over the back contact of relay 3004 to the inner lower armature of relay 3139, is now extended over the inner lower back contact of relay 3139, conductor 3161 over the lower contacts of the relay 3039 and conductor 3030 to battery through the winding of release relay 3103 of the sender. The sender, trunk finder and sender trunk connector then proceed to release in the manner previously described.

*False ground condition*

If, however, relay 3004 fails to release at this time indicating a false ground condition on the calling line which would render the previously made party test unreliable and since upon the operation of relay 3039 a start circuit was established from ground on conductor 3108, over the lower normal contacts of relay 3044, at the inner upper contacts of relay 3039 to the timing circuit, the timing circuit will, after approximately 10 seconds, establish a circuit over the inner lower contacts of relay 3039 to battery through the upper winding of relay 3044. Relay 3044 thereupon operates; locks over its lower winding and inner lower alternate contacts to ground on conductor 3108; opens the start circuit to the timing circuit; establishes a circuit from ground over its upper contacts and conductor 3045 to battery through the winding of relay 3204 which operates and locks over its lower No. 4 contacts to ground on conductor 3108; establishes a circuit from ground over its middle lower contacts and conductor 3046 to battery through the winding of relay 3226 and prepares a circuit from ground over its lower contacts and conductor 3047. Relay 3204 upon operating causes the operation of a sender trunk connector in the manner previously described. It will be assumed that the sender trunk connector of Fig. 47 is operated, thereby extending the control conductors from the sender to the trunk and to the ticket printer thereof. The circuit previously established to conductor 3047 by the operation of relay 3044 is now extended over the No. 18 contacts of relays 4731F and 4700 and conductor 947 to battery through the lower winding of alarm relay 935 of the trunk. Relay 935 thereupon operates locking through its upper winding and over its upper contacts under the control of alarm release key 936, closing the circuit of alarm lamp 937 and over its lower contacts closing a frame alarm circuit.

Following the operation of the sender trunk connector, relay 3157 of the sender is operated and the start circuit for advancing switch 3250 from its normal position is established as previously described. With relay 3226 now operated, when brush 3254 reaches the No. 1 terminal of its arc, a circuit is established from ground applied over conductor 3159, over the normal contacts of stepping relay 3225, brush 3254 and the No. 1 terminal of its arc, the lower No. 2 front contact of relay 3226, conductor 4723 and thence as previously traced to the (—) distributor segment of the printer 960 of the trunk. When the brush 962 of the distributor, which with the type-wheel was started into rotation by the closure of the motor circuit following the operation of relay 3204 of the sender and the operation of the sender trunk connector, reaches the (—) segment, print magnet 964 is operated to arrest the rotation of the type-wheel to print a dash on the ticket and to control the advance of the brushes 3252 and 3254 of switch 3250 of the sender into engagement with the No. 2 terminals of their arcs in the manner previously described. With brush 3254 in engagement with the No. 2 terminal of its arc, a circuit is established from ground applied over such brush and the lower No. 1 front contact of relay 3226, thence as previously traced to the (—) distributor segment of the printer, whereupon a second dash is printed on the ticket and the switch 3250 is controlled to advance its brushes 3253 and 3254 into engagement with the No. 3 terminals of their arcs.

With brush 3254 in engagement with the No. 3 terminal of its arc, a circuit is established from ground applied thereover, over the upper No. 3 back contact of relay 3227, the upper No. 3 front contact of relay 3226, conductor 3246, terminal (SD) strapped to a terminal in the lower portion of Fig. 38 indicative of the tens digit of the sender number, for example to the No. 0 terminal, and thence as previously traced to the No. 0 distributor segment of the printer. In the manner previously described, when distributor brush 962 engages the No. 0 segment, print magnet 964 is operated to arrest the rotation of the type-wheel to print the digit 0 on the ticket and to control the advance of the brushes 3252 and 3254 of the sender switch 3250 into engagement with the No. 4 terminals of their arcs. With brush 3254 in engagement with the No. 4 terminal of its arc, a circuit is established from ground applied thereover, over the upper No. 2 back contact of relay 3227, the upper No. 2 front contact of relay 3226, conductor 3247, terminal (SD1), strapped to a terminal in the lower portion of Fig. 38 indicative of the units digit of the sender number, for example to the No. 0 terminal, and thence as previously traced to the No. 0 distributor segment of the printer. In the manner previously described, when the distributor brush 962 engages the No. 0 segment, print magnet 964 is operated to arrest the rotation of the type-wheel, to print the digit 0 on the ticket and to control the advance of the brushes of the switch 3250 into engagement with the No. 5 terminals of their respective arcs.

When brush 3254 engages the No. 5 terminal of its arc, a circuit is established from ground applied thereover, over the upper No. 1 back contact of relay 3227, the upper No. 1 front contact of relay 3226, conductor 4723 and thence as traced to the (—) distributor segment of the printer. In the manner previously described, when the distributor brush 962 engages the (—) segment, print magnet 964 is operated to arrest the rotation of the type-wheel, to print a dash on the ticket and to control the advance of the brushes 3252 and 3254 of the switch 3250 into engagement with the No. 6 terminals of their arcs. With brush 3254 now engaged with the No. 6 terminal of its arc, a circuit is established from ground applied thereover, over the lower No. 3 front contact of relay 3226, conductor 3270, the lower front contact of relay 3139, conductor 3342, the upper contacts of relay 3039, conductor 4631, the lower No. 4 contacts of relay 4620 of the trunk finder, brush 4625, conductor 723, the upper No. 3 back contact of relay 709 to a point between the upper winding of relay 708 and resistance 749 thereby causing the release of relay 708. Relay 708 upon releasing opens the previously traced circuit of relay 3139 which releases, and opens the previously traced circuits over which the lower winding of relay 3004 was connected to the conductors of the calling line. The sender, trunk finder and sender trunk connector then proceed to release in the manner previously described. The printer has thus been controlled to print the notation "– – sender number –" on the ticket indicative of the false ground condition.

*Printing the elapsed time*

With relay 708 released following the false ground test, the circuit of relay 801 is established to start the ticket printer to print the elapsed time digits on the ticket. This circuit may be traced from battery through the upper winding of relay 801, over the lower No. 6 contacts of relay 800, conductor 748, the lower No. 4 back contact of relay 715, which released following the release of the trunk finder, the upper No. 3 back contact of relay 708 to ground over the upper back contact of relay 712. With relay 801 operated in the manner just described, or operated in the manner previously described, if the call was not from a tip party, it opens the locking circuit of relay 818 at its lower No. 3 back contact allowing relay 818 to release; closes the circuit from ground over its lower Nos. 1 and 2 contacts, conductor 824, thence over conductor 925 through the printer motor 961 to the commercial source of current for starting the rotation of brush 962 and the type-wheel of the printer; closes a circuit from battery through the winding of relay 906, over conductor 825, the lower No. 3 back contact of relay 818, the upper No. 4 contacts of relay 801 to ground over the upper No. 5 contacts of relay 800 and prepares a circuit for the print magnet 964 which is completed when the distributor brush 962 reaches the (—) segment of the distributor. This circuit may be traced from battery through the magnet 964, the distribututor ring 963, brush 962, the (—) segment, conductor 928, the No. 1 terminal of the arc of switch 850 associated with brush 852, the normal contacts of the pulse-help relay 826, the lower No. 1 back contact of relay 805, the upper No. 3 back contact of relay 818, the upper No. 3 contacts of relay 801, conductor 827 to ground over the lower No. 1 contacts of relay 715. Magnet 964, upon operating, arrests the rotation of the type-wheel, prints a dash on the ticket and establishes a circuit from ground over its contacts, over conductor 929, through the lower No. 4 contacts of relay 801, conductor 828, the upper No. 4 back contact of relay 715, conductor 829 through the winding of pulse-help relay 826 to battery. Relay 826 operates, locks over its lower front contact and conductor 930 to ground over the contacts of magnet 964; opens at its normal contacts the previously traced circuit for magnet 964 which thereupon releases, and closes an obvious operating circuit for stepping magnet 853 of the switch 850. Magnet 964, upon releasing, releases relay 826 which in turn releases magnet 853 whereby the brushes 851 and 852 of switch 850 are advanced into engagement with the No. 2 terminals of their arcs.

With brush 852 on the No. 2 terminal of its arc, ground applied thereto over the normal contacts of relay 826, as previously traced, is applied over the upper No. 1 front contact of relay 801, conductor 802 to the lower movable spring of the off-normal springs 905 associated with the tens timing switch 900. If this switch has not advanced due to the call having been less than ten minutes in duration, the circuit is extended over the lower No. 1 front contact and the upper No. 2 front contact of relay 906, to brushes 955 and 956 of the units timing switch 950. If this switch has not advanced its brush 955 beyond the first two terminals of its arc, indicating a maximum duration of conversation of not more than 15 to 30 seconds, this circuit is further extended over brush 955 and the No. 2 terminal of its arc, the lower No. 2 front contact of relay 906 and conductor 931 to the (*) segment of the distributor. When thereafter the brush 962 engages this segment print magnet 964 is operated to arrest the rotation of the type-wheel, to print an asterisk on the ticket and to cause the advance of the brushes of switch 850 a further step in the manner previously described.

If, however, the units timing switch has advanced beyond the Nos. 1 and 2 terminals of the arc associated with brush 955, the previously traced circuit is extended over either brush 955 or brush 956 and a terminal of its associated arc to either conductor 932 or 933, thence over either the upper No. 1 or the upper No. 3 front contact of relay 906 to the No. 0 distributor segment. In the manner previously described, when the brush 962 engages this segment magnet 964 operates to arrest the rotation of the type-wheel, to print the numeral 0 indicative of the fact that the conversation lasted less than 10 minutes and to cause the advance of the brushes of switch 850.

It will be assumed, however, that the conversation lasted 16 minutes and that therefore the brushes 901 and 902 have been advanced to the No. 1 terminals of their arcs and the off-normal switch 905 has been operated to its alternate position. Therefore, the circuit previously traced to the lower movable spring of the off-normal switch 905 is extended over brush 901 and the No. 1 terminal of its arc to the No. 1 distributor segment and, when the brush 962 engages such segment, print magnet 964 is operated to arrest the rotation of the type-wheel, to print the tens digit 1 of the elapsed time on the ticket and to control the advance of the brush 852 of switch 850 into engagement with the No. 3 terminal of its arc as previously described.

A circuit is now established from ground applied over the normal contacts of relay 826, brush 852, thence over the No. 3 terminal of its arc, conductor 934, brush 954, which is in engagement with one of the first four terminals of its arc to indicate that the conversation terminated some time during the sixth minute of a ten-minute period, to the No. 6 distributor segment. When the brush 962 engages such segment, print magnet 964 is operated to arrest the rotation of the type-wheel, to print the units digit 6 of the elapsed time on the ticket and to cause the advance of brush 852 of switch 850 into engagement with the No. 4 terminal of its arc as previously described.

A circuit is now established from ground applied over the normal contacts of relay 826 to brush 852, thence over the No. 4 terminal of its arc and conductor 931 to the (*) segment of the distributor of the printer, whereupon print magnet 964 is operated when brush 962 engages that segment to arrest the rotation of the type-wheel, to print an asterisk on the ticket and to cause the advance of brushes 850 and 852 of switch 850 to the No. 5 terminal of their respective arcs as previously described. With brush 852 engaging the No. 5 terminal of its arc, the circuit just traced is completed to cause a second asterisk to be printed on the ticket and to cause the advance of the brush 852 to the No. 6 terminal of its arc.

A circuit is now established from ground applied over the normal contacts of relay 826 to brush 852, thence over the No. 6 terminal of its arc and conductor 830 to battery through the winding of relay 709. Relay 709 now operates opening at its upper No. 5 back contact the locking circuit of relay 800 which now releases in turn releasing relay 801. With relay 801 released, the circuit of relay 906 is opened and relay 906 releases. A restoring circuit for units switch 950 is now established from battery through the winding and interrupter contacts of the stepping magnet 957 thereof, over the upper No. 4 back contact of relay 906, conductor 939, the upper No. 3 back contact of relay 800, conductor 940, over the strapped terminals associated with the brush 951 and thence over brush 951 to ground for advancing the brushes 951, 953 and 955 to the No. 22 terminals of their arcs if the switch has not been advanced beyond a half revolution. With the brush 951 engaging the No. 22 terminal of its arc, an obvious self-interrupting circuit for magnet 957 is established for advancing the brushes of switch 950 until brush 952 engages the first terminal of its arc, whereupon the magnet 957 is operated over the circuit previously traced to conductor 940 and thence over strapped terminals of the arc associated with brush 952 and over brush 952 to ground until brush 952 engages the No. 17 terminal of its arc. A circuit is now closed from ground over brush 952 and the No. 17 terminal of its arc, conductor 941, the lower Nos. 4 and 3 back contacts of relay 800, conductor 939, the upper No. 4 back contact of relay 906 to battery over the interrupter contacts and through the winding of magnet 957 to battery. Magnet 957 now operates over this circuit to advance the brushes of switch 950 until the brush 952 engages the No. 19 terminal of its arc, whereupon the previously traced circuit for magnet 957 is effective to advance the brushes of switch 950 into their normal position in which position no circuit is effective to further operate magnet 957.

With brush 951 now in engagement with the No. 1 terminal of its arc, a circuit is established from ground thereover, over the lower No. 1 back contact of relay 906, over the upper springs of off-normal switch 905, if switch 900 has been advanced from normal, conductor 942, the upper No. 2 back contact of relay 800 and conductor 943 to battery through the release magnet 904. Magnet 904 upon operating causes the restoration of the brushes 901 and 902 of switch 900 to their normal positions whereupon the off-normal switch 905 is restored to release magnet 904. With switch 905 in its normal position, a circuit is established from ground over brush 951, the lower No. 1 back contact of relay 906, the lower normal contact of switch 905, conductor 802, the upper No. 1 back contact of relay 801, the upper contacts of off-normal switch 855 of switch 850, the upper back contact of relay 713, the upper No. 4 back contact of relay 715, the lower back contact of relay 711 to battery through release magnet 854 of the switch 850 whereupon this switch is restored to normal. All of the operated apparatus of the trunk has now been restored to normal. The ticket now has printed thereon all of the information required for billing the call. The ticket printed as previously described for the assumed call would have the following notations:

283–9095–1225096–000–627–1345– –52–16

If the sender had, upon the ground test detected an unstandard ground, the ticket printed would appear as follows:

283–9095–1225096–000–627–1345– –52– –00–16

*Call duration over 99 minutes*

When a conversation reaches 99 minutes in duration, the tens timing switch 900 is advanced to position its brushes 901 and 902 upon the No. 10 terminals of their arcs by the circuit previously traced over the No. 16 terminal of the arc associated with brush 956 of the units switch after the units switch has made nine complete revolutions. Since the brushes of switch 900 are advanced from the No. 9 to the No. 10 terminals of their arcs upon the closure of the circuit of stepping magnet 903 upon the engagement of the brush 956 with the No. 16 terminal of its arc and switch 950 is not advanced a further step until this impulse ceases, switch 950 is prevented from advancing beyond the No. 17 terminal position of the arcs associated with brushes 952, 954 and 956. With brush 952 engaging the No. 17 terminal of its arc, a circuit is established from ground thereover, over brush 902 and the No. 10 terminal of its arc, conductor 944 through the lower winding of relay 801 and conductor 945 to battery through the winding of alarm relay 935. Relay 935 operates and locks thereby causing lamp 937 to light and closes the alarm circuit. Relay 801 upon operating, causes the printer motor 861 to operate. The printing of the elapsed time proceeds in the manner previously described, a dash being printed in position 1 of switch 850, a tens digit 9 being printed in position 2 of switch 850, a dash instead of a units digit 0 being printed in position 3 of switch 850 to provide a positive check against printing a 9 instead of a 0 should the path for advancing the switch 950 be open due to a trouble condition when brush 955 reaches the No. 18 terminal of its arc, and asterisks being printed when switch 850 is in positions 4 and 5. Thus for a time interval of over 99 minutes, a first notation of 9–** is printed on the ticket.

When switch 850 reaches position 6 a circuit is established for operating relay 709 which releases relay 800, followed by the release of switches 850, 900 and 950. When switch 950 becomes restored to normal, relay 801 releases followed by the release of relay 906. The rotation of the printer shaft is now arrested. If the call is not abandoned at this time, the fact that relays 712 and 813 are still operated causes the reoperation of relays 800 and 810 as previously described and the resetting of the timing switches 900 and 950 as previously described for the interval over 100 minutes. When the calling subscriber terminates the conversation and restores his receiver to the switchhook, the printing of the elapsed time over 100 minutes is done in the manner previously described.

*Non-ticketed call*

On a call which is not to be ticketed, relay 3217 of the sender and relay 805 of the trunk will both be operated. The operation of relay 805 of the trunk opens at its lower No. 1 back contact the circuit previously traced over which ground was applied to the segments of the printer for controlling the printing of the digits designating the duration of the conversation; opens at its lower No. 3 back contact the previously traced circuit controlled by relay 743 for periodically advancing the timing switches 900 and 950 and, at its upper Nos. 4 and 5 contacts, reverses the connection of battery and ground through the windings of the calling supervisory relay 806 so that when the called supervisory relay 813 operates following the response of the called subscriber, and the operation of the reversing relay 817, there will be no reversal of current over the calling line loop in order to cause the charge apparatus to function in the message rate or coin trunk.

With relay 3217 of the sender operated, the circuit previously traced over its lower back contact for moving the printer control switch 3250 off-normal is not effective, the circuit previously traced over its inner upper back contact for operating reversing relay 3100 is not effective and the circuit over either one of its two uppermost back contacts for operating either relay 3018 or 3021 is also not effective to call in a sender trunk connector as previously described. Also, a circuit is established by the operation of relay 3217 from ground over the lower No. 3 front contact of relay 3204, the lower front contact of relay 3217, conductor 3269, over the lower contacts of relay 3028 (if the previously made party test found a tip party calling) over the upper back contact of relay 3157, conductor 3259, the front contacts of relay 3026, conductor 3030 to battery through the sender release relay 3103, or from conductor 3269 over the inner lower contacts of relay 3029 if the party test found a ring party calling, over the front contacts of relay 3026 and conductor 3030 to battery through the winding of sender release relay 3103. Relay 3103 upon operating proceeds to release the sender and the trunk finder in the manner previously described.

*Denied service*

If the attempted call is denied to the calling subscriber and relay 732 of the trunk is therefore operated as previously described, a circuit is established from ground over its upper No. 3 contacts and conductor 750, and an interrupter circuit is established over the upper No. 1 contacts and conductor 751 to the "no-such number tone circuit," whereby such circuit applies an interrupted tone current over conductors 752 and 753 and the upper Nos. 3 and 4 contacts of relay 732, thence over the calling line loop as a signal that the connection cannot be established. At its lower No. 2 contacts relay 732 extends its operating ground to the winding of the cut-through relay 710 which thereupon operates and releases relay 709. With relay 709 released, the circuit for holding relay 3800 operated which was traced in part from conductor 720 over the lower No. 1 normal contacts of relay 709, through resistance 731, the lower No. 2 back contact of relay 714, the lower No. 3 back contact of relay 732 to conductor 719, is opened by the operation of relay 732 and relay 3800 of the sender releases thereby initiating the release of the sender and the release of the trunk finder. The calling subscriber upon hearing the tone restores his receiver thereby releasing the operated selector switches and restoring the trunk to normal.

*Failure to identify the calling line*

If for any reason the identifier fails to identify the calling line number, the sender functions to establish connection with a monitoring operator's position over a trunk circuit which is common to a group of senders. This arrangement permits the completion of such calls through the ticketing equipment so as to prevent overload conditions should the identification failure be common to a number of subscribers. Whenever, on a second trial the identifier is unable to identify the calling number, relay 3222 is operated as previously described and when relay 3201 operates at the completion of dialing, it establishes a circuit from battery through the winding of relay 3203 over the inner upper contacts of relay 3201, the upper No. 3 front contact of relay 3208 and the upper contacts of relay 3222 to ground. Relay 3203 upon operating establishes a circuit from battery through resistance 3207 over the lower front contact of relay 3220, conductor 4032, the upper front contact of relay 4007, conductor 3295, the lower No. 1 normal contacts of relay 3204, the upper front contact of relay 3203, conductor 3271, upper back contact of relay 3838, winding of preference relay 3839F individual to the first of the group of senders, thence over the inner lower normal contacts of such preference relay and the inner lower normal contacts of the preference relays such as relays 3839I of intermediate senders and over the inner lower normal contacts of preference relay 3839L of the last sender to ground if no other succeeding sender of the group has taken the monitoring trunk for use.

Relay 3839F upon operating establishes a locking circuit for itself from battery over conductor 3271, over its lower front contact through its winding and over its inner lower alternate contacts to ground independent of the contacts of relay 3838 or of the other preference relays, and establishes the circuit of relay 3838 over its inner upper contacts, which relay upon operating also causes the operation of relay 3840. Relays 3838 and 3840 upon operating, open at their back contacts the operating circuits for the preference relays of all senders of the group. Relay 3839F, however, remains operated over the locking circuit just traced. Relay 3838 at its lower front contact also establishes a circuit for lamp 3841, associated with the jack 3842 at the monitor's position.

When the monitoring operator answers by plugging a cord circuit of her position into the jack 3842, a circuit is established for sleeve relay 3843 which upon operating completes a circuit from ground over the upper front contact of relay 3839F, conductor 3272 to battery through the winding of relay 3200. Relay 3200 upon operating establishes a holding circuit for relay 3800 extending from battery through the lower winding thereof, over conductor 3102 to ground over its upper No. 2 and lower No. 3 contacts; establishes a circuit from battery through the winding of relay 3227 to ground over its lower No. 1 front contacts and at its upper No. 1 and lower No. 2 contacts, transfers the connection from the tip and ring conductors extending back to the calling line from the windings of relay 3800 to conductors 3273 and 3274 and thence to the monitoring operator's headset. The monitoring operator may now talk with the calling subscriber to secure from him the number of his line and the number of the line which he has called and to inform such subscriber that the call will be completed. The sender remains in this condition until the operator disconnects, whereupon relay 3200 releases. With relay 3227 locked operated over its lower No. 2 contacts to ground on conductor 3113, following the release of relay 3200, a circuit is now established from ground over the lower No. 1 back contact of relay 3200, the lower No. 3 contacts of relay 3227, to battery through the winding of relay 3204. Relay 3204 now operates, locks, permits the continuation of outpulsing to set up the connection to the wanted line, causes the association of the sender with the ticketing trunk over the sender trunk connector and at its lower No. 1 contacts opens the previously traced circuit of relay 3839F which releases in turn releasing relays 3838 and 3840 and extinguishing the lamp 3841. Relay 3204 also establishes the previously traced circuit for starting switch 3250.

Since at this time relay 3227 is operated and in operating has caused the operation of relay 3231, the ticket printer will print zeros for the calling office code, calling line number, class and rate since the sender has not been able to secure the proper calling line identification and class information. During the advance of brush 3254 of switch 3250 over the Nos. 2 and 3 terminals of its arc, two asterisks will be printed on the ticket as previously described and thereafter brush 3254 will be advanced into engagement with the No. 4 terminal of its arc. With brush 3254 engaged on the No. 4 terminal, a circuit is established from ground thereover, over the upper No. 3 front contact of relay 3227 to the No. 0′ terminal, strapped to the No. 0′ terminal of Fig. 38, and thence to the No. 0 distributor segment of printer 960 for controlling the printer to print the digit 0. In Nos. 5 and 6 positions of the brush 3254, similar circuits are established over the upper Nos. 2 and 1 front contacts of relay 3227 to the No. 0 segment of the printer distributor whereby two additional zeros are printed. Thus three zeros are printed on the ticket in place of the office code digits. In position 7 brush 3254 controls the printing of a dash and in the following positions 8, 9, 10 and 11 of brush 3254, circuits are established over the upper Nos. 3, 2 and 1 and the lower No. 1 front contacts of relay 3231 for controlling the printer to print four successive zero digits on the ticket in place of the calling line number. From this point, as switch 3250 advances its brushes from position to position, the printer is controlled to print the digits indicative of the month, the day of the month, the hour of the day, and the fraction of the hour of the time when the call was made, to print the sender and identifier numbers and to print the called office code and called line number in the manner previously described. After these printing operations have been completed, switch 3250 will have advanced its brush 3253 into engagement with the No. 16 terminal of its arc.

With relay 3231 operated, when brush 3253 engages the No. 16 terminal of its arc, a circuit is established from ground thereover, over the lower No. 3 front contact of relay 3231 to the No. 0′ terminal, strapped to the No. 0′ terminal of Fig. 38 and thence to the No. 0 distributor segment of the printer, whereupon the printer is controlled to print a zero on the ticket in place of the usual class identification digit. Following the printing of this digit when the brush 3253 engages the No. 17 terminal of its arc a similar circuit is established over the lower No. 2 front contact of relay 3231 for controlling the printer to print another zero on the ticket in place of the usual charge rate digit. The sender trunk connector and trunk finder are thereafter released and the ticket printer of the trunk is controlled to print digits on the ticket indicative of the elapsed time of the conversation as soon as the calling subscriber restores his receiver to terminate the conversation all in the manner previously described. The printed ticket will thus lack the calling line identification, the calling line class identification and the call rate to be charged, but this information may be supplied from the information which the monitoring operator has secured from the calling subscriber.

*Sender monitor busy*

As before stated the trunk to the sender monitor's position is common to a group of senders. Whenever the trunk is busy and relays 3838 and 3840 are operated through the operation of the preference relay 3839 of the sender which has taken such trunk for use, the circuits of the preference relays of all other senders of the group are opened at the back contacts of relays 3838 and 3840 and the preference relay of no other sender may be operated. Therefore if any other sender, for example, the sender disclosed, should attempt to seize the trunk, a circuit will be established from ground over the upper front contact of relay 3838, over the upper back contact of the preference relay 3839F of such sender, conductor 3275, the lower contacts of relay 3203 to battery through the winding of relay 3227. Relay 3227 thereupon operates, locks and establishes the circuit of relay 3231 which also operates. Since relay 3280 is not operated under this condition, the circuit of relay 3204 is established over the lower No. 3 contacts of relay 3227 and the lower No. 1 back contact of relay 3280 as soon as relay 3227 operates and the ticket will be printed as previously described.

What is claimed is:

1. In a telephone system, a plurality of lines, divided into thousand-line groups, each group of lines being further subdivided into hundred-line subgroups, thousands transformers corresponding to the thousand-line groups of lines, each having two differentially wound primary windings with their inner terminals connected to ground and their outer terminals connected respectively to conductors of one half of the associated thousand groups of lines, a plurality of calling line identifiers, means responsive to the extension of a connection from a calling line for seizing an idle one of said identifiers, and for connecting a source of identifying potential to the conductor of said calling line and means in said identifier responsive to the potential applied from said conductor through one of said transformers for first determining the thousands group in which the conductor to which said potential has been applied is located and for making a registration indicative thereof, means for then determining the hundreds subgroup of such thousands group in which said conductor is located, and for making a registration indicative thereof, means for then determining the tens subgroup of such hundreds group in which said conductor is located and for making a registration thereof, and means for finally locating the conductor in said tens group and for making a registration thereof.

2. In a telephone system, a plurality of lines divided into thousand-line groups, each group of lines being further subdivided into hundred-line subgroups, thousands transformers corresponding to the thousand line groups of lines in the primary winding of each of which a conductor of each of the lines of the corresponding thousand-line group terminates, a plurality of calling line identifiers, means responsive to the extension of a connection from the calling line for seizing an idle one of said identifiers and for connecting a source of identifying potential to the said conductor of the calling line, means in said identifier for determining the thousands group in which the conductor to which said potential has been applied is located, and means common to said identifiers and associable with the identifier taken for use having relay means for connecting the secondary windings of said transformers to the determining means of said identifier whereby said means is selectively operated to make a registration of the thousands designation of said calling line.

3. In a telephone system, a plurality of offices, each having a plurality of lines divided into thousand-line groups, each group of lines being further subdivided into hundred-line subgroups, a group of thousands transformers corresponding to the thousand-line groups of lines for each office, in the primary winding of each of which transformers, a conductor of each of the lines of the corresponding thousand-line group terminates, a plurality of calling line identifiers common to all of said offices, means responsive to the extension of a connection from any one of said lines for seizing an idle one of said identifiers and for connecting a source of identifying potential to said conductor of the calling line, means in said identifiers for determining the thousands group of an office in which the conductor to which said potential has been applied is located, means common to said identifiers and associable with the identifier taken for use having relays therein corresponding to said offices, means in said identifier for successively operating said relays to associate the secondary windings of all the thousands transformers of each office with the determining means of said identifier, and means controlled thereby for registering the office and the thousands designation of the calling line of such office.

4. In a telephone system, a plurality of lines divided into groups and subgroups, some of which are denied a particular type of service, means responsive to the extension of a connection from a calling line for connecting a source of identifying potential to a conductor of said calling line, and an identifying means common to said lines responsive to the potential on said conductor for producing signals constituting an identification of the number of any calling line to which service is not denied and for producing a special signal if the calling line is one to which service should be denied.

5. In a telephone system, a plurality of lines divided into thousand-line groups, each group of lines being further divided into hundred-line subgroups, some of which are denied a particular type of service, thousands transformers corresponding to the thousand-line groups of lines in the primary winding of each of which a conductor of each of the lines of the corresponding thousand-line group terminates, a transformer in the primary winding of which a conductor of each line to which said service is to be denied terminates, a plurality of calling line identifiers, means responsive to the extension of a connection from a calling line for seizing an idle one of said identifiers and for connecting a source of identifying potential to said conductor of the calling line, means in said identifier for determining the thousands group in which the conductor to which said potential has been applied is located, means common to said identifiers and associable with the identifier taken for use for connecting the secondary winding of said thousands and denied service transformers to the determining means of said identifier and means controlled by said determining means to make a registration of the thousands digit of the calling line if said line is permitted service or to operate a denied service relay if service is to be denied.

6. In a telephone system, a plurality of offices each having a plurality of lines divided into thousand-line groups, each group of lines being further subdivided into hundred-line subgroups, some of which are denied a particular type of service, a group of ten thousands transformers corresponding to the possible ten thousand-line groups of lines for each office in the primary winding of each of which transformers a conductor of each of the lines of the corresponding thousand-line group terminates, a transformer common to all of said offices in the primary winding of which the conductor of each line to which said service is to be denied terminates, cross-connecting means for connecting the secondary winding of said latter transformer in lieu of the secondary winding of a thousands transformer of one of said offices not required in the identification of a thousand group of lines, a plurality of calling line identifiers, means responsive to the extension of a connection from a calling line for seizing an idle one of said identifiers and for connecting a source of identifying potential to said conductor of the calling line. means in said identifier for determining the thousands group of an office in which the conductor to which said potential has been applied is located, means common to said identifiers and associable with the identifier taken for use having relays therein corresponding in number to said offices, means in said identifier for successively operating said relays to associate the secondary windings of all the thousands transformers of certain of said offices and the employed thousands transformer windings and said denied service transformer winding of said particular office with said determining means and means controlled by said determining means to make a registration of the thousands digit of the calling line if said line is permitted service or to operate a denied service relay if serve is to be denied.

7. In a telephone system, a plurality of offices, each having a plurality of lines divided into thousand-line groups, each group of lines being further subdivided into hundred-line subgroups, a group of thousands transformers corresponding to the thousand-line groups of lines for each office in the primary winding of each of which transformers a conductor of each of the lines of the corresponding thousand-line group terminates, a plurality of calling line identifiers common to all of said offices, means responsive to the extension of a connection from any one of said lines for seizing an idle one of said identifiers and for connecting a source of identifying potential to said conductor of the calling line, means in said identifier for determining the thousands group of an office in which the conductor to which said potential has been applied is located, means common to said identifiers and associable with the identifier taken for use having relays therein corresponding in number to said offices, means in said identifier for successively operating said relays to associate the secondary windings of all the thousands transformers of each office with the determining means, means responsive to said determining means for registering the thousands group in which the calling line is located, a thousand group connector relay individual to the office of the calling line operative in response to said registering means, and means operated in response to said connector relay to register the office and the thousands digits of the calling line.

8. In a telephone system, a plurality of lines including party lines, said plurality of lines being divided into groups and subgroups, each of said lines having one or more stations thereon, and each of said stations having a directory number individual thereto, means responsive to the extension of a calling line for connecting a source of identifying potential to a conductor of said calling line, and an identifying means common to said lines responsive to the potential on said conductor comprising circuit networks connectable to said conductor for producing signals constituting an identification of the calling party subscriber's directory number.

9. In a telephone system, a plurality of two-party lines divided into groups and subgroups, an identifying conductor allocated to each substation of each party line, two groups of transformers each group having as many transformers as there are groups of lines, the conductors allocated to all ring party substations terminating in the proper transformers of one group and the conductors allocated to the tip party substations terminating in the proper transformers of the other group, a plurality of calling line identifiers responsive to the extension of a connection from any one of said lines for connecting a source of identifying potential to said conductor of the calling substation, means for determining whether the call was originated by a tip or ring party on the calling line, means in said identifier responsive to said potential for determining the group of the calling line and means dependent upon said party determining means for associating one or the other of said groups of transformers with said group determining means.

10. In a telephone system, a plurality of offices each having a plurality of two-party lines divided into groups and subgroups, an identifying conductor allocated to each substation of each party line, two groups of transformers for each office, each of which has as many transformers as there are groups of lines, the conductors allocated to all tip party substations terminating in the proper transformers of one group and the conductors allocated to all ring party substations terminating in the proper transformers of the other group, a plurality of calling line identifiers, means responsive to the extension of a connection from any one of said lines for seizing an idle one of said identifiers and for connecting a source of identifying potential to said conductor of the calling substation, means for determining whether the call was originated by a tip or a ring party on the calling line, means in said identifier responsive to said potential for determining the group of the calling substation, means common to said identifiers and associable with the identifier taken for use having one group of tip party relays individual respectively to said offices and a group of ring party relays individual respectively to said offices, and means dependent upon said party determining means for successively operating said tip or ring party relays for associating the tip party groups of transformers of said offices or for associating the ring party groups of transformers of said offices with the group determining means of said identifier.

11. In a telephone system, a plurality of offices each having a plurality of lines divided into groups and subgroups, a plurality of calling line identifiers common to all of said offices, means responsive to the extension of a connection from any one of said lines for seizing an idle one of said identifiers and for connecting a source of identifying potential to a conductor of the calling line, means in said identifier responsive to said potential for determining the office and the group and the subgroup thereof in which said conductor is located and the terminal position of said conductor, means for successively associating the line groups of said offices with said determining means, means operative if the identifying potential is not detected in any line group of any office on a first trial for causing the successive association of the line groups with said determining means on a second trial, and means operative if the identifying potential is not then detected for giving a trouble alarm.

12. In a telephone system, a plurality of offices each having a plurality of lines divided into thousand-line groups, each group of lines being further subdivided into hundred-line groups, thousands transformers corresponding to the thousand-line groups of lines in the primary winding of each of which a conductor of each of the lines of the corresponding thousand-line group terminates, a plurality of calling line identifiers, means responsive to the extension of a connection from a calling line for seizing an idle one of said identifiers and for connecting a source of identifying potential to said conductor of the calling line, means in said identifier for determining the thousands group of an office in which the conductor to which said potential has been applied is located, means common to said identifiers and associable with the identifier taken for use for successively associating the secondary windings of all the thousands transformers of each office with the determining means of said identifier, and means operative upon the detection of the potential through a transformer of an office to render said transformer of such office ineffective.

13. In a telephone system, a plurality of offices each having a plurality of two-party lines divided into groups and subgroups, an identifying conductor allocated to each substation of each party line, tip and ring field groups of transformers for each office, each of which has as many transformers as there are groups of lines, the conductors allocated to all tip party substations terminating in the proper transformers of the tip field group and the conductors allocated to all ring party substations terminating in the proper transformers of the ring field group, a plurality of calling line identifiers, means responsive to the extension of a connection from any one of said lines for seizing an idle one of said identifiers and for connecting a source of identifying potential to said conductor of the calling substation, means for determining whether the call was originated by a tip or a ring party on the calling line, means in said identifier responsive to said potential for determining the group of the calling substation, means common to said identifiers and associable with the identifier taken for use for successively associating the groups of tip field transformers or the groups of ring field transformers of said offices with the group determining means of said identifier, and means in each identifier when associated with said common means for informing all other identifiers as to whether said first identifier is functioning with tip or ring field groups of transformers.

14. In a telephone system, a plurality of offices having a plurality of two-party lines divided into groups and subgroups, an identifying conductor allocated to each substation of each party line, tip and ring field groups of transformers for each office, each of which has as many transformers as there are groups of lines, the conductors allocated to all tip party substations terminating in the proper transformers of the tip field group and the conductors allocated to all ring party substations terminating in the proper transformers of the ring field group, a plurality of calling line identifiers, means responsive to the extension of a connection from any one of said lines for seizing an idle one of said identifiers and for connecting a source of identifying potential to said conductor of the calling substation, means in said identifier responsive to said potential for determining the group of the calling substation, means common to said identifiers and associable with the identifier taken for use for successively associating the groups of tip field transformers or the groups of ring field transformers of said offices with the group determining means of said identifier, and means in said identifier for holding said common means and for delaying said group determination if any other identifier is at the time making a line identification involving the other party field.

15. In a telephone system, a plurality of lines, means including trunks for extending connections from said lines, said trunks being grouped in accordance with the class of the lines which have access thereto, a class transformer for each class of line to the primary winding of each of which is connected to a conductor of each trunk of that class group, a plurality of calling line identifiers, means operative in response to the extension of a connection from any line for seizing an idle one of said identifiers and for connecting a source of identifying potential to the conductor of the trunk included in the established connection, a plurality of detector circuits corresponding in number to said class transformers, a class register relay associated with each circuit and means common to said identifiers and associable with the identifier taken for use for associating the secondary windings of said class transformers with said detector circuits whereby one of said detector circuits is operated in response to said potential to cause a registration of the class of the calling line.

16. In a telephone system, a plurality of lines divided into thousand-line groups, each group of lines being further subdivided into hundred-line subgroups, thousands transformers corresponding to the thousand-line groups of lines in the primary winding of each of which a conductor of each of the lines of the corresponding thousand-line group terminates, means including trunks over which connections are extended from calling lines, class of service transformers associated with different groups of trunks, a plurality of identifiers, means responsive to the extension of a connection from a calling line for seizing an idle one of said identifiers and for connecting a source of identifying potential to the class transformer associated with the established connection and to said conductor of the calling line, means in said identifier for determining the thousands group in which the conductor to which said potential has been applied is located, means for determining the class of the calling line, and means common to said identifiers and associable with the identifier taken for use for connecting the secondary windings of the thousands transformers with said group determining means and for connecting said class transformers with said class determining means.

17. In a telephone system, a plurality of lines divided into thousand-line groups, each group of lines being further subdivided into hundred-line subgroups, thousands transformers corresponding to the thousand-line groups of lines in the primary winding of each of which said conductor of each of the lines of the corresponding thousand-line group terminates, means including trunks for extending connections from said lines, said trunks being grouped in accordance with the class of the lines which have access thereto, a class transformer for each class of line to the primary winding of each of which is connected a conductor of each trunk of that class group, a plurality of calling line identifiers, means operative in responsive to the extension of a connection from any line for seizing an idle one of said identifiers and for connecting a source of identifying potential to the conductor of the trunk included in the connection and to the conductor of the calling line, means in said identifier for determining the thousands group in which the conductor to which said potential has been applied is located, means for determining the class of the calling line, means common to said identifiers and associable with the identifier taken for use for connecting the secondary windings of the thousands transformers with said group determining means and for connecting the secondary windings of said class transformers to said class determining means and means operative following the determination of the thousands group and the class for dismissing said common means.

18. In a telephone system, a plurality of offices each having a plurality of lines divided into thousand-line groups, each group of lines being further subdivided into hundred-line subgroups, a group of thousands transformers corresponding to the thousand-line groups of lines for each office in the primary winding of each of which transformers a conductor of each of the lines of the corresponding thousand-line groups terminates, a plurality of calling line identifiers common to all of said offices, means responsive to the extension of a connection from any one of said lines for seizing an idle one of said identifiers and for connecting a source of identifying potential to said conductor of the calling line, a group of twenty detector circuits in said identifier, means common to said identifiers and associable with the identifier taken for use having relays therein corresponding in number to said offices, means in said identifier for successively operating said relays in pairs to associate the secondary windings of all the thousands transformers of pairs of offices with said detector circuits, and means controlled by said circuits for registering the office and the thousands designations of the calling line of the calling office.

19. In a telephone system, a plurality of lines divided into groups and subgroups and into classes, a plurality of recorders each having a plurality of registers, means responsive to the extension of a connection from a calling line for associating an idle one of said recorders with the established connection, a plurality of calling line identifiers, means responsive to the seizure of a recorder for associating an idle identifier therewith, and for connecting a source of identifying potential to a conductor of the calling line, means in said identifier operative responsive to said potential for causing the registration of digits indicative of the number of the calling line and for registering the class of the calling line, means for transferring said registrations to corresponding registers of the associated recorder, checking means operative upon the complete transfer of said registrations, means operative upon the failure of such checking means to operate for operating an alarm device and for signaling the recorder, and means in said recorder responsive to said signal for releasing said identifier and for seizing another identifier to make a second attempt to identify the calling line.

20. In a telephone system, a plurality of lines divided into groups and subgroups and into classes, a plurality of recorders each having a plurality of registers, means responsive to the extension of a connection from a calling line for associating an idle one of said recorders with the established connection, a plurality of calling line identifiers, means responsive to the seizure of a recorder for associating an idle identifier therewith and for connecting a source of identifying potential to a conductor of the calling line, means in said identifier operative responsive to said potential for causing the registration of digits indicative of the number of the calling line and for registering the class of the calling line, means in said identifier for timing the successive steps of its operation, an alarm device, means operative in the event said identifier fails to complete a step of its operation within the required time interval for operating said alarm device and for signaling the associated recorder, and means in said recorder responsive to said signal for releasing said identifier and for causing another identifier to make a second attempt to identify the calling line.

21. In a telephone system, a plurality of two-party message rate lines divided into groups and subgroups, an identifying conductor allocated to each substation of each party line, a group of transformers having as many transformers as there are groups of lines, the conductors allocated to all of the tip and ring party substations terminating in the proper transformers of said group in accordance with the thousands digit designation of a party station subscriber, a plurality of calling line identifiers, means including a trunk for extending a connection from a calling line to an idle one of said identifiers, means in said trunk for determining whether the call originated from a tip or from a ring station on the calling line, means in said identifier for connecting a source of identifying potential to the conductor allocated to the calling party station under the control of said trunk means, means in said identifier responsive to the application of said potential to one of said transformers for determining the group or thousands digit designation of the calling substation, and means thereafter effective to determine the other identifying digits of the calling substation.

22. In a telephone system, an exchange having a group of lines extending thereto, a tester, switching mechanism having access to each of the lines in said group, a number of digit registers, means for operating said digit registers successively, means controlled by the operation of said digit registers for causing said switching mechanism to connect the progressively smaller subgroups of said group of lines including a calling line to said tester and then to connect the calling line in the smallest subgroup of said group of lines to said tester, and means controlled jointly by said tester and said switching mechanism for governing said first-mentioned means, thereby to cause said digit registers to identify the calling line in said group of lines.

23. In a telephone system, a calling subscriber line of the party type, a called line, apparatus for setting up a connection between said lines, and means for detecting both the particular designation of said calling subscriber line and the particular designation of the calling subscriber substation on said calling subscriber line.

24. In a telephone system, a party line, a plurality of stations on said party line having corresponding designations individual thereto, apparatus controllable from any calling one of said stations for setting up a connection from said party line, detecting means, and means in said apparatus including said detecting means for detecting both the particular designation of said party line and the particular designation of the calling station on said party line.

25. In a telephone system, a plurality of private lines, each of said private lines being provided with a single terminal individual thereto having a corresponding individual designation, a plurality of party lines, each of said party lines being provided with several terminals individual to the several stations thereon having corresponding individual designations, apparatus for setting up calls from said lines, and automatic means for registering in conjunction with each call the particular terminal designation of the calling private line or the particular terminal designation of the calling party line corresponding to the calling station thereon.

26. In a telephone system, a plurality of party lines, a number of stations on each of said party lines, each of said party lines being provided with a number of terminals individually corresponding to the stations thereon, corresponding ones of the terminals of said party lines being arranged in a number of groups, whereby the various terminals in a given group correspond to similarly positioned stations on said party lines, a detector having access to said terminals, and means responsive to the extension of a call from a given station on a given party line for causing said detector to detect the terminal of said given party line in the corresponding group of terminals, thereby to identify both said given party line as the calling line and said given station as the calling station thereon.

JOHN W. GOODERHAM.

REFERENCES CITED

The following references are of record in the file of this patent:

UNITED STATES PATENTS

| Number | Name | Date |
|---|---|---|
| 1,678,185 | Harper | July 24, 1928 |
| 1,733,466 | Nelson | Oct. 29, 1929 |
| 1,859,924 | Johnson et al. | May 24, 1932 |
| 2,084,105 | Myers | June 15, 1937 |
| 2,092,465 | Matthies | Sept. 7, 1937 |
| 2,196,250 | Collis et al. | Apr. 9, 1940 |
| 2,232,371 | Dehn et al. | Feb. 18, 1941 |
| 2,272,475 | Ostline | Feb. 10, 1942 |
| 2,299,212 | Collis et al. | Oct. 20, 1942 |
| 2,369,062 | McDovitt | Feb. 6, 1945 |
| 2,447,494 | Deakin | Aug. 24, 1948 |
| 2,484,612 | Dehn et al. | Oct. 11, 1949 |